US011751593B2

(12) United States Patent
Shi et al.

(10) Patent No.: US 11,751,593 B2
(45) **Date of Patent: *Sep. 12, 2023**

(54) SWEETENER AND FLAVOR COMPOSITIONS, METHODS OF MAKING AND METHODS OF USE THEREOF

(71) Applicants: EPC Natural Products Co., Ltd., Beijing (CN); Weiyao Shi, Bethlehem, PA (US)

(72) Inventors: Jingang Shi, Beijing (CN); Hansheng Wang, Beijing (CN); Thomas Eidenberger, Wels (AT)

(73) Assignee: EPC NATURAL PRODUCTS CO., LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,945

(22) Filed: Nov. 7, 2019

(65) Prior Publication Data

US 2020/0138071 A1 May 7, 2020

Related U.S. Application Data

(63) Continuation-in-part of application No. 16/402,641, filed on May 3, 2019.

(60) Provisional application No. 62/841,858, filed on May 2, 2019, provisional application No. 62/819,980, filed on Mar. 18, 2019, provisional application No. 62/775,983, filed on Dec. 6, 2018, provisional application No. 62/771,485, filed on Nov. 26, 2018, provisional application No. 62/668,580, filed on May 8, 2018.

(51) Int. Cl.

| | |
|---|---|
| ***A23L 27/30*** | (2016.01) |
| ***A23L 27/21*** | (2016.01) |
| ***A23L 2/60*** | (2006.01) |
| ***A23L 27/10*** | (2016.01) |
| *A23L 2/64* | (2006.01) |

(52) U.S. Cl.

CPC ................ *A23L 27/36* (2016.08); *A23L 2/60* (2013.01); *A23L 27/215* (2016.08); *A23L 2/64* (2013.01); *A23L 27/10* (2016.08); *A23L 27/11* (2016.08); *A23L 27/115* (2016.08); *A23V 2002/00* (2013.01)

(58) Field of Classification Search

CPC .......... A23L 27/36; A23L 27/10; A23L 27/11; A23L 27/115; A23L 27/215; A23L 2/60; A23L 2/64

See application file for complete search history.

(56) References Cited

U.S. PATENT DOCUMENTS

| | | | | |
|---|---|---|---|---|
| 3,620,772 | A | 11/1971 | Kitada et al. | |
| 5,089,278 | A | 2/1992 | Haynes et al. | |
| 7,029,717 | B1 | 4/2006 | Ojima et al. | |
| 2011/0091635 | A1 * | 4/2011 | Abelyan | A23L 2/60 426/599 |
| 2011/0189367 | A1 | 8/2011 | Sagalowicz et al. | |
| 2012/0088671 | A1 * | 4/2012 | Quave | A61K 38/12 504/136 |
| 2015/0216209 | A1 | 8/2015 | Lyndon et al. | |
| 2016/0029677 | A1 | 2/2016 | Prakash et al. | |
| 2016/0183575 | A1 | 6/2016 | Galaev et al. | |
| 2016/0235102 | A1 * | 8/2016 | Oglesby | A23L 2/60 |
| 2017/0311633 | A1 * | 11/2017 | Heidebach | A23G 9/32 |
| 2017/0339994 | A1 * | 11/2017 | Purkayastha | A23L 27/86 |
| 2018/0116266 | A1 | 5/2018 | Jackson et al. | |

FOREIGN PATENT DOCUMENTS

| | | | | |
|---|---|---|---|---|
| CN | 104397371 | A | 3/2015 | |
| KR | 100 888 694 | B1 | 3/2009 | |
| WO | 2009/140568 | A1 | 11/2009 | |
| WO | 2016/157868 | A1 | 10/2016 | |
| WO | WO-2016157868 | A1 * | 10/2016 | A23L 27/00 |
| WO | 2017/035524 | A1 | 3/2017 | |
| WO | 2017/214026 | A1 | 12/2017 | |

OTHER PUBLICATIONS

Lund, N.L., Ray, C.A., "Control of Maillard Reactions in Foods: Strategies and Chemical Mechanisms", 2017, Journal of Agricultural and Food Chemistry, vol. 65, pp. 4537-4552 (Year: 2017).*

Marković et al., "Chemical composition of leaf extracts of Stevia rebaudiana Bertoni grown experimentally in Vojvodina", 2008, Journal of the Serbian Chemical Society, vol. 73(3), pp. 283-297 (Year: 2008).*

"What temperature does the Maillard reaction occur?", 2015, Seasoned Advice (Year: 2015).*

Karaköse, H., "Phytochemical Characterization of Stevia rebaudiana", 2012, Jacobs University (Year: 2012).*

Masibay, K.Y., "What Every Baker Needs to Know About Sugar", 2017, Fine Cooking, https://web.archive.org/web/20171111013935/https://www.finecooking.com/article/what-every-baker-needs-to-know-about-sugar (Year: 2017).*

Translation of Uemura_WO2016157868 (Year: 2016).*

International Search Report and Written Opinion dated Jul. 27, 2019 in International Application No. PCT/US19/30814.

International Search Report and Written Opinion dated Aug. 27, 2019 in International Application No. PCT/US19/30836.

Younes, Met al. Safety in use of glucosylated steviol glycosides as a food additive in different food categories. European Food Safety Authority Journal, https://doi.org/10.2903/j.efsa.2018.5181, Jan. 31, 2018; abstract; p. 3, eight paragraph; p. 6, third-fourth paragraphs.

Wikipedia Article "Stevioside";ht1ps://en.wikipedia.org/w/index.php title= Stevioside &oldid= 8296117141/4; Mar. 9, 2018 (Mar. 9, 2018) stevioside is artificial sweetener extract.

(Continued)

*Primary Examiner* — Jeffrey P Mornhinweg
*Assistant Examiner* — Kelly P Kershaw
(74) *Attorney, Agent, or Firm* — Michael Ye; Rimon Law

(57) ABSTRACT

A *Stevia* extract comprises one or more *Stevia*-derived non-steviol glycoside substances and/or one or more non-volatile non-steviol glycoside substances. The *Stevia* extract may be used as a sweetener or a flavorant in an orally consumable product.

34 Claims, 52 Drawing Sheets

(56) References Cited

OTHER PUBLICATIONS

Yoshikawa, et al. "Transglycosylation of Mogroside V, a Triterpene Glycoside in Siraitia grosvenori, Cyclodextrin Glucanotransferase and Improvement of the Qualities of Sweetness", Journal of Applied Glycoscience, vol. 52, Jan. 1, 2005, pp. 247-252.
International Search Report and Written Opinion dated Jun. 17, 2020, in International Application No. PCT/US2019/060295.
International Search Report and Written Opinion dated Jul. 5, 2019 in International Application No. PCT/US2019/030906
International Search Report and Written Opinion dated Jul. 17, 2019 in International Application No. PCT/US2019/030910.

* cited by examiner

Figure 1. SPME-GC×GC-TOFMS for Sample 1-1# (TIC)

Figure 2. SPME-GC×GC-TOFMS for Sample 1-2# (TIC)

Figure 3. SPME-GC×GC-TOFMS for Sample 1-3# (TIC)

Figure 4. SPME-GC×GC-TOFMS for Sample 1-4# (TIC)

Figure 5. SPME-GC×GC-TOFMS for Sample 1-1# (3D surface plot)

Figure 6. SPME-GC×GC-TOFMS for Sample 1-2# (3D surface plot)

Figure 7. SPME-GC×GC-TOFMS for Sample 1-3# (3D surface plot)

Figure 8. SPME-GC×GC-TOFMS for Sample 1-4# (3D surface plot)

UV-Trace (210 nm) of 2-1# (top) to 2-2# (bottom)

Non-Steviol components

Steviol components

UV-Trace (210 nm) of 2-1# (top) and SG related m/z SIM extractions (803, 641, 965)

UV-Trace (210 nm) of 2-2# (top) and SG related m/z SIM extractions (803, 641, 965)

UV-Trace (210 nm) of 2-3# (top) and SG related m/z SIM extractions (803, 641, 965)

UV-Trace (210 nm) of 2-4# (top) and SG related m/z SIM extractions (803, 641, 965)

Caffeoylquinic acid Sample 2-1# (UV 254 nm upper lane, m/z=353 lower lane)

Di-Caffeoylquinic acid Sample 2-1# (UV 254 nm upper lane, m/z=515 lower lane)

Kaempferol-glucoside Sample 2-1# (UV 254 nm upper lane, m/z=447 lower lane)

Quercetin-pentoside Sample 2-1# (UV 254 nm upper lane, m/z=433 lower lane)

Kaempferolxylosylglucoside, Naringin Sample 2-1# (UV 254 nm upper lane, m/z=579 lower lane)

Quercetin-diglucoside-rhamnoside Sample 2-1# (UV 254 nm upper lane, m/z=771 lower lane)

Quercetin-dirhamnoside Sample 2-1# (UV 254 nm upper lane, m/z=593 lower lane)

UV-Spectra (Sample 2-1#)

A. Caffeoylquinic acid

B. Di-Caffeoylquinic acid

C. Quercetin-diglucoside-rhamnoside

Comparative Non-volatiles in Samples 2-1#-2-4#

Overlay 254 nm

Blue 2-1#, Red 2-2#, Green 2-3#, Pink 2-4#

Caffeoyl-quinic acids in Samples 2-1#-2-4#

Blue 2-1#, Red 2-2#, Green 2-3#, Pink 2-4#

Di-caffeoyl-quinic acids in Samples 2-1#-2-4#

Blue 2-1#, Red 2-2#, Green 2-3#, Pink 2-4#

SWEETENER AND FLAVOR COMPOSITIONS, METHODS OF MAKING AND METHODS OF USE THEREOF

This application is a Continuation-in-part application of U.S. patent application Ser. No. 16/402,641, filed on May 3, 2019, which claims priority to U.S. Provisional Patent Application Ser. No. 62/668,580, filed May 8, 2018, U.S. Provisional Patent Application Ser. No. 62/696,481, filed Jul. 11, 2018, U.S. Provisional Patent Application Ser. No. 62/744,755, filed Oct. 12, 2018, U.S. Provisional Patent Application Ser. No. 62/771,485, filed Nov. 26, 2018, U.S. Provisional Patent Application Ser. No. 62/775,983, filed Dec. 6, 2018, U.S. Provisional Application Ser. No. 62/819,980, filed Mar. 18, 2019 and U.S. Provisional Application Ser. No. 62/841,858, filed May 2, 2019. The contents of all the above-described patent applications are expressly incorporated herein by reference for all purposes.

FIELD

The present disclosure relates generally to sweeteners and flavoring agents, and their use in food and beverage products.

BACKGROUND

Caloric sugars are widely used in the food and beverage industry. However, there is a growing trend toward use of more healthy alternatives, including non-caloric or low caloric sweeteners. Popular non-caloric sweeteners include high intensity synthetic sweeteners, such as aspartame (e.g., NutraSweet, Equal), sucralose (Splenda), and acesulfame potassium (also known as acesulfame K, or Ace-K), as well as high intensity natural sweeteners, which are typically derived from plants, such as *Stevia*.

Despite the widespread use of non-caloric sweeteners, which are gaining in popularity, many consumers are reluctant to use these products, since their taste properties are often considered to insufficiently mimic the taste profile of caloric sugars, such as sucrose. Therefore, there is a need in further developing and enhancing the taste properties of natural sweeteners to better reproduce the taste properties associated with conventional sugar products, so as to provide increased consumer satisfaction.

SUMMARY

Except used as tea infusion, industrial *Stevia* plant is cultivated for purpose of extracting sweet substances of steviol glycosides. Steviol glycosides are characterized by unpleasant bitterness, aftertaste, slow on-site, astringency, thus limits their application in food and beverage. Non-steviol glycosides are taken as partial sources of unpleasant taste, so it is desired to be removed as much as possible. The inventor surprisingly found *Stevia* extract comprises selected non-steviol glycoside (NSG) substances could create quick on-site, sugar-like taste profile, improved mouthfeel, reduced bitterness, less astringency, less unpleasant aftertaste compared with purified steviol glycosides. The selected NSG substances could create pleasant retronasal taste, which could impair the disadvantage of higher intensity sweeteners such as sucralose and steviol glycosides. The *Stevia* extract comprises NSG substances originated from *Stevia* plant (leaves, stem, flower, and seed) could be used as flavor or sweeteners for food, beverage, feed, pharmaceutical and cosmetic industry. Such extract could be used as raw material for further glycosylation. Especially, when such extract comprises NSG substances with glycoside group, the glycosylation process would change its structure and make it taste better. Such extract and or its glycosylated products could be used as raw material for Maillard reaction, too.

One aspect of the present application relates to *Stevia* extracts that comprise one or more NSG substances.

In some embodiments, the one or more NSG substances comprise *Stevia*-derived NSG substances.

In some embodiments, the *Stevia*-derived NSG substances comprise one or more volatile substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

In some embodiments, the *Stevia*-derived NSG substances comprise volatile substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2- methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*, R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

In some embodiments, the *Stevia*-derived NSG substances comprise one or more non-volatile substances selected from the group consisting of 3-caffeoylquinic acid, 4-caffeoylquinic acid, 4-caffeoylquinic acid, 3,5 dicaffeoylquinic acid, 3,4 dicaffeoylquinic acid, 4,5 dicaffeoylquinic acid, kaempferol-hexoside, quercetin-pentoside, kaempferol-xyloside-hexoside, quercetin-dihexoside-rhamnoside and quercetin-dirhamnoside.

In some embodiments, the one or more *Stevia*-derived NSG substances comprise substances derived from precursors of steviol glycosides and/or metabolized steviol glycosides.

In some embodiments, the one or more *Stevia*-derived NSG substances comprise substances derived from precursors of steviol glycosides and/or metabolized steviol glycosides in the leaves of *Stevia* plant.

In some embodiments, the *Stevia* extract is extracted from a raw material that comprises *Stevia* plant flower. The *Stevia* plant flower may be in fresh, half dried or dried form.

In some embodiments, the *Stevia* extract is extracted from one or more materials selected from the group consisting of whole *Stevia* plant, aerial part of *Stevia* plant, flowers of *Stevia* plant, seeds of *Stevia* plants, roots of *Stevia* plant, branches of *Stevia* plant, leaves of *Stevia* plant, mixtures thereof, crude juice thereof, extract thereof and purified substance thereof.

Another aspect of the present application relates to a composition comprising steviol glycosides and *Stevia*-derived NSG substances.

In some embodiments, the *Stevia*-derived NSG substances are glycosides.

Another aspect of the present application relates to a Millard reaction product (MRP), comprising one or more volatile substances.

In some embodiments, the one or more volatile substances comprise one or more *Stevia*-derived volatile NSG substances.

Another aspect of the present application relates to a composition comprising steviol glycosides, glycosylated steviol glycosides, *Stevia*-derived NSG substances and glycosylated *Stevia*-derived NSG substances.

Another aspect of the present application relates to an orally consumable product comprising the NSG substance-containing compositions of the present application or the MRP of the present application.

In some embodiments, the NSG substance-containing composition or the MRP is present in an amount of 0.0001 wt % to 50 wt % of the orally consumable product.

In some embodiments, the orally consumable product is a beverage.

While multiple embodiments are disclosed, still other embodiments of the present invention will be apparent to those skilled in the art from the following detailed description. As will be apparent, the invention is capable of modifications in various obvious aspects, without departing from the spirit and scope of the present invention. Accordingly, the detailed descriptions herein are to be regarded as illustrative in nature and not restrictive.

DETAILED DESCRIPTION

I. Definitions

Figure 1:
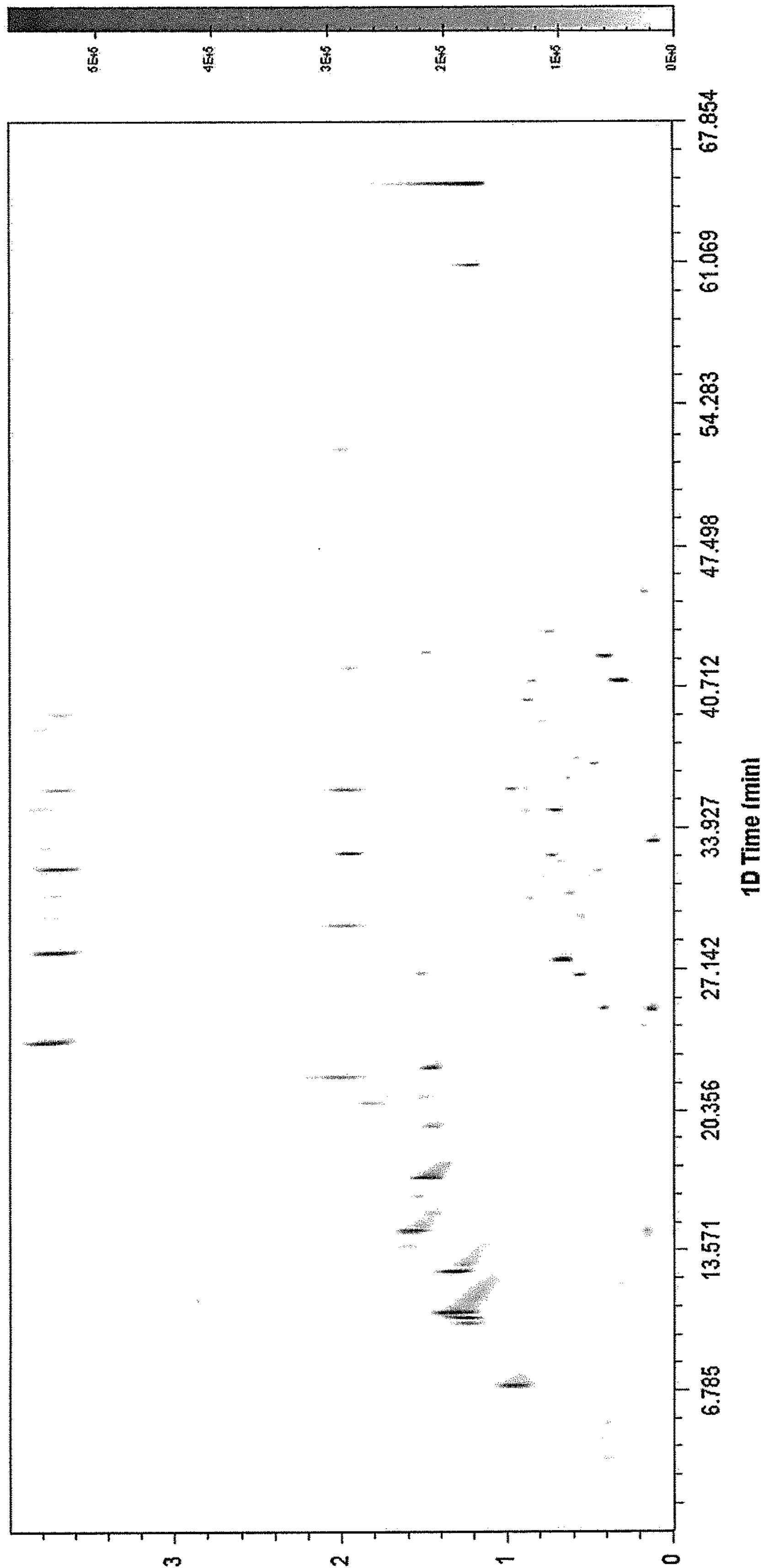
FIG. 1 shows the total ion chromatograms (TIC) of sample 1-1 # detected by SPME-GCxGC-TOFMS.
Figure 2:
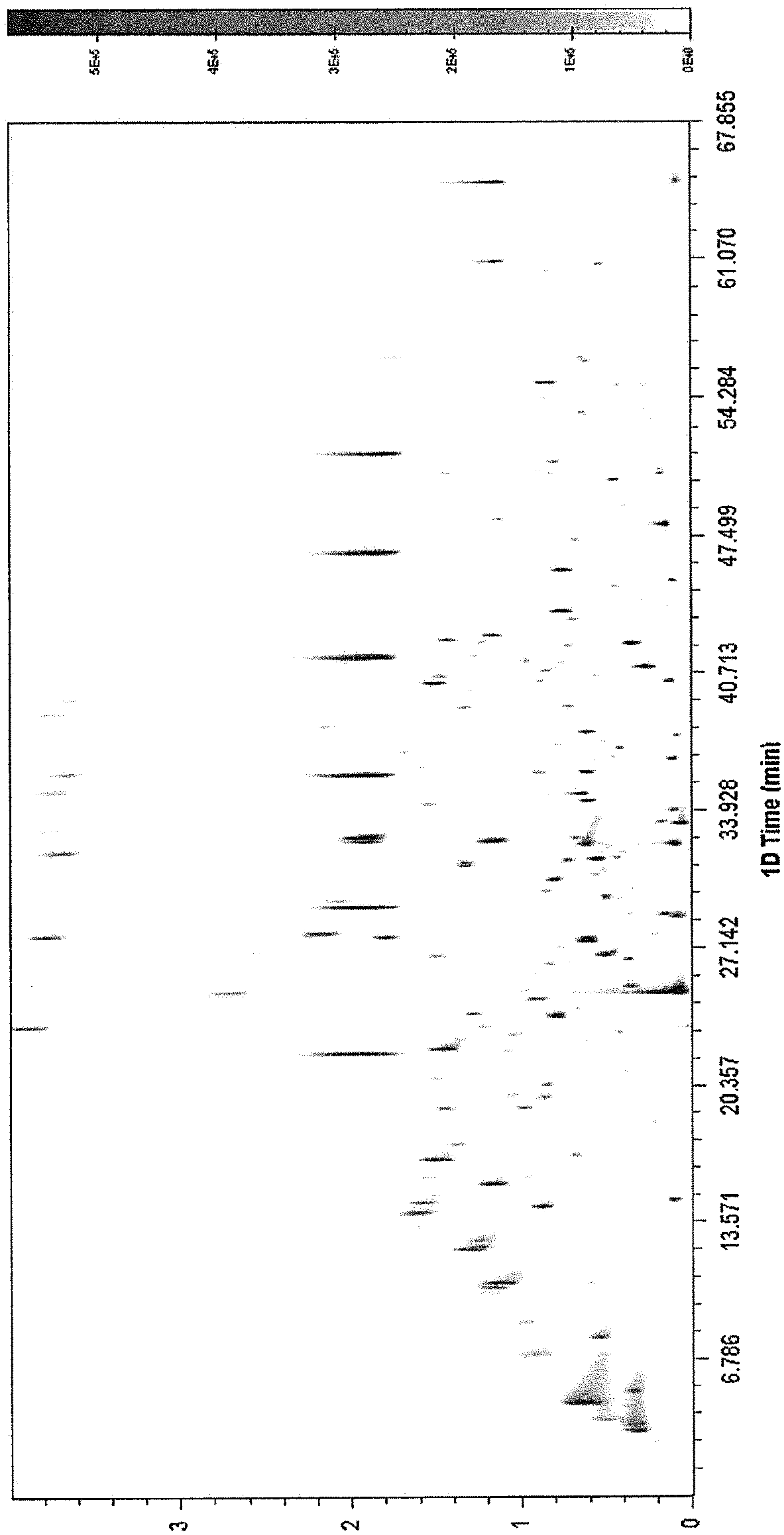
FIG. 2 shows the TIC of sample 1-2 # detected by SPME-GCXGC-TOFMS.
Figure 3:
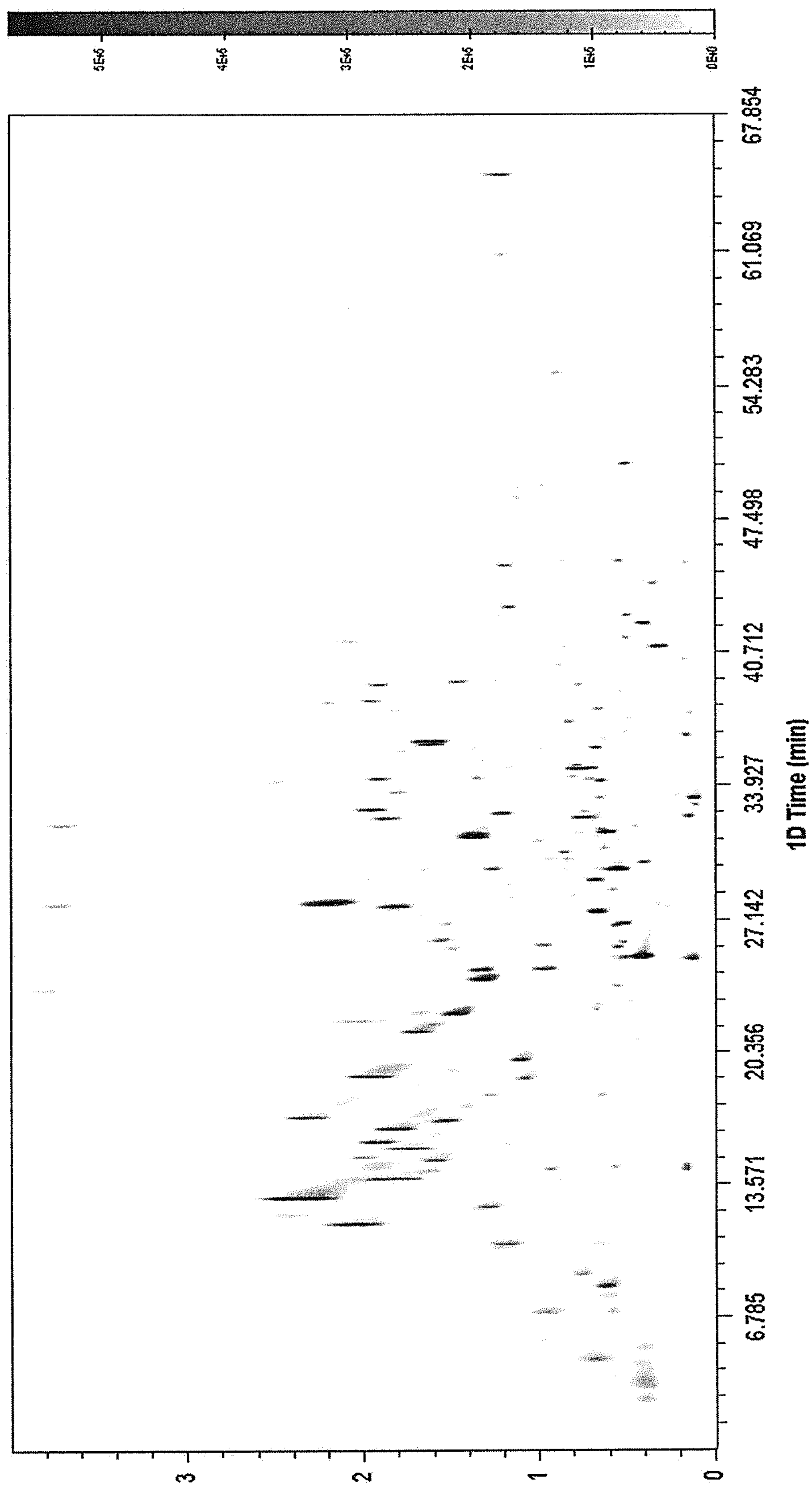
FIG. 3 shows the TIC of sample 1-3 # detected by SPME-GCXGC-TOFMS.
Figure 4:
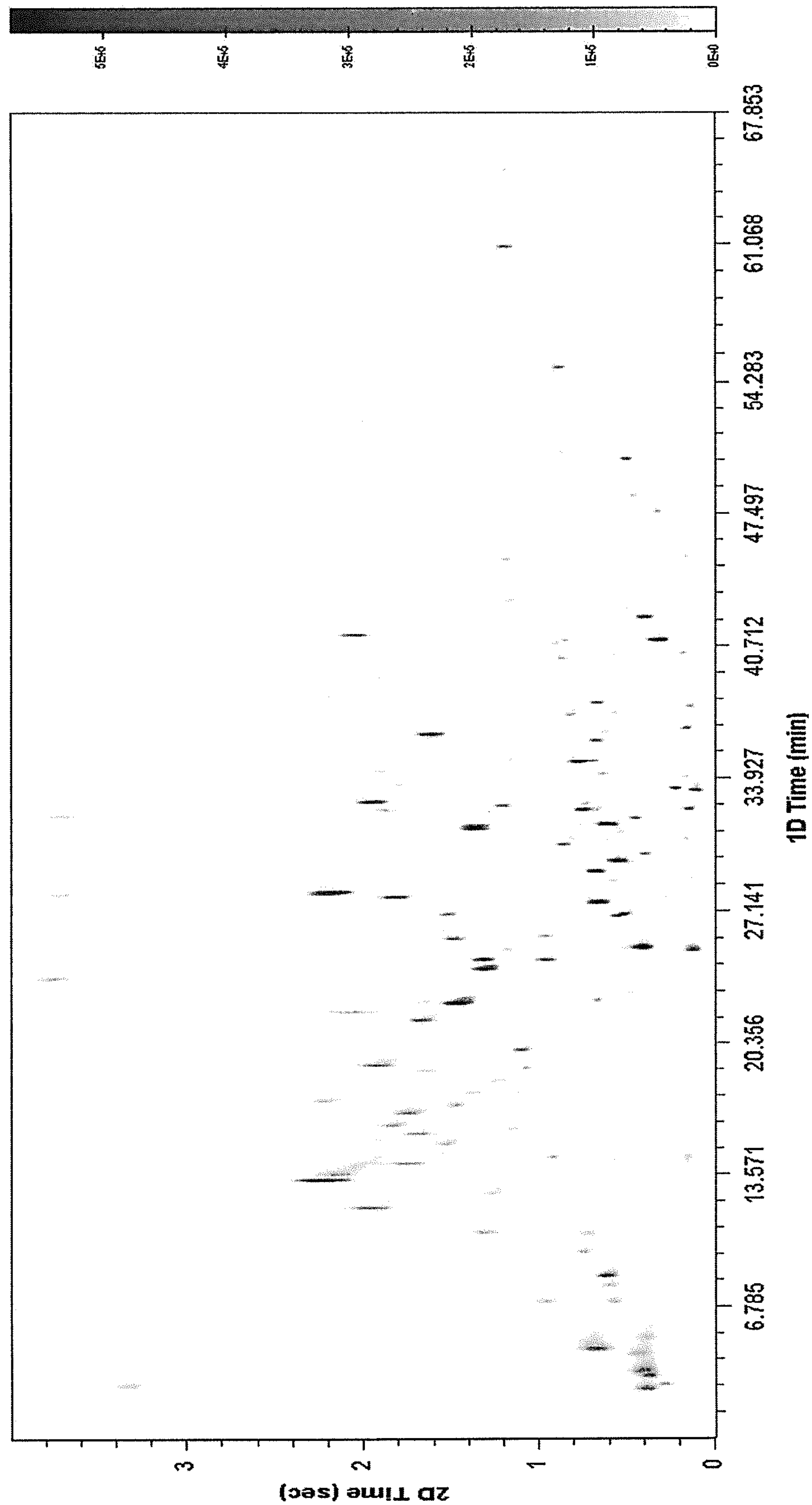
FIG. 4 shows the TIC of sample 1-4 # detected by SPME-GCXGC-TOFMS.
Figure 5:
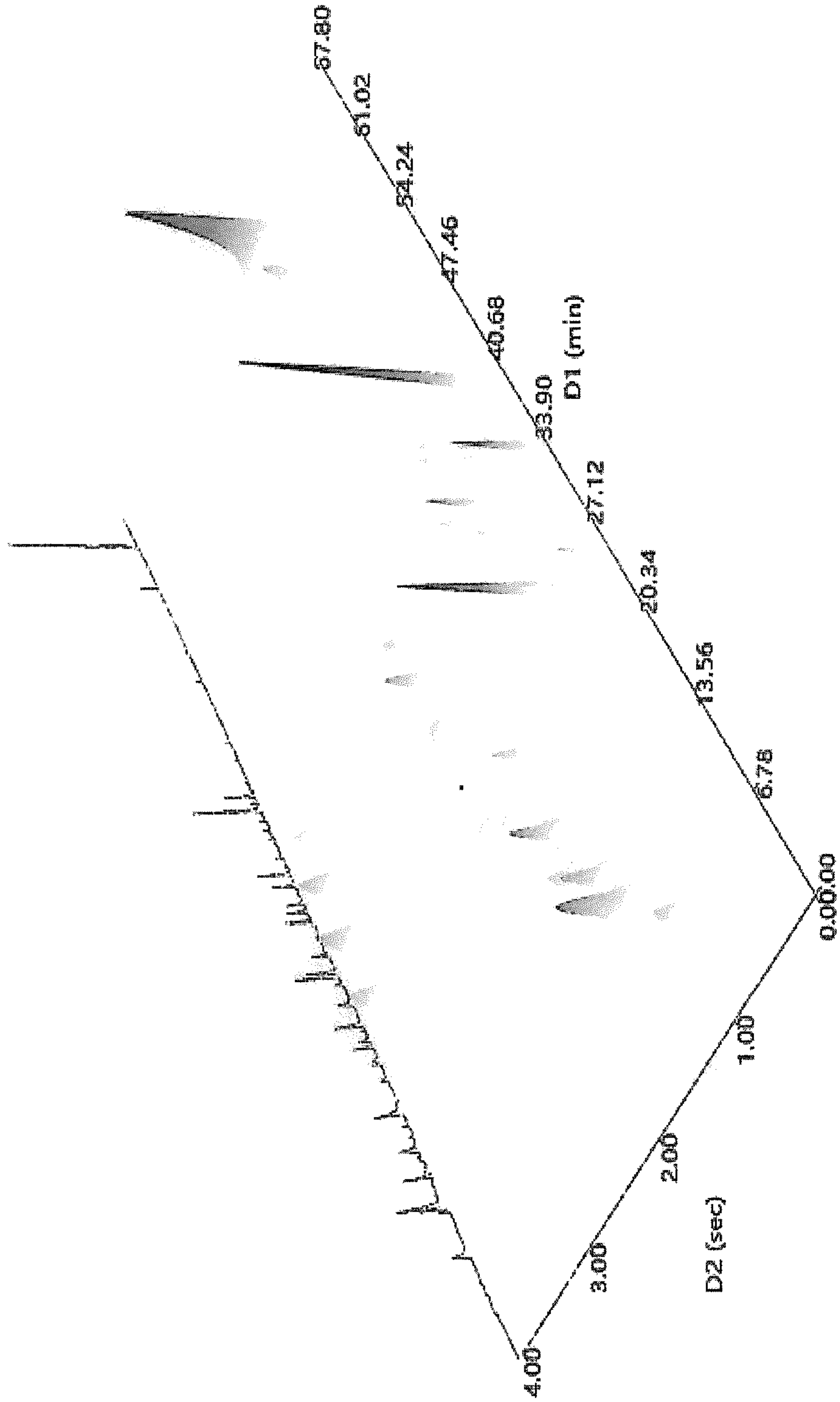
FIG. 5 shows the TIC of sample 1-1 # detected by SPME-GCXGC-TOFMS in 3-D surface plot.
Figure 6:
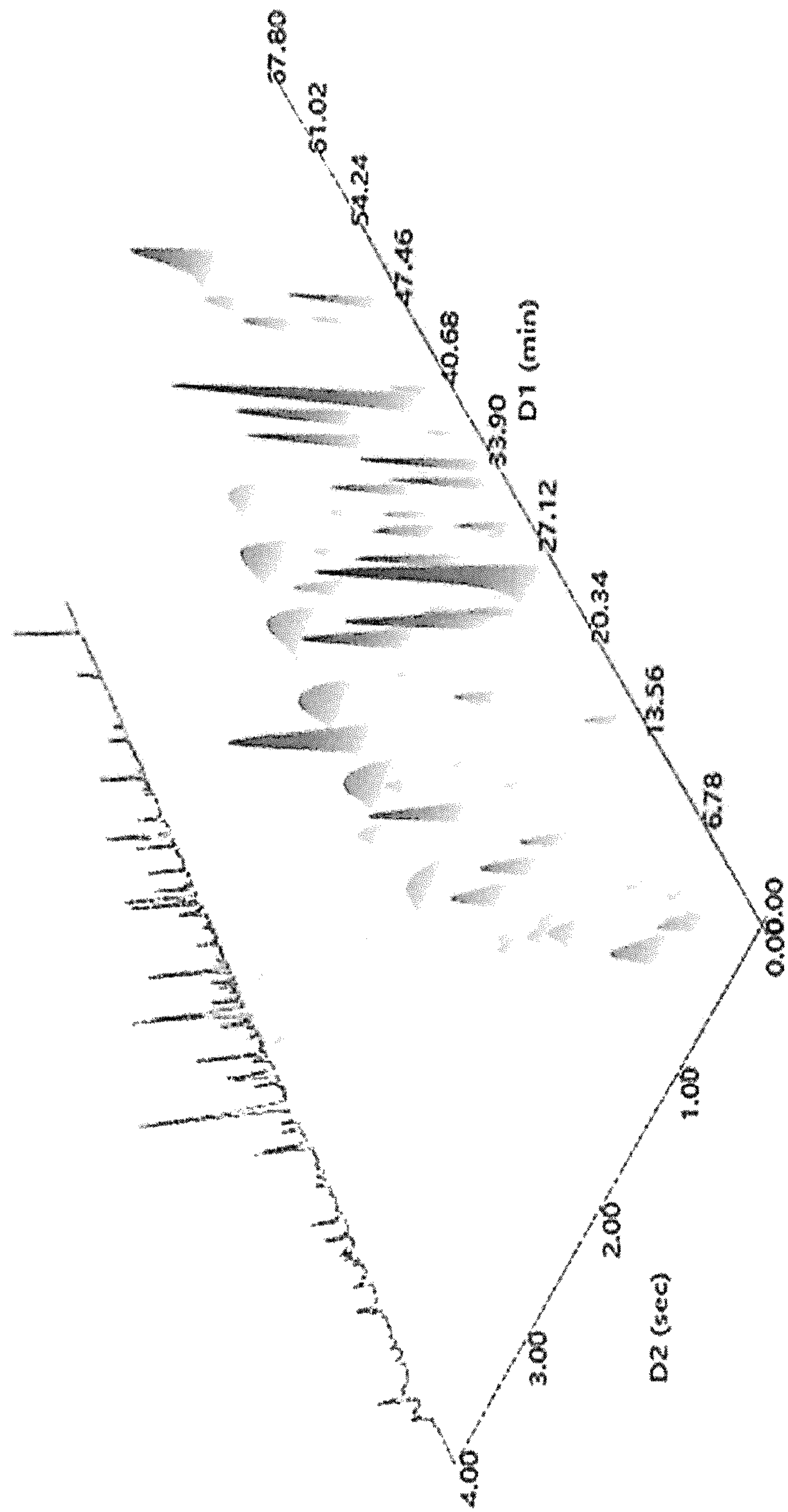
FIG. 6 shows the TIC of sample 1-2 # detected by SPME-GCXGC-TOFMS in 3-D surface plot.
Figure 7:
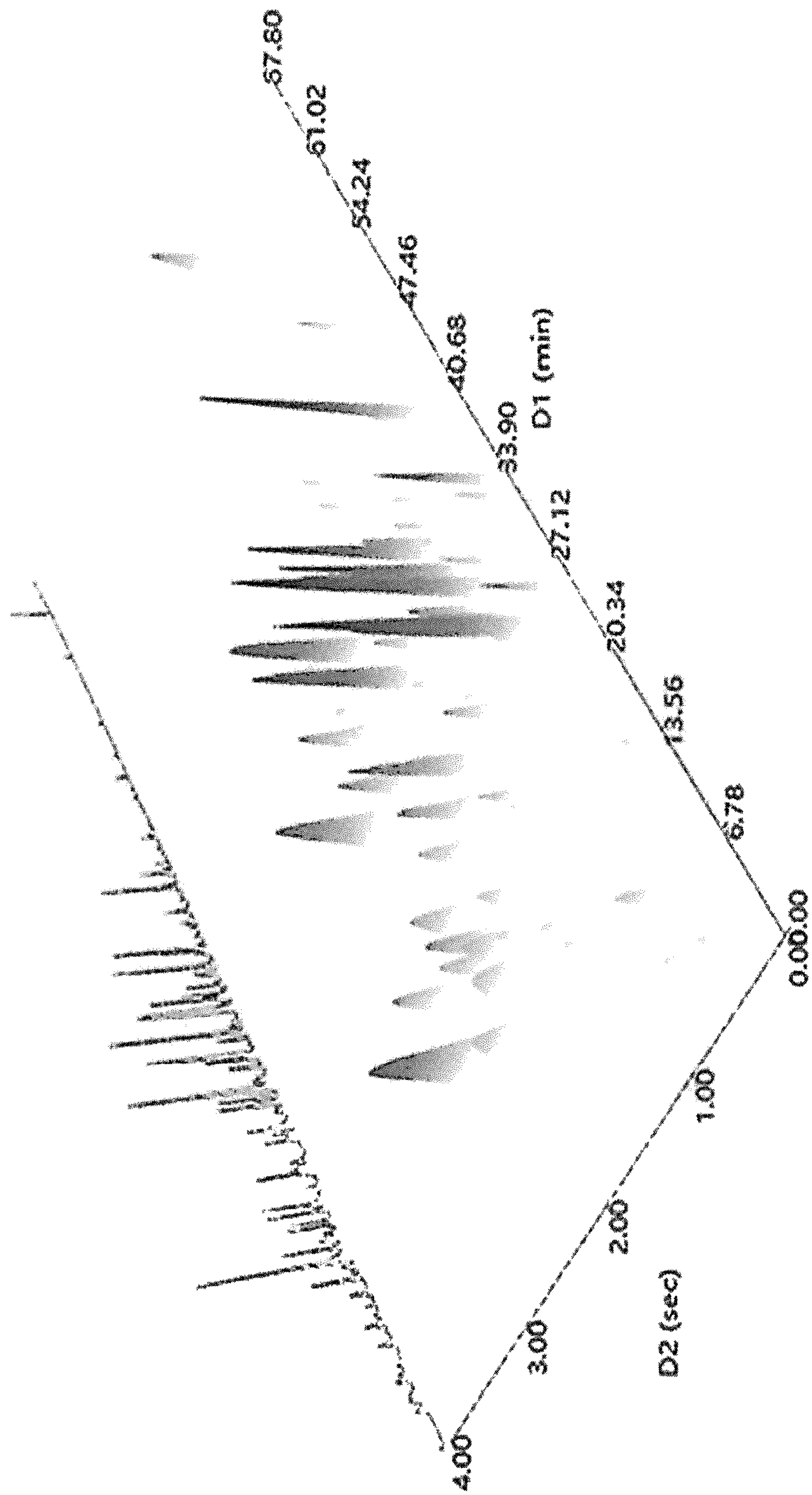
FIG. 7 shows the TIC of sample 1-3 # detected by SPME-GCXGC-TOFMS in 3-D surface plot.
Figure 8:
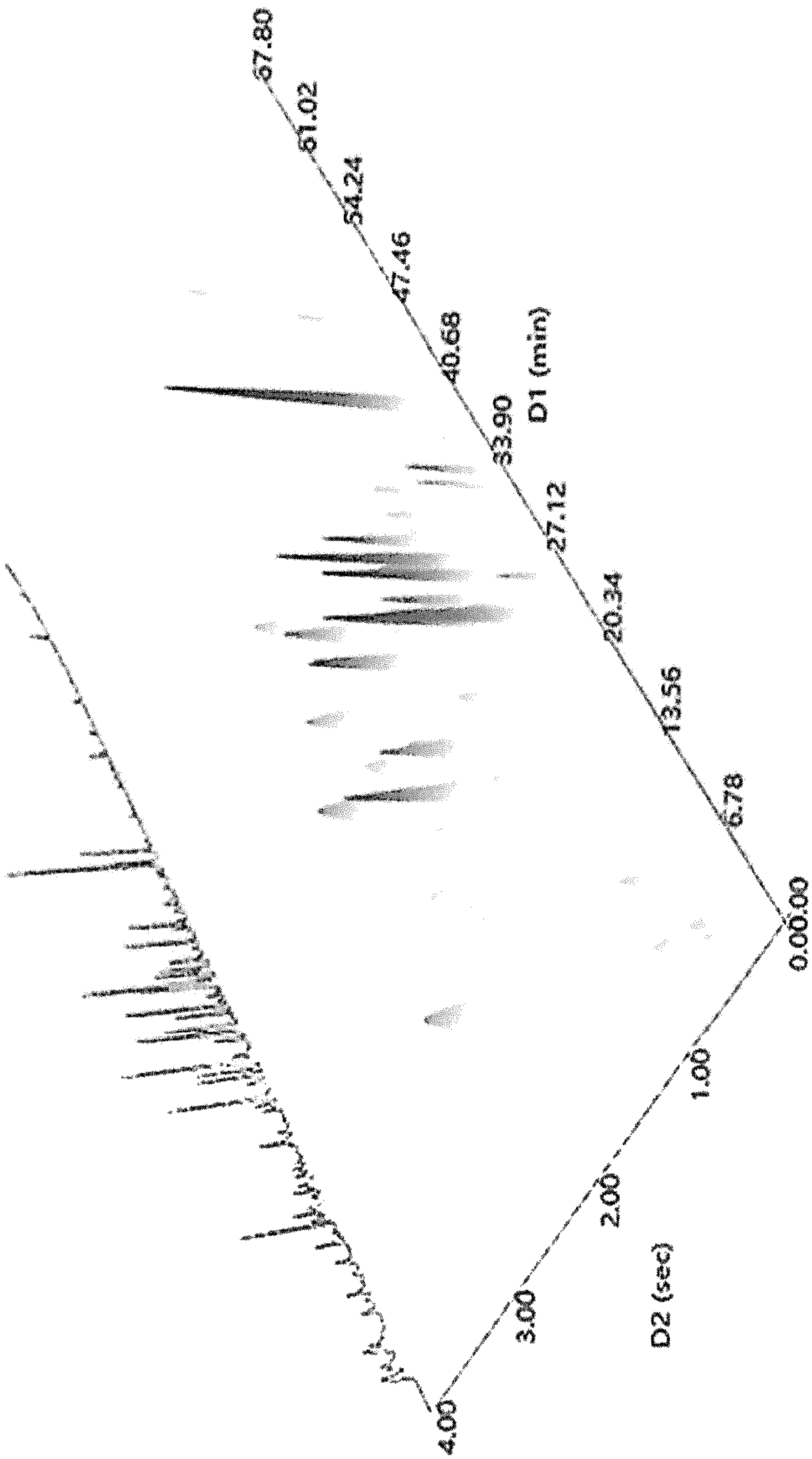
FIG. 8 shows the TIC of sample 1-4 # detected by SPME-GCXGC-TOFMS in 3-D surface plot.

Unless defined otherwise, all technical and scientific terms used herein have the same meanings as commonly understood by one of ordinary skill in the art to which this application belongs. All publications and patents specifically mentioned herein are incorporated by reference in their entirety for all purposes including describing and disclosing the chemicals, instruments, statistical analyses and methodologies which are reported in the publications which might be used in connection with the application. All references cited in this specification are to be taken as indicative of the level of skill in the art. Nothing herein is to be construed as an admission that the application is not entitled to antedate such disclosure by virtue of prior invention.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a," "an," and "the" include plural reference unless the context clearly dictates otherwise. Further, the terms "a" (or "an"), "one or more" and "at least one" can be used interchangeably herein. It is also to be noted that the terms "comprising," "including," "characterized by" and "having" can be used interchangeably. Further, any reactant concentrations described herein should be considered as being described on a weight to weight (w/w) basis, unless otherwise specified to the contrary (e.g., mole to mole, weight to volume (w/v), etc.)

As used herein, the term "Maillard reaction" refers to a non-enzymatic reaction of (1) one or more reducing and/or non-reducing sugars, and (2) one or more amine donors in the presence of heat, wherein the non-enzymatic reaction produces a Maillard reaction product and/or a flavor. Thus, this term is used unconventionally, since it accommodates the use of non-reducing sweetening agents as substrates, which were not heretofore believed to serve as substrates for the Maillard reaction.

The term "reaction mixture" refers to a composition comprising at least one amine donor and one sugar donor, wherein the reaction mixture is to be subjected to a Maillard reaction; a "reaction mixture" is not to be construed as the reaction contents after a Maillard reaction has been conducted, unless otherwise noted.

The term "sugar," as used herein, refers to a sweet-tasting, soluble carbohydrate, typically used in consumer food and beverage products.

The term "sugar donor," as used herein, refers to a sweet-tasting compound or substance from natural or synthetic sources, which can participate as a substrate in a Maillard reaction with an amine group-containing donor molecule.

The term "amine donor," as used herein, refers to a compound or substance containing a free amino group, which can participate in a Maillard reaction.

As used herein, the term "sweetener" generally refers to a consumable product, which produces a sweet taste when consumed alone. Examples of sweeteners include, but are not limited to, high-intensity sweeteners, bulk sweeteners, sweetening agents, and low sweetness products produced by synthesis, fermentation or enzymatic conversion methods.

As used herein the term "high-intensity sweetener," refers to any synthetic or semi-synthetic sweetener or sweetener found in nature. High-intensity sweeteners are compounds or mixtures of compounds which are sweeter than sucrose. High-intensity sweeteners are typically many times (e.g., 20 times and more, 30 times and more, 50 times and more or 100 times sweeter than sucrose). For example, sucralose is about 600 times sweeter than sucrose, sodium cyclamate is about 30 times sweeter, Aspartame is about 160-200 times sweeter, and thaumatin is about 2000 times sweeter then sucrose (the sweetness depends on the tested concentration compared with sucrose).

High-intensity sweeteners are commonly used as sugar substitutes or sugar alternatives because they are many times sweeter than sugar but contribute only a few to no calories when added to foods. High-intensity sweeteners may also be used to enhance the flavor of foods. High-intensity sweeteners generally will not raise blood sugar levels.

As used herein, the term "high intensity natural sweetener," refers to sweeteners found in nature, typically in plants, which may be in raw, extracted, purified, refined, or any other form, singularly or in combination thereof. High intensity natural sweeteners characteristically have higher sweetness potency, but fewer calories than sucrose, fructose, or glucose.

High intensity natural sweeteners include, but are not limited to, sweet tea extracts, stevia extracts, swingle extracts, sweet tea components, steviol glycosides, mogrosides, glycosylated sweet tea extracts, glycosylated stevia extracts, glycosylated swingle extracts, glycosylated sweet tea glycosides, glycosylated steviol glycosides, glycosylated mogrosides, licorice extracts, glycyrrhizic acid, including mixtures, salts and derivatives thereof.

As used herein, the term "high intensity synthetic sweetener" or "high intensity artificial sweetener" refers to high intensity sweeteners that are not found in nature. High intensity synthetic sweeteners include "high intensity semi-synthetic sweeteners" or "high intensity semi-artificial sweeteners", which are synthesized from, artificially modified from, or derived from, high intensity natural sweeteners.

Examples of high intensity synthetic sweeteners include, but are not limited to, sucralose, aspartame, acesulfame-K, neotame, saccharin and aspartame, glycyrrhizic acid ammonium salt, sodium cyclamate, saccharin, advantame, neohesperidin dihydrochalcone (NHDC) and mixtures, salts and derivatives thereof.

As used herein, the term "sweetening agent" refers to a high intensity sweetener.

As used herein, the term "bulk sweetener" refers to a sweetener, which typically adds both bulk and sweetness to a confectionery composition and includes, but is not limited to, sugars, sugar alcohols, sucrose, commonly referred to as "table sugar," fructose, commonly referred to as "fruit sugar," honey, unrefined sweeteners, syrups, such as agave syrup or agave nectar, maple syrup, corn syrup and high fructose corn syrup (or HFCS).

As used herein, the term "sweetener enhancer" refers to a compound (or composition) capable of enhancing or intensifying sensitivity of the sweet taste. The term "sweetener enhancer" is synonymous with a "sweetness enhancer," "sweet taste potentiator," "sweetness potentiator," and/or "sweetness intensifier." A sweetener enhancer enhances the sweet taste, flavor, mouth feel and/or the taste profile of a sweetener without giving a detectable sweet taste by the sweetener enhancer itself at an acceptable use concentration. In some embodiments, the sweetener enhancer provided herein may provide a sweet taste at a higher concentration by itself. Certain sweetener enhancers provided herein may also be used as sweetening agents.

Sweetener enhancers can be used as food additives or flavors to reduce the amounts of sweeteners in foods while maintaining the same level of sweetness. Sweetener enhancers work by interacting with sweet receptors on the tongue, helping the receptor to stay switched "on" once activated by the sweetener, so that the receptors respond to a lower concentration of sweetener. These ingredients could be used to reduce the calorie content of foods and beverages, as well as save money by using less sugar and/or less othersweeteners. Examples of sweetener enhancers include, but are not limited to, brazzein, miraculin, curculin, pentadin, mabinlin, thaumatin, and mixtures thereof.

In some cases, sweetening agents or sweeteners can be used as sweetener enhancers or flavors when their dosages in food and beverage are low. In some cases, sweetener enhancers can be utilized as sweeteners where their dosages in foods and beverages are higher than dosages regulated by FEMA, EFSA or other related authorities.

As used herein, the phrase "low sweetness products produced by synthesis, fermentation or enzymatic conversion" refers to products that have less sweetness or similar sweetness than sucrose. Examples of low sweetness products produced by extraction, synthesis, fermentation or enzymatic conversion method include, but are not limited to, sorbitol, xylitol, mannitol, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, and mixtures thereof.

For example, "sugar alcohols" or "polyols" are sweetening and bulking ingredients used in manufacturing of foods and beverages. As sugar substitutes, they supply fewer calories (about a half to one-third fewer calories) than sugar, are converted to glucose slowly, and are not characterized as causing spiked increases in blood glucose levels.

Sorbitol, xylitol, and lactitol are exemplary sugar alcohols (or polyols). These are generally less sweet than sucrose, but have similar bulk properties and can be used in a wide range of food and beverage products. In some case, their sweetness profile can be fine-tuned by being mixed together with high-intensity sweeteners.

The following table illustrates sweetnesses and energy densities of various materials in compared to sucrose:

| Name | Sweetness by weight | Sweetness by food energy | Energy density | Notes |
|---|---|---|---|---|
| Brazzein | 500-2000 | | | Protein |
| Curculin | 430-2070 | | | Protein; also changes the taste of water and sour solutions to sweet |
| Erythritol | 0.6-0.7 | 14 | 0.05 | |
| Fructo-oligosaccharide | 0.3-0.5 | | | |
| Glycyrrhizin | 30-50 | | | |
| Glycerol | 0.6 | 0.55 | 1.075 | E422 |
| Hydrogenated starch hydrolysates | 0.4-0.9 | 0.5 × −1.2 | 0.75 | |
| Inulin | 0.1 | | | |
| Isomalt | 0.45-0.65 | 0.9-1.3 | 0.5 | E953 |
| Isomalto-oligosaccharide | 0.5 | | | |
| Isomaltulose | 0.5 | | | |
| Lactitol | 0.4 | 0.8 | 0.5 | E966 |
| Mogroside mix | 300 | | | |
| Mabinlin | 100 | | | Protein |
| Maltitol | 0.75-0.9 | 1.7 | 0.525 | E965 |
| Maltodextrin | 0.15 | | | |
| Mannitol | 0.5 | 1.2 | 0.4 | E421 |
| Miraculin | | | | A protein that does not taste sweet by itself but modifies taste receptors to make sour things taste sweet temporarily |
| Monatin | 3,000 | | | Sweetener isolated from the plant *Sclerochiton ilicifolius* |
| Monellin | 800-2,000 | | | Protein; the sweetening ingredient in serendipity berries |
| Osladin | 500 | | | |
| Pentadin | 500 | | | Protein |
| Polydextrose | 0.1 | | | |
| Psicose | 0.7 | | | |
| Sorbitol | 0.6 | 0.9 | 0.65 | Sugar alcohol, E420 |
| *Stevia* | 250 | | | Extracts known as rebiana, Sweet and Fit *Stevia*, Truvia, PureVia, Enliten; mainly containing rebaudioside A, a steviol glycoside |
| Tagatose | 0.92 | 2.4 | 0.38 | Monosaccharide |
| Thaumatin | 2,000 | | | Protein; E957 |

As used herein, the term "glycoside" refers to a molecule in which a sugar (the "glycone" part or "glycone component" of the glycoside) is bonded to a non-sugar (the "aglycone" part or "aglycone component") via a glycosidic bond.

The terms "terpenoid" are used interchangeably with reference to a large and diverse class of organic molecules derived from terpenes, more specifically five-carbon isoprenoid units assembled and modified in a variety of ways and classified in groups based on the number of isoprenoid units used in group members. The term "terpenoids" includes hemiterpenoids, monoterpenoids, sesquiterpenoids, diterpenoids, sesterterpenoids, triterpenoids, tetraterpenoids and polyterpenoids.

The term "terpenoid glycoside" and "terpenoid sweetener" refer to a compound having a terpenoid aglycone linked by a glycosidic bond to a glycone. Exemplary terpenoid glycosides include steviol glycosides, stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, dulcoside A, steviolbioside, rubusoside, glycosylated steviol glycosides, as well as any other steviol glycoside(s) found in *Stevia rebaudiana* plant; Luo Han Guo extract, mogrol glycosides, mogrosides, mogroside II, mogroside II B, mogroside II E, mogroside III, mogroside III A2, mogroside IV, mogroside V, mogroside VI, neomogroside, grosmomoside siamenoside I, 7-oxo-mogroside II E, 11-oxo-mogroside A1, 11-deoxy-mogroside III, -oxomogroside IV A, 7-oxo-mogroside V, 11-oxo-mogroside V, as well as any other mogrol glycoside(s) found in the *Siraitia grosvenorii* plant.

The terms "steviol glycoside," and "SG" are used interchangeably with reference to a glycoside of steviol, a diterpene compound shown in Formula I, which is found in *Stevia* leaves. Non-limiting examples of steviol glycosides are shown in Tables A and B below. The steviol glycosides for use in the present application are not limited by source or origin. Steviol glycosides may be extracted from *Stevia* leaves, synthesized by enzymatic processes or chemical syntheses, or produced by fermentation.

The terms "non-steviol glycoside," "non-SG," "NSG," "non-steviol glycoside substance," "non-SG substance" and "NSG substance" are used interchangeably with reference to any material or compound that is not a steviol glycoside. A "non-steviol glycoside" or "non-SG" can be an amino acid, a polypeptide, a nuclei acid, a polynucleotide, a lipid, a monosacchride, a polysaccharide, or a glycoside of a non-steviol compound. A "non-steviol glycoside substance" or "NSG substance" can be a volatile compound or a non-volatile compound.

The term "*Stevia*-derived non-steviol glycoside," "*Stevia*-derived non-steviol glycoside substance," "*Stevia*-derived NSG," and "*Stevia*-derived NSG substance," are used interchangeably with reference to a non-steviol glycoside that is present in a stevia plant or a stevia extract. A stevia derived NSG may be present in the whole stevia plant, in the aerial part of a stevia plant, in the leaves of a stevia plant, in the flowers of a stevia plant, in the seeds of a stevia plants, in the root of a stevia plant, in the branches of a stevia plant, or in several different parts of a stevia plant.

The term "non-steviol glycoside containing stevia extract" and "NSG containing SE" are used interchangeably with reference to a stevia extract that contains certain NSGs in desired amounts. In some embodiments, the NSGs are stevia derived NSGs.

The terms "rebaudioside A," "Reb A," and "RA" are equivalent terms referring to the same molecule. The same condition applies to all lettered rebaudiosides.

The terms "steviol glycoside composition" and "SG composition" are used interchangeably with reference to a composition comprising one or more SGs.

The term "*Stevia* extract," as used herein, refers to a plant extract from *Stevia* that contains varying percentages of SGs.

The terms "glycosylated steviol glycoside" and "GSG" are used interchangeably with reference to an SG containing one or more additional glucose residues added relative to the parental SGs (including partially glycosylated steviol glycosides) present in e.g., *Stevia* leaves. A "GSG" may be produced from any known or unknown SG by enzymatic synthesis, chemical synthesis or fermentation. It should be understood that GSG(s) essentially contain a glycosylated steviol glycoside(s), but may also contain unreacted steviol glycosides, dextrins and other non-steviol glycoside substances when using extracts in the starting materials. It should also be understood that the GSG(s) can be purified and/or separated into purified/isolated components. The terms "unreacted SG" and "unreacted steviol glycoside" are used interchangeably with reference to a SG that has not been subjected to an additional glycosylation reaction.

The terms "glycosylated non-steviol glycoside" and "GNSG" are used interchangeably with reference to an NSG containing one or more additional glucose residues added relative to the parental NSG (including partially glycosylated NSG) present in e.g., *Stevia* leaves. A "GNSG" may be produced from any known or unknown NSG by enzymatic synthesis, chemical synthesis or fermentation. It should be understood that GNSG(s) essentially contain a glycosylated NSG, but may also contain unreacted NSG, dextrins and other non-steviol glycoside substances when using extracts in the starting materials. It should also be understood that the GNSG(s) can be purified and/or separated into purified/isolated components. The terms "unreacted NSG" and "unreacted non-steviol glycoside" are used interchangeably with reference to a NSG that has not been subjected to an additional glycosylation reaction.

The terms "glycosylated steviol glycoside composition" or "GSG composition" refer to any material comprising one or more GSGs.

As used herein, the term "SG/GSG composition" refers to a generic composition that may comprise one or more SGs and/or one or more GSGs.

The terms "SG component," "SG-containing component," "SG-containing composition," "SG-containing product," "*Stevia* sweetener" and "SG sweetener" are used interchangeably with reference to a component, composition, product or sweetener that contains one or more steviol glycosides and/or one or more glycosylated steviol glycosides.

The terms "non-SG component", "non-SG-containing component", "non-SG-containing composition", "non-SG-containing product", "non-*Stevia* sweetener", "non-SG sweetener" and "non-*Stevia* sweetening agent" are used with reference to a component, composition, product, sweetener or sweetening agent that does not contain a steviol glycoside or a glycosylated steviol glycoside.

The phrase "total steviol glycosides" refers to the total amount of SGs and/or GSGs in a composition.

An acronym of the type "YYxx" refers to a composition, where YY refers to a given (such as RA) or collection of compounds (e.g., SGs), where "xx" is typically a percent by weight number between 1 and 100 denoting the level of purity of a given compound (such as RA) or collection of compounds, where the weight percentage of YY in the dried product is equal to or greater than xx. The acronym "YYxx+WWzz" refers to a composition, where each one of "YY" and "WW" refers to a given compound (such as RA) or a collection of compounds (e.g., SGs), and where each of "xx" and "zz" refers to a percent by weight number between 1 and 100 denoting the level of purity of a given compound (such as RA) or a collection of compounds, where the weight percentage of YY in the dried product is equal to or greater than xx, and where the weight percentage of WW in the dried product is equal to or greater than zz.

The acronym "RAx" refers to a *Stevia* composition containing RA in amount of ≥x % and <(x+10)% with the following exceptions: the acronym "RA100" specifically refers to pure RA; the acronym "RA99.5" specifically refers to a composition where the amount of RA is ≥99.5 wt %, but <100 wt %; the acronym "RA99" specifically refers to a composition where the amount of RA is ≥99 wt %, but <100 wt %; the acronym "RA98" specifically refers to a composition where the amount of RA is ≥98 wt %, but <99 wt %; the acronym "RA97" specifically refers to a composition where the amount of RA is ≥97 wt %, but <98 wt %; the acronym "RA95" specifically refers to a composition where the amount of RA is ≥95 wt %, but <97 wt %; the acronym "RA85" specifically refers to a composition where the amount of RA is ≥85 wt %, but <90 wt %; the acronym "RA75" specifically refers to a composition where the amount of RA is ≥75 wt %, but <80 wt %; the acronym "RA65" specifically refers to a composition where the amount of RA is ≥65 wt %, but <70 wt %; the acronym "RA20" specifically refers to a composition where the amount of RA is ≥15 wt %, but <30 wt %. *Stevia* extracts include, but are not limited to, RA20, RA40, RA50, RA60, RA80, RA 90, RA95, RA97, RA98, RA99, RA99.5, RB8, RB10, RB15, RC15, RD6, and combinations thereof.

The acronym "GSG-RAxx" refers to a GSG composition prepared in an enzymatically catalyzed glycosylation process with RAxx as the starting SG material. More generally, acronyms of the type "GSG-YYxx" refer to a composition of the present application where YY refers to a compound (such as RA, RB, RC or RD), or a composition (e.g., RA20), or a mixture of compositions (e.g., RA40+RB8). For example, GSG-RA20 refers to the glycosylation products formed from RA20.

The abbreviation "GX" refers to a glycosyl group "G" where "X" is a value from 1 to 20 and refers to the number of glycosyl groups present in the molecule. For example, Stevioside G1 (ST-G1) has one (1) glycosyl group (G), thus "G1," Stevioside G2 (ST-G2) has two (2) glycosyl groups present, Stevioside G3 (ST-G3) has three (3) glycosyl groups present, Stevioside G4 (ST-G4) has four (4) glycosyl groups present, Stevioside G5 (ST-G5) has five (5) glycosyl groups present, Stevioside G6 (ST-G6) has six (6) glycosyl groups present, Stevioside G7 (ST-G7) has seven (7) groups present, Stevioside G8 (ST-G8) has eight (8) glycosyl groups present, Stevioside G9 (ST-G9) has nine (9) glycosyl groups present, etc. The glycosylation of the molecule can be determined by HPLC-MS.

The term "Maillard reaction product" or "MRP" refers to any compound produced by a Maillard reaction between an amine donor and a sugar donor in the form of a reducing sugar, non-reducing sugar, or both. Preferably, the sugar donor includes at least one carbonyl group. In certain embodiments, the MRP is a compound that provides flavor ("Maillard flavor"), color ("Maillard color"), or a combination thereof.

The term "MRP composition" refers to a composition comprising one or more MRPs produced by a Maillard reaction between an amine donor and a sugar donor in the form of a reducing sugar, non-reducing sugar, or both. Preferably, the sugar donor includes at least one carbonyl group. In certain embodiments, the MRP is a compound that provides flavor ("Maillard flavor"), color ("Maillard color"), or a combination thereof.

The terms "steviol glycoside-derived MRP", "SG-derived MRP", and "S-MRP" are used interchangeably with reference to an MRP or MRP-containing composition produced by a Maillard reaction between an amine donor and a sugar donor comprising a steviol glycoside, a glycosylated steviol glycoside, a *Stevia* extract and/or a glycosylated *Stevia* extract or combination thereof with or without an additional reducing sugar added to the reaction. In some cases, an S-MRP may be used interchangeably with the term "SG-MRP." In some embodiments, S-MRP or SG-MRP refers to an MRP composition in which (1) steviol glycosides, glycosylated steviol glycosides, steviol extracts, and glycosylated steviol extracts, or combination thereof (2) an amine donor, and (3) a reducing sugar, are present in a reaction mixture subjected to the Maillard reaction.

The term "thaumatin", as used herein, is used generically with reference to thaumatin I, II, III, a, b, c, etc. and/or combinations thereof.

The term "TS-MRP" refers to (1) a thaumatin-containing MRP composition produced by a Maillard reaction, wherein the reaction mixture comprises thaumatin and wherein thaumatin may be present in the beginning of the Maillard reaction or be added during the Maillard reaction, (2) a composition comprising an MRP prepared in the absence of thaumatin and additionally added thaumatin, or (3) a composition comprising a thaumatin-containing MRP composition and additionally added thaumatin.

The term "sweetener-derived MRP" or "sweetening agent-derived MRP" refers to an MRP or MRP-containing composition produced by a Maillard reaction between (1) an amine donor and (2) a sugar donor comprising a sweetener or a sweetening agent, respectively.

The terms "Maillard product composition" and "Maillard flavor composition" are used interchangeably (unless otherwise noted) with reference to a composition comprising MRPs, S-MRPs, as well as any degraded products from the reactants, optionally including any salt(s) present, sweetener(s) present, and/or mixtures thereof.

The term "non-volatile", as used herein, refers to a compound having a negligible vapor pressure at room temperature, and/or exhibits a vapor pressure of less than about 2 mm. of mercury at 20° C.

The term "volatile", as used herein, refers to a compound having a measurable vapor pressure at room temperature, and/or exhibits a vapor pressure of, or greater than, about 2 mm. of mercury at 20° C.

The terms "flavor" and "flavor characteristic" are used interchangeably with reference to the combined sensory perception of one or more components of taste, odor, and/or texture.

The terms "flavoring agent", "flavoring" and "flavorant" are used interchangeably with reference to a product added to food or beverage products to impart, modify, or enhance the flavor of food. As used herein, these terms do not include substances having an exclusively sweet, sour, or salty taste (e.g., sugar, vinegar, and table salt).

The term "natural flavoring substance" refers to a flavoring substance obtained by physical processes that may result in unavoidable but unintentional changes in the chemical structure of the components of the flavoring (e.g., distillation and solvent extraction), or by enzymatic or microbiological processes, from material of plant or animal origin.

The term "synthetic flavoring substance" refers to a flavoring substance formed by chemical synthesis.

The term "enhance," as used herein, includes augmenting, intensifying, accentuating, magnifying, and potentiating the sensory perception of a flavor characteristic without changing the nature or quality thereof.

Unless otherwise specified, the terms "modify" or "modified" as used herein, includes altering, varying, suppressing, depressing, fortifying and supplementing the sensory perception of a flavor characteristic where the quality or duration of such characteristic was deficient.

The phrase "sensory profile" or "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness". A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The phrase "sucrose equivalence" or "SE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must generally have the same sweetness as a 12% sucrose soft drink, i.e., a diet soft drink must have a 12% SE. Soft drink dispensing equipment assumes an SE of 12%, since such equipment is set up for use with sucrose-based syrups.

As used herein, the term "off-taste" refers to an amount or degree of taste that is not characteristically or usually found in a beverage product or a consumable product of the present disclosure. For example, an off-taste is an undesirable taste of a sweetened consumable to consumers, such as, a bitter taste, a licorice-like taste, a metallic taste, an aversive taste, an astringent taste, a delayed sweetness onset, a lingering sweet aftertaste, and the like, etc.

The term "orally ingestible product" refers to a composition comprising substances which are contacted with the mouth of man or animal, including substances which are taken into and subsequently ejected from the mouth and substances which are drunk, eaten, swallowed or otherwise ingested, and are safe for human or animal consumption when used in a generally acceptable range.

Unless otherwise noted, the term "ppm" (parts per million) means parts per million on a w/w or wt/wt basis.

II. *Stevia* Extracts Containing NSG Substances and Compositions Containing NSG Substance

*Stevia* plants are generally cultivated on industrial scale for the purpose of extracting sweet substances of steviol glycosides. Steviol glycosides, however, are characterized by unpleasant bitterness, aftertaste, slow on-site, and/or astringency, thus limiting their application in food and beverage. NSG substances are believed to be at least partially responsible for the unpleasant taste, so the general conception in the field is that NSG substances should be removed as much as possible from stevia extracts and steviol glycoside preparations.

The inventors surprisingly found that *Stevia* extracts comprising certain NSG substances could create quick on-site, sugar-like taste profile, improved mouthfeel, reduced bitterness, less astringency, and/or less unpleasant aftertaste compared with purified steviol glycosides. In some cases, certain NSG substances could create pleasant retronasal taste, which could impair the disadvantage of higher intensity sweeteners, such as sucralose and steviol glycosides. Accordingly, *Stevia* extracts comprising certain *Stevia*-derived NSG substances (e.g., derived from leaves, stem, flower, and/or seed of *Stevia* plant) may be used as flavor or sweeteners for food, beverage, feed, pharmaceutical and cosmetic industry. Such extracts may also be used as raw materials for further glycosylation. In particular, when such extracts comprise NSG substances with glycoside groups, the glycosylation process would change the structure of these substances and make them taste better. Such extracts and/or their glycosylated products could be used as raw material for Maillard reaction, too.

One aspect of the present application relates to *Stevia* extracts containing one or more NSG substances, such *Stevia* extracts are also referred to as "NSG-containing stevia extracts" or "NSG-containing SE". Another aspect of the present application relates to glycosylated NSG-containing *Stevia* extracts. Another aspect of the present application relates to Millard reaction products (MRPs) derived from a NSG-containing *Stevia* extract. Another aspect of the present application relates to MRPs derived from a glycosylated NSG-containing *Stevia* extract.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise NSG substances in the amounts of 0.00001-99.5 wt %, 0.0001-99.5 wt %, 0.001-99.5 wt %, 0.01-99.5 wt %, 0.01-0.02 wt %, 0.01-0.05 wt %, 0.01-0.07 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.01-7 wt %, 0.01-10 wt %, 0.01-20 wt %, 0.01-50 wt %, 0.01-70 wt %, 0.01-99 wt %, 0.02-0.05 wt %, 0.02-0.07 wt %, 0.02-0.1 wt %, 0.02-0.2 wt %, 0.02-0.5 wt %, 0.02-0.7 wt %, 0.02-1 wt %, 0.02-2 wt %, 0.02-5 wt %, 0.02-7 wt %, 0.02-10 wt %, 0.02-20 wt %, 0.02-50 wt %, 0.02-70 wt %, 0.02-99 wt %, 0.05-0.07 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.05-7 wt %, 0.05-10 wt %, 0.05-20 wt %, 0.05-50 wt %, 0.05-70 wt %, 0.05-99 wt %, 0.07-0.1 wt %, 0.07-0.2 wt %, 0.07-0.5 wt %, 0.07-0.7 wt %, 0.07-1 wt %, 0.07-2 wt %, 0.07-5 wt %, 0.07-7 wt %, 0.07-10 wt %, 0.07-20 wt %, 0.07-50 wt %, 0.07-70 wt %, 0.07-99 wt %, 0.1-0.2 wt %, 0.1-0.5 wt %, 0.1-0.7 wt %, 0.1-1 wt %, 0.1-2 wt %, 0.1-5 wt %, 0.1-7 wt %, 0.1-10 wt %, 0.1-20 wt %, 0.1-50 wt %, 0.1-70 wt %, 0.1-99 wt %, 0.2-0.5 wt %, 0.2-0.7 wt %, 0.2-1 wt %, 0.2-2 wt %, 0.2-5 wt %, 0.2-7 wt %, 0.2-10 wt %, 0.2-20 wt %, 0.2-50 wt %, 0.2-70 wt %, 0.2-99 wt %, 0.5-0.7 wt %, 0.5-1 wt %, 0.5-2 wt %, 0.5-5 wt %, 0.5-7 wt %, 0.5-10 wt %, 0.5-20 wt %, 0.5-50 wt %, 0.5-70 wt %, 0.5-99 wt %, 0.7-1 wt %, 0.7-2 wt %, 0.7-5 wt %, 0.7-7 wt %, 0.7-10 wt %, 0.7-20 wt %, 0.7-50 wt %, 0.7-70 wt %, 0.7-99 wt %, 1-2 wt %, 1-5 wt %, 1-7 wt %, 1-10 wt %, 1-20 wt %, 1-50 wt %, 1-70 wt %, 1-99 wt %, 2-5 wt %, 2-7 wt %, 2-10 wt %, 2-20 wt %, 2-50 wt %, 2-70 wt %, 2-99 wt %, 5-7 wt %, 5-10 wt %, 5-20 wt %, 5-50 wt %, 5-70 wt %, 5-99 wt %, 7-10 wt %, 7-20 wt %, 7-50 wt %, 7-70 wt %, 7-99 wt %, 10-20 wt %, 10-50 wt %, 10-70 wt %, 10-99 wt %, 20-50 wt %, 20-70 wt %, 20-99 wt %, 50-70 wt %, 50-99 wt %, or 70-99 wt %.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise stevia-derived NSG substances in an amount greater than 0.01 wt %, 0.1 wt %, 1 wt %, 2 wt %, 5 wt %, 10 wt %, 20 wt %, 30 wt %, 40 wt %, 50 wt %, 60 wt %, 70 wt %, 80 wt %, 90 wt %, 95 wt %, or 99 wt %.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise steviol glycosides in the amounts of 1-2 wt %, 1-5 wt %, 1-7 wt %, 1-10 wt %, 1-15 wt %, 1-20 wt %, 1-30 wt %, 1-50 wt %, 1-70 wt %, 1-99 wt %, 2-5 wt %, 2-7 wt %, 2-10 wt %, 2-15 wt %, 2-20 wt %, 2-30 wt %, 2-50 wt %, 2-70 wt %, 2-99 wt %, 5-7 wt %, 5-10 wt %, 5-15 wt %, 5-20 wt %, 5-30 wt %, 5-50 wt %, 5-70 wt %, 5-99 wt %, 7-10 wt %, 7-15 wt %, 7-20 wt %, 7-30 wt %, 7-50 wt %, 7-70 wt %, 7-99 wt %, 10-20 wt %, 10-30 wt %, 10-50 wt %, 10-70 wt %, 10-99 wt %, 20-30 wt %, 20-50 wt %, 20-70 wt %, 20-99 wt %, 30-50 wt %, 30-70 wt %, 30-99 wt %, 50-70 wt %, 50-99 wt %, 70-99 wt % or 80-99 wt %.

In some embodiments, the one or more NSG substances comprise *Stevia*-derived NSG substances. In some embodiments, the one or more NSG substances are *Stevia*-derived NSG substances. In some embodiments, the *Stevia*-derived NSG substances comprise volatile *Stevia*-derived NSG substances and/or non-volatile *Stevia*-derived NSG substances.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise volatile NSG substances in the amounts of 0.000000.1-99.5 wt %, 0.00000.1-99.5 wt %, 0.0000.1-99.5 wt %, 0.00001-0.0001 wt %, 0.00001-0.1 wt %, 0.00001-1 wt %, 0.00001-2 wt %, 0.00001-3 wt %, 0.00001-4 wt %, 0.00001-5 wt %, 0.00001-6 wt %, 0.00001-7 wt %, 0.00001-8 wt %, 0.00001-9 wt %, 0.00001-10 wt %, 0.00001-20 wt %, 0.00001-30 wt %, 0.00001-40 wt %, 0.00001-50 wt %, 0.00001-60 wt %, 0.00001-70 wt %, 0.00001-80 wt %, 0.00001-90 wt %, 0.00001-99 wt %, 0.00001-99.5 wt %, 0.0001-0.1 wt %, 0.0001-1, 0.0001-2 wt %, 0.0001-3 wt %, 0.0001-4 wt %, 0.0001-5 wt %, 0.0001-6 wt %, 0.0001-7 wt %, 0.0001-8 wt %, 0.0001-9 wt %, 0.0001-10 wt %, 0.0001-20 wt %, 0.0001-30 wt %, 0.0001-40 wt %, 0.0001-50 wt %, 0.0001-60 wt %, 0.0001-70 wt %, 0.0001-80 wt %, 0.0001-90 wt %, 0.0001-99 wt %, 0.0001-99.5 wt %, 0.1-1 wt %, 0.1-2 wt %, 0.1-3 wt %, 0.1-4 wt %, 0.1-5 wt %, 0.1-6 wt %, 0.1-7 wt %, 0.1-8 wt %, 0.1-9 wt %, 0.1-10 wt %, 0.1-20 wt %, 0.1-30 wt %, 0.1-40 wt %, 0.1-50 wt %, 0.1-60 wt %, 0.1-70 wt %, 0.1-80 wt %, 0.1-90 wt %, 0.1-99 wt %, 0.1-99.5 wt %, 1-2 wt %, 1-3 wt %, 1-4 wt %, 1-5 wt %, 1-6 wt %, 1-7 wt %, 1-8 wt %, 1-9 wt %, 1-10 wt %, 1-20 wt %, 1-30 wt %, 1-40 wt %, 1-50 wt %, 1-60 wt %, 1-70 wt %, 1-80 wt %, 1-90 wt %, 1-99 wt %, 2-3 wt %, 2-4 wt %, 2-5 wt %, 2-6 wt %, 2-7 wt %, 2-8 wt %, 2-9 wt %, 2-10 wt %, 2-20 wt %, 2-30 wt %, 2-40 wt %, 2-50 wt %, 2-60 wt %, 2-70 wt %, 2-80 wt %, 2-90 wt %, 2-99 wt %, 3-4 wt %, 3-5 wt %, 3-6 wt %, 3-7 wt %, 3-8 wt %, 3-9 wt %, 3-10 wt %, 3-20 wt %, 3-30 wt %, 3-40 wt %, 3-50 wt %, 3-60 wt %, 3-70 wt %, 3-80 wt %, 3-90 wt %, 3-99 wt %, 4-5 wt %, 4-6 wt %, 4-7 wt %, 4-8 wt %, 4-9 wt %, 4-10 wt %, 4-20 wt %, 4-30 wt %, 4-40 wt %, 4-50 wt %, 4-60 wt %, 4-70 wt %, 4-80 wt %, 4-90 wt %, 4-99 wt %, 5-6 wt %, 5-7 wt %, 5-8 wt %, 5-9 wt %, 5-10 wt %, 5-20 wt %, 5-30 wt %, 5-40 wt %, 5-50 wt %, 5-60 wt %, 5-70 wt %, 5-80 wt %, 5-90 wt %, 5-99 wt %, 6-7 wt %, 6-8 wt %, 6-9 wt %, 6-10 wt %, 6-20 wt %, 6-30 wt %, 6-40 wt %, 6-50 wt %, 6-60 wt %, 6-70 wt %, 6-80 wt %, 6-90 wt %, 6-99 wt %, 7-8 wt %, 7-9 wt %, 7-10 wt %, 7-20 wt %, 7-30 wt %, 7-40 wt %, 7-50 wt %, 7-60 wt %, 7-70 wt %, 7-80 wt %, 7-90 wt %, 7-99 wt %, 8-9 wt %, 8-10 wt %, 8-20 wt %, 8-30 wt %, 8-40 wt %, 8-50 wt %, 8-60 wt %, 8-70 wt %, 8-80 wt %, 8-90 wt %, 8-99 wt %, 9-10 wt %, 9-20 wt %, 9-30 wt %, 9-40 wt %, 9-50 wt %, 9-60 wt %, 9-70 wt %, 9-80 wt %, 9-90 wt %, 9-99 wt %, 10-20 wt %, 10-30 wt %, 10-40 wt %, 10-50 wt %, 10-60 wt %, 10-70 wt %, 10-80 wt %, 10-90 wt %, 10-99 wt %, 20-30 wt %, 20-40 wt %, 20-50 wt %, 20-60 wt %, 20-70 wt %, 20-80 wt %, 20-90 wt %, 20-99 wt %, 30-40 wt %, 30-50 wt %, 30-60 wt %, 30-70 wt %, 30-80 wt %, 30-90 wt %, 30-99 wt %, 40-50 wt %, 40-60 wt %, 40-70 wt %, 40-80 wt %, 40-90 wt %, 40-99 wt %, 50-60 wt %, 50-70 wt %, 50-80 wt %, 50-90 wt %, 50-99 wt %, 60-70 wt %, 60-80 wt %, 60-90 wt %, 60-99 wt %, 70-80 wt %, 70-90 wt %, 70-99 wt %, 80-90 wt %, 80-99 wt %, or 90-99 wt %. In some embodiments, the one or more volatile NSG substances comprise *Stevia*-derived volatile NSG substances and/or their glycosylated products. In some embodiments, the one or more volatile NSG substances are *Stevia*-derived volatile NSG substances and/or their glycosylated products.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more volatile *Stevia*-derived NSG substances listed in Tables 1-2 to 1-5 and/or their glycosylated products.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*,R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde and their glycosylated products.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances and/or their glycosylated products listed below:

(1) tetradecane and/or its glycosylated products in the amount of 0.1-10 wt %, 0.4-8 wt %, 0.4-7 wt %, 0.4-6 wt %, 0.4-5 wt %, 0.4-4 wt %, 0.5-8 wt %, 0.5-7 wt %, 0.5-6 wt %, 0.5-5 wt %, 0.5-4 wt %, 0.6-8 wt %, 0.6-7 wt %, 0.6-6 wt %, 0.6-5 wt %, 0.6-4 wt %, 0.7-8 wt %, 0.7-7 wt %, 0.7-6 wt %, 0.7-5 wt %, 0.7-4 wt %, 0.8-8 wt %, 0.8-7 wt %, 0.8-6 wt %, 0.8-5 wt % or 0.8-4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(2) pentadecane and/or its glycosylated products in the amount of 0.1-10 wt %, 0.4-8 wt %, 0.4-7 wt %, 0.4-6 wt %, 0.4-5 wt %, 0.4-4 wt %, 0.5-8 wt %, 0.5-7 wt %, 0.5-6 wt %, 0.5-5 wt %, 0.5-4 wt %, 0.6-8 wt %, 0.6-7 wt %, 0.6-6 wt %, 0.6-5 wt %, 0.6-4 wt %, 0.7-8 wt %, 0.7-7 wt %, 0.7-6 wt %, 0.7-5 wt %, 0.7-4 wt %, 0.8-8 wt %, 0.8-7 wt %, 0.8-6 wt %, 0.8-5 wt % or 0.8-4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(3) hexadecane and/or its glycosylated products in the amount of 0.1-10 wt %, 0.4-8 wt %, 0.4-7 wt %, 0.4-6 wt %, 0.4-5 wt %, 0.4-4 wt %, 0.5-8 wt %, 0.5-7 wt %, 0.5-6 wt %, 0.5-5 wt %, 0.5-4 wt %, 0.6-8 wt %, 0.6-7 wt %, 0.6-6 wt %, 0.6-5 wt %, 0.6-4 wt %, 0.7-8 wt %, 0.7-7 wt %, 0.7-6 wt %, 0.7-5 wt %, 0.7-4 wt %, 0.8-8 wt %, 0.8-7 wt %, 0.8-6 wt %, 0.8-5 wt % or 0.8-4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(4) 2,6,10,14-tetramethyl-pentadecane and/or its glycosylated products in the amount of 0.1-3 wt %, 0.1-2 wt %, 0.1-1.5 wt %, 0.1-1.2 wt %, 0.1-1 wt %, 0.1-0.9 wt %, 0.2-3 wt %, 0.2-2 wt %, 0.2-1.5 wt %, 0.2-1.2 wt %, 0.2-1 wt %, 0.2-0.9 wt %, 0.3-3 wt %, 0.3-2 wt %, 0.3-1.5 wt %, 0.3-1.2 wt %, 0.3-1 wt %, 0.3-0.9 wt %, 0.4-3 wt %, 0.4-2 wt %, 0.4-1.5 wt %, 0.4-1.2 wt %, 0.4-1 wt % or 0.4-0.9 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(5) heptadecane and/or its glycosylated products in the amount of 0.1-4 wt %, 0.1-3 wt %, 0.1-2 wt %, 0.1-1.5 wt %, 0.1-1.2 wt %, 0.2-4 wt %, 0.2-3 wt %, 0.2-2 wt %, 0.2-1.5 wt %, 0.2-1.2 wt %, 0.3-4 wt %, 0.3-3 wt %, 0.3-2 wt %, 0.3-1.5 wt %, 0.3-1.2 wt %, 0.4-4 wt %, 0.4-3 wt %, 0.4-2 wt %, 0.4-1.5 wt % or 0.4-1.2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(6) nonanal and/or its glycosylated products in the amount of 0.1-10 wt %, 0.3-10 wt %, 0.5-10 wt %, 0.5-9 wt %, 0.5-8 wt %, 0.5-7 wt %, 0.5-6 wt %, 0.5-5 wt %, 0.5-4 wt %, 0.5-3 wt %, 0.5-2 wt %, 1-10 wt %, 1-9 wt %, 1-8 wt %, 1-7 wt %, 1-6 wt %, 1-5 wt %, 1-4 wt %, 1-3 wt %, 1-2 wt %, 1.2-10 wt %, 1.2-9 wt %, 1.2-8 wt %, 1.2-7 wt %, 1.2-6 wt %, 1.2-5 wt %, 1.2-4 wt %, 1.2-3 wt %, 1.2-2 wt %, 1.5-10 wt %, 1.5-9 wt %, 1.5-8 wt %, 1.5-7 wt %, 1.5-6 wt %, 1.5-5 wt %, 1.5-4 wt %, 1.5-3 wt %, 1.5-2 wt %, 1.7-10 wt %, 1.7-9 wt %, 1.7-8 wt %, 1.7-7 wt %, 1.7-6 wt %, 1.7-5 wt %, 1.7-4 wt %, 1.7-3 wt % or 1.7-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(7) benzaldehyde and/or its glycosylated products in the amount of 0.5-15 wt %, 0.5-12 wt %, 0.5-10 wt %, 0.5-9 wt %, 0.5-8 wt %, 0.5-7 wt %, 0.5-6 wt %, 1-15 wt %, 1-12 wt %, 1-10 wt %, 1-9 wt %, 1-8 wt %, 1-7 wt %, 1-6 wt %, 2-15 wt %, 2-12 wt %, 2-10 wt %, 2-9 wt %, 2-8 wt %, 2-7 wt % or 2-6 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(8) 2,3-butanedione and/or its glycosylated products in the amount of 0.1-10 wt %, 0.1-9 wt %, 0.1-8 wt %, 0.1-7 wt %, 0.1-6 wt %, 0.1-5 wt %, 0.1-4 wt %, 0.1-3 wt %, 0.1-2 wt %, 0.1-1.5 wt %, 0.2-10 wt %, 0.2-9 wt %, 0.2-8 wt %, 0.2-7 wt %, 0.2-6 wt %, 0.2-5 wt %, 0.2-4 wt %, 0.2-3 wt %, 0.2-2 wt %, 0.2-1.5 wt %, 0.3-10 wt %, 0.3-9 wt %, 0.3-8 wt %, 0.3-7 wt %, 0.3-6 wt %, 0.3-5 wt %, 0.3-4 wt %, 0.3-3 wt %, 0.3-2 wt %, 0.3-1.5 wt %, 0.4-10 wt %, 0.4-9 wt %, 0.4-8 wt %, 0.4-7 wt %, 0.4-6 v, 0.4-5 wt %, 0.4-4 wt %, 0.4-3 wt %, 0.4-2 wt % or 0.4-1.5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(9) acetic acid and/or its glycosylated products in the amount of 0.2-20 wt %, 0.5-20 wt %, 0.5-18 wt %, 0.5-15 wt %, 0.5-13 wt %, 0.5-12 wt %, 0.5-11 wt %, 0.5-10 wt %, 0.8-20 wt %, 0.8-18 wt %, 0.8-15 wt %, 0.8-13 wt %, 0.8-12 wt %, 0.8-11 wt %, 0.8-10 wt %, 1-20 wt %, 1-18 wt %, 1-15 wt %, 1-13 wt %, 1-12 wt %, 1-11 wt %, 1-10 wt %, 1.2-20 wt %, 1.2-18 wt %, 1.2-15 wt %, 1.2-13 wt %, 1.2-12 wt %, 1.2-11 wt % or 1.1-10 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(10) 2-ethyl-1-hexanol and/or its glycosylated products in the amount of 0.1-5 wt %, 0.2-4 wt %, 0.2-3 wt %, 0.2-2 wt %, 0.2-1.5 wt %, 0.2-1.3 wt %, 0.4-4 wt %, 0.4-3 wt %, 0.4-2 wt %, 0.4-1.5 wt %, 0.4-1.3 wt %, 0.5-4 wt %, 0.5-3 wt %, 0.5-2 wt %, 0.5-1.5 wt %, 0.5-1.3 wt %, 0.6-4 wt %, 0.6-3 wt %, 0.6-2 wt %, 0.6-1.5 wt %, 0.6-1.3 wt %, 0.7-4 wt %, 0.7-3 wt %, 0.7-2 wt %, 0.7-1.5 wt % or 0.7-1.3 wt % of the total *Stevia*-derived volatile NSG substances in the *Stevia* extracts, the glycosylated NSG-containing *Stevia* extract, the MRPs derived from a NSG-containing

*Stevia* extract, or the MRPs derived from a glycosylated NSG-containing *Stevia* extract of the present application;

(11) benzyl alcohol and/or its glycosylated products in the amount of 0.01-10 wt %, 0.05-10 wt %, 0.05-8 wt %, 0.05-6 wt %, 0.05-5 wt %, 0.05-4 wt %, 0.05-3 wt %, 0.1-10 wt %, 0.1-8 wt %, 0.1-6 wt %, 0.1-5 wt %, 0.1-4 wt %, 0.1-3 wt %, 0.2-10 wt %, 0.2-8 wt %, 0.2-6 wt %, 0.2-5 wt %, 0.2-4 wt %, 0.2-3 wt %, 0.25-10 wt %, 0.25-8 wt %, 0.25-6 wt %, 0.25-5 wt %, 0.25-4 wt %, 0.25-3 wt %, 0.3-10 wt %, 0.3-8 wt %, 0.3-6 wt %, 0.3-5 wt %, 0.3-4 wt % or 0.3-3 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(12) phenylethyl alcohol and/or its glycosylated products in the amount of 0.1-5 wt %, 0.2-4 wt %, 0.2-3 wt %, 0.2-2 wt %, 0.2-1.5 wt %, 0.2-1.3 wt %, 0.4-4 wt %, 0.4-3 wt %, 0.4-2 wt %, 0.4-1.5 wt % or 0.4-1.3 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application; and

(13) dimethyl ester of pentanedioic acid and/or its glycosylated products in the amount of 0.1-5 wt %, 0.2-4 wt %, 0.2-3 wt %, 0.2-2 wt %, 0.2-1.5 wt %, 0.2-1.3 wt %, 0.2-1.2 wt %, 0.4-4 wt %, 0.4-3 wt %, 0.4-2 wt %, 0.4-1.5 wt %, 0.4-1.3 wt %, 0.4-1.2 wt %, 0.5-4 wt %, 0.5-3 wt %, 0.5-2 wt %, 0.5-1.5 wt %, 0.5-1.3 wt %, 0.5-1.2 wt %, 0.6-4 wt %, 0.6-3 wt %, 0.6-2 wt %, 0.6-1.5 wt %, 0.6-1.3 wt % or 0.6-1.2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances and/or their glycosylated products listed below:

(1) nonanal and/or its glycosylated products in the amount of 0.1-10 wt %, 0.3-9 wt %, 0.5-8 wt %, 0.6-7 wt %, 0.8-6 wt %, 1-5 wt %, 1.2-4 wt %, 1.4-3 wt % or 1.6-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(2) decanal and/or its glycosylated products in the amount of 0.01-1 wt %, 0.05-0.8 wt %, 0.1-0.6 wt %, 0.2-0.5 wt % or 0.3-0.4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(3) 2-ethyl-1-hexanol and/or its glycosylated products in the amount of 0.1-5 wt %, 0.2-4 wt %, 0.3-3 wt %, 0.4-2 wt %, 0.5-1.5 wt %, 0.6-1 wt % or 0.6-0.8 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application; and (4) (3R, 6R)-2,2,6-trimethyl-6-vinyltetrahydro-2H-pyran-3-ol and/or its glycosylated products in the amount of 0.01-1 wt %, 0.03-0.6 wt %, 0.05-0.4 wt %, 0.1-0.3 wt % or 0.15-0.2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances and/or their glycosylated products listed below:

(1) hexanal and/or its glycosylated products in the amount of 0.1-10 wt %, 0.1-8 wt %, 0.1-5 wt %, 0.2-3 wt %, 0.3-1 wt % or 0.4-0.6 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(2) 2-hexenal and/or its glycosylated products in the amount of 0.1-10 wt %, 1-8 wt %, 1-5 wt %, 0.2-8 wt %, 0.4-6 wt %, 0.6-4 wt %, 0.8-2 wt %, 0.8-1.5 wt % or 0.8-1.2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(3) safranal and/or its glycosylated products in the amount of 0.5-10 wt %, 0.5-8 wt %, 1-5 wt %, 1.5-3 wt % or 2-3 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(4) 2-ethyl-1-hexanol and/or its glycosylated products in the amount of 0.1-5 wt %, 0.1-4 wt %, 0.1-3 wt %, 0.3-4 wt %, 0.5-3 wt %, 0.8-2 wt % or 1-1.5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(5) benxyl alcohol and/or its glycosylated products in the amount of 1-10 wt %, 1-8 wt %, 1-5 wt %, 1.5-8 wt %, 2-6 wt % and 2-4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(6) 5,6,7,7a-tetrahydro-4,4,7a-trimethyl-2(4H)-benzofuranone and/or its glycosylated products in the amount of 0.1-5 wt %, 0.1-4 wt %, 0.1-3 wt %; 0.2-4 wt %, 0.4-3 wt %, 0.5-2 wt %, 0.6-1.5 wt % and 0.7-1 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(7) δ-octalactone and/or its glycosylated products in the amount of 0.1-5 wt %, 0.1-4 wt %, 0.1-3 wt %, 0.3-4 wt %, 0.5-3 wt %, 0.8-2 wt % or 1-1.5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(8) 2-pentyl-furan and/or its glycosylated products in the amount of 0.1-5 wt %, 0.1-4 wt %, 0.1-3 wt %, 0.2-4 wt %, 0.3-3 wt %, 0.4-2 wt % or 0.5-1 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(9) acetic acid and/or its glycosylated products in the amount of 1-20 wt %, 3-20 wt %, 3-15 wt %, 5-20 wt %, 5-15 wt % or 7-13 wt %; wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(10) propanoic acid and/or its glycosylated products in the amount of 0.1-5 wt %, 0.1-4 wt %, 0.1-3 wt %, 0.3-3 wt %, 0.3-2 wt %, 0.3-1 wt % or 0.4-1 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(11) butanoic acid and/or its glycosylated products in the amount of 0.1-10 wt %, 0.1-8 wt %, 0.1-5 wt %, 0.5-5 wt %, 1-3 wt % or 1-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application; and

(12) cyclohexanecarboxylic acid and/or its glycosylated products in the amount of 0.1-5 wt %, 0.1-4 wt %. 0.1-3 wt %, 0.3-4 wt %, 0.5-3 wt %, 0.8-2 wt % or 1-1.5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise one or more *Stevia*-derived volatile NSG substances and their glycosylated products listed below:

(1) β-myrcene and/or its glycosylated products in the amount of 0.1-10 wt %, 0.1-5 wt %, 0.5-5 wt %, 0.5-4 wt % or 0.5-3 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(2) L-limonene and/or its glycosylated products in the amount of 0.5-20 wt %, 0.5-15 wt %, 0.5-10 wt %, 1-20 wt %, 1-15 wt %, 1-10 wt %, 2-20 wt %, 2-15 wt % or 2-10 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(3) cosmene and/or its glycosylated products in the amount of 0.1-10 wt %, 0.1-5 wt %, 0.1-3 wt %, 0.3-10 wt %, 0.3-5 wt %, 0.3-3 wt %, 0.5-10 wt %, 0.5-5 wt %, 0.5-3 wt %, 0.5-2 wt % or 0.5-1.5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(4) bornylene and/or its glycosylated products in the amount of 0.1-10 wt %, 0.1-5 wt %, 0.1-3 wt %, 0.3-10 wt %, 0.3-5 wt %, 0.3-3 wt %, 0.5-10 wt %, 0.5-5 wt %, 0.5-3 wt %, 0.5-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(5) cyprotene and/or its glycosylated products in the amount of 0.1-10 wt %, 0.1-8 wt %, 0.1-5 wt %, 0.5-10 wt %, 0.5-5 wt %, 1-10 wt %, 1-5 wt %, 2-10 wt % or 2-4 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(6) beta-terpineol and/or its glycosylated products in the amount of 0.1-10 wt %, 0.1-5 wt %, 0.1-3 wt %, 0.5-10 wt %, 0.5-5 wt %, 0.5-3 wt %, 1-10 wt %, 1-5 wt %, 1-3 wt % or 1-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(7) (Z)-linalool oxide and/or its glycosylated products in the amount of 0.1-5 wt %, 0.1-3 wt %, 0.3-5 wt %, 0.3-3 wt % or 0.3-1 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(8) linalool and/or its glycosylated products in the amount of 0.1-10 wt %, 0.1-5 wt %, 0.1-3 wt %, 0.3-10 wt %, 0.3-5 wt %, 0.3-3 wt % or 0.3-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(9) α-terpineol and/or its glycosylated products in the amount of 0.1-10 wt %, 0.1-5 wt %, 0.5-10 wt %, 0.5-5 wt %, 1-10 wt %, 1-5 wt % or 1-3 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(10) phenylethyl alcohol and/or its glycosylated products in the amount of of 0.1-10 wt %, 0.1-5 wt %, 0.1-3 wt %, 0.3-10 wt %, 0.3-5 wt %, 0.3-3 wt % or 0.3-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(11) benzyl alcohol and/or its glycosylated products in the amount of 0.1-15 wt %, 0.1-10 wt %, 0.1-6 wt %, 0.3-15 wt %, 0.3-10 wt %, 0.3-6 wt %, 0.5-10 wt % or 0.5-6 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(12) nonanal and/or its glycosylated products in the amount of 0.1-10 wt %, 0.1-8 wt %, 0.1-5 wt %, 0.5-10 wt %, 0.5-8 wt %, 0.15-5 wt %, 1-10 wt %, 1-8 wt % or 1-6 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(13) safranal and/or its glycosylated products in the amount of 0.05-5 wt %, 0.05-2 wt %, 0.05-1 wt %, 0.2-5 wt %, 0.2-2 wt %, 0.2-1 wt % or 0.2-0.7 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(14) 5-α, 4-dimethyl-3-cyclohexene-4-1-acetaldehyde and/or its glycosylated products in the amount of 0.1-15 wt %, 0.1-10 wt %, 0.5-15 wt %, 0.5-10 wt %, 1-15 wt %, 1-10 wt % or 1-8 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(15) 5-methyl furfural and/or its glycosylated products in the amount of 0.1-10 wt %, 0.1-5 wt %, 1-10 wt %, 1-5 wt % or 2-5 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(16) furfural and/or its glycosylated products in the amount of 0.5-15 wt %, 0.5-10 wt %, 1-15 wt %, 1-10 wt %, 2-15 wt %, 2-18 wt % or 2-8 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(17) benzaldehyde and/or its glycosylated products in the amount of 0.1-15 wt %, 0.1-10 wt %, 0.5-15 wt %, 0.5-10 wt %, 1-15 wt %, 1-10 wt %, 1-8 wt % or 1-6 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(18) 7-6-methyl-6-hepten-2-one and/or its glycosylated products in the amount of 0.1-5 wt %, 0.1-3 wt %, 0.3-5 wt %, 0.3-3 wt % or 0.3-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application;

(19) 1-(2-furanyl)-ethanone and/or its glycosylated products in the amount of 0.1-10 wt %, 0.1-5 wt %, 0.1-3 wt %, 0.3-10 wt %, 0.3-5 wt %, 0.3-3 wt %, 0.5-10 wt %, 0.5-5 wt %, 0.5-3 wt % or 0.5-2 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application; and

(20) 3-butyl ester of 2-propenoic acid and/or its glycosylated products in the amount of 0.05-10 wt %, 0.05-5 wt %, 0.05-2 wt %, 0.1-10 wt %, 0.1-5 wt %, 0.1-2 wt %, 0.2-10 wt %, 0.2-5 wt %, 0.2-2 wt % or 0.3-1 wt % of the total *Stevia*-derived volatile NSG substances in the *Stevia* extracts, the glycosylated NSG-containing *Stevia* extract, the MRPs derived from a NSG-containing *Stevia* extract, or the MRPs derived from a glycosylated NSG-containing *Stevia* extract of the present application.

In some embodiments, the *Stevia* extracts, the glycosylated NSG-containing *Stevia* extract, the MRPs derived from a NSG-containing *Stevia* extract, or the MRPs derived from a glycosylated NSG-containing *Stevia* extract comprise non-volatile NSG substances in the amounts of 0.0000001-99.5 wt %, 0.000001-99.5 wt %, 0.00001-99.5 wt %, 0.0001-99.5 wt %, 0.0001-99.5 wt %, 0.001-99.5 wt %, 0.01-99.5 wt %, 0.01-0.1 wt %, 0.01-0.2 wt %, 0.01-0.5 wt %, 0.01-0.7 wt %, 0.01-1 wt %, 0.01-10 wt %, 0.01-20 wt %, 0.01-40 wt %, 0.01-60 wt %, 0.01-80 wt %, 0.01-90 wt %, 0.01-92 wt %, 0.01-95 wt %, 0.01-97 wt %, 0.01-98 wt %, 0.01-99 wt %, 0.05-0.1 wt %, 0.05-0.2 wt %, 0.05-0.5 wt %, 0.05-0.7 wt %, 0.05-1 wt %, 0.05-10 wt %, 0.05-20 wt %, 0.05-40 wt %, 0.05-60 wt %, 0.05-80 wt %, 0.05-90 wt %, 0.05-92 wt %, 0.05-95 wt %, 0.05-97 wt %, 0.05-98 wt %, 0.05-99 wt %, 0.07-0.1 wt %, 0.07-0.2 wt %, 0.07-0.5 wt %, 0.07-0.7 wt %, 0.07-1 wt %, 0.07-10 wt %, 0.07-20 wt %, 0.07-30 wt %, 0.07-40 wt %, 0.07-50 wt %, 0.07-60 wt %, 0.07-70 wt %, 0.07-80 wt %, 0.07-90 wt %, 0.07-92 wt %, 0.07-95 wt %, 0.07-97 wt %, 0.07-98 wt %, 0.07-99 wt %, 0.1-0.2 wt %, 0.1-0.5 wt %, 0.1-0.7 wt %, 0.1-1 wt %, 0.1-10 wt %, 0.1-20 wt %, 0.1-30 wt %, 0.1-40 wt %, 0.1-50 wt %, 0.1-60 wt %, 0.1-70 wt %, 0.1-80 wt %, 0.1-90 wt %, 0.1-92 wt %, 0.1-95 wt %, 0.1-97 wt %, 0.1-98 wt %, 0.1-99 wt %, 0.2-0.5 wt %, 0.2-0.7 wt %, 0.2-1 wt %, 0.2-10 wt %, 0.2-20 wt %, 0.2-30 wt %, 0.2-40 wt %, 0.2-50 wt %, 0.2-60 wt %, 0.2-70 wt %, 0.2-80 wt %, 0.2-90 wt %, 0.2-92 wt %, 0.2-95 wt %, 0.2-97 wt %, 0.2-98 wt %, 0.2-99 wt %, 0.5-0.7 wt %, 0.5-1 wt %, 0.5-10 wt %, 0.5-20 wt %, 0.5-30 wt %, 0.5-40 wt %, 0.5-50 wt %, 0.5-60 wt %, 0.5-70 wt %, 0.5-80 wt %, 0.5-90 wt %, 0.5-92 wt %, 0.5-95 wt %, 0.5-97 wt %, 0.5-98 wt %, 0.5-99 wt %, 0.7-1 wt %, 0.7-10 wt %, 0.7-20 wt %, 0.7-30 wt %, 0.7-40 wt %, 0.7-50 wt %, 0.7-60 wt %, 0.7-70 wt %, 0.7-80 wt %, 0.7-90 wt %, 0.7-92 wt %, 0.7-95 wt %, 0.7-97 wt %, 0.7-98 wt %, 0.7-99 wt %, 1-10 wt %, 1-20 wt %, 1-30 wt %, 1-40 wt %, 1-50 wt %, 1-60 wt %, 1-70 wt %, 1-80 wt %, 1-90 wt %, 1-92 wt %, 1-95 wt %, 1-97 wt %, 1-98 wt %, 1-99 wt %, 10-20 wt %, 10-30 wt %, 10-40 wt %, 10-50 wt %, 10-60 wt %, 10-70 wt %, 10-80 wt %, 10-90 wt %, 10-92 wt %, 10-95 wt %, 10-97 wt %, 10-98 wt %, 10-99 wt %, 20-30 wt %, 20-40 wt %, 20-50 wt %, 20-60 wt %, 20-70 wt %, 20-80 wt %, 20-90 wt %, 20-92 wt %, 20-95 wt %, 20-97 wt %, 20-98 wt %, 20-99 wt %, 30-40 wt %, 30-50 wt %, 30-60 wt %, 30-70 wt %, 30-80 wt %, 30-90 wt %, 30-92 wt %, 30-95 wt %, 30-97 wt %, 30-98 wt %, 30-99 wt %, 40-50 wt %, 40-60 wt %, 40-70 wt %, 40-80 wt %, 40-90 wt %, 40-92 wt %, 40-95 wt %, 40-97 wt %, 40-98 wt %, 40-99 wt %, 50-60 wt %, 50-70 wt %, 50-80 wt %, 50-90 wt %, 50-92 wt %, 50-95 wt %, 50-97 wt %, 50-98 wt %, 50-99 wt %, 60-70 wt %, 60-80 wt %, 60-90 wt %, 60-92 wt %, 60-95 wt %, 60-97 wt %, 60-98 wt %, 60-99 wt %, 70-80 wt %, 70-90 wt %, 70-92 wt %, 70-95 wt %, 70-97 wt %, 70-98 wt %, 70-99 wt %, 80-90 wt %, 80-92 wt %, 80-95 wt %, 80-97 wt %, 80-98 wt %, 80-99 wt %, 90-92 wt %, 90-95 wt %, 90-96 wt %, 90-97 wt %, 90-98 wt %, 90-99 wt %, 92-95 wt %, 92-97 wt %, 92-98 wt %, 92-99 wt %, 95-97 wt %, 95-98 wt %, 95-99 wt %, 97-99 wt %, or 98-99 wt %. In some embodiments, the above-described non-volatile NSG substances are *Stevia*-derived non-volatile NSG substances that have a molecular weight that equals to, or is greater than, 3,000, 5,000, 8,000, 10,000 or 15,000 dalton. In some embodiments, the above-described non-volatile NSG substances are *Stevia*-derived non-volatile NSG substances that have a molecular weight that is less than 3,000, 2,000, 1,500, 1,000 or 500 dalton. In some embodiments, the non-volatile NSG substances comprise *Stevia*-derived non-volatile NSG substances and/or their glycosylated products. In some embodiments, the non-volatile NSG substances are *Stevia*-derived non-volatile NSG substances and/or their glycosylated products.

In some embodiments, the *Stevia* extracts of the present application, the glycosylated *Stevia* extracts of the present application, MRP derived from the *Stevia* extract of the present application, or MRP derived from the glycosylated *Stevia* extracts of the present application comprise stevia-derived NSG substances comprise one or more of the following *Stevia*-derived non-volatile NSG compounds and/or their glycosylated products:

3-caffeoylquinic acid, 4-caffeoylquinic acid, 4-caffeoylquinic acid, 3,5 dicaffeoylquinic acid, 3,4 dicaffeoylquinic acid, 4,5 dicaffeoylquinic acid, kaempferol-hexoside, quercetin-pentoside, kaempferol-xyloside-hexoside, quercetin-dihexoside-rhamnoside and quercetin-dirhamnoside.

In some embodiments, each of the one or more non-volatile NSG compounds and/or their glycosylated products is present in an amount of less than 0.01 wt %, 0.02 wt %, 0.05 wt %, 0.1 wt %, 0.2 wt %, 0.5 wt %, 1 wt %, 2 wt %, 5 wt %, 10 wt %, 20 wt %, 30 wt % or 40 wt % of the *Stevia* extracts of the present application, the glycosylated *Stevia* extracts of the present application, the MRP derived from the *Stevia* extract of the present application, or the MRP derived from the glycosylated *Stevia* extracts of the present application.

In some embodiments, the total amount of the non-volatile NSG compounds in the *Stevia* extracts of the present application, the glycosylated *Stevia* extracts of the present application, the MRP derived from the *Stevia* extract of the present application, or the MRP derived from the glycosylated *Stevia* extracts of the present application in is less than 0.1 wt %, 1 wt %, 10 wt %, 20 wt %, 30 wt %, 40 wt %, 50 wt %, 60 wt %, 70 wt %, 80 wt % or 90 wt % of the *Stevia* extracts of the present application, the glycosylated *Stevia* extracts of the present application, the MRP derived from the *Stevia* extract of the present application, or the MRP derived from the glycosylated *Stevia* extracts of the present application.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise less than 10 wt %, 5 wt %, 2 wt %, 1 wt %, 0.5 wt %, 0.2 wt %, 0.1 wt %, 0.05 wt %, 0.02 wt %, 0.01 wt %, 0.005 wt %, 0.002 wt % or 0.001 wt % of caffeoylquinic acid, dicaffeoylquinic acid, kaempferol-hexoside, quercetin-pentoside, kaempferol-xyloside-hexoside, quercetin-dihexoside-rhamnoside, quercetin-dirhamnoside and the glycosylated products thereof.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived volatile NSG substances and one or more *Stevia*-derived non-volatile NSG substances listed below: 0.001-3 wt %, 0.001-1 wt % or 0.001-0.1 wt % of caffeoylquinic acid and/or its glycosylated products, 0.001-2 wt %, 0.001-1 wt % or 0.001-0.1 wt % of dicaffeoylquinic acid and/or its glycosylated products, 0.001-3 wt % of Kaempferol-hexoside and/or its glycosylated products, 0.001-2 wt % of Quercetin-pentoside and/or its glycosylated products, 0.001-3 wt % of Kaempferol-xyloside-hexoside and/or its glycosylated products, 0.001-2 wt % of Quercetin-dihexoside-rhamnoside and/or its glycosylated products, 0.001-2 wt % of Quercetin-dirhamnoside.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise caffeoylquinic acid and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise dicaffeoylquinic acid and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise Kaempferol-hexoside and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise Quercetin- and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise Kaempferol-xyloside-hexoside and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise Quercetin-dihexoside-rhamnoside and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise Quercetin-dirhamnoside and/or its glycosylated products in the amount of 0.001-5 wt %, 0.001-0.05 wt %, 0.001-0.1 wt %, 0.001-0.2 wt %, 0.001-0.5 wt %, 0.001-0.7 wt %, 0.001-1 wt %, 0.001-2 wt %, 0.001-5 wt %, 0.01-0.05 wt %, 0.01-0.1 wt %, 0.01-0.2 wt %, 0.01-0.5 wt %, 0.01-0.7 wt %, 0.01-1 wt %, 0.01-2 wt %, 0.01-5 wt %, 0.05-0.1 wt %, 0.05-0.2 wt %, 0.05-0.5 wt %, 0.05-0.7 wt %, 0.05-1 wt %, 0.05-2 wt %, 0.05-5 wt %, 0.1-0.2 wt %, 0.1-0.5 wt %, 0.1-0.7 wt %, 0.1-1 wt %, 0.1-2 wt %, 0.1-5 wt %, 0.2-0.5 wt %, 0.2-0.7 wt %, 0.2-1 wt %, 0.2-2 wt %, 0.2-5 wt %, 0.5-0.7 wt %, 0.5-1 wt %, 0.5-2 wt %, 0.5-5 wt %, 0.7-1 wt %, 0.7-2 wt %, 0.7-5 wt %, 1-2 wt % or 1-5 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise NSG substances wherein the NSG substances contain one or more molecules characterized by terpene, di-terpene, or ent-kaurene structure.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside A (RA) and/or its glycosylated products in an amount smaller than 99 wt %, 95 wt %, 90 wt %, 80 wt %, 70 wt %, 60 wt %, 50 wt %, 40 wt %, 30 wt %, 20 wt %, 10 wt %, 5 wt %, 2 wt %, or 1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside A (RA) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside B (RB) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside C (RC) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside D (RD) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside E (RE) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside F (RF) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside M (RM) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application contain Rebaudioside N (RN) and/or its glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts containing stevia-derived NSGs of the present application, the glycosylated *Stevia* extracts containing stevia-derived NSGs of the present application, the MRP derived from the *Stevia* extract containing stevia-derived NSGs of the present application, or the MRP derived from the glycosylated *Stevia* extracts containing stevia-derived NSGs of the present application comprise TSG(9) and/or their glycosylated products in an amount of 0.001-99 wt %, 0.001-95 wt %, 0.001-90 wt %, 0.001-80 wt %, 0.001-70 wt %, 0.001-60 wt %, 0.001-50 wt %, 0.001-40 wt %, 0.001-30 wt %, 0.001-20 wt %, 0.001-10 wt %, 0.001-5 wt %, 0.001-2 wt %, or 0.001-1 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived NSG substances that contain glycosides.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived NSG substances that contain substances derived from precursors of steviol glycosides and/or metabolized steviol glycosides.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived NSG substances that contain substances derived from precursors of steviol glycosides and/or metabolized steviol glycosides in the leaves of *Stevia* plant.

In some embodiments, the *Stevia* extract of the present application is extracted from a raw material that comprises *Stevia* plant flower. The *Stevia* plant flower may be in fresh, half-dried or dried form.

In some embodiments, the *Stevia* extract is extracted from one or more materials selected from the group consisting of whole *Stevia* plant, aerial part of *Stevia* plant, flowers of *Stevia* plant, seeds of *Stevia* plant, roots of *Stevia* plant, branches of *Stevia* plant, leaves of *Stevia* plant, mixtures thereof, crude juice thereof, extract thereof and purified substance thereof.

In some embodiments, the *Stevia* extract comprises *Stevia*-derived non-steviol glycosides substances with molecular weight bigger than 2,000 dalton, 5,000 dalton, 10,000 dalton, or 100,000 dalton. In some embodiments, the amount of the *Stevia*-derived non-steviol glycosides substances with molecular weight bigger than 2,000 dalton is less than 95 wt %, 70 wt %, 50 wt %, 20 wt %, 10 wt %, 5 wt %, 2 wt %, 1 wt %, 0.5 wt %, 0.2 wt %, 0.1 wt %, 0.05 wt %, 0.02 wt %, 0.01 wt %, 0.005 wt %, 0.002 wt %, 0.001 wt %, 0.0005 wt %, 0.0002 wt %, or 0.0001 wt %. In some embodiments, the amount of the *Stevia*-derived non-steviol glycosides substances with molecular weight bigger than 2,000 dalton is in the range of 10-0.0001 wt %, 5-0.0001 wt %, 2-0.0001 wt %, 1-0.0001 wt %, 0.5-0.0001 wt %, 0.2-0.0001 wt %, 0.1-0.0001 wt %, 0.05-0.0001 wt %, 0.02-0.0001 wt %, 0.01-0.0001 wt %, 0.005-0.0001 wt %, 0.002-0.0001 wt %, 0.001-0.0001 wt %, 0.0005-0.0001 wt %, 10-0.001 wt %, 5-0.001 wt %, 2-0.001 wt %, 1-0.001 wt %, 0.5-0.001 wt %, 0.2-0.001 wt %, 0.1-0.001 wt %, 0.05-0.001 wt %, 0.02-0.001 wt %, 0.01-0.001 wt %, 0.005-0.001 wt %, 10-0.01 wt %, 5-0.01 wt %, 2-0.01 wt %, 1-0.01 wt %, 0.5-0.01 wt %, 0.2-0.01 wt %, 0.1-0.01 wt %, 0.05-0.01 wt %, 10-0.1 wt %, 5-0.1 wt %, 2-0.1 wt %, 1-0.1 wt %, or 0.5-0.1 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived proteins. In some embodiments, the amount of the *Stevia*-derived proteins is less than 99.5 wt %, 95 wt %, 70 wt %, 50 wt %, 20 wt %, 10 wt %, 5 wt %, 2 wt %, 1 wt %, 0.5 wt %, 0.2 wt %, 0.1 wt %, 0.05 wt %, 0.02 wt %, 0.01 wt %, 0.005 wt %, 0.002 wt %, 0.001 wt %, 0.0005 wt %, 0.0002 wt %, or 0.0001 wt %. In some embodiments, the amount of the *Stevia*-derived proteins is in the range of 10-0.0001 wt %, 5-0.0001 wt %, 2-0.0001 wt %, 1-0.0001 wt %, 0.5-0.0001 wt %, 0.2-0.0001 wt %, 0.1-0.0001 wt %, 0.05-0.0001 wt %, 0.02-0.0001 wt %, 0.01-0.0001 wt %, 0.005-0.0001 wt %, 0.002-0.0001 wt %, 0.001-0.0001 wt %, 0.0005-0.0001 wt %, 10-0.001 wt %, 5-0.001 wt %, 2-0.001 wt %, 1-0.001 wt %, 0.5-0.001 wt %, 0.2-0.001 wt %, 0.1-0.001 wt %, 0.05-0.001 wt %, 0.02-0.001 wt %, 0.01-0.001 wt %, 0.005-0.001 wt %, 10-0.01 wt %, 5-0.01 wt %, 2-0.01 wt %, 1-0.01 wt %, 0.5-0.01 wt %, 0.2-0.01 wt %, 0.1-0.01 wt %, 0.05-0.01 wt %, 10-0.1 wt %, 5-0.1 wt %, 2-0.1 wt %, 1-0.1 wt %, or 0.5-0.1 wt % of the *Stevia* extracts of the present application, the glycosylated *Stevia* extracts of the present application, the MRP derived from the *Stevia* extract of the present application, or the MRP derived from the glycosylated *Stevia* extracts of the present application comprise.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise *Stevia*-derived polypheonols and/or its glycosylated products. In some embodiments, the amount of the *Stevia*-derived polypheonols and/or its glycosylated products are less than 99.5 wt %, 95 wt %, 70 wt %, 50 wt %, 20 wt %, 10 wt %, 5 wt %, 2 wt %, 1 wt %, 0.5 wt %, 0.2 wt %, 0.1 wt %, 0.05 wt %, 0.02 wt %, 0.01 wt %, 0.005 wt %, 0.002 wt %, 0.001 wt %, 0.0005 wt %, 0.0002 wt %, or 0.0001 wt %. In some embodiments, the amount of the *Stevia*-derived polypheonols is in the range of 10-0.0001 wt %, 5-0.0001 wt %, 2-0.0001 wt %, 1-0.0001 wt %, 0.5-0.0001 wt %, 0.2-0.0001 wt %, 0.1-0.0001 wt %, 0.05-0.0001 wt %, 0.02-0.0001 wt %, 0.01-0.0001 wt %, 0.005-0.0001 wt %, 0.002-0.0001 wt %, 0.001-0.0001 wt %, 0.0005-0.0001 wt %, 10-0.001 wt %, 5-0.001 wt %, 2-0.001 wt %, 1-0.001 wt %, 0.5-0.001 wt %, 0.2-0.001 wt %, 0.1-0.001 wt %, 0.05-0.001 wt %, 0.02-0.001 wt %, 0.01-0.001 wt %, 0.005-0.001 wt %, 10-0.01 wt %, 5-0.01 wt %, 2-0.01 wt %, 1-0.01 wt %, 0.5-0.01 wt %, 0.2-0.01 wt %, 0.1-0.01 wt %, 0.05-0.01 wt %, 10-0.1 wt %, 5-0.1 wt %, 2-0.1 wt %, 1-0.1 wt %, or 0.5-0.1 wt %.

In some embodiments, the *Stevia* extracts of the present application, the glycosylated *Stevia* extracts of the present application, the MRP derived from the *Stevia* extract of the present application, or the MRP derived from the glycosylated *Stevia* extracts of the present application comprise volatile and non-volatile terpine and or terpinoids substances originated from *Stevia* plant (i.e., extracted from one or more parts selected from leaves, root, stem, flowers and seeds of *Stevia*). Such substances could be purified further in order to obtain the tasteful sweet profile with aroma. Treating *Stevia* extract with a chromatographic column or other separation resins, or other separation methods, such as distillation, could reserve most of tasteful aroma terpine and or terpinoids substances containing oxygen in the structure and remove the unpleasant taste substances. In some embodiments, the *Stevia* extracts of the present application comprise enriched aroma terpene substances containing oxygen in the structure originated from *Stevia* plant. To enhance the citrus or tangerine taste, the inventors surprisingly found that good citrus materials could be obtained by heat processing of *Stevia* extract, especially *Stevia* extract containing terpines and or terpinoids originated from stevia plant under acidic conditions, especially in the presence of citric acid, tartaric acid, fumaric acid, lactic acid, malic acid etc., more preferably citric acid. Substances, such as linalool, may react with citric acid with or without a Maillard reaction. Vacuum distillation or column chromatography (such as by silica gel), any type of macroporous resins, for example macropore resin, ion exchange resins produced by Dow, Sunresin can be used for further purification. One embodiment of the present application is directed to a method to produce citrus flavored stevia extract by using a heat process, with or without a Maillard reaction, under acidic conditions, more preferably with a Maillard reaction under citric acid conditions. Another embodiment of the present application provides a citrus flavored stevia extract preparable by heat processing with or without a Maillard reaction, preferably with a Maillard reaction under acidic conditions, more preferably under citric acid conditions.

Another aspect of the present application provides a composition that comprises a *Stevia* extract of the present application, a glycosylated *Stevia* extract of the present application, a MRP derived from the *Stevia* extract of the present application, or a MRP derived from the glycosylated *Stevia* extract of the present application.

In some embodiments, the composition further comprises a sweetener. Examples of the sweetener include, but are not limited to, sorbitol, xylitol, mannitol, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, licorice extract, sweet tea extract, swingle extract, glycosylated sweet tea extract, *Stevia* extract, steviol glycoside, glycosylated swingle extract, glycosylated sweet tea glycoside, glycosylated *Stevia* extract glycosylated steviol glycoside, glycosylated mogroside or mixtures thereof.

In some embodiments, the composition comprises *Stevia*-derived NSG substances characterized by citrus flavor or sugar-cane-like flavor.

Another aspect of the present application relates to a composition derived from one or more substances selected from precursors of steviol glycosides and metabolized steviol glycosides.

Examples of precursors of steviol glycosides include, but are not limited to, steviol and iso-steviol, kaurenoic acid, kaurene, compounds comprises structure of isophentenyl, dimethylallyl group, and other diterpene non-glycosylated compounds, oxygenated monoterpenes and sesquiterpenes, and their respective hydrocarbons, non-stevia terpenes, such as hemiterpenes, monoterpenes, monoterpenoids, such as geraniol, terpineol, limonene, myrcene, linalool, pinene, and iridoids derive from monoterpenes, sesquiterpenes and sesquiterpenoids include humulene, farnesenes, farnesol, diterpenes and diterpenoids such as cafestol, kahweol, cembrene and taxadiene, taxol, sesterterpenes and sesterterpenoid such as geranylfarnesol, triterpenes, sesquarterpenes, non-stevia glycosides tetraterpenes and tetraterpenoids, such as acyclic lycopene, monocyclic gamma-carotene, and bicyclic alpha- and beta-carotenes, polyterpenes, norisoprenoids, such as the $C_{13}$-norisoprenoids 3-oxo-α-ionol and 7,8-dihydroionone derivatives, megastigmane-3,9-diol and 3-oxo-7,8-dihydro-α-ionol Examples of metabolites of steviol glycosides include, but are not limited to, steviol glucuronides, hydrosteviol and dihydroxy steviol.

In some embodiments, the precursors of steviol glycosides and/or metabolized steviol glycosides are from the leaves of *Stevia* plant.

In some embodiments, the composition comprises glycosylated products of precursors of steviol glycosides and/or glycosylated products of metabolized steviol glycosides. In some embodiments, the precursors of steviol glycosides and metabolized steviol glycosides are from the leaves of *Stevia* plant.

In some embodiments, the composition comprises (A) a NSG-containing *Stevia* extract of the present application and (B) a sweetener, such as RA97, sucralose or acesulfame K. In some embodiments, the composition comprises components A and B at a A:B ratio of 99:1 to 1:99.

In some embodiments, the composition comprises (A) a glycosylated NSG-containing *Stevia* extract of the present application and (B) a sweetener, such as RA97, sucralose or acesulfame K. In some embodiments, the composition comprises components A and B at a A:B ratio of 99:1 to 1:99.

In some embodiments, the composition comprises (A) a MRP of a NSG-containing *Stevia* extract of the present application and (B) a sweetener, such as RA97, sucralose or acesulfame K. In some embodiments, the composition comprises components A and B at a A:B ratio of 99:1 to 1:99.

In some embodiments, the composition comprises (A) a MRP of a glycosylated NSG-containing *Stevia* extract of the present application and (B) a sweetener, such as RA97, sucralose or acesulfame K. In some embodiments, the composition comprises components A and B at a A:B ratio of 99:1 to 1:99.

In some embodiments, the composition comprises one or more compounds selected from the group consisting of acetophenone, benzofuran, chromene, bisabolane, longipinanes, germacranes, elemanes, eudesmanes, eremophilanes, guaianes, pseudoguaianes, acyclic and bicyclic diterpenoids, non-sweet tetracyclic diterpenoids, sesquiterpenoids, triterpenoids, and their derivates.

The following paragraphs enumerated consecutively from 1 through 35 provide for various aspects and/or embodiments of the present invention and are referred herein as "Set 1 embodiments."

1. A *Stevia* composition comprising steviol glycosides and *Stevia*-derived non-steviol glycoside substances.

2. The *Stevia* composition of paragraph 1, wherein the *Stevia*-derived non-steviol glycoside substances are glycosides.

3. The *Stevia* composition of paragraph 1, wherein the amount of *Stevia*-derived non-steviol glycoside substances is 0.0001 wt % or more, 0.001 wt % or more, 0.01 wt % or more, 0.1 wt % or more, 1 wt % or more, 2 wt % or more, 5 wt % or more, 7.5 wt % or more, 10 wt % or more, 15 wt % or more, 20 wt % or more, 30 wt % or more, 40 wt % or more, 50 wt % or more, 60 wt % or more, 70 wt % or more, 80 wt % or more, 90 wt % or more, 95 wt % or more, 99 wt % or more.

4. The *Stevia* composition of paragraph 1, wherein the total glycosides in the *Stevia* composition are less than 99 wt %, 95 wt %, 90 wt %, 80 wt %, 70 wt %, 60 wt %, 50 wt %, 40 wt %, 30 wt %, 20 wt %, 10 wt %, 5 wt %, 2 wt % or 1 wt %.

5. The *Stevia* composition of paragraph 1 or 2, wherein the composition is used as raw material for enzymatic conversion.

6. The *Stevia* composition of paragraph 5, wherein the enzymatic conversion is glycosylation.

7. A flavor or sweetener composition, comprising glycosylated *Stevia*-derived non-steviol glycosides.

8. The flavor or sweetener composition of paragraph 7, wherein the glycosylated *Stevia*-derived non-stevia glycosides is in an amount of 0.5 wt % or less, 1 wt % or less, 5 wt % or less, 10 wt % or less, 15 wt % or less, 20 wt % or less, 30 wt % or less, 50 wt % or less, 60 wt % or less, 80 wt % or less, 90 wt % or less, 95 wt % or less, or 99 wt % or less.

9. The flavor or sweetener composition of paragraph 7, further comprising glycosylated steviol glycosides.

10. The flavor or sweetener composition of paragraph 9, wherein the amount of glycosylated steviol glycosides is less than 99 wt %, 95 wt %, 90 wt %, 85 wt %, 70 wt %, 60 wt %, 50 wt %, 40 wt %, 30 wt %, 20 wt %, 10 wt %, 5 wt %, or 1 wt %.

11. The flavor or sweetener composition of paragraph 9, wherein the amount of glycosylated steviol glycosides is in the range of 0.1-99 wt %, 0.1-95 wt %, 0.1-90 wt %, 0.1-80 wt %, 0.1-70 wt %, 0.1-60 wt %, 0.1-50 wt %, 0.1-40 wt %, 0.1-30 wt %, 0.1-20 wt %, 0.1-10 wt %, 0.1-5 wt %, 0.1-1 wt %, 1-99 wt %, 1-95 wt %, 1-90 wt %, 1-80 wt %, 1-70 wt %, 1-60 wt %, 1-50 wt %, 1-40 wt %, 1-30 wt %, 1-20 wt %, 1-10 wt %, 1-5 wt %, 5-99 wt %, 5-95 wt %, 5-90 wt %, 5-80 wt %, 5-70 wt %, 5-60 wt %, 5-50 wt %, 5-40 wt %, 5-30 wt %, 5-20 wt %, 5-10 wt %, 10-99 wt %, 10-95 wt %, 10-90 wt %, 10-80 wt %, 10-70 wt %, 10-60 wt %, 10-50 wt %, 10-40 wt %, 10-30 wt %, 10-20 wt %, 20-99 wt %, 20-95 wt %, 20-90 wt %, 20-80 wt %, 20-70 wt %, 20-60 wt %, 20-50 wt %, 20-40 wt %, 20-30 wt %, 30-99 wt %, 30-95 wt %, 30-90 wt %, 30-80 wt %, 30-70 wt %, 30-60 wt %, 30-50 wt %, 30-40 wt %, 40-99 wt %, 40-95 wt %, 40-90 wt %, 40-80 wt %, 40-70 wt %, 40-60 wt %, 40-50 wt %, 50-99 wt %, 50-95 wt %, 50-90 wt %, 50-80 wt %, 50-70 wt %, 50-60 wt %, 60-99 wt %, 60-95 wt %, 60-90 wt %, 60-80 wt %, 60-70 wt %, 70-99 wt %, 70-95 wt %, 70-90 wt %, 70-80 wt %, 80-99 wt %, 80-95 wt %, 80-90 wt %, 90-99 wt %, 90-95 wt %, or 95-99 wt %.

12. The flavor or sweetener composition of paragraph 9, further comprising unreacted steviol glycosides.

13. The flavor or sweetener composition of paragraph 12, wherein the amount of unreacted steviol glycosides is 99 wt % or less, 95 wt % or less, 90 wt % or less, 85 wt % or less, 70 wt % or less, 60 wt % or less, 50 wt % or less, 40 wt % or less, 30 wt % or less, 20 wt % or less, 10 wt % or less, 5 wt % or less, or 1 wt % or less.

14. The flavor or sweetener composition of paragraph 12, wherein the amount of unreacted steviol glycosides is in the range of 0.1-99 wt %, 0.1-95 wt %, 0.1-90 wt %, 0.1-80 wt %, 0.1-70 wt %, 0.1-60 wt %, 0.1-50 wt %, 0.1-40 wt %, 0.1-30 wt %, 0.1-20 wt %, 0.1-10 wt %, 0.1-5 wt %, 0.1-1 wt %, 1-99 wt %, 1-95 wt %, 1-90 wt %, 1-80 wt %, 1-70 wt %, 1-60 wt %, 1-50 wt %, 1-40 wt %, 1-30 wt %, 1-20 wt %, 1-10 wt %, 1-5 wt %, 5-99 wt %, 5-95 wt %, 5-90 wt %, 5-80 wt %, 5-70 wt %, 5-60 wt %, 5-50 wt %, 5-40 wt %, 5-30 wt %, 5-20 wt %, 5-10 wt %, 10-99 wt %, 10-95 wt %, 10-90 wt %, 10-80 wt %, 10-70 wt %, 10-60 wt %, 10-50 wt %, 10-40 wt %, 10-30 wt %, 10-20 wt %, 20-99 wt %, 20-95 wt %, 20-90 wt %, 20-80 wt %, 20-70 wt %, 20-60 wt %, 20-50 wt %, 20-40 wt %, 20-30 wt %, 30-99 wt %, 30-95 wt %, 30-90 wt %, 30-80 wt %, 30-70 wt %, 30-60 wt %, 30-50 wt %, 30-40 wt %, 40-99 wt %, 40-95 wt %, 40-90 wt %, 40-80 wt %, 40-70 wt %, 40-60 wt %, 40-50 wt %, 50-99 wt %, 50-95 wt %, 50-90 wt %, 50-80 wt %, 50-70 wt %, 50-60 wt %, 60-99 wt %, 60-95 wt %, 60-90 wt %, 60-80 wt %, 60-70 wt %, 70-99 wt %, 70-95 wt %, 70-90 wt %, 70-80 wt %, 80-99 wt %, 80-95 wt %, 80-90 wt %, 90-99 wt %, 90-95 wt %, or 95-99 wt %.

15. The flavor or sweetener composition of paragraph 12, further comprising one or more ingredient selected from starch, modified starch, maltodextrin.

16. The *Stevia* composition of paragraph 1, wherein the *Stevia*-derived non-stevia glycosides comprise non-volatile substances.

17. The *Stevia* composition of paragraph 16, wherein the amount of non-volatile substances in the *Stevia* composition is 0.0001 wt % or more, 0.001 wt % or more, 0.01 wt % or more, 0.1 wt % or more, 1 wt % or more, 5 wt % or more, 10 wt % or more, 20 wt % or more, 50 wt % or more, 70 wt % or more, or 95 wt % or more.

18. The *Stevia* composition of paragraph 16, wherein the amount of non-volatile substances in the *Stevia* composition is 0.0001-99 wt %, 0.001-99 wt %, 0.01-99 wt %, 0.1-99 wt %, 1-99 wt %, 5-99 wt %, 10-99 wt %, 20-99 wt %, 30-99 wt %, 40-99 wt %, 50-99 wt %, 60-99 wt %, 70-99 wt %, 80-99 wt %, 90-99 wt %, 95-99 wt %, 0.0001-95 wt %, 0.001-95 wt %, 0.01-95 wt %, 0.1-95 wt %, 1-95 wt %, 5-95 wt %, 10-95 wt %, 20-95 wt %, 30-95 wt %, 40-95 wt %, 50-95 wt %, 60-95 wt %, 70-95 wt %, 80-95 wt %, 90-95 wt %, 0.0001-90 wt %, 0.001-90 wt %, 0.01-90 wt %, 0.1-90 wt %, 1-90 wt %, 5-90 wt %, 10-90 wt %, 20-90 wt %, 30-90 wt %, 40-90 wt %, 50-90 wt %, 60-90 wt %, 70-90 wt %, 80-90 wt %, 0.0001-80 wt %, 0.001-80 wt %, 0.01-80 wt %, 0.1-80 wt %, 1-80 wt %, 5-80 wt %, 10-80 wt %, 20-80 wt %, 30-80 wt %, 40-80 wt %, 50-80 wt %, 60-80 wt %, 70-80 wt %, 0.0001-70 wt %, 0.001-70 wt %, 0.01-70 wt %, 0.1-70 wt %, 1-70 wt %, 5-70 wt %, 10-70 wt %, 20-70 wt %, 30-70 wt %, 40-70 wt %, 50-70 wt %, 60-70 wt %, 0.0001-60 wt %, 0.001-60 wt %, 0.01-60 wt %, 0.1-60 wt %, 1-60 wt %, 5-60 wt %, 10-60 wt %, 20-60 wt %, 30-60 wt %, 40-60 wt %, 50-60 wt %, 0.0001-50 wt %, 0.001-50 wt %, 0.01-50 wt %, 0.1-50 wt %, 1-50 wt %, 5-50 wt %, 10-50 wt %, 20-50 wt %, 30-50 wt %, 40-50 wt %, 0.0001-40 wt %, 0.001-40 wt %, 0.01-40 wt %, 0.1-40 wt %, 1-40 wt %, 5-40 wt %, 10-40 wt %, 20-40 wt %, 30-40 wt %, 0.0001-30 wt %, 0.001-30 wt %, 0.01-30 wt %, 0.1-30 wt %, 1-30 wt %, 5-30 wt %, 10-30 wt %, 20-30 wt %, 0.0001-20 wt %, 0.001-20 wt %, 0.01-20 wt %, 0.1-20 wt %, 1-20 wt %, 5-20 wt %, 10-20 wt %, 0.0001-10 wt %, 0.001-10 wt %, 0.01-10 wt %, 0.1-10 wt %, 1-10 wt %, 5-10 wt %, 0.0001-5 wt %, 0.001-5 wt %, 0.01-5 wt %, 0.1-5 wt %, 1-5 wt %, 0.0001-1 wt %, 0.001-1 wt %, 0.01-1 wt %, 0.1-1 wt %, 0.0001-0.1 wt %, 0.001-0.1 wt %, 0.01-0.1 wt %, 0.0001-0.01 wt %, 0.001-0.01 wt %, or 0.0001-0.001 wt %.

19. The *Stevia* composition of paragraph 2, wherein the amount of the *Stevia*-derived non-stevia glycosides in the *Stevia* composition is 0.0001 wt % or more, 0.001 wt % or more, 0.01 wt % or more, 0.1 wt % or more, 1 wt % or more, 5 wt % or more, 10 wt % or more, 20 wt % or more, 50 wt % or more, 70 wt % or more, 95 wt % or more.

20. The *Stevia* composition of paragraph 1, wherein the *Stevia*-derived non-stevia glycosides are volatile substances.

21. The *Stevia* composition of paragraph 20, wherein the amount of the volatile substances is 99 wt % or less, 70 wt % or less, 50 wt % or less, 20 wt % or less, 10 wt % or less, 1 wt % or less, 0.1 wt % or less, 0.01 wt % or less, 0.001 wt % or less, or 0.0001 wt % or less.

22. The *Stevia* composition of paragraph 20, wherein the amount of volatile substances in the *Stevia* composition is 0.0001-99 wt %, 0.001-99 wt %, 0.01-99 wt %, 0.1-99 wt %, 1-99 wt %, 5-99 wt %, 10-99 wt %, 20-99 wt %, 30-99 wt %, 40-99 wt %, 50-99 wt %, 60-99 wt %, 70-99 wt %, 80-99 wt %, 90-99 wt %, 95-99 wt %, 0.0001-95 wt %, 0.001-95 wt %, 0.01-95 wt %, 0.1-95 wt %, 1-95 wt %, 5-95 wt %, 10-95 wt %, 20-95 wt %, 30-95 wt %, 40-95 wt %, 50-95 wt %, 60-95 wt %, 70-95 wt %, 80-95 wt %, 90-95 wt %, 0.0001-90 wt %, 0.001-90 wt %, 0.01-90 wt %, 0.1-90 wt %, 1-90 wt %, 5-90 wt %, 10-90 wt %, 20-90 wt %, 30-90 wt %, 40-90 wt %, 50-90 wt %, 60-90 wt %, 70-90 wt %, 80-90 wt %, 0.0001-80 wt %, 0.001-80 wt %, 0.01-80 wt %, 0.1-80 wt %, 1-80 wt %, 5-80 wt %, 10-80 wt %, 20-80 wt %, 30-80 wt %, 40-80 wt %, 50-80 wt %, 60-80 wt %, 70-80 wt %, 0.0001-70 wt %, 0.001-70 wt %, 0.01-70 wt %, 0.1-70 wt %, 1-70 wt %, 5-70 wt %, 10-70 wt %, 20-70 wt %, 30-70 wt %, 40-70 wt %, 50-70 wt %, 60-70 wt %, 0.0001-60 wt %, 0.001-60 wt %, 0.01-60 wt %, 0.1-60 wt %, 1-60 wt %, 5-60 wt %, 10-60 wt %, 20-60 wt %, 30-60 wt %, 40-60 wt %, 50-60 wt %, 0.0001-50 wt %, 0.001-50 wt %, 0.01-50 wt %, 0.1-50 wt %, 1-50 wt %, 5-50 wt %, 10-50 wt %, 20-50 wt %, 30-50 wt %, 40-50 wt %, 0.0001-40 wt %, 0.001-40 wt %, 0.01-40 wt %, 0.1-40 wt %, 1-40 wt %, 5-40 wt %, 10-40 wt %, 20-40 wt %, 30-40 wt %, 0.0001-30 wt %, 0.001-30 wt %, 0.01-30 wt %, 0.1-30 wt %, 1-30 wt %, 5-30 wt %, 10-30 wt %, 20-30 wt %, 0.0001-20 wt %, 0.001-20 wt %, 0.01-20 wt %, 0.1-20 wt %, 1-20 wt %, 5-20 wt %, 10-20 wt %, 0.0001-10 wt %, 0.001-10 wt %, 0.01-10 wt %, 0.1-10 wt %, 1-10 wt %, 5-10 wt %, 0.0001-5 wt %, 0.001-5 wt %, 0.01-5 wt %, 0.1-5 wt %, 1-5 wt %, 0.0001-1 wt %, 0.001-1 wt %, 0.01-1 wt %, 0.1-1 wt %, 0.0001-0.1 wt %, 0.001-0.1 wt %, 0.01-0.1 wt %, 0.0001-0.01 wt %, 0.001-0.01 wt %, or 0.0001-0.001 wt %.

23. The *Stevia* composition of paragraphs 1-6, wherein the *Stevia* composition and or glycosylated *Stevia* composition are used for Maillard reaction.

24. A MRP composition comprising one or more plant-derived non-steviol glycoside substances and/or glycosylated plant-derived non-steviol glycoside substances.

25. The MRP composition of paragraph 24, wherein the one or more plant-derived non-steviol glycoside substances and/or glycosylated plant-derived non-steviol glycoside substances are present in an amount of 0.0001 wt % or more, 0.001 wt % or more, 0.01 wt % or more, 0.1 wt % or more, 1 wt % or more, 5 wt % or more, 10 wt % or more, 20 wt % or more, 50 wt % or more, 70 wt % or more, or 90 wt % or more.

26. A method for improving flavor and/or sweetness of an orally consumable composition, comprising the step of adding an effective amount of the *Stevia* composition of paragraph 1, or the flavor or sweetener composition of paragraph 7, or the MRP composition of paragraph 24, to the orally consumable composition.

27. The method of paragraph 26, wherein the orally consumable composition is a food product.

28. The method of paragraph 26, wherein the orally consumable composition is a beverage.

29. The method of paragraph 26, wherein the orally consumable composition is a pharmaceutical product.

30. The method of paragraph 26, wherein the orally consumable composition is a dairy product.

31. The method of paragraph 26, wherein the orally consumable composition is a syrup.

32. The method of paragraph 31, wherein the orally consumable composition is added in an amount less than 30 wt %, 50 wt %, or 80 wt %.

33. The method of paragraph 26, wherein the orally consumable composition is add in an amount that results in a SE of less than 1.5%.

34. An orally consumable composition produced by the method of paragraph 26.

35. An orally consumable composition of paragraph 34, wherein the orally consumable composition comprises the *Stevia* composition of paragraph 1, or the flavor or sweetener composition of paragraph 7, or the MRP composition of paragraph 24 in am amount of 0.0001-1 wt %, preferably 0.0005-0.15 wt %.

The following paragraphs enumerated consecutively from 1 through 64 provide for various aspects and/or embodiments of the present invention and are referred herein as "Set 2 embodiments."

1. A *Stevia* extract, comprising one or more volatile and/or non-volatile non-steviol glycoside substances, wherein the one or more volatile and/or non-volatile non-steviol glycoside (NSG) substances are present in an amount of 0.0000001-99.5 wt %, preferably 0.0001-99.5 wt %, and more preferably 1-99.5 wt % of the *Stevia* extract.

2. The *Stevia* extract of paragraph 1, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

3. The *Stevia* extract of paragraph 1, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*,R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

4. The *Stevia* extract of any one of paragraphs 1-3, comprising both volatile and non-volatile NSG substances.

5. The *Stevia* extract of any one of paragraphs 1-4, comprising one or more non-volatile NSG substances selected from the group consisting of cafffeoylquinic acid, di-cafffeoylquinic acid, kaempferol-glucoside, quercetin-pentoside, kaempferol-xylosyl-glucoside, quercetin-diglucoside-rhamnoside, and quercetin-dirhamnoside.

6. The *Stevia* extract of any one of paragraphs 1-5, comprising cafffeoylquinic acid and/or di-cafffeoylquinic acid in a total amount of 0.0001-1 wt %, preferably 0.0001-0.1 wt %, more preferably 0.0001-0.01 wt %.

7. The *Stevia* extract of any one of paragraphs 1-6, comprising one or more non-volatile NSG substances selected from the group consisting of kaempferol-glucoside, quercetin-pentoside, kaempferol-xylosyl-glucoside, quercetin-diglucoside-rhamnoside, and quercetin-dirhamnoside in a total amount of 0.0001-99 wt %, preferably 0.01-20 wt %, more preferably 0.01-10 wt %.

8. The *Stevia* extract of any one of paragraphs 1-7, wherein the *Stevia* extract is extracted from a raw material that comprises *Stevia* plant flower.

9. An orally consumable product comprising the *Stevia* extract of any one of paragraphs 1-8.

10. The orally consumable product of paragraph 9, wherein the *Stevia* extract is present in an amount of 1-100,000 ppm, preferably 1-25,000 ppm, more preferably 1-5,000 ppm.

11. The orally consumable product of paragraph 9 or 10, wherein the orally consumable product is a beverage.

12. A method of improving flavor or sweetness of an orally consumable product, comprising adding an effective amount of the *Stevia* extract of any one of paragraphs 1-8 to the orally consumable product.

13. The method of paragraph 12, wherein the *Stevia* extract is added to the orally consumable product at a final concentration of 1-100,000 ppm, preferably 1-25,000 ppm, and more preferably 1-5,000 ppm.

14. A composition comprising a glycosylated *Stevia* extract, wherein the glycosylated *Stevia* extract is derived from a *Stevia* extract comprising one or more volatile and/or non-volatile NSG substances and wherein the one or more volatile and/or non-volatile NSG substances are present in an amount of 0.0000001-99.5 wt %, preferably 0.0001-99.5 wt %, and more preferably 1-99.5 wt % of the *Stevia* extract.

15. The composition of paragraph 14, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, and 5-methyl-2-furancarboxaldehyde.

16. The composition of paragraph 14, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*,R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

17. The composition of any one of paragraphs 14-16, wherein the *Stevia* extract comprises both volatile and non-volatile NSG substances.

18. The composition of any one of paragraphs 14-17, wherein the *Stevia* extract comprises one or more non-volatile NSG substances selected from the group consisting of cafffeoylquinic acid, di-cafffeoylquinic acid, kaempferol-glucoside, quercetin-pentoside, kaempferol-xylosyl-glucoside, quercetin-diglucoside-rhamnoside and quercetin-dirhamnoside.

19. The composition of any one of paragraphs 14-18, wherein the *Stevia* extract comprises cafffeoylquinic acid and/or di-cafffeoylquinic acid in a total amount of 0.0001-1 wt %, preferably 0.0001-0.1 wt %, more preferably 0.0001-0.01 wt % *Stevia* extract.

20. The composition of any one of paragraphs 14-19, wherein the *Stevia* extract comprises one or more non-volatile NSG substances selected from the group consisting of kaempferol-glucoside, quercetin-pentoside, kaempferol-xylosyl-glucoside, quercetin-diglucoside-rhamnoside and quercetin-dirhamnoside in a total amount of 0.0001-99 wt %, preferably 0.01-20 wt %, more preferably 0.01-10 wt % *Stevia* extract.

21. The composition of any one of paragraphs 14-20, wherein *Stevia* extract is extracted from a raw material that comprises *Stevia* plant flower.

22. An orally consumable product comprising the composition of any one of paragraphs 14-21.

23. The orally consumable product of paragraph 22, wherein the composition is present in an amount of 1-100,000 ppm, preferably 1-25,000 ppm, more preferably 1-5,000 ppm.

24. The orally consumable product of paragraph 22 or 23, wherein the orally consumable product is a beverage.

25. A method of improving flavor or sweetness of an orally consumable product, comprising adding an effective amount of the composition of any one of paragraphs 14-21 to the orally consumable product.

26. The method of paragraph 25, wherein the composition is add to the orally consumable product at a final concentration of 1-100,000 ppm, preferably 1-25,000 ppm, and more preferably 1-5,000 ppm.

27. The composition of paragraph 14, wherein the glycosylated *Stevia* extract comprises maltodextrin.

28. A composition comprising glycosylated *Stevia*-derived NSG substances, wherein the glycosylated *Stevia*-derived NSG substances comprise one or more volatile and/or non-volatile NSG substances, and wherein the glycosylated *Stevia*-derived NSG substances are present in an amount of 0.0000001-99 wt %, preferably 0.0001-99 wt %, more preferably 1-99 wt % of the composition.

29. The composition of paragraph 28, further comprising glycosylated steviol glycosides and/or unreacted stevio glycosides.

30. The composition of paragraph 29, wherein the glycosylated steviol glycosides and/or unreacted stevio glycosides are present in a total amount of 0.0001-99 wt %, preferably 0.01-99 wt %, more preferably 1-99 wt % of the composition.

31. The composition of any one of paragraphs 28-30, further comprising maltodextrin.

32. An orally consumable product comprising the composition of any one of paragraphs 28-31.

33. The orally consumable product of paragraph 32, wherein the composition is present in an amount of 1-100,000 ppm, preferably 1-25,000 ppm, more preferably 1-5,000 ppm.

34. The orally consumable product of paragraph 32 or 33, wherein the orally consumable product is a beverage.

35. A method of improving flavor or sweetness of an orally consumable product, comprising adding an effective amount of the composition of any one of paragraphs 28-31 to the orally consumable product.

36. The method of paragraph 35, wherein the composition is add to the orally consumable product at a final concentration of 1-100,000 ppm, preferably 1-25,000 ppm, more preferably 1-5,000 ppm.

37. A composition comprising a Maillard reaction product (MRP), wherein the MRP is produced with a starting mixture comprising a *Stevia* extract and an amine donor, and wherein the *Stevia* extract comprises one or more *Stevia*-derived volatile and/or non-volatile NSG substances.

38. The composition of paragraph 37, wherein the starting mixture further comprises a sugar.

39. The composition of paragraph 37, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

40. The composition of paragraph 37, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*,R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

41. The composition of any one of paragraphs 37-40, wherein the *Stevia* extract comprises both volatile and non-volatile NSG substances.

42. The composition of any one of paragraphs 37-41, wherein the *Stevia* extract comprises one or more non-volatile NSG substances selected from the group consisting of cafffeoylquinic acid, di-cafffeoylquinic acid, kaempferol-glucoside, quercetin-pentoside, kaempferol-xylosyl-glucoside, quercetin-diglucoside-rhamnoside, and quercetin-dirhamnoside.

43. The composition of any one of paragraphs 37-42, wherein the *Stevia* extract comprises cafffeoylquinic acid and/or di-cafffeoylquinic acid in a total amount of 0.0001-1 wt %, preferably 0.0001-0.1 wt %, more preferably 0.0001-0.01 wt %.

44. The composition of any one of paragraphs 37-43, wherein the *Stevia* extract comprises one or more non-volatile NSG substances selected from the group consisting of kaempferol-glucoside, quercetin-pentoside, kaempferol-xylosyl-glucoside, quercetin-diglucoside-rhamnoside, and quercetin-dirhamnoside in a total amount of 0.0001-99 wt %, preferably 0.01-20 wt %, more preferably 0.01-10 wt %.

45. The composition of any one of paragraphs 37-44, wherein the *Stevia* extract is extracted from a raw material that comprises *Stevia* plant flower.

46. An orally consumable product comprising the composition of any one of paragraphs 37-45.

47. The orally consumable product of paragraph 46, wherein the composition is present in an amount of 1-100,000 ppm, preferably 1-25,000 ppm, more preferably 1-5,000 ppm.

48. The orally consumable product of paragraph 46 or 47, wherein the orally consumable product is a beverage.

49. A method of improving flavor or sweetness of an orally consumable product, comprising adding an effective amount of the composition of any one of paragraphs 37-45 to the orally consumable product.

50. The method of paragraph 49, wherein the composition is add to the orally consumable product at a final concentration of 1-100,000 ppm, preferably 1-25,000 ppm, and more preferably 1-5,000 ppm.

51. A composition comprising a Maillard reaction product (MRP), wherein the MRP is produced with a starting mixture comprising a glycosylated *Stevia* extract and an amine donor, wherein the glycosylated *Stevia* extract is derived from a *Stevia* extract comprising one or more *Stevia*-derived volatile and/or non-volatile NSG substances, and wherein the composition optionally comprises one or more unreacted stevio glycosides.

52. The composition of paragraph 51, wherein the starting mixture further comprises a sugar.

53. The composition of paragraph 51, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, benzyl alcohol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, acetic acid, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, β-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, linalool, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, tetradecane, 2,3-dimethyl-1,3-Butadiene, β-myrcene, 1-limonene, β-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, acetic acid, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

54. The composition of paragraph 51, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, acetic acid, propanoic acid, butanoic acid, pentanoic acid, hexanoic acid, cyclohexanecarboxylic acid, 2-ethyl-1-hexanol, [S—(R*,R*)]-2,3-butanediol, hotrienol, p-mentha-1,5-dien-8-ol, 5,8,10-undecatrien-3-ol, α,α-Dimethyl-benzenemethanol, benzyl alcohol, phenylethyl alcohol, dimethyl ester pentanedioic acid, 3,7-Dimethyl-6-nonen-1-ol acetate, methyl ester hexadecanoic acid, δ-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

55. The composition of any one of paragraphs 51-54, wherein the *Stevia* extract comprises both volatile and non-volatile NSG substances.

56. The composition of any one of paragraphs 51-55, wherein the *Stevia* extract comprises one or more non-volatile NSG substances selected from the group consisting of cafffeoylquinic acid, di-cafffeoylquinic acid, kaempferol-glucoside, quercetin-pentoside, kaempferol-xylosyl-glucoside, quercetin-diglucoside-rhamnoside, and quercetin-dirhamnoside.

57. The composition of any one of paragraphs 51-56, wherein the *Stevia* extract comprises cafffeoylquinic acid and/or di-cafffeoylquinic acid in a total amount of 0.0001-1 wt %, preferably 0.0001-0.1 wt %, more preferably 0.0001-0.01 wt %.

58. The composition of any one of paragraphs 51-57, wherein the *Stevia* extract comprises one or more non-volatile NSG substances selected from the group consisting of kaempferol-glucoside, quercetin-pentoside, kaempferol-xylosyl-glucoside, quercetin-diglucoside-rhamnoside, and quercetin-dirhamnoside in a total amount of 0.0001-99 wt %, preferably 0.01-20 wt %, more preferably 0.01-10 wt %.

59. The composition of any one of paragraphs 51-58, wherein the *Stevia* extract is extracted from a raw material that comprises *Stevia* plant flower.

60. An orally consumable product comprising the composition of any one of paragraphs 51-59.

61. The orally consumable product of paragraph 60, wherein the composition is present in an amount of 1-100,000 ppm, preferably 1-25,000 ppm, more preferably 1-5,000 ppm.

62. The orally consumable product of paragraph 60 or 61, wherein the orally consumable product is a beverage.

63. A method of improving flavor or sweetness of an orally consumable product, comprising adding an effective amount of the composition of any one of paragraphs 51-59 to the orally consumable product.

64. The method of paragraph 63, wherein the composition is add to the orally consumable product at a final concentration of 1-100,000 ppm, preferably 1-25,000 ppm, and more preferably 1-5,000 ppm.

III. The Maillard Reaction

The Maillard reaction (MR) generally refers to a non-enzymatic browning reaction of a sugar donor with an amine donor in the presence of heat which produces flavor. Common flavors produced as a result of the Maillard reaction include, for example, those associated with red meat, poultry, coffee, vegetables, bread crust etc. subjected to heat. A Maillard reaction relies mainly on sugars and amino acids but it can also contain other ingredients including: autolyzed yeast extracts (AYE), hydrolyzed vegetable proteins (HVP), gelatin (protein source), vegetable extracts (i.e. onion powder), enzyme treated proteins, meat fats or extracts and acids or bases to adjust the pH of the reaction. The reaction can be in an aqueous environment with an adjusted pH at specific temperatures for a specified amount of time to produce a variety of flavors. Typical flavors include those associated with chicken, pork, beef, caramel, chocolate etc. However, a wide variety of different taste and aroma profiles can be achieved by adjusting the ingredients, the temperature and/or the pH of the reaction. The main advantage of the reaction flavors is that they can produce characteristic meat, burnt, roasted, caramellic, or chocolate profiles desired by the food industry, which are not typically achievable by using compounding of flavor ingredients.

Reducing groups can be found on reducing sugars (sugar donors) and amino groups can be found on amino donors such as free amino acids, peptides, and proteins. Initially, a reactive carbonyl group of a reducing sugar condenses with a free amino group, with a concomitant loss of a water molecule. A reducing sugar substrate for Maillard reaction typically has a reactive carbonyl group in the form of a free aldehyde or a free ketone. The resultant N-substituted glycoaldosylamine is not stable. The aldosylamine compound rearranges, through an Amadori rearrangement, to form a ketosamine. Ketosamines that are so-formed may further react through any of the following three pathways: (a) further dehydration to form reductones and dehydroreductones; (b) hydrolytic fission to form short chain products, such as diacetyl, acetol, pyruvaldehyde, and the like, which can, in turn, undergo Strecker degradation with additional amino groups to form aldehydes, and condensation, to form aldols; and (c) loss of water molecules, followed by reaction with additional amino groups and water, followed by condensation and/or polymerization into melanoids. Factors that affect the rate and/or extent of Maillard reactions include among others the temperature, water activity, and pH. The Maillard reaction is enhanced by high temperature, low moisture levels, and alkaline pH.

In the Maillard reaction, suitable carbonyl containing reactants include those that comprise a reactive aldehyde (—CHO) or keto (—CO—) group, such that the carbonyl free aldehyde or free keto group is available to react with an amino group associated with the reactant. Typically, the reducing reactant is a reducing sugar, e.g., a sugar that can reduce a test reagent, e.g., can reduce $Cu^{2+}$ to $Cu^{+}$, or can be oxidized by such reagents.

Monosaccharides, disaccharides, oligosaccharides, polysaccharides (e.g., dextrins, starches, and edible gums) and their hydrolysis products are suitable reducing reactants if they have at least one reducing group that can participate in a Maillard reaction. Reducing sugars include aldoses or ketoses such as glucose, fructose, maltose, lactose, glyceraldehyde, dihydroxyacetone, arabinose, xylose, ribose, mannose, erythrose, threose, and galactose. Other reducing reactants include uronic acids (e.g., glucuronic acid, glucuronolactone, and galacturonic acid, mannuronic acid, iduronic acid) or Maillard reaction intermediates bearing at least one carbonyl group such as aldehydes, ketones, alpha-hydroxycarbonyl or dicarbonyl compounds.

A. Maillard Reaction Products (MRPs)

In some embodiments, the Maillard reactants in a reaction mixture include an amino donor and a sugar donor in the form of a reducing sugar and/or a non-reducing sugar that are present as reactants. The Maillard reaction products (MRPs) formed from these reactants encompass MRPs formed with or without sweeteners or sweetening agents.

B. Steviol Glycoside-Derived Maillard Reaction Products (S-MRPs) and NSG-Derived Maillard Reaction Products (NS-MRPs)

In some embodiments, the Maillard reactants in a reaction mixture include (1) an amino donor; and (2) a sugar donor comprising a steviol glycoside, a glycosylated steviol glycoside, a stevia extract, a glycosylated stevia extract, or combinations thereof. The resulting products are referred to as steviol glycoside-derived MRPs, S-MRPs, or SG-MRPs. In some embodiments, S-MRPs or SG-MRPs are produced from a reaction mixture that comprises (1) one or more amine donors, (2) one or more reducing sugar, and (3) one or more steviol glycosides, glycosylated steviol glycosides, stevia extracts, and/or glycosylated stevia extracts.

In one embodiment, the S-MRPs are formed under reaction conditions in which no reducing sugar is present.

The inventors of the present application have surprisingly discovered that certain non-reducing sugars exemplified by high intensity natural sweeteners, including steviol glycosides, glycosylated steviol glycosides, stevia extracts, and/or glycosylated stevia extracts can serve as substrates in the Maillard reaction and provide Maillard reaction product (MRP) compositions having improved taste profiles over previously reported high intensity natural sweetener compositions. As further described herein, steviol glycosides, glycosylated steviol glycosides, *Stevia* extracts, and/or glycosylated *Stevia* extracts have been surprisingly found to undergo a Maillard type reaction to provide MRPs and/or undergo caramelization (to produce caramelization reaction products (CRPs)), even though a ketone or aldehyde is not present in the sweetening agent. In some embodiments, the *Stevia* extracts are NSG-containing *Stevia* extracts. In some embodiments, the glycosylated *Stevia* extracts are glycosylated NSG-containing *Stevia* extracts.

As a result of these unconventional Maillard reactions, steviol glycoside-derived Maillard reaction products (MRPs) can be formed. As used herein, the terms "steviol glycoside-derived MRP", "SG-derived MRP", and "S-MRP" are used interchangeably with reference to an MRP or MRP-containing composition produced by a Maillard reaction between an amine donor and one or more steviol glycosides, with or without the addition of reducing sugar(s) being added to the reaction mixture or reaction solution.

Additional high intensity natural sweetening agents for use in the present reactions and product compositions include sweet tea extracts (*Rubus suavissimus* S. Lee (Rosaceae) providing, for example rubusoside and suaviosides which are kaurane-type diterpene glycosides including suaviosides B, G, H, I and J), swingle extracts (mogroside extracts), glycosylated sweet tea extracts, glycosylated *Stevia* extracts, glycosylated swingle extracts, glycosylated sweet tea glycosides, glycosylated steviol glycosides, glycosylated mogrosides, neohesperidin dihydrochalcone (NHDC), glycosylated NHDC, glycyrrhizin, glycosylated glycyrrhizin, hernandulcin, and mixtures thereof.

It is believed that an amine reacts with the non-reducing sugar component with or without an added reducing sugar to provide new previously unknown MRP compound(s). As such, the MRP compositions of the present application include products preparable (or obtainable) by the reaction of an amine with a non-reducing sugar, for example, a high intensity natural sweetening agent, such as a steviol glycoside (SG), a *Stevia* extract, a NSG-containing *Stevia* extract, a mogroside, a sweet tea extract, a glycosylated *Stevia* extract (GSG), a glycosylated NSG-containing *Stevia* extract, NHDC, etc.

In some embodiments, the Maillard reactants in a reaction mixture include one or more NSG substances. The NSG substances may be volatile substances, non-volatile substances, or a mixture of both. In some embodiments, the NSG substances are *Stevia*-derived NSG substances. In some embodiments, the Maillard reactants in a reaction mixture include a NSG-containing *Stevia* extract. In some embodiments, the NSG-containing *Stevia* extract contains only *Stevia*-derived NSG substances.

C. Sweetening Agent-Derived Maillard Reaction Products (SA-MRPs)

In Maillard reactions other than those involving production of S-MRPs, the Maillard reactions described herein utilize an amine donor in combination with at least one sweetening agent (SA) (or natural high intensity sweetener). The terms "sweetening agent-derived MRP" and "SA-MRP" are used interchangeably with reference to an MRP or MRP-containing composition produced by a Maillard reaction between an amine donor and a sweetening agent, i.e., natural high intensity sweetener. Thus, an S-MRP is a particular type of SA-MRP.

In some embodiments, one or more carbohydrate sweeteners may be added to a reaction mixture subjected to the Maillard reaction. In other embodiments, one or more carbohydrate sweeteners may be added to an MRP composition. Non-limiting examples of carbohydrate sweeteners for use in the present application include caloric sweeteners, such as, sucrose, fructose, glucose, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, sugar alcohols, such as erythritol, xylitol, mannitol, sorbitol, maltitol, lactitol, mannitol, and inositol; xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (containing fructose and glucose, e.g., HFCS55, HFCS42, or HFCS90), coupling sugars, soybean oligosaccharides, and glucose syrup. Additionally, the above carbohydrates may be in either the D- or L-configuration.

It should be noted, however, that not all carbohydrate sweeteners are reducing sugars. Sugars having acetal or ketal linkages are not reducing sugars, as they do not have free aldehyde chains. They therefore do not react with reducing-sugar test solutions (e.g., in a Tollens' test or Benedict's test). However, a non-reducing sugar can be hydrolyzed using diluted hydrochloric acid. Exemplary carbohydrate sweeteners that are not reducing sugars, include e.g., sucrose, trehalose, xylitol, and raffinose. In some embodiments, the sweetening agent comprises one or more *Stevia*-derived NSG substances.

D. Thaumatin Containing MRPs (TS-MRPs)

Thaumatin is a sweet-tasting protein that can serve as an amino donor in the Maillard reaction. In certain preferred embodiments, thaumatin is added to the reaction mixture subjected to the Maillard reaction or is added to an MRP composition produced with or without thaumatin.

Thaumatin is typically prepared from the katemfe fruit (*Thaumatococcus daniellii* Bennett) of West Africa. Wherever thaumatin is mentioned in this specification, it should be understood to apply to the use of thaumatin prepared from all types of katemfe fruit extracts or any other extracts, or from other plants and plant extracts, including genetically modified plants, as well as protein preparations derived from cell cultures or fermentation processes.

The inventors surprisingly found that inclusion of thaumatin in the Maillard reaction or added to an MRP composition formed therefrom can significantly improve the overall taste profile of food and beverages to have a better mouth feel, a creamy taste, a reduction of bitterness of other ingredients in food and beverage, such as astringency of tea, protein, or their extracts, acidic nature and bitterness of coffee, etc. Thaumatin can also help to reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as an additive for improving the taste performance of food and beverage products comprising one or more sweetening agents or sweeteners, such as sucralose, acesulfame-K, aspartame, steviol glycosides, swingle extract, sweet tea extracts, allulose, sodium saccharin, sodium cyclamate or siratose.

In addition to the ability of thaumatin to augment MRP functionality with *Stevia* and other high intensity natural sweeteners, the additional inclusion of malic acid can further improve the taste profile substantially, including less lingering.

E. Flavor Generation

Maillard reaction technology described herein may be used for the production of process or reaction flavors. Process flavors are complex aroma building blocks, which provide similar aroma and taste properties as thermally treated foodstuffs such as cooked meat, chocolate, coffee, caramel, popcorn and bread. Additionally, they can be combined with other flavor ingredients to impart flavor enhancement and/or specific flavor notes in the applications in which they are used. However, such technology currently is mainly used for producing meat flavor and spiciness to enhance the taste of food. It is seldom considered as a tool to improve taste for the beverage industry.

Flavor can be characterized as a complex combination of the olfactory, gustatory and trigeminal sensations perceived during tasting. The flavor can be influenced by tactile, thermal, painful and/or kinaesthetic effects. However the exact mechanisms that lead to our perception of flavor have not yet been elucidated, due to different reasons: i) flavor perception involves a wide range of stimuli, ii) the chemical compounds and food structures that activate the flavor sensors change as food is eaten, iii) the individual modalities interact in a complex way. There is a need first to identify not only the stimuli involved in flavor perception which includes taste and aroma modalities, but also the other senses which can affect flavor perception, such as irritation, temperature, color, texture, and sound. It has been shown, for example, that irritants do interact with the perception of both tastes and smells inhibiting their perceived intensity and that some taste and odor compounds contain an irritating component. Temperature has an impact on taste perception through the triggering of cascade reactions in receptors. In the case of color, learned color—taste associations influence perceived taste. All these sensations experienced while eating are crucial and should have a tremendous impact on whether foods will be accepted or rejected. Moreover, one has also to take into account the influence of the associations between flavor experiences and feelings of contentment or well-being on the overall acceptability of the product.

The Maillard reaction is one of the most important routes to flavor compounds in cooked foods. The initial stages of the reaction involve the condensation of the carbonyl group of a reducing sugar with an amine compound, followed by the degradation of the condensation products to give a number of different oxygenated compounds. The subsequent stages of the Maillard reaction involve the interaction of these compounds with other reactive components, such as amines, amino acids, aldehydes, hydrogen sulfide and ammonia. These additional reactions lead to many important classes of flavor compounds including furans, pyrazines, pyrroles, oxazoles, thiophenes, thiazoles and other heterocyclic compounds. The large number of different reactive intermediates that can be generated in the Maillard reaction gives rise to an extremely complex array of volatile products.

Indeed, the Maillard reaction produces volatile substances (comprising pure and impure substances) and non-volatile substances (comprising pure and impure substances). The Maillard reaction products include various products that can be isolated, either partially volatile substances or partially non-volatile substances removed as a direct result of the Maillard reaction. In certain embodiments, volatile compounds may be separated from non-volatile compounds at e.g., 105° C., which represents a typical temperature to determine the dry mass of compounds. In this case, "dry mass" may be interpreted as "compound-water-volatile compounds".

Extraction with organic solvents generally provides a more complete profile of volatile metabolites including representation from polar hydrophilic species such as the lower molecular weight alcohols, hydroxyl-acids, thiols, and flavor compounds such as acetoin, methionol and furaneol. However, non-volatile material such as leaf waxes, triterpenes, sterols, triglycerides and more complex lipids, and silicones and plasticizers from laboratory apparatuses are also likely to be extracted and may complicate analysis unless removed or the analytical method is suitably modified. Solvents chosen to optimize the profile of extracted metabolites include pentane-ether mixtures and dichloromethane. Unwanted interfering compounds such as lipids, pigments and hydrocarbons, may be removed by distillation (simultaneous distillation-extraction (SDE), vacuum micro distillation or solvent assisted flavor evaporation (SAFE), or by adsorption chromatography (solid phase extraction). Vacuum micro distillation, using liquid nitrogen to distil and condense organic extracts under vacuum, also appears a useful technique to isolate volatile fractions suitable for instrumental analysis from complex matrices such as urine and faeces. Atmospheric pressure (SDE) and steam distillation (hydrodistillation) methods used to prepare volatile extracts for GC-MS analysis are liable to artifact formation due to the use of heat.

Solvent extracts are routinely concentrated by evaporation before analysis, increasing sensitivity but resulting in selective loss of the more volatile metabolites as a function of the extent of the volume reduction. These losses may be compensated for by the use of internal standards which are generally added during sample extraction and are used to correct for any loss of volatiles that occurs during the process of sample preparation. Internal standards are generally more easily used with solvent extraction than with headspace methods. Since only a small portion (1 μL) of the final solvent extract is usually used for GC-MS analysis, solvent extraction methods offer less sensitivity than direct thermal desorption or solid phase microextraction (SPME). Solvent extracts, prepared either by solvent extraction or elution of headspace sampling adsorbents provide the most convenient method of sample handling. Samples can be easily stored before analysis, introduction into the GC is readily and reliably automated, and there is usually sufficient sample for multiple analyses facilitating robust identification and quantification of both known and unknown volatiles.

An alternative to the use of organic solvents is extraction with supercritical fluids (SCF) usually supercritical carbon dioxide, either pure or in the presence of chemical modifiers. Supercritical carbon dioxide has a polarity comparable to pentane and has been used to obtain volatiles and essential oils from a wide range of plant species. While SCF extraction has the advantage of using totally volatile solvents, specialized equipment is required. SCF extraction has been compared with conventional solvent and Soxhlet extraction, hydrodistillation, and simultaneous distillation-extraction (SDE) methods of volatile extraction.

Profiling of volatile compounds can be achieved using gas chromatography mass spectrometry (GC-MS). Further, in some embodiments, GC may be coupled to detection by electron impact mass spectrometry (EI-MS) to provide high chromatographic resolution, sensitivity, compound-specific detection, quantification, and the potential to identify unknown volatiles by characteristic and reproducible fragmentation spectra in addition to their retention times on the gas chromatograph. Sample analysis can be simplified compared with silylation-based methods for the GC analysis of primary metabolites in that no chemical derivatization is required and the chromatograms generally contain fewer metabolites and less chemical noise. A variety of commercial and web-based resources can be used to identify unknown compounds in a given volatile sample including large databases of searchable mass spectral libraries. High-resolution time-of-flight GC-MS instruments enable highly accurate measurement of ion masses (m/z ratios). This allows the calculation of chemical formulae and aids in the identification of unknown metabolites. The use of chemical detectors other than the mass spectrometer, sulfur selective detectors or the human nose in gas chromatography-olfactometry (sniffer port, GC-O), may enable more specific and sensitive detection of particular metabolites.

In addition, Maillard reaction products may include water soluble and/or fat soluble compounds.

F. Maillard Reaction Mechanisms

With respect to flavor generation, the Maillard reaction can be broken down into four stages. The first stage involves the formation of glycosylamines. The second stage involves rearrangement of the glycosylamines to form Amadori and Heyns rearrangement products (often abbreviated in the literature to "ARPs" and "HRPs", respectively). The third stage involves dehydration and/or fission of the Amadori and Heyns rearrangement products to furan derivatives, reductones and other carbonyl compounds (which may have significant organoleptic qualities). These "third stage products" may also be produced without the formation of ARP's or HRP's. The fourth stage involves the conversion of these furan derivatives, reductones and other carbonyl compounds into colored and aroma/flavor compounds. Thus, products and reactants present in both the third and fourth stage of the Maillard reaction contribute towards aroma and/or flavor. During the Maillard reaction, phosphate can be used as catalyst to help the conversion of Amadori compounds to flavor compounds.

The phrase "Amadori rearrangement" refers to an organic reaction describing the acid or base catalyzed isomerization or rearrangement reaction of the N-glycoside of an aldose or the glycosylamine to the corresponding 1-amino-1-deoxy-ketose. The reaction is important in carbohydrate chemistry, specifically the glycation of hemoglobin (as measured by the HbA1c test). The rearrangement is usually preceded by formation of an α-hydroxyimine by condensation of an amine with an aldose sugar in a reaction known as Schiff base formation. The rearrangement itself entails an intramolecular redox reaction, converting this α-hydroxyimine to an α-ketoamine. The formation of imines is generally reversible, but subsequent to conversion to the keto-amine, the attached amine is fixed irreversibly.

As used herein, the term "Amadori product" or "Amadori compound" refers to an intermediate in the Maillard reaction between a compound having a free amino group and a compound having a free aldehyde having a ketoamine structure represented by a general formula —(CO)—CHR—NH— (R represents a hydrogen atom or a hydroxyl group). The Amadori product is formed by a rearrangement of the Schiff base. Flavor compounds and other intermediates may be generated from Amadori products via different degradation pathways. In certain embodiments, the MRP reaction products of the present application may include one or more detectable Amadori products in the final reaction products, as documented in Examples 281 and 282.

When a ketose sugar having a free keto group (such as fructose) is used in a Maillard reaction with an amine donor, the intermediate analogous to the Amadori product is referred to as a "Heyn's product" or "Heyn's compound." The Heyn's product is formed by a rearrangement of the Schiff base. Flavor compounds and other intermediates may be generated from Heyn's products via different degradation pathways. In certain embodiments, the MRP reaction products of the present application may include one or more detectable Heyn's products in the final reaction products.

In one embodiment, the present application provides an MRP composition comprising one or more Amadori products.

In another embodiment, the present application provides an MRP composition comprising one or more Heyn's products.

It should be understood that throughout this specification, when reference is made to an MRP composition, the MRP composition should be considered to further accommodate one or more Amadori products, one or more Heyn's products or a combination thereof.

The following illustrates a general scheme for the Maillard reaction:

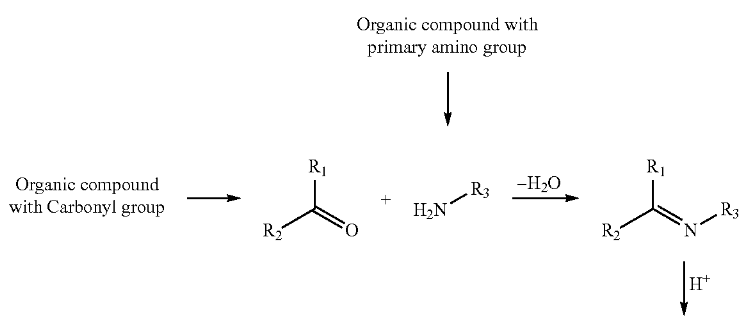

-continued

Schiff's Base

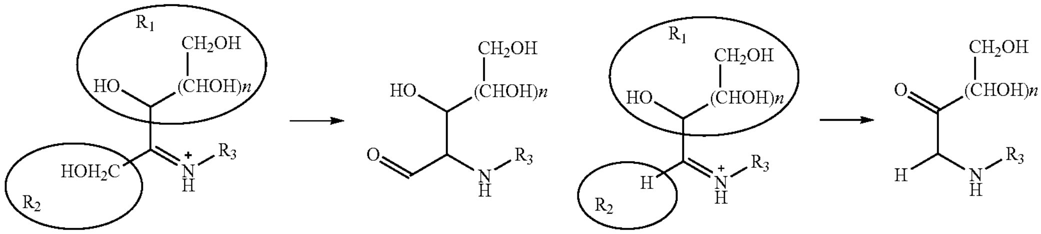

Ketose - Heyns Rearrangement

Aldose - Amadori Rearrangement

Reaction Scheme I below illustrates a classical Maillard reaction between a reducing sugar and an amino group from an amino acid:

Reaction Scheme I

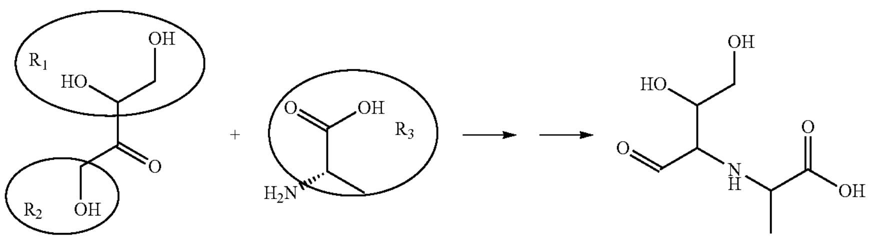

Example: Maillard reaction for Erythrulose + Alanine to the corresponding Heyns product

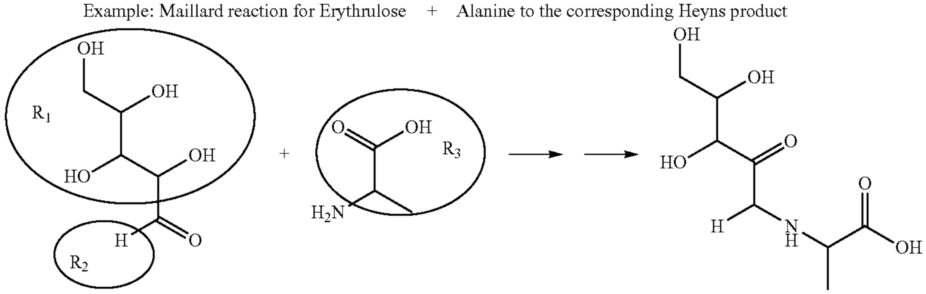

Example: Maillard reaction for Xylose + Alanine to the corresponding Amadori product R1 denotes the residue for any sugar chain in any possible chiral configuration. Including any reducing sugar with an unlimited number of glycosidic bound monosaccharides
R2 = H identifies the sugar as aldose in open chain form which is equivalent to the hemiacetal
R2 = CH2OH identifies the sugar as ketose in open chain form which is equivalent to the hemiacetal
R3 denotes any amino acid residue inclduing its D—, L— isomers, the amino-terminal end of peptides and proteins and any second or third amino group of amino acids.

The following Reaction Scheme II below illustrates the formation of a Schiff base (a very early reaction product) between a ketone/aldehyde and an amino group from an amino acid:

Reaction Scheme II

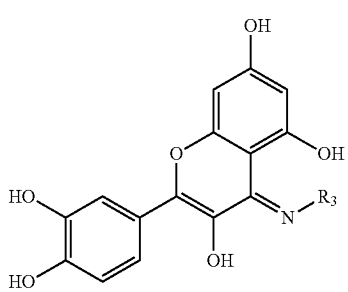

Schiff'sche Base of Quercetin and a primary amine

-continued

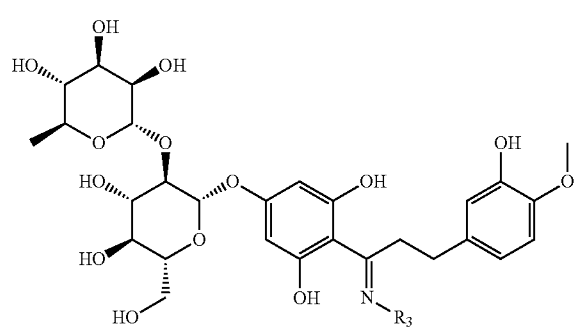

Schiff'sche Base of neohesperidinedihydrochalcone and a primary amine

-continued

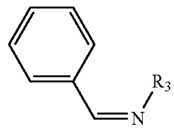

Schiff'sche Base of Benzaldehyde and a primary amine

A Schiff'sche base is formed by the reaction of a carbonyl- and a primary amino-group. The Schiff'sche base is a very early reaction product of the Maillard Reaction.
R3 denotes any amino acid residue inclduing its D—, L— isomers, the amino-terminal end of peptides and proteins and any second amino group of amino acids.

Reaction Scheme III below illustrates the formation of a Schiff base (a very early Maillard reaction product) between an organic amine and a reducing sugar:

Reaction Scheme III

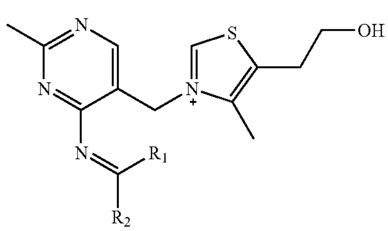

Schiff'sche Base of Thiamine and a carbonyl-group

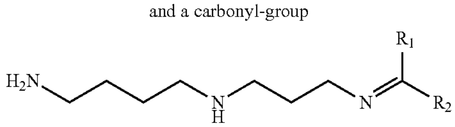

Schiff'sche Base of Spermidine and a carbonyl-group

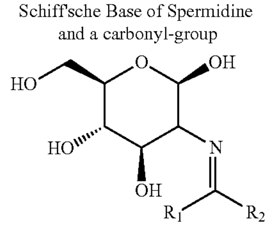

Schiff'sche Base of Glucosamine and a carbonyl-group

A Schiff'sche base is formed by the reaction of a carbonyl- and a primary amino-group. The Schiff'sche base is a very early reaction product of the Maillard Reaction.
R1 denotes the residue for any sugar chain in any possible chiral configuration, including any reducing sugar with an unlimited number of glycosidic bound monosaccharides
R2 = H identifies the sugar as aldose in open chain form which is equivalent to the hemiacetal
R2 = CH2OH identifies the sugar as ketose in open chain form which is equivalent to the hemiacetal In summary, a composition of Maillard reaction products includes the raw materials for the reaction, the sugar donor and amine donor; and the finished Maillard products, which include MRP reactant products originating from the reaction between the sugar donor and the amine donor, as well as any unreacted reactants remaining after the reaction, i.e., sugar donors and amine donors. The reactants may be completely or partially consumed.

Where the sugar donor(s) is steviol glycoside, Reaction Scheme IV below illustrates a proposed reaction between a steviol glycosides and a free amino group:

Reaction Scheme IV

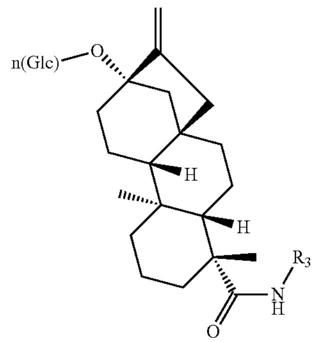

Reaction of Steviolglycoside with free carboxylic group and primary amine yields an amide

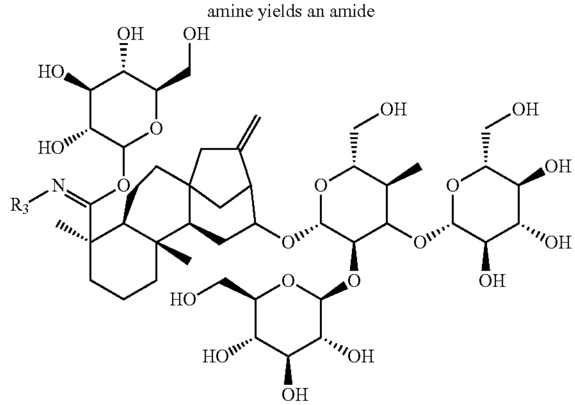

Reaction of Steviolglycoside coside with ester bound glucose and amine yields a Schiff'sche base.

Steviolglycoside can react with an amino group yielding an amide or a Schiff'sche base (base possible itermediates of the Maillard reaction). Upon heating, monosaccharides are liberated from steviolglycosides which undergo Maillard reaction.
The Schiffsche base is a very early reaction product of the Maillard Reaction.
R3 denotes any amino acid residue inclduing its D—, L— isomers, the amino-terminal end of peptides and proteins and any second amino group of amino acids.

Here, the finished S-MRP products are comprised of two parts: (1) unreacted reactants, including sugar donor, amine donor, *Stevia* extract with or without non-steviol glycosides; (2) reactant resultants, including any resultants from the reaction of the sugar donor, amine donor, any resultant from reaction of steviol glycosides and the amino donor, any resultant from non-steviol glycosides extracted from leaves, or other types of method to produce the steviol glycosides (e.g., fermentation, bioconversion) during the heated reaction of amine donors with or without sugar donors.

The proposed Reaction IV is further applicable to other high intensity natural sweeteners that are not aldoses or ketoses, but have free carboxylic groups for reaction with an amine donor.

Generally, Maillard reaction products can be classified into four groups depending on their aroma type, chemical structure, molecular shape and processing parameters. These include, but are not limited to:

(1) nitrogen heterocyclics-pyrazines, pyrroles, pyridines, alkyl- and acetyl-substituted saturated N-heterocyclics; these compounds are responsible for corny, nutty, roasted and breadlike odors;

(2) cylic enolones of maltol or isomaltol, dehydrofuranones, dehydropyrones; cyclopentenolones are responsible for typically caramel like odors;

(3) moncarbonyls; and (4) polycarbonyls-2-furaldehydes, 2-pyrrole aldehydes, C3-C6 methyl ketones.

Maillard reaction products (MRPs) include, but are not limited to, pyrazines, pyrroles, alkyl pyridines, acyl pyridines, furanones, furans, oxazoles, melanoidins, and thiophenes. Such MRPs impart flavors such as nutty, fruity, caramel, meaty, or combinations thereof.

For example, pyrazines provide cooked, roasted and/or toasted flavors. Pyrroles provide cereal-like or nutty flavors. Alkylpyridines provide bitter, burnt or astringent flavors. Acylpyridines provide cracker-like or cereal flavors. Furanones provide sweet, caramel or burnt flavors. Furans provide meaty, burnt, or caramel-like flavors. Oxazoles provide green, nutty or sweet flavors. Thiophenes provide meaty or roasted flavors.

In certain embodiments, the Maillard reaction products (MRPs) produced may include, but are not limited to, (1) acyclic products, such as methional, phenylacetylaldehyde, 2-mercaptopropionic acid, (E)-2-((methylthio)methyl)but-2-enal glyoxal, butanedione, pyruvaldehyde, prop-2-ene-1, 1-diylbis(methylsulfane), glyceraldehyde, 1,3-dihydroxyacetone, acetoin and glycoladehyde; (2) cyclic products, such as cyclic products including 3,5,6-trimethyhlpyrazin-2(1H)-one, 4,5-dimethyl-2-(2-(methylthio)ethyl)oxazole and 1-(3H-imidazo[4,5-c]pyridine-4-yl)ethan-1-one; (3) heterocyclic products such as 5-(hydroxymethyl)furan-2-carbaldehyde (5-hydroxymethyl furfural), 3-hydroxy-2-methyl-4H-pyran-4-one, 2-hydroxy-2,5-dimethyl-3(2H)-thiophenone, 1-(2, (3-dihydro-1H-pyrrolizin-5-yl)ethan-1-one, 1-(3H-imidazo[4,5-c]pyridine-4-yl)ethan-1-one, 3,5,6-trimethylpyrazin-2(1H)-one and 4,5-dimethyl-2-(2-(methylthio)ethyl)oxazole; (4) pyrazine products, such as 3, 5, 6-trimethylpyrazin-2(1H)-one; (5) melanoidins, which are poorly characterized, but generally have the following physical properties including: a mass from 1 kda to >24 kda; form oligomers of heterocyclic compounds and/or sugar fragments; form pyridines, pyrazines, pyrroles and imidazoles as determined by 13C-NMR, 15N-NMR, MALDI-TOF mass spec and IR; form oligomers from 14 to >30 identified; and normally 3-4% nitrogen is present in the molecule.

MRPs can act as a coloring agent by optimization of reaction conditions. The MRPs' own color can be combined with natural colors to create new colors. The MRPs can be blended with other colors to remove the unpleasant taste associated with the color/coloring agent.

Additionally, Maillard reactions typically create a brownish color, which might not be desirable in certain applications. The inventors of the present application have successfully developed a method to select optimized reactants and reaction condition for a desired color. Thus the final product may be prepared to provide good color, aroma, taste and texture. Suitable colors include, for example, red, orange, yellow, etc.

Maillard reaction flavors are also called process flavors. The ingredients for reaction or process flavors can include (a) a protein nitrogen source, (b) a carbohydrate source, (c) a fat or fatty acid source and (d) other ingredients including herbs and spices; sodium chloride; polysiloxane acids; bases and salts such as pH regulators; water; the salts and acid forms of thiamine, ascorbic, citric, lactic, inosinic acid and guanylic acids; esters or amino acids; inositol; sodium and ammonium sulfides and hydrosulfides; diacetyl and lecithin.

The Maillard reactions described herein can be advantageously controlled to have only 1$^{st}$ or the 2$^{nd}$ reaction steps in the overall process if necessary. In one embodiment, the composition(s) would include the product(s) of the first step or from the second step.

As used herein, the term "Maillard reaction" refers to a non-enzymatic reaction of (1) one or more reducing and/or non-reducing sugars, and (2) one or more amine donors in the presence of heat, wherein the non-enzymatic reaction produces a flavor. Thus, this term is used unconventionally, since it accommodates the use of use of non-reducing sweetening agents as substrates, which were not heretofore believed to serve as substrates for the Maillard reaction, such as sweet tea extracts (*Rubus suavissimus* S. Lee (Rosaceae) providing, for example rubusoside and suaviosides which are kaurane-type diterpene glycosides including suaviosides B, G, H, I and J), stevia extracts, swingle extracts (mogroside extracts), glycosylated sweet tea extracts, glycosylated stevia extracts, glycosylated swingle extracts, glycosylated sweet tea glycosides, glycosylated steviol glycosides, glycosylated mogrosides, glycyrrhizine, glycosylated glycyrrhizinse or mixtures thereof could undergo a Maillard type reaction to provide MRPs like substances and/or caramelization to provide CRPs like substances even thought a ketone or aldehyde is not present in the sweetening agent. Not to be bound by theory, it is believed that an amine reacts with the non-reducing sugar component to provide new previously unknown compound(s). As such compositions include products preparable (or obtainable) by the reaction of an amine with a non-reducing sugar, for example, a steviol glycoside, sweet tea extract(s), glycosylated stevia extracts, etc., noted as sweetening agents herein. Although these non-reducing sweetening agents include free carbonyl groups, such as free carboxyl groups, they do not have free aldehyde or free keto groups, characteristic of conventional "reducing sugars" or "caloric carbohydrate sweeteners" used in Maillard reactions.

The Maillard reactions referred to herein result in the formation of MRPs formed from conventional reducing sugar sweeteners, as well as unconventional non-reducing sweetening agents as described herein. It should be understood that Maillard reaction products can include the reaction products resulting from Maillard reactions between one or more donor amine(s) and one or more reducing sugar(s), non-reducing sweetening agents and/or components from extracts, syrups, plants, etc. that provide a source of the reducing sugar(s) and/or the non-reducing sweetening agent(s).

Steviol glycosides are not regarded as reducing sugars in the conventional sense, however, as further documented in the Examples, the inventors have surprisingly found that steviol glycosides can react with amine donors directly. Therefore, the inventors found that glycosides can act as sugar donor replacements with in a Maillard reaction with amine donors. In should be noted, however, that in certain instances steviol glycosides may be degraded to create reducing sugars which can react with amine donors in a conventional sense.

In certain preferred embodiments, a composition of the present application can comprise one or more MRPs formed where the sugar donor(s) (or sweetening agent(s)) comprise one or more glycosides.

The embodiments described herein can also provide the advantages of providing a "kokumi" taste. The term "kokumi" is used for flavors that cannot be represented by any of the five basic taste qualities. Kokumi is Japanese for "rich taste." Kokumi is a taste sensation best known for the hearty, long finish it provides to a flavor. Kokumi also provides a mouthful punch at initial taste, and lends an overall balance and richness to foods, like umami, kokumi heightens the sensation of other flavors. Therefore, kokumi helps developers respond to consumer demands for healthier products, by allowing a reduction of sodium, sugar, oil, fat or MSG content without sacrificing taste.

Kokumi can be classified into four profiles, namely thickness, continuity, mouthfulness and harmony of taste as well as long-lastingness. Compounds with kokumi properties (such as peptides) increase the perception of other tastes, especially saltiness and umami; as such, with the same amount of salt, a food rich in these kokumi compounds will be perceived as saltier and more flavorful.

One of the key performance characteristics of the MRP compositions described herein is the development of improved taste characteristics, exemplified by kokumi. The compositions provided herein have a mouthful punch at initial quick on site sweet, and overall balance and richness, which make the sweetening agents more sugar-like and overcome the disadvantages of the sweetening agents having slow onset, void, bitterness, lingering, aftertaste etc.

In addition, besides the steviol glycosides, which are ent-kaurane-type diterpene glycosides, there are many other constituents in high intensity natural sweeteners, such as phytosterols, non-glycosylated sterebins A-N ent-labdanes glycosides, nonsweet steroid glycosides, lupeol esters, pigments, flavonoids, fatty acids, phospholipids, and glycolipids etc. For example, 30 to over 300 compounds have been detected within the essential and volatile oils of *S. rebaudiana*. The inventors of the present application have surprisingly found that retention of some amount of these volatile substances, such as trans-β-farnesene, nerolidol, caryophyllene, caryophyllene oxide, limonene, spathulenol together with other sesqiterpenes, nonoxygenated sesquiterpenes, mono-terpenes could improve the taste profile of steviol glycosides and create unique pleasant flavors. These flavors could also exist in their intact form, react in Maillard reactions, and/or interact with other MRPs to create new, interesting flavors. For example, they can improve the overall taste profile of steviol glycosides and make them more acceptable for consumers.

IV. Maillard Reaction Components

The inventors of the present application have surprisingly discovered that non-reducing sugars may serve as substrates in the Maillard reaction and provide Maillard reaction product (MRP) compositions having improved taste profiles over previously reported high intensity natural sweetener compositions. In addition, *Stevia*-derived NSG substances may also serve as substrates in the Maillard reaction and provide Maillard reaction product (MRP) compositions having improved taste or flavor profiles.

In one aspect, an MRP sweetening composition comprises one or more Maillard reaction products (MRPs) formed from a Maillard reaction between (1) a high intensity natural sweetening agent composition comprising one or more steviol glycosides, one or more *Stevia* extracts, or a combination thereof: and (2) an amine donor comprising a free amino group, wherein the amine donor is a primary amine compound, a secondary amine compound, an amino acid, a peptide, a protein, a protein extract, or a mixtures thereof.

In another aspect, an MRP sweetening composition comprises one or more Maillard reaction products (MRPs) formed from a Maillard reaction mixture comprising (1) a high intensity natural sweetening agent composition in combination with a reactant mixture comprising (2) an amine donor comprising a free amino group and (3) a reducing sugar comprising a free aldehyde or free ketone group, wherein the high intensity natural sweetening agent composition comprises one or more steviol glycosides, one or more *Stevia* extracts, or a combination thereof, wherein the amine donor is a primary amine compound, a secondary amine compound, an amino acid, a peptide, a protein, a protein extract, or a mixtures thereof, and wherein the reducing sugar is a monosaccharide, disaccharide, oligosaccharide, polysaccharide, or a combinations thereof.

In another aspect, an MRP sweetening composition comprises one or more MRP(s) and at least one sweetening agent or sweetener as defined in the present application.

A. Amine Donor

The term “amine reactant” or “amine donor” refers to a compound or substance containing a free amino group, which can participate in a Maillard reaction. Amine containing reactants include amino acids, peptides (including dipeptides, tripeptides, and oligopeptides), proteins, proteolytic or nonenzymatic digests thereof, and other compounds that react with reducing sugars and similar compounds in a Maillard reaction, such as phospholipids, chitosan, lipids, etc. In some embodiments, the amine reactant also provides one or more sulfur-containing groups.

Exemplary amine donors include amino acids, peptides, proteins, protein extracts.

Exemplary amino acids include, for example, nonpolar amino acids, such as alanine, glycine, isoleucine, leucine, methionine, tryptophan, phenylalanine, proline, valine; polar amino acids, such as cysteine, serine, threonine, tyrosine, asparagine, and glutamine; polar basic (positively charged) amino acids, such as histidine and lysine; and polar acidic (negatively charged) amino acids, such as aspartate and glutamate.

Exemplary peptides include, for example, hydrolyzed vegetable proteins (HVPs) and mixtures thereof.

Exemplary proteins include, for example, sweet taste-modifying proteins, soy protein, sodium caseinate, whey protein, wheat gluten or mixtures thereof. Exemplary sweet taste-modifying proteins include, for example, thaumatin, monellin, brazzein, miraculin, curculin, pentadin, mabinlin, and mixtures thereof. In certain embodiments, the sweet-taste modifying proteins may be used interchangeably with the term “sweetener enhancer.”

Exemplary protein extracts include yeast extracts, plant extracts, bacterial extracts and the like.

The nature of the amino donor can play an important role in accounting for the many flavors produced from a Maillard reaction. In some embodiments, the amine donor may account for one or more flavors produced from a Maillard reaction. In some embodiments, a flavor may be produced from a Maillard reaction by using one or more amine donors, or a particular combination of a amine donor and sugar donor.

In certain embodiments, the amine donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent.

B. Sugar Donor

The sugar donor may be a reducing sugar, a non-reducing sugar, or a combination thereof.

In some embodiments, the MR reactants include one or more reducing sugars in combination with one or more amine donors. When a reaction mixture contains these reactants in the absence of non-reducing sugars (including high intensity natural sweeteners) an MRP composition is formed.

Reducing groups are found on reducing sugars. Initially, a reactive carbonyl group of a reducing sugar condenses with a free amino group, with a concomitant loss of a water molecule. A reducing sugar substrate for the Maillard reaction typically has a reactive carbonyl group in the form of a free aldehyde (aldose) or a free ketone (ketose).

In some embodiments, the MR reactants include (1) one or more amine donors and (2) one or more reducing sugars.

In other embodiments, the MR reactants include (1) one or more amine donors and (2) one or more non-reducing sugars.

In other embodiments, the MR reactants include (1) one or more amine donors; (2) one or more non-reducing sugars; and (3) one or more reducing sugars.

In some embodiments, non-reducing sugar refers to a sugar or sweetening agent that does not contain free aldehyde or free keto groups. Exemplary non-reducing sugars include sucrose, trehalose, raffinose, stachyose, and verbascose. Exemplary non-reducing sweetening agents include high intensity natural sweetening agents.

In some embodiments, the non-reducing sugars include one or more high intensity natural sweetening agents, which may be included as reactant(s) in the Maillard reaction or are added to MRP compositions formed therefrom. The high intensity natural sweetening agents may comprise the only sugar donor(s) in the Maillard reaction mixture or they may be combined with one or more sweetening agents. Alternatively, or in addition, the natural and/or synthetic sweetening agents may be added to an MRP composition after completion of the MR reaction.

High-intensity natural sweeteners are commonly used as sugar substitutes or sugar alternatives, because they are many times sweeter than sugar, contribute only a few to no calories when added to foods, and enhance the flavor of foods. Because they are many times sweeter than table sugar (sucrose), smaller amounts of high-intensity sweeteners are needed to achieve the same level of sweetness as sugar in food. Moreover, they generally will not raise blood sugar levels.

High intensity synthetic sweeteners are synthetically produced sugar substitutes or sugar alternatives that are similarly many times sweeter than sugar and contribute few to no calories when added to foods. Moreover, they can be similarly used as Maillard reaction components or as flavor enhancers added to MRP compositions of the present application. High intensity synthetic sweeteners include Advantame, Aspartame, Acesulfame potassium (Ace-K), Neotame, Sucralose, and Saccharin.

The present inventor has found that Advantame can boost the flavor and taste profile of the compositions disclosed herein, especially when added after Maillard reaction. Generally, Advantame and other high intensity synthetic sweeteners can be added in the range of 0.01 ppm to 100 ppm.

In some embodiments, the MR reactants include (1) one or more amine donors; and (2) one or more terpenoid glycosides with or without additional sweetening agents and/or reducing sugars.

In some embodiments, the sugar donor may account for one or more flavors produced from a Maillard reaction. More particularly, a flavor may be produced from a Maillard reaction by using one or more sugar donors, wherein at least one sugar donor is selected from a product comprising a glycoside and a free carbonyl group. In some embodiments, glycosidic materials for use in Maillard reactions include natural concentrates/extracts selected from bilberry, raspberry, lingonberry, cranberry, apple, peach, apricot, mango, etc.

Reducing sugars can be derived from various sources for use as a sugar donor in the Maillard reaction or as a component added to an MRP composition. For example, a sugar syrup may be extracted from a natural source, such as Monk fruit, fruit juice or juice concentrate (e.g., grape juice, apple juice, etc.), vegetable juice (e.g., onion etc.), or fruit (e.g., apples, pears, cherries, etc.), could be used as sugar donor. Such a syrup may include any type of juice regardless whether there is any ingredient being isolated from juice, such as purified apple juice with trace amount of malic acid etc. The juice could be in the form of liquid, paste or solid. Reducing sugars may also be extracted from *Stevia*, sweet tea, luohanguo, etc. after isolation of high intensity sweetening agents described herein (containing non-reducing sugars) from crude extracts and mixtures thereof.

The natural extracts used in Maillard reactions described herein can include any solvent extract-containing substances, such as polyphenols, free amino acids, flavonoids etc. The extracts can be further purified by methods such as resin-enriched, membrane filtration, crystallization etc., as further described herein.

In one embodiment, a Maillard reaction mixture or an MRP composition produced thereof may include a sweetener, thaumatin, and optionally one or more MRP products, wherein the sweetener is selected from date paste, apple juice concentrate, monk fruit concentrate, sugar beet syrup, pear juice or puree concentrate, apricot juice concentrate. Alternatively, a root or berry juice may be used as sugar donor or sweetener added to an MRP composition.

In some embodiments, particular flavors may be produced from a Maillard reaction through the use of one or more sugar donors, where at least one sugar donor is selected from plant juice/powder, vegetable juice/powder, berries juice/powder, fruit juice/powder. In certain preferred embodiments, a concentrate or extract may be used, such as a bilberry juice concentrate or extract having an abundance of anthocyanins. Optionally, at least one sugar donor and/or one amine donor is selected from animal source based products, such as meat, oil etc. Meat from any part of an animal, or protein(s) from any part of a plant could be used as source of amino donor(s) in this application.

In certain embodiments, the sugar donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent.

B1. Reducing Sugars and Carbohydrate Sweeteners

In certain embodiments, the sugar donor is a reducing sugar or carbohydrate sweetener. Reducing sugars for use in the present application include, for example, all monosaccharides and some disaccharides, which can be aldose reducing sugars or ketose reducing sugars. Typically, the reducing sugar may be selected from the group consisting of aldotetrose, aldopentose, aldohexose, ketotetrose, ketopentose, and ketohexose reducing sugars. Suitable examples of aldose reducing sugars include erythrose, threose, ribose, arabinose, xylose, lyxose, allose, altrose, glucose, mannose, gulose, idose, galactose and talose. Suitable examples of ketose reducing sugars include erythrulose, ribulose, xylulose, psicose, fructose, sorbose and tagatose. The aldose or the ketose may also be a deoxy-reducing sugar, for example a 6-deoxy reducing sugar, such as fucose or rhamnose.

Specific monosaccharide aldoses include, for example, reducing agents include, for example, where at least one reducing sugar is a monosaccharide, or the one or more reducing sugars are selected from a group comprising monosaccharide reducing sugars, typically at least one monosaccharide reducing sugar is an aldose or a ketose.

Where the reducing sugar is a monosaccharide, the monosaccharide may be in the D- or L-configuration, or a mixture thereof. Typically, the monosaccharide is present in the configuration in which it most commonly occurs in nature. For example, the one or more reducing sugars may be selected from the group consisting of D-ribose, L-arabinose, D-xylose, D-lyxose, D-glucose, D-mannose, D-galactose, D-psicose, D-fructose, L-fucose and L-rhamnose. In a more particular embodiment, the one or more reducing sugars are selected from the group consisting of D-xylose, D-glucose, D-mannose, D-galactose, L-rhamnose and lactose.

Specific reducing sugars include ribose, glucose, fructose, maltose, lyxose, galactose, mannose, arabinose, xylose, rhamnose, rutinose, lactose, maltose, cellobiose, glucuronolactone, glucuronic acid, D-allose, D-psicose, xylitol, allulose, melezitose, D-tagatose, D-altrose, D-alditol, L-gulose, L-sorbose, D-talitol, inulin, stachyose, including mixtures and derivatives therefrom.

Exemplary disaccharide reducing sugars for use in the present application include maltose, lactose, lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose or xylobiose.

Mannose and glucuronolactone or glucuronic acid can be used as sugar donors under Maillard reaction conditions, although they have seldom been used. Maillard reaction products of mannose, glucuronolactone or glucuronic acid provide yet another unique approach to provide new taste profiles with the sweetening agents described throughout the specification alone or in combination with additional natural sweeteners, synthetic sweeteners, and/or flavoring agents described herein.

Additionally, the reducing sugars for use in the present application additionally include any of the carbohydrate sweeteners described above in Section II.

B2. Terpenoid Glycosides ("TGs")

Terpenoid glycosides include steviol glycosides and other high intensity natural sweetening agents from plants, including glycosides, which may serve as sugar substitutes, and which are further described below.

A glycoside is a molecule in which a sugar is bound to another functional group via a glycosidic bond. The sugar group is known as the glycone and the non-sugar group as the aglycone or genin part of the glycoside. Glycosides are prevalent in nature and represent a significant portion of all the pharmacologically active constituents of botanicals. As a class, aglycones are much less water-soluble than their glycoside counterparts.

Depending on whether the glycosidic bond lies "below" or "above" the plane of the cyclic sugar molecule, glycosides of the present application can be classified as α-glycosides or β-glycosides. Some enzymes such as α-amylase can only hydrolyze α-linkages; others, such as emulsin, can only affect β-linkages. Further, there are four types of linkages present between glycone and aglycone: a C-linked glycosidic bond, which cannot be hydrolyzed by acids or enzymes; an O-linked glycosidic bond; an N-linked glycosidic bond; or an S-linked glycosidic bond.

The glycone can consist of a single sugar group (monosaccharide) or several sugar groups (oligosaccharide). Exemplary glycones include glucose, galactose, fructose, mannose, rhamnose, rutinose, xylose, lactose, arabinose, glucuronic acid etc. An aglycone is the compound remaining after the glycosyl group on a glycoside is replaced by a hydrogen atom. When combining a glycone with an aglycone, a number of different glycosides may be formed, including steviol glycosides, terpenoid glycosides, alcoholic glycosides, anthraquinone glycosides, coumarin glycosides, chromone glycosides, cucurbitane glycosides, cyanogenic glycosides, flavonoid glycosides, phenolic glycosides, steroidal glycosides, iridoid glycosides, and thioglycosides.

For example, the term "flavonoid aglycone" refers to an unglycosylated flavonoid. Flavonoid aglycones include flavone aglycones, flavanol aglycones, flavanone aglycones, isoflavone aglycones and mixtures thereof. Thus, the terms "flavone aglycone", "flavanol aglycone", "flavanone aglycone" and "isoflavone aglycones" refer to unglycosylated flavones, flavanols, flavanones and isoflavones, respectively. More particularly, the flavonoid aglycone may be selected from the group consisting of apigenin, luteolin, quercetin, kaempferol, myricetin, naringenin, pinocembrin, hesperetin, genistein, and mixtures thereof.

Terpenoid glycosides (TGs) for use in the present application, include e.g., steviol glycosides, *Stevia* extracts, mogrosides (MGs), *Siraitia grosvenorii* (luo han guo or monk fruit) plant extracts, rubusosides (RUs), *Rubus suavissimus* (Chinese sweet tea) plant extracts; flavanoid glycosides, such as neohesperidin dihydrochalcone (NHDC); osladin, a sapogenin steroid glycoside from the rhizome of *Polypodium vulgare*; trilobatin, a dihydrochalcone glucoside from apple leaves; eriodictyol, a bitter-masking flavonoid glycoside extracted from yerba santa (*Eriodictyon californicum*), one of the four flavanones extracted from this plant as having taste-modifying properties, along homoeriodictyol, its sodium salt, and sterubin; polypodoside A (from the rhizome of *Polypodium glycyrrhiza*); phyllodulcin, a coumarin glycoside found in *Hydrangea macrophylla* and *Hydrangea serrata*; swingle glycosides, such as mogroside V, mogroside IV, siamenoside I, and 11-oxomogroside V, which are cucurbitane glycosides; monatin, a naturally occurring, high intensity sweetener isolated from the plant *Sclerochiton ilicifolius*, and its salts (monatin SS, RR, RS, SR); hernandulcin, an intensely sweet chemical compound gained from the chiefly Mexican and South American plant *Lippia dulcis*; phlorizin, plant-derived dihydrochalcone that is a glucoside of phloretin, which is found primarily in unripe *Malus* (apple) and the root bark of apple; glycyphyllin, an alpha-L-rhamnoside derived from phloretin, the aglucone of phlorizin, a plant-derived dihydrochalcone; baiyunoside, a diterpene glycoside isolated from the Chinese drug Bai-Yun-Shen; pterocaryoside A and pterocaryoside B, secodammarane saponin glycosides isolated from *Pterocarya paliurus* Batal. (Juglandaceae), which are native to China; mukuroziosides Ia, Ib, IIa and IIb, acyclic sesquiterpene oligoglycosides isolated from the pericarp of *Sapindus mukurossi* and *Sapindus rarak*; phlomisoside I, a furanolabdane-type diterpene glycoside isolated from the roots of the Chinese plant, *Phlomis betonicoides* Diels (Lamiaceae); periandrin I and V, two sweet-tasting triterpene-glycosides from *Periandra dulcis*; abrusoside A-D, four sweet tasting triterpine glycosides from the leaves of *Abrus precatorius*; cyclocariosides I; II, and III, and synthetically glycosylated compositions thereof (e.g., GSGs, glycosylated *Stevia* extracts etc).

It should be understood that throughout this specification, when reference is made to a specific terpenoid glycoside or high intensity natural sweetening agent, such as an SG, a *Stevia* extract, a mogroside, a swingle extract, a sweet tea extract, NHDC, or any glycosylated derivative thereof, that the example is meant to be inclusive and applicable to all of the other terpenoid glycosides or high intensity natural sweetening agents in these classes. The same applies to other sweeteners; when reference is made to a sweetening agent, such as a terpenoid glycoside sweetener, steviol glycoside sweetener, high intensity natural sweetener, sweetener enhancer, high intensity synthetic sweetener, reducing sugar, or non-reducing sugar, that the example is meant to be inclusive and applicable to all of the other sweeteners or sweetening agents in any given class.

B3. Steviol Glycosides (SGs)

Extracts from *Stevia* plants provide steviol glycosides ("SGs") with varying percentages of components, SGs. The phrase "steviol glycoside" is recognized in the art and is intended to include the major and minor constituents of *Stevia*. These "SGs" include, for example, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside, dulcoside A (DA) as well as those listed in Tables A and B (below) or mixtures thereof.

As used herein, the terms "steviol glycoside," or "SG" refers to a glycoside of steviol, a diterpene compound shown in Formula I.

(I)

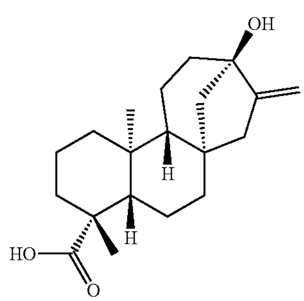

As shown in Formula II, GSGs are comprised of steviol molecules glycosylated at the C13 and/or C19 position(s).

(II)

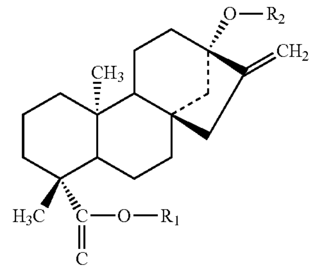

Based on the type of sugar (i.e. glucose, rhamnose/deoxyhexose, xylose/arabinose) SGs can be grouped into three families (1) SGs with glucose; (2) SG with glucose and one rhamnose or deoxyhexose moiety; and (3) SGs with glucose and one xylose or arabinose moiety.

Table A provides a non-limiting list of about 80 SGs grouped according to the molecular weight. The steviol glycosides for use in the present application are not limited by source or origin. Steviol glycosides may be extracted from *Stevia* leaves, synthesized by enzymatic processes, synthesized by chemical syntheses, or produced by fermentation. Steviol glycosides found in the *Stevia* plant include rebaudioside A (RA), rebaudioside B (RB), rebaudioside D (RD), stevioside, rubusoside, as well as those in Table B (below) etc., and further includes mixtures thereof. The steviol glycoside of interest can be purified before use.

TABLE A

SGs grouped by molecular weight (MW)

| SG Name | MW | # Added Glucose moieties mw = 180 | # Added Rhamnose/Deoxy-hexose moieties mw = 164 | # Added Xylose/Arabinose moieties mw = 150 | R1 (C-19) | R2 (C-13) | Backbone |
|---|---|---|---|---|---|---|---|
| Related SvGn#1 | 457 | — | | | | | |
| Steviol-monoside | 479 | 1 | | | H- | Glcβ1- | Steviol |
| Steviol-monoside A | 479 | 1 | 1 | | Glcβ1- | H- | |
| SG-4 | 611 | 1 | | 1 | H- | Xylβ(1-2)Glcβ1- | Steviol |
| Dulcoside A1 | 625 | 1 | 1 | | H- | Rhaα(1-2)Glcβ1- | Steviol |

TABLE A-continued

| SGs grouped by molecular weight (MW) | | | | | | | | |
|---|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Iso-steviol-bioside | 641 | 2 | | | H- | Glcβ(1-2)Glcβ1- | Isosteviol |
| Reb-G1 | 641 | 2 | | | H- | Glcβ(1-3)Glcβ1- | Steviol |
| Rubusoside | 641 | 2 | | | Glcβ1- | Glcβ1- | Steviol |
| Steviol-bioside | 641 | 2 | | | H- | Glcβ(1-2)Glcβ1- | Steviol |
| Related SvGn#3 | 675 | — | | | | | |
| Reb-F1 | 773 | 2 | | 1 | H- | Xylβ(1-2)[Glcβ(1-3)]Glcβ1- | Steviol |
| Reb-R1 | 773 | 2 | | 1 | H- | Glcβ(1-2)[Glcβ(1-3)]Xylβ1- | Steviol |
| Stevioside F (SG-1) | 773 | 2 | | 1 | Glcβ1- | Xylβ(1-2)Glcβ1- | Steviol |
| SG-Unk1 | 773 | 2 | | 1 | — | — | Steviol |
| Dulcoside A | 787 | 2 | 1 | | Glcβ1- | Rhaα(1-2)Glcβ1- | Steviol |
| Dulcoside B (JECFAC) | 787 | 2 | 1 | | H- | Rhaα(1-2)[Glcβ(1-3)]Glcβ1- | Steviol |
| SG-3 | 787 | 2 | 1 | | H- | 6-deoxyGlcβ(1-2)[Glcβ(1-3)]Glcβ1- | Steviol |
| Stevioside D | 787 | 2 | 1 | | Glcβ1- | Glcβ(1-2)6-deoxyGlcβ1- | |
| Iso-Reb B | 803 | 3 | | | H- | Glcβ(1-2)[Glcβ(1-3)]Glcβ1- | Isosteviol |
| Iso-Stevioside | 803 | 3 | | | Glcβ1- | Glcβ(1-2)Glcβ1- | Isosteviol |
| Reb B | 803 | 3 | | | H- | Glcβ(1-2)[Glcβ(1-3)]Glcβ1- | Steviol |
| Reb G | 803 | 3 | | | Glcβ1- | Glcβ(1-3)Glcβ1- | Steviol |
| Reb-KA | 803 | 3 | | | Glcβ(1-2)Glcβ1- | Glcβ1- | Steviol |
| SG-13 | 803 | 3 | | | Glcβ1- | Glcβ(1-2)Glcβ1- | Isomeric steviol (12α-hydroxy) |
| Stevioside | 803 | 3 | | | Glcβ1- | Glcβ(1-2)Glcβ1- | Steviol |
| Stevioside B (SG-15) | 803 | 3 | | | Glcβ(1-3)Glcβ1- | Glcβ1- | Steviol |
| Reb F | 935 | 3 | | 1 | Glcβ1- | Xylβ(1-2)[Glcβ(1-3)]Glcβ1- | Steviol |
| Reb R | 935 | 3 | | 1 | Glcβ1- | Glcβ(1-2)[Glcβ(1-3)]Xylβ1- | Steviol |
| SG-Unk2 | 935 | 3 | | 1 | — | — | Steviol |
| SG-Unk3 | 935 | 3 | | 1 | — | — | Steviol |
| Reb F3 (SG-11) | 935 | 3 | | 1 | Xylβ(1-6)Glcβ1- | Glcβ(1-2)Glcβ1- | Steviol |
| Reb F2 (SG-14) | 935 | 3 | | 1 | Glcβ1- | Glcβ(1-2)[Xylβ(1-3)]Glcβ1- | Steviol |
| Reb C | 949 | 3 | 1 | | Glcβ1- | Rhaα(1-2)[Glcβ(1-3)]Glcβ1- | Steviol |

TABLE A-continued

| SGs grouped by molecular weight (MW) | | | | | | | |
|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Reb C2/Reb S | 949 | 3 | 1 | | Rhaα(1-2)Glcβ1- | Glcβ(1-2)Glcβ1- | Steviol |
| Stevioside E (SG-9) | 949 | 3 | 1 | | Glcβ1- | 6-DeoxyGlcβ(1-2)[Glcβ(1-3)]Glcβ1- | Steviol |
| Stevioside E2 | 949 | 3 | 1 | | 6-DeoxyGlcβ1- | Glcβ(1-2)[Glcβ(1-3)]Glcβ1- | |
| SG-10 | 949 | 3 | 1 | | Glcβ1- | Glcα(1-3)Glcβ(1-2)[Glcβ(1-3)]Glcβ1- | Steviol |
| Reb L1 | 949 | 3 | 1 | | H- | Glcβ(1-3)Rhaα(1-2)[Glcβ(1-3)]Glcβ1- | Steviol |
| SG-2 | 949 | 3 | 1 | | Glcβ1- | 6-deoxyGlcβ(1-2)[Glcβ(1-3)]Glcβ1- | Steviol |
| Reb A3 (SG-8) | 965 | 4 (1 Fru) | | | Glcβ1- | Glcβ(1-2)[Fruβ(1-3)]Glcβ1- | |
| Iso-Reb A | 965 | 4 | | | Glcβ1- | Glcβ(1-2)[Glcβ(1-3)]Glcβ1- | Isosteviol |
| Reb A | 965 | 4 | | | Glcβ1- | Glcβ(1-2)[Glcβ(1-3)]Glcβ1- | Steviol |
| Reb A2 (SG-7) | 965 | 4 | | | Glcβ1- | Glcβ(1-6)[Glcβ(1-2)]Glcβ1- | Steviol |
| Reb E | 965 | 4 | | | Glcβ(1-2)Glcβ1- | Glcβ(1-2)Glcβ1- | Steviol |
| Reb H1 | 965 | 4 | | | H- | Glcβ(1-6)Glcβ(1-3)[Glcβ1-3)]Glcβ1- | Steviol |
| Related SvGn#2 | 981 | — | | | | | |
| Related SvGn#5 | 981 | — | | | | | |
| Reb U2 | 1097 | 4 | | 1 | Xylβ(1-2)[Glcβ(1-3)]Glcβ1- | Glcβ(1-2)Glcβ1- | |
| Reb T | 1097 | 4 | | 1 | Xylβ(1-2)Glcβ1- | Glcβ(1-2)[Glcβ(1-3)]Glcβ1- | |
| Reb W | 1097 | 4 | | 1 | Glcβ(1-2)[Araβ(1-3)]Glcβ1- | Glcβ(1-2)Glcβ1- | |
| Reb W2 | 1097 | 4 | | 1 | Araβ(1-2)Glcβ1- | Glcβ(1-2)[Glcβ(1-3)]Glcβ1- | |
| Reb W3 | 1097 | 4 | | 1 | Araβ(1-6)Glcβ1- | Glcβ(1-2)[Glcβ(1-3)]Glcβ1- | |
| Reb U | 1097 | 4 | | 1 | Araα(1-2)-Glcβ1- | Glcβ(1-2)[Glcβ(1-3)]Glcβ1- | Steviol |
| SG-12 | 1111 | 4 | 1 | | Rhaα(1-2)Glcβ1- | Glcβ(1-2)[Glcβ(1-3)]Glcβ1- | Steviol |
| Reb H | 1111 | 4 | 1 | | Glcβ1- | Glcβ(1-3)Rhaα(1-2)[Glcβ(1-3)]Glcβ1- | Steviol |
| Reb J | 1111 | 4 | 1 | | Rhaα(1-2)Glcβ1- | Glcβ(1-2)[Glcβ(1-3)]Glcβ1- | Steviol |

TABLE A-continued

| SGs grouped by molecular weight (MW) | | | | | | | |
|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Reb K | 1111 | 4 | 1 | | Glcβ(1-2)Glcβ1- | Rhaα(1-2)[Glcβ(1-3)]Glcβ1- | Steviol |
| Reb K2 | 1111 | 4 | 1 | | Glcβ(1-6)Glcβ1- | Rhaα(1-2)[Glcβ(1-3)]Glcβ1- | Steviol |
| SG-Unk4 | 1111 | 4 | 1 | | — | — | Steviol |
| SG-Unk5 | 1111 | 4 | 1 | | — | — | Steviol |
| Reb D | 1127 | 5 | | | Glcβ(1-2)Glcβ1- | Glcβ(1-2)[Glcβ(1-3)]Glcβ1- | Steviol |
| Reb I | 1127 | 5 | | | Glcβ(1-3)Glcβ1- | Glcβ(1-2)[Glcβ(1-3)]Glcβ1- | Steviol |
| Reb L | 1127 | 5 | | | Glcβ1- | Glcβ(1-6)Glcβ(1-2)[Glcβ(1-3)]Glcβ1- | Steviol |
| Reb I3 | 1127 | 5 | | | [Glcβ(1-2) Glcβ(1-6)] Glcβ1- | Glcβ(1-2)Glcβ1- | |
| SG-Unk6 | 1127 | 5 | | | — | — | Steviol |
| Reb Q (SG-5) | 1127 | 5 | | | Glcβ1- | Glcα(1-4)Glcβ(1-2)[Glcβ(1-3)]Glcβ1- | Steviol |
| Reb I2 (SG-6) | 1127 | 5 | | | Glcβ1- | Glcα(1-3)Glcβ1-2[Glcβ1-3)]Glcβ1- | Steviol |
| Reb Q2 | 1127 | 5 | | | Glcα(1-2)Glcα(1-4)Glcβ1- | Glcβ(1-2)Glcβ1- | |
| Reb Q3 | 1127 | 5 | | | Glcβ1- | Glcα(1-4)Glcβ(1-3)[Glcβ(1-2)]Glcβ1- | |
| Reb T1 | 1127 | 5 (1 Gal) | | | Galβ(1-2)Glcβ1- | Glcβ(1-2)[Glcβ(1-3)]Glcβ1- | |
| Related SvGn#4 | 1127 | — | | | | | |
| Reb V2 | 1259 | 5 | | 1 | Xylβ(1-2)[Glcβ(1-3)]-Glcβ1- | Glcβ(1-2)[Glcβ(1-3)]Glcβ1- | Steviol |
| Reb V | 1259 | 5 | | 1 | Glcβ(1-2)[Glcβ(1-3)]Glcβ1- | Xylβ(1-2)[Glcβ(1-3)]-Glcβ1- | |
| Reb Y | 1259 | 5 | | 1 | Glcβ(1-2)[Araβ(1-3)]Glcβ1- | Glcβ(1-2)[Glcβ(1-3)]Glcβ1- | |
| Reb N | 1273 | 5 | 1 | | Rhaα(1-2)[Glcβ(1-3)]Glcβ1- | Glcβ(1-2)[Glcβ(1-3)]Glcβ1- | Steviol |
| Reb M | 1289 | 6 | | | Glcβ(1-2)[Glcβ(1-3)]Glcβ1- | Glcβ(1-2)[Glcβ(1-3)]Glcβ1- | Steviol |
| 15α-OH Reb M | 1305 | 6 | | | Glcβ1-2(Glcβ1-3)Glcβ1- | Glcβ(1-2)[Glcβ1-3]Glcβ1- | 15α-Hydroxy-steviol |
| Reb O | 1435 | 6 | 1 | | Glcβ(1-3)Rhaα(1-2)[Glcβ(1-3)]Glcβ1- | Glcβ(1-2)[Glcβ(1-3)]Glcβ1- | Steviol |

TABLE A-continued

| SGs grouped by molecular weight (MW) | | | | | | | |
|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Reb O2 | 1435 | 6 | 1 | | Glcβ(1-4)Rhaα(1-2)[Glcβ(1-3)]Glcβ1- | Glcβ(1-2)[Glcβ(1-3)]Glcβ1- | |

Legend:
SG-1 to 16: SGs without a specific name;
SG-Unk1-6: SGs without detailed structural proof;
Glc: Glucose;
Rha: Rhamnose;
Xyl: Xylose;
Ara: Arabinose.

TABLE B

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| SG-1G | Steviol-monoside | 480 | 1 | | | H- | Glcβ1- | Steviol |
| | Steviol-monoside A | 480 | 1 | | | Glcβ1- | H- | Steviol |
| SG-1G1R | Dulcoside A1 | 626 | 1 | 1 | | H- | Rhaα(1-2)Glcβ1- | Steviol |
| | Dulcoside A1 | 626 | 1 | 1 | | | | Steviol |
| SG-1G1X | SG-4 | 612 | 1 | | 1 | H- | Xylβ(1-2)Glcβ1- | Steviol |
| SG-2G | Reb-G1 | 642 | 2 | | | H- | Glcβ(1-3)Glcβ1- | Steviol |
| | Rubusoside | 642 | 2 | | | Glcβ1- | Glcβ1- | Steviol |
| | Steviol-bioside | 642 | 2 | | | H- | Glcβ(1-2)Glcβ1- | Steviol |
| SG-2G1R | Dulcoside A | 788 | 2 | 1 | | Glcβ1- | Rhaα(1-2)Glcβ1- | Steviol |
| | Dulcoside B (JECFAC) | 788 | 2 | 1 | | H- | Rhaα(1-2)[Glcβ(1-3)]Glcβ1- | Steviol |
| | SG-3 | 788 | 2 | 1 | | H- | 6-deoxyGlcβ(1-2)[Glcβ(1-3)]Glcβ1- | Steviol |
| | Stevioside D | 788 | 2 | 1 | | Glcβ1- | Glcβ(1-2)6-deoxyGlcβ1- | Steviol |
| SG-2G1X | Reb-F1 | 774 | 2 | | 1 | H- | Xylβ(1-2)[Glcβ(1-3)]Glcβ1- | Steviol |
| | Reb-R1 | 774 | 2 | | 1 | H- | Glcβ(1-2)[Glcβ(1-3)]Xylβ1- | Steviol |
| | Stevioside F (SG-1) | 774 | 2 | | 1 | Glcβ1- | Xylβ(1-2)Glcβ1- | Steviol |
| | SG-Unk1 | 774 | 2 | | 1 | — | — | Steviol |
| SG-3G | Reb B | 804 | 3 | | | H- | Glcβ(1-2)[Glcβ(1-3)]Glcβ1- | Steviol |
| | Reb G | 804 | 3 | | | Glcβ1- | Glcβ(1-3)Glcβ1- | Steviol |
| | Reb-KA | 804 | 3 | | | Glcβ(1-2)Glcβ1- | Glcβ1- | Steviol |
| | Stevioside | 804 | 3 | | | Glcβ1- | Glcβ(1-2)Glcβ1- | Steviol |
| | Stevioside B (SG-15) | 804 | 3 | | | Glcβ(1-3)Glcβ1- | Glcβ1- | Steviol |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| SG-3G1Fru | Reb A3 (SG-8) | 966 | 4 (1 Fru) | | | Glcβ1- | Glcβ(1-2)[Fruβ(1-3)]Glcβ1- | Steviol |
| SG-3G1R | Reb C | 950 | 3 | 1 | | Glcβ1- | Rhaα(1-2)[Glcβ(1-3)][Glcβ1- | Steviol |
| | Reb C2/ Reb S | 950 | 3 | 1 | | Rhaα(1-2)Glcβ1- | Glcβ(1-2)Glcβ1- | Steviol |
| | Stevioside E (SG-9) | 950 | 3 | 1 | | Glcβ1- | 6-DeoxyGlcβ(1-2)[Glcβ(1-3)][Glcβ1- | Steviol |
| | Stevioside E2 | 950 | 3 | 1 | | 6-DeoxyGlcβ1- | Glcβ(1-2)[Glcβ(1-3)]Glcβ1- | Steviol |
| | SG-10 | 950 | 3 | 1 | | Glcβ1- | Glcα(1-3)Glcβ(1-2)[Glcβ(1-3])Glcβ1- | Steviol |
| | Reb L1 | 950 | 3 | 1 | | H- | Glcβ(1-3)Rhaα(1-2)[Glcβ(1-3)]Glcβ1- | Steviol |
| | SG-2 | 950 | 3 | 1 | | Glcβ1- | 6-deoxyGlcβ(1 2)[Glcβ(1-3)]Glcβ1- | Steviol |
| SG-3G1X | Reb F | 936 | 3 | | 1 | Glcβ1- | Xylβ(1-2)[Glcβ(1-3)]Glcβ1- | Steviol |
| | Reb R | 936 | 3 | | 1 | Glcβ1- | Glcβ(1-2)[Glcβ(1-3)]Xylβ1- | Steviol |
| | SG-Unk2 | 936 | 3 | | 1 | — | — | Steviol |
| | SG-Unk3 | 936 | 3 | | 1 | — | — | Steviol |
| | Reb F3 (SG-11) | 936 | 3 | | 1 | Xylβ(1-6)Glcβ1- | Glcβ(1-2)Glcβ1- | Steviol |
| | Reb F2 (SG-14) | 936 | 3 | | 1 | Glcβ1- | Glcβ(1-2)[Xylβ(1-3)]Glcβ1- | Steviol |
| SG-4G | Reb A | 966 | 4 | | | Glcβ1- | Glcβ(1-2)[Glcβ(1-3)][Glcβ1- | Steviol |
| | Reb A2 (SG-7) | 966 | 4 | | | Glcβ1- | Glcβ(1-6)[Glcβ(1-2)]Glcβ1- | Steviol |
| | Reb E | 966 | 4 | | | Glcβ(1-2)Glcβ1- | Glcβ(1-2)Glcβ1- | Steviol |
| | Reb H1 | 966 | 4 | | | H- | Glcβ(1-6)Glcβ(1-3)[Glcβ1-3)]Glcβ1- | Steviol |
| SG-4G1 Gal | Reb T1 | 1128 | 5 (1 Gal) | | | Galβ(1-2)Glcβ1- | Glcβ(1-2)[Glcβ(1-3)]Glcβ1- | Steviol |
| SG-4G1R | SG-12 | 1112 | 4 | 1 | | Rhaα(1-2)Glcβ1- | Glcβ(1-2)[Glcβ(1-3)]Glcβ1 | Steviol |
| | Reb H | 1112 | 4 | 1 | | Glcβ1- | Glcβ(1-3)Rhaα(1-2)[Glcβ(1-3)]Glcβ1- | Steviol |
| | Reb J | 1112 | 4 | 1 | | Rhaα(1-2)Glcβ1- | Glcβ(1-2)[Glcβ(1-3)]Glcβ1- | Steviol |
| | Reb K | 1112 | 4 | 1 | | Glcβ(1-2)Glcβ1- | Rhaα(1-2)[Glcβ(1-3)]Glcβ1- | Steviol |
| | Reb K2 | 1112 | 4 | 1 | | Glcβ(1-6)Glcβ1- | Rhaα(1-2)[Glcβ(1-3)]Glcβ1- | Steviol |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| | SG-Unk4 | 1112 | 4 | 1 | | — | — | Steviol |
| | SG-Unk5 | 1112 | 4 | 1 | | — | — | Steviol |
| SG-4G1X | Reb U2 | 1098 | 4 | | 1 | Xylβ(1-2)[Glcβ(1-3)]Glcβ1- | Glcβ(1-2)Glcβ1- | Steviol |
| | Reb T | 1098 | 4 | | 1 | Xylβ(1-2)Glcβ1- | Glcβ(1-2)[Glcβ(1-3)]Glcβ1- | Steviol |
| | Reb W | 1098 | 4 | | 1 | Glcβ(1-2)[Araβ(1-3)]Glcβ1- | Glcβ(1-2)Glcβ1- | Steviol |
| | Reb W2 | 1098 | 4 | | 1 | Araβ(1-2)Glcβ1- | Glcβ(1-2)[Glcβ(1-3)]Glcβ1- | Steviol |
| | Reb W3 | 1098 | 4 | | 1 | Araβ(1-6)Glcβ1- | Glcβ(1-2)[Glcβ(1-3)]Glcβ1- | Steviol |
| | Reb U | 1098 | 4 | | 1 | Araβ(1-2)-Glcβ1- | Glcβ(1-2)[Glcβ(1-3)]Glcβ1- | Steviol |
| SG-5G | Reb D | 1128 | 5 | | | Glcβ(1-2)Glcβ1- | Glcβ(1-2)[Glcβ(1-3)]Glcβ1- | Steviol |
| | Reb I | 1128 | 5 | | | Glcβ(1-3)Glcβ1- | Glcβ(1-2)[Glcβ(1-3)]Glcβ1- | Steviol |
| | Reb L | 1128 | 5 | | | Glcβ1- | Glcβ1-6)Glcβ(1-2)[Glcβ(1-3)]Glcβ1- | Steviol |
| | Reb I3 | 1128 | 5 | | | [Glcβ(1-2)Glcβ(1-6)]Glcβ1- | Glcβ(1-2)Glcβ1- | Steviol |
| | SG-Unk6 | 1128 | 5 | | | — | — | Steviol |
| | Reb Q (SG-5) | 1128 | 5 | | | Glcβ1- | Glcα(1-4)Glcβ(1-2)[Glcβ(1-3)]Glcβ1- | Steviol |
| | Reb I2 (SG-6) | 1128 | 5 | | | Glcβ1- | Glcα(1-3)Glcβ1-2[Glcβ1-3)]Glcβ1- | Steviol |
| | Reb Q2 | 1128 | 5 | | | Glcα(1-2)Glcα(1-4)Glcβ1- | Glcβ(1-2)Glcβ1- | Steviol |
| | Reb Q3 | 1128 | 5 | | | Glcβ1- | Glcα(1-4)Glcβ(1-3)[Glcβ(1-2)]Glcβ1- | Steviol |
| SG-5G1R | Reb N | 1274 | 5 | 1 | | Rhaα(1-2)[Glcβ(1-3)]Glcβ1- | Glcβ(1-2)[Glcβ(1-3)]Glcβ1- | Steviol |
| SG-5G1X | Reb V2 | 1260 | 5 | | 1 | Xylβ(1-2)[Glcβ(1-3)]-Glcβ1- | Glcβ(1-2)[Glcβ(1-3)]Glcβ1- | Steviol |
| | Reb V | 1260 | 5 | | 1 | Glcβ(1-2)[Glcβ(1-3)]Glcβ1- | Xylβ(1-2)[Glcβ(1-3)]-Glcβ1- | Steviol |
| | Reb Y | 1260 | 5 | | 1 | Glcβ(1-2)[Araβ(1-3)]Glcβ1- | Glcβ(1-2)[Glcβ(1-3)]Glcβ1- | Steviol |
| SG-6G | Reb M | 1290 | 6 | | | Glcβ(1-2)[Glcβ(1-3)]Glcβ1- | Glcβ(1-2)[Glcβ(1-3)]Glcβ1- | Steviol |
| SG-6G1R | Reb O | 1436 | 6 | 1 | | Glcβ(1-3)Rhaα(1-2)[Glcβ(1-3)]Glcβ1- | Glcβ(1-2)[Glcβ(1-3)]Glcβ1- | Steviol |
| | Reb O2 | 1436 | 6 | 1 | | Glcβ(1-4)Rhaα(1-2)[Glcβ(1-3)]Glcβ1- | Glcβ(1-2)[Glcβ(1-3)]Glcβ1 | Steviol |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| SG-Rel | Related SvGn#1 | 458 | — | | | | | Steviol |
| SG-Rel | Related SvGn#2 | 982 | — | | | | | Steviol |
| SG-Rel | Related SvGn#3 | 676 | — | | | | | Steviol |
| SG-Rel | Related SvGn#4 | 1128 | — | | | | | Steviol |
| SG-Rel | Related SvGn#5 | 982 | — | | | | | Steviol |
| — | Iso-Steviol-bioside | 642 | 2 | | | H- | Glcβ(1-2)Glcβ1- | Isosteviol |
| — | Iso-Reb B | 804 | 3 | | | H- | Glcβ(1-2)[Glcβ(1-3)]Glcβ1 | Isosteviol |
| — | Iso-Stevioside | 804 | 3 | | | Glcβ1- | Glcβ(1-2)Glcβ1- | Isosteviol |
| — | Iso-Reb A | 966 | 4 | | | Glcβ1- | Glcβ(1-2)[Glcβ(1-3)]Glcβ1- | Isosteviol |
| — | SG-13 | 804 | 3 | | | Glcβ1- | Glcβ(1-2)Glcβ1- | Isomeric steviol (12α-hydroxy) |
| — | 15α-OH Reb M | 1306 | 6 | | | Glcβ1-2(Glcβ1-3)Glcβ1- | Glcβ1-2(Glcβ1-3)Glcβ1- | 15α-Hydroxy-steviol |

Legend:
SG-1 to 16: SGs without a specific name;
SG-Unk1-6: Steviolglycosides without detailed structural proof;
Glc: Glucose;
Rha: Rhamnose;
Xyl: Xylose;
Ara: Arabinose;
Fru: Fructose;
Gal: Galactose Steviol glycosides include a hydrophobic part (steviol) and a hydrophilic part (sugars, such as glucose). When steviol glycosides are dissolved in a suitable solvent, steviol glycosides can form solvate(s). It is assumed that steviol glycosides can form clusters similar with flavor molecules as they do for water and other solvents. Such structures can stabilize the flavor, especially volatile substances, either in an aqueous solution or in solid form. It has been found that three steviol glycosides share one water molecule in its crystal structure. Not to be limited by theory, it is believed that steviol glycosides share one or more flavor molecules which can stabilize the flavor molecule better than in the absence of the *Stevia*. In general, steviol glycosides improve the solubility of flavor substances. It is further believed that *Stevia* extracts and steviol glycosides have attractive forces to hold the flavor, protect the stability of flavor, and hereafter it is referred to as steviol glycoside flavorate (SGF). One embodiment includes a composition comprising a *Stevia* extract with a flavor.

In certain embodiments, compositions of RA+RB, RA+RB+RD, RA+RB+RC, RA+RB+RC+RD, RA+RB+RC+RD+RE, RA+RB+RC+RD+RM, RA+RD+RM, RD+RM, RD+RM+RO+RE, etc. are used. These combinations can be either added to Maillard reaction products produced from a sugar donor and an amine donor, or included in the Maillard reaction with the sugar donor and amine donor, or serve as the substrate(s) for the Maillard reaction in the presence of an amine donor.

As used herein, the term "steviol glycoside composition" or "SG composition" refers to a composition comprising one or more SGs (steviol glycosides).

B4. Steviol Glycoside Extracts

In other embodiments, the sugar donor(s) comprise a plurality of SGs in the form of a *Stevia* extract. Extracts from *Stevia* leaves, for example, provide SGs with varying percentages corresponding to the SGs present in a particular extract. The phrase "steviol glycoside" is recognized in the art and is intended to include the major and minor constituents of *Stevia*. These SGs include, for example, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside, dulcoside A (DA), mixtures thereof, as well as those listed in Tables A and B.

A *Stevia* extract may contain various combinations of individual SGs, where the extract may be defined by the proportion of a particular SG in the extract. For example, an analysis of an exemplary RA50 extract prepared by the process described in Example 81 is shown in Table C. An analysis of an exemplary combination extract comprising RA40+RB8 is shown in Table D.

TABLE C

Distribution and concentration of SGs in RA50

| Name | MW | mg/10 ml | % m/m |
|---|---|---|---|
| Related steviol glycoside | 517 or | <0.01 | <0.01 |
| Related steviol glycoside | 981 | 0.23 | 0.130 |
| Related steviol glycoside | 427 or | 0.27 | 0.151 |
| Related steviol glycoside | 675 or | 0.07 | 0.037 |
| Related steviol glycoside | 981 | 2.23 | 1.242 |
| Reb-V | 1259 | <0.01 | <0.01 |
| Reb-T | 1127 | <0.01 | <0.01 |
| Reb-E | 965 | 0.87 | 0.487 |
| Reb-O | 1435 | 0.02 | 0.009 |
| Reb-D | 1127 | 2.63 | 1.464 |
| Reb-K | 1111 | 0.06 | 0.035 |
| Reb-N | 1273 | 0.03 | 0.014 |
| Reb-M | 1289 | 0.07 | 0.038 |
| Reb-S | 949 | 0.00 | −0.002 |
| Reb-J | 1111 | 0.05 | 0.028 |
| Reb-W | 1097 | 0.13 | 0.074 |
| Reb-U2 | 1097 | <0.01 | <0.01 |
| Reb-W2/3 | 1097 | <0.01 | <0.01 |
| Reb-O2 | 965 | 0.08 | 0.047 |
| Reb-Y | 1259 | 0.09 | 0.050 |
| Reb-I | 1127 | <0.01 | <0.01 |
| Reb-V2 | 1259 | <0.01 | <0.01 |
| Reb-K2 | 1111 | 1.19 | 0.661 |
| Reb-H | 1111 | <0.01 | <0.01 |
| Reb-A | 965 | 91.72 | 51.041 |
| Stevioside | 803 | 55.43 | 30.844 |
| Reb-F | 935 | 0.15 | 0.086 |
| Reb-C | 949 | 7.40 | 4.118 |
| Dulcoside-A | 787 | 0.45 | 0.248 |
| Rubusoside | 641 | 0.47 | 0.260 |
| Reb-B | 803 | 4.02 | 2.239 |
| Dulcoside B | 787 | 0.65 | 0.362 |
| Steviolbioside | 641 | 0.96 | 0.531 |
| Reb-R | 935 | 0.01 | 0.005 |
| Reb-G | 803 | 0.23 | 0.128 |
| Stevioside-B | 787 | 0.94 | 0.526 |
| Reb-G1 | 641 | <0.01 | <0.01 |
| Reb-R1 | 773 | 1.39 | 0.771 |
| Reb-F1 | 773 | <0.01 | <0.01 |
| Iso-Steviolbioside | 641 | 0.23 | 0.130 |
| | Sum | 171.33 | 95.34 |

TABLE D

Distribution and concentration of SGs in RA40/RB8

| | | RA40/RB8 Lot 174-71-01 | | |
|---|---|---|---|---|
| Name | MW | mg/10 ml | % m/m | ±s.d. % (m/m) |
| Related steviol glycoside #1 | 517 or 427 | 0.08 | 0.05 | 0.01 |
| Related steviol glycoside #2 | 981 | <0.01 | <0.01 | <0.01 |
| Related steviol glycoside #3 | 427 or 735 | 1.01 | 0.67 | 0.13 |
| Related steviol glycoside #4 | 675 or 1127 | 0.21 | 0.14 | 0.03 |
| Related steviol glycoside #5 | 981 | 0.10 | 0.06 | 0.01 |
| Reb-V | 1259 | <0.01 | <0.01 | <0.01 |
| Reb-T | 1127 | <0.01 | <0.01 | <0.01 |
| Reb-E | 965 | 0.74 | 0.49 | 0.10 |
| Reb-O | 1435 | 2.53 | 1.69 | 0.25 |
| Reb-D | 1127 | 1.73 | 1.15 | 0.17 |
| Reb-K | 1111 | <0.01 | <0.01 | <0.01 |
| Reb-N | 1273 | 0.42 | 0.28 | 0.06 |
| Reb-M | 1289 | 0.07 | 0.05 | 0.01 |
| Reb-S | 949 | 0.11 | 0.07 | 0.01 |
| Reb-J | 1111 | 0.11 | 0.07 | 0.01 |
| Reb-W | 1097 | 0.05 | 0.03 | 0.01 |

TABLE D-continued

Distribution and concentration of SGs in RA40/RB8

| | | RA40/RB8 Lot 174-71-01 | | |
|---|---|---|---|---|
| Name | MW | mg/10 ml | % m/m | ±s.d. % (m/m) |
| Reb-U2 | 1097 | <0.01 | <0.01 | <0.01 |
| Reb-W2/3 | 1097 | 0.05 | 0.03 | 0.01 |
| Reb-O2 | 965 | <0.01 | <0.01 | <0.01 |
| Reb-Y | 1259 | 0.38 | 0.25 | 0.05 |
| Reb-I | 1127 | 1.12 | 0.75 | 0.15 |
| Reb-V2 | 1259 | <0.01 | <0.01 | <0.01 |
| Reb-K2 | 1111 | <0.01 | <0.01 | <0.01 |
| Reb-H | 1111 | <0.01 | <0.01 | <0.01 |
| Reb-A | 965 | 60.36 | 40.30 | 6.04 |
| Stevioside | 803 | 26.66 | 17.80 | 2.67 |
| Reb-F | 935 | <0.01 | <0.01 | <0.01 |
| Reb-C | 949 | 2.91 | 1.94 | 0.29 |
| Dulcoside-A | 787 | 11.92 | 7.96 | 1.19 |
| Rubusoside | 641 | 2.50 | 1.67 | 0.25 |
| Reb-B | 803 | 12.09 | 8.07 | 1.21 |
| Dulcoside B | 787 | 0.36 | 0.24 | 0.05 |
| Steviolbioside | 641 | 0.37 | 0.25 | 0.05 |
| Reb-R | 935 | 0.72 | 0.48 | 0.10 |
| Reb-G | 803 | 1.49 | 1.00 | 0.20 |
| Stevioside-B | 787 | 1.04 | 0.69 | 0.14 |
| Reb-G1 | 641 | <0.01 | <0.01 | <0.01 |
| Reb-R1 | 773 | <0.01 | <0.01 | <0.01 |
| Reb-F1 | 773 | <0.01 | <0.01 | <0.01 |
| Iso-Steviolbioside | 641 | <0.01 | <0.01 | <0.01 |
| | Sum | 129.11 | 86.19 | |

In some embodiments, the *Stevia* extract(s) included in the Maillard reaction or added to an MRP composition may be selected from the group consisting of RA20, RA40, RA50, RA60, RA80, RA 90, RA95, RA97, RA98, RA99, RA99.5, RB8, RB10, RB15, RC15, RD6, STV60, STV90, RA75/RB15, RA90/RD7, RA80/RB10/RD6 and combinations thereof.

In another embodiment, the *Stevia* extract comprises non-steviol glycoside components. Non-steviol glycoside components are volatile substances characterized by a characteristic odor and/or flavor, such as a citrus flavor and other flavors described herein.

In another embodiment, the *Stevia* extract comprises a non-volatile type of non-steviol glycoside substances comprising one or more molecules characterized by terpene, di-terpene, or ent-kaurene structure.

In another embodiment, the *Stevia* extract comprises one or more volatile and one or more non-volatile types of non-steviol glycoside substances.

In some embodiments, the SGs can be fractionated to select for high molecular weight molecules.

In a particular embodiment, the *Stevia* extract comprises 25-35 wt % Reb-A, 0.4-4 wt % Reb-B, 5-15 wt % Reb-C, 1-10 wt % Reb-D, 2-5 wt % Reb-F, 1-5 wt % Reb-K, and 20-40 wt % Stevioside.

In another embodiment, the *Stevia* extract comprises one or more members selected from the group consisting of 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG #4, 0.01-0.5 wt % Rel SG #5, 0.01-0.4 wt % Reb-M, 0.01-0.4 wt % Reb-N, 0.01-0.4 wt % Reb-E, 0.01-0.4 wt % Reb-F1, 0.01-0.4 wt % Reb-Y, and combinations thereof.

In another embodiment, the *Stevia* extract comprises at least 20, at least 21, at least 22, at least 23 or at least 24 members selected from the group consisting of: 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG #4, 0.01-0.5 wt % Rel SG #5, 0.01-0.4 wt % Reb-M, 0.01-0.4 wt % Reb-N, 0.01-0.4 wt % Reb-E, 0.01-0.4 wt % Reb-F1, and 0.01-0.4 wt % Reb-Y.

In another embodiment, the *Stevia* extract comprises 45-55 wt % Reb-A, 20-40 wt % Stevioside, 2-6 wt % Reb-C, 0.5-3 wt % Reb-B, and 0.5-3 wt % Reb-D.

In another embodiment, the *Stevia* extract comprises one or more members selected from the group consisting of: 0.1-3 wt % Related SG #5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG #3, 0.01-1 wt % Related SG #2, 0.01-1 wt % Reb-G, 0.01-1 wt % Reb-F, and 0.01-1 wt % Reb-W.

In another embodiment, the *Stevia* extract comprises at least 12, at least 13, at least 14 or at least 15 members selected from the group consisting of: 0.1-3 wt % Related SG #5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG #3, 0.01-1 wt % Related SG #2, 0.01-1 wt % Reb-G, 0.01-1 wt % Reb-F, and 0.01-1 wt % Reb-W.

In another embodiment, the *Stevia* extract comprises 35-45 wt % Reb-A, 10-25 wt % Stevioside, 4-12 wt % Reb-B, 4-12 wt % Dulcoside A, 0.5-4 wt % Reb-C, and 0.1-4 wt % Reb-O.

In another embodiment, the *Stevia* extract comprises one or more members selected from the group consisting of: 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG #3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, 0.01-1 wt % Dulcoside B, and combinations thereof.

In another embodiment, the *Stevia* extract comprises at least 10, at least 11, at least 12 or at least 13 members selected from the group consisting of: 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG #3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, and 0.01-1 wt % Dulcoside B.

One embodiment includes compositions of *Stevia* derived MRP(s) and/or also the *Stevia* derived MRP(s) and non-steviol glycosides contained within the *Stevia* leaves/extracts. In one embodiment, the steviol glycosides and non-steviol glycoside are extracted directly from leaves together. In other embodiments, the steviol glycosides and non-steviol glycosides may be blended following separate extraction(s) and/or separation(s), and then blended back together. In some embodiments, the non-steviol glycoside substances can be obtained by fermentation or enzymatic conversion. The non-steviol glycoside substances can be used as substrates for the Maillard reaction.

In one embodiment, the inventors of the present application have developed an extraction process from the *Stevia* plant so as to preserve unique flavors, such as citrus (or tangerine). Without being bound by theory, it is believed that the unique citrus (or tangerine) flavor originates from one or more flavor substances in the *Stevia* extract. The flavor substances may be water soluble or they may be dispersible in an oil-in-water solution or *Stevia* flavorate, where the flavor threshold value can be as low as $10^{-9}$ ppb.

In one embodiment, a composition of steviol glycoside(s) and flavor substances originate from a *Stevia* extract. Exemplary flavors that may be formed from the *Stevia* extracts include floral, caramel, citrus, chocolate, orange, violet, nectar, peach, jujube, barbecue, green tea, toast, roast barley, and combinations thereof.

Suitable FEMA recognized *Stevia* based compositions are included herein as noted in Table E. These *Stevia* based compositions can be used in the Maillard reaction as described throughout as the sweetening agent(s).

TABLE E

FEMA GRAS *Stevia* Summary

| FEMA GRAS LIST | FEMA NO. | SUBSTANCE PRIMARY NAME AND SYNONYMS | THE IDENTITY DESCRIPTION AS REVIEWED BY THE FEMA EXCEPT PANEL |
|---|---|---|---|
| 25 | 4720 | Rebaudioside C<br>Dulcoside B | |
| 26 | 4728 | Glucosyl steviol glycosides<br>*Stevia* extract, enzymatically modified | *Not less than 75% total supra-glucosylated steviol glycoside; not more than 6% major steviol glycosides not further glucosylated; not more than 4% individual steviol glycosides not further glucosylated; not more than 20% maltodextrin |
| 26 | 4763 | Stevioside<br>Steviosin<br>(4,alpha)-13-[(2-0-beta-D-Glucopyranosyl-alpha-D-glucopyranosyl)oxy]kaur-16-en-18-oic acid beta-D-glucopyranosyl ester | |
| 26 | 4771 | Steviol glycoside extract,<br>*Stevia rebaudiana*,<br>Rebaudioside A 60% | |

TABLE E-continued

FEMA GRAS *Stevia* Summary

| FEMA GRAS LIST | FEMA NO. | SUBSTANCE PRIMARY NAME AND SYNONYMS | THE IDENTITY DESCRIPTION AS REVIEWED BY THE FEMA EXCEPT PANEL |
|---|---|---|---|
| 26 | 4772 | Steviol glycoside extract, *Stevia rebaudiana*, Rebaudioside A 80% | |
| 27 | 4796 | Steviol glycoside extract, *Stevia rebaudiana*, Rebaudioside C 30% | Total steviol glycosides >95%, including 28-33% rebaudioside C, 17-23% rebaudioside A, 10-15% stevioside, 25-36% other steviol glycosides (including rebaudiosides B, D, E and F, steviolbioside, rubusoside and dulcoside A) |
| 27 | 4805 | Steviol glycoside extract, *Stevia rebaudiana*, Rebaudioside A 22% | Total principal steviol glycosides 60-63%, including 18-22% rebaudioside A, 5-8% stevioside, 8-14% rebaudioside D; rebaudiosides B, C, E, F, N, O, M, steviolbioside, rubusoside, and dulcoside A individually present at concentrations up to 6%. Additional steviol glycosides, 36-42% |
| 27 | 4806 | Steviol glycoside extract, *Stevia rebaudiana*, Rebaudioside C 22% | Total principal steviol glycosides 56-59%, including 13-22% rebaudioside C, 13-18% rebaudioside A. 5-8% stevioside; rebaudiosides B, D, E, F, N, O, and M, steviolbioside, rubusoside and dulcoside A individually present at concentrations up to 4%. Additional steviol glycosides, 38-45%. |
| 28 (Interim) | 4728 | Glucosyl steviol glycosides | Total steviol glycosides 80-90% inclusive of supraglucosylated steviol glycosides 75-80%; Rebaudioside A 1-6%; stevioside 2-4% and other individual steviol glycosides not further glucosylated each less than 3%. Maltodextrin 3-20% |
| 28 | 4728 | Glucosyl steviol glycosides | Total steviol glycosides 80-90% inclusive of supraglucosylated steviol glycosides 75-80%; Rebaudioside A 1-6%; stevioside 2-4% and other individual steviol glycosides not further glucosylated each less than 3%. Maltodextrin 3-20% |
| 28 | 4845 | Glucosylated *Stevia* extract | At least 80% steviol glycosides, not more than 10% Rebaudioside A, not more than 4% Rebaudioside C, not more than 5% stevioside, and no individual steviol glycosides further glucosylated ≤3%. |
| 28 | 4876 | Enzyme modified *Stevia*, stevioside 20% | 90-95% steviol glycosides inclusive of supraglucosylated steviol glycosides 64-70%; rebaudioside A 10-13%; stevioside 20-22%, maltodextrin 1-6%, and other individual steviol glycosides not further glucosylated each less than 1%. |

B5. Glycosylated Steviol Glycosides (GSGs) and Glycosylated *Stevia* Extracts (GSEs)

In another embodiment, the sugar donor(s) comprise one or more glycosylated steviol glycosides (GSGs) originating from one or more SGs listed in Table A or Table B. As used herein, a GSG refers to an SG containing additional glucose residues added relative to the parental (or native) SGs present in e.g., *Stevia* leaves. The additional sugar groups can be added at various positions of the SG molecules. A GSG may be produced from any known or unknown SG by enzymatic synthesis, chemical synthesis or fermentation. In preferred embodiments, the additional sugar groups are added in an enzymatically catalyzed glycosylation process. The glycosylation of an SG can be determined by HPLC-MS as described herein.

GSGs may be obtained by enzymatic processes, for example, by transglycosylating stevia extract containing steviol glycosides, or by common known synthetic manipulation. Herein, the GSGs comprise glycosylated *Stevia* extract containing glycosylated steviol glycoside(s) and also comprise short chain compounds obtained by hydrolyzation of glycosylated product, as well as non-glycosylated components which are the residue of unreacted steviol glycosides, or unreacted components other than steviol glycosides contained in the stevia extract.

Any of the SGs in Tables A-D, for example, STB, ST, RA, RB, RC, RD, rebaudioside E (RE), rebaudioside F (RF), rebaudioside M (RM), rubusoside and dulcoside A can be enzymatically modified to afford, for example, their corresponding multi-glycosylated glycosides as follows: Steviol-G1, Steviol-G2, Steviol-G3, Steviol-G4, Steviol-G5, Steviol-G6, Steviol-G7, Steviol-G8, Steviol-G9, STB-G1, STB-G2, STB-G3, STB-G4, STB-G5, STB-G6, STB-G7, STB-G8, STB-G9, RB-G1, RB-G2, RB-G3, RB-G4, RB-G5, RB-G6, RB-G7, RB-G8, RB-G9, RC-G1, RC-G2, RC-G3, RC-G4, RC-G5, RC-G6, RC-G7, RC-G8, RC-G9, RD-G1, RD-G2, RD-G3, RD-G4, RD-G5, RD-G6, RD-G7, RD-G8, RD-G9, RE-G1, RE-G2, RE-G3, RE-G4, RE-G5, RE-G6, RE-G7, RE-G8, RE-G9, RF-G1, RF-G2, RF-G3, RF-G4, RF-G5, RF-G6, RF-G7, RF-G8, RF-G9, RM-G1, RM-G2, RM-G3, RM-G4, RM-G5, RM-G6, RM-G7, RM-G8, RM-G9, Rubusoside-G1, Rubusoside-G2, Rubusoside-G3, Rubusoside-G4, Rubusoside-G5, Rubusoside-G6, Rubusoside-G7, Rubusoside-G8, Rubusoside-G9, Dulcoside A-G1, Dulcoside A-G2, Dulcoside A-G3, Dulcoside A-G4, Dulcoside A-G5, Dulcoside A-G6, Dulcoside A-G7, Dulcoside A-G8, and Dulcoside A-G9.

For example, G1 and G2 of steviol, STB, ST, RA, RB, RC, RD, RE, RF, RM, rubusoside and dulcoside A are shown below.

Further, by way of example, in one embodiment, GSGs may originate from an SG selected from the group consisting of Reb-D, Reb-I, Reb-L, Reb-Q, and Reb-I2. In this case, the resulting GSGs are included in the group consisting of GSG-5G-1, GSG-5G-2, GSG-5G-3, GSG-5G-4, and GSG-5G-5. These GSGs originate from the SG-5G group.

More extensive non-limiting lists of GSGs are shown in Tables F, G and G.

Table F depicts GSG groups corresponding to parental SGs with glucose ("G"; i.e., 2nd G after hyphen) moieties added thereto. For example, GSG-1G-2 refers to an SG having one glucose added, and "2" is the series number in the row of Table F.

TABLE F

| Parental SG | | | Steviol + Glucose Glycosylated Steviolglycoside (GSG)-group based on SG-group given | | | | | |
|---|---|---|---|---|---|---|---|---|
| Steviol-glycoside | SG-group | MW | MW = 480 SG-1G | MW = 642 SG-2G | MW = 804 SG-3G | MW = 966 SG-4G | MW = 1128 SG-5G | MW = 1290 SG-6G |
| Steviolmonoside<br>Steviolmonoside A | SG-1G | 480 | | | | | | |
| Iso-Steviolbioside<br>Reb-G1<br>Rubusoside<br>Steviolbioside | SG-2G | 642 | GSG-1G-1 | | | | | |
| Iso-Reb B<br>Iso-Stevioside<br>Reb B<br>Reb G<br>Reb-KA<br>SG-13<br>Stevioside<br>Stevioside B (SG-15) | SG-3G | 804 | GSG-1G-2 | GSG-2G-1 | | | | |
| Reb A3 (SG-8)<br>Iso-Reb A<br>Reb A<br>Reb A2 (SG-7)<br>Reb E<br>Reb H1 | SG-4G | 966 | GSG-1G-3 | GSG-2G-2 | GSG-3G-1 | | | |
| Reb D<br>Reb I<br>Reb L<br>Reb I3<br>SG-Unk6<br>Reb Q (SG-5)<br>Reb I2 (SG-6)<br>Reb Q2<br>Reb Q3<br>Reb T1<br>Related SvGn#4 | SG-5G | 1128 | GSG-1G-4 | GSG-2G-3 | GSG-3G-2 | GSG-4G-1 | | |
| Reb M | SG-6G | 1290 | GSG-1G-5 | GSG-2G-4 | GSG-3G-3 | GSG-4G-2 | GSG-5G-1 | |
| — | — | 1452 | GSG-1G-6 | GSG-2G-5 | GSG-3G-4 | GSG-4G-3 | GSG-5G-2 | GSG-6G-1 |
| — | — | 1614 | GSG-1G-7 | GSG-2G-6 | GSG-3G-5 | GSG-4G-4 | GSG-5G-3 | GSG-6G-2 |
| — | — | 1776 | GSG-1G-8 | GSG-2G-7 | GSG-3G-6 | GSG-4G-5 | GSG-5G-4 | GSG-6G-3 |
| — | — | 1938 | | GSG-2G-8 | GSG-3G-7 | GSG-4G-6 | GSG-5G-5 | GSG-6G-4 |
| — | — | 2100 | | | GSG-3G-8 | GSG-4G-7 | GSG-5G-6 | GSG-6G-5 |

Similarly, other glucose substitutes can be incorporated into the GSG, such as for example, rhamnose or deoxyhexose (see Table G) below. Table G depicts GSG groups corresponding to parental SGs with glucose ("G"; i.e., 2nd G after hyphen) and one moiety of rhamnose or deoxyhexose "R") added thereto.

TABLE G

| | | | Steviol + Glucose + 1 Rhamnose/Deoxyhexose Glycosylated Steviolglycoside (GSG)-groups based on SG-group given | | | | | |
|---|---|---|---|---|---|---|---|---|
| Steviol-glycoside | SG-group | MW | MW = 626 SG-1G1R | MW = 788 SG-2G1R | MW = 950 SG-3G1R | MW = 1112 SG-4G1R | MW = 1274 SG-5G1R | MW = 1436 SG-6G1R |
| Dulcoside A1 | SG-1G1R | 626 | | | | | | |
| Dulcoside A<br>Dulcoside B (JECFA C)<br>SG-3<br>Stevioside D<br>Reb C<br>Reb C2/Reb S<br>Stevioside E | SG-2G1R | 788 | GSG-1G1R-1 | | | | | |
| (SG-9)<br>Stevioside E2<br>SG-10<br>Reb L1<br>SG-2 | SG-3G1R | 950 | GSG-1G1R-2 | GSG-2G1R-1 | | | | |
| SG-12<br>Reb H<br>Reb J<br>Reb K<br>Reb K2<br>SG-Unk4<br>SG-Unk5 | SG-4G1R | 1112 | GSG-1G1R-3 | GSG-2G1R-2 | GSG-3G1R-1 | | | |
| Reb N | SG5-G1R | 1274 | GSG-1G1R-4 | GSG-2G1R-3 | GSG-3G1R-2 | GSG-4G1R-1 | | |
| Reb O<br>Reb O2 | SG-6G1R | 1436 | GSG-1G1R-5 | GSG-2G1R-4 | GSG-3G1R-3 | GSG-4G1R2 | GSG-5G1R1 | |
| — | — | 1598 | GSG-1G1R-6 | GSG-2G1R-5 | GSG-3G1R-4 | GSG-4G1R-3 | GSG-5G1R-2 | GSG-6G1R-1 |
| — | — | 1760 | GSG-1G1R-7 | GSG-2G1R-6 | GSG-3G1R-5 | GSG-4G1R-4 | GSG-5G1R-3 | GSG-6G1R-2 |
| — | — | 1922 | GSG-1G1R-8 | GSG-2G1R-7 | GSG-3G1R-6 | GSG-4G1R-5 | GSG-5G1R-4 | GSG-6G1R-3 |
| — | — | 2084 | | GSG-2G1R-8 | GSG-3G1R-7 | GSG-4G1R-6 | GSG-5G1R-5 | GSG-6G1R-4 |
| — | — | 2246 | | | GSG-3G1R-8 | GSG-4G1R-7 | GSG-5G1R-6 | GSG-6G1R-5 |

Table H depicts GSG groups corresponding to parental SGs with glucose ("G"; i.e., 2nd G after hyphen) and one moiety of xylose or arabinose ("X") added thereto.

TABLE H

| | | | Steviol + Glucose + 1 Xylose/Arabinose Glycosylated Steviolglycoside (GSG)-groups based on SG-group given | | | | | |
|---|---|---|---|---|---|---|---|---|
| Steviol-glycoside (GS) | SG-group | MW | MW = 612 SG-1G1X | MW = 774 SG-2G1X | MW = 936 SG-3G1X | MW = 1098 SG-4G1X | MW = 1260 SG-5G1X | MW = 1422 SG-6G1X |
| SG-4 | SG-1G1X | 612 | | | | | | |
| Reb-F1<br>Reb-Rl<br>Stevioside F (SG-1)<br>SG-Unk1 | SG-2G1X | 774 | GSG-1G1X-1 | | | | | |
| Reb F<br>Reb R<br>SG-Unk2<br>SG-Unk3<br>Reb F3 (SG-11)<br>Reb F2 (SG-14) | SG-3G1X | 936 | GSG-1G1X-2 | GSG-2G1X-1 | | | | |
| Reb U2<br>Reb T<br>Reb W<br>Reb W2 | SG-4G1X | 1098 | GSG-1G1X-3 | GSG-2G1X-2 | GSG-3G1X-1 | | | |

TABLE H-continued

| Steviol-glycoside (GS) | SG-group | MW | Steviol + Glucose + 1 Xylose/Arabinose Glycosylated Steviolglycoside (GSG)-groups based on SG-group given MW = 612 SG-1G1X | MW = 774 SG-2G1X | MW = 936 SG-3G1X | MW = 1098 SG-4G1X | MW = 1260 SG-5G1X | MW = 1422 SG-6G1X |
|---|---|---|---|---|---|---|---|---|
| Reb W3<br>Reb U<br>Reb V<br>Reb Y | SG-5G1X | 1260 | GSG-1G1X-4 | GSG-2G1X-3 | GSG-3G1X-2 | GSG-4G1X-1 | | |
| — | — | 1422 | GSG-1G1X-5 | GSG-2G1X-4 | GSG-3G1X-3 | GSG-4G1X-2 | GSG-5G1X-1 | |
| — | — | 1584 | GSG-1G1X-6 | GSG-2G1X-5 | GSG-3G1X-4 | GSG-4G1X-3 | GSG-5G1X-2 | GSG-6G1X-1 |
| — | — | 1746 | GSG-1G1X-7 | GSG-2G1X-6 | GSG-3G1X-5 | GSG-4G1X-4 | GSG-5G1X-3 | GSG-6G1X-2 |
| — | — | 1908 | GSG-1G1X-8 | GSG-2G1X-7 | GSG-3G1X-6 | GSG-4G1X-5 | GSG-5G1X-4 | GSG-6G1X-3 |
| — | — | 2070 | | GSG-2G1X-8 | GSG-3G1X-7 | GSG-4G1X-6 | GSG-5G1X-5 | GSG-6G1X-4 |
| — | — | 2232 | | | GSG-3G1X-8 | GSG-4G1X-7 | GSG-5G1X-6 | GSG-6G1X-5 |

As noted above, the one or more GSGs comprise at least one GSG representing a further glycosylation product of an SG from Table A or Table B. In some embodiments, the one or more GSGs comprise at least one GSG representing a further glycosylation product of an SG selected from the group consisting of SvGn #1, SG-4, iso-steviolbioside, SvGn #3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, SvGn #2, SvGN #5, rebaudioside U2, rebaudioside T, rebaudioside W, rebaudioside W2, rebaudioside W3, rebaudioside U, SG-12, rebaudioside K2, SG-Unk4, SG-Unk5, rebaudioside 13, SG-Unk6, rebaudioside Q, rebaudioside Q2, rebaudioside Q3, rebaudioside 12, rebaudioside T1, SvGn #4, rebaudioside V, rebaudioside V2, rebaudioside Y, 15α-OH— rebaudioside M, rebaudioside O2, and combinations thereof.

In some embodiments, the one or more GSGs comprise one or more additional glucose moieties.

In some embodiments, the one or more GSGs are selected from the group consisting of: GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-4G-1, GSG-4G-2, GSG-5G-1, and combinations thereof.

In some embodiments, the one or more GSGs comprise one or more additional glucose moieties and are selected from the group consisting of: GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, and combinations thereof.

In some embodiments, the one or more GSGs comprise one or more rhamnose moieties, one or more deoxyhexose moieties, or a combination thereof.

In certain particular embodiments, the one or more GSGs are selected from the group consisting of: GSG-1G1R-1, GSG-1G1R-2, GSG-2G1R-1, GSG-1G1R-3, GSG-2G1R-2, GSG-3G1R-1, GSG-1G1R-4, GSG-2G1R-3, GSG-3G1R-2, GSG-4G-1R-1, GSG-1G1R-5-1, GSG-2G1R-4, GSG-3G1R-3a, GSG-3G1R-3b, GSG-4G1R-2, GSG-5G1R-1, and combinations thereof.

In other embodiments, the one or more GSGs are selected from the group consisting of: GSG-3G1R-3a, GSG-3G1R-3b, GSG-4G1R-2, GSG-4G1R-3, GSG-4G1R-4, GSG-4G1R-6, GSG-5G1R-4, GSG-6G1R-1a, GSG-6G1R-1b, GSG-6G1R-2, and combinations thereof.

In some embodiments, the one or more GSGs comprise one or more xylose moieties, arabinose moieties, or a combination thereof.

In certain particular embodiments, the one or more GSGs are selected from the group consisting of: GSG-1G1X-1, GSG-1G1X-2, GSG-1G1X-3, GSG-1G1X-4, GSG-2G1X-1, GSG-2G1X-2, GSG-2G1X-3, GSG-3G1X-1, GSG-3G1X-2, GSG-4G1X-1, and combinations thereof.

In certain particular embodiments, the one or more GSGs are selected from the group consisting of: GSG-3G1X-4, GSG-3G1X-5, GSG-4G1X-1, GSG-4G1X-2, GSG-4G1X-3, GSG-4G1X-4, and combinations thereof.

In some embodiments, at least one of the one or more GSGs has a molecular weight less than equal to or less than 1128 daltons; less than equal to or less than 966 daltons; or less than equal to or less than 804 daltons.

In other embodiments, at least one of the one or more GSGs has a molecular weight greater than 1128 daltons; equal to or greater than 1260 daltons; equal to or greater than 1422 daltons; equal to or greater than 1746 daltons; or equal to or greater than 1922 daltons.

The one or more GSGs may be present in the composition in a total amount of 0.1-99.5% of the composition by weight. In some embodiments, the one or more GSGs comprise are 50-70% of the composition by weight or 55-65% of the composition by weight.

Glycosylated *Stevia* extracts may be derived from any *Stevia* extract(s). A non-limiting list of exemplary GSGs includes glycosylated *Stevia* extracts including, but not limited to, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8). The *Stevia* extracts may contain *Stevia*-derived non-steviol glycoside substances. The *Stevia*-derived non-steviol glycoside substances may comprise volatile non-steviol glycoside substances, non-volatile non-steviol glycoside substances, or both.

In some embodiments, the glycosylated *Stevia* extracts contains glycosylated *Stevia*-derived non-steviol glycoside substances. In some embodiments, the glycosylated *Stevia*-derived non-steviol glycoside substances comprise glycosylated volatile *Stevia*-derived non-steviol glycoside substances. In some embodiments, the glycosylated *Stevia*-derived non-steviol glycoside substances comprise glycosylated non-volatile *Stevia*-derived non-steviol glycoside substances. In some embodiments, the glycosylated *Stevia*-derived non-steviol glycoside substances comprise glycosylated volatile *Stevia*-derived non-steviol glycoside substances and glycosylated non-volatile *Stevia*-derived non-steviol glycoside substances.

Different sugar donors, such as glucose, xylose, rhamnose, etc. also can be obtained during degradation of different compositions of steviol glycosides. These combinations of sugar donors could react with different amino acid donors, thus creating many unique and surprisingly pleasant flavors. The reaction removes the typical grassy, bitter, void, lingering and aftertaste of steviol glycosides.

In one embodiment, glycosylated steviol glycosides (GSGs) are obtained for example, by synthetic manipulation or by enzymatic processes. GSGs obtained by these methods are not naturally occurring steviol glycosides. The methods and GSGs found in KR10-2008-0085811 are herein incorporated by reference. Stevioside G1 (ST-G1), Stevioside G2 (ST-G2), Stevioside G3 (ST-G3), Stevioside G4 (ST-G4), Stevioside G5 (ST-G5), Stevioside G6 (ST-G6), Stevioside G7 (ST-G7), Stevioside G8 (ST-G8), Stevioside G9 (ST-G9), Rebaudioside A G1 (RA-G1), Rebaudioside A G2 (RA-G2), Rebaudioside A G3 (RA-G3), Rebaudioside A G4 (RA-G4), Rebaudioside A G5 (RA-G5), Rebaudioside A G6 (RA-G6), Rebaudioside A G7 (RA-G7), Rebaudioside A G8 (RA-G8), Rebaudioside A G9 (RA-G9), Rebaudioside B G1 (RB-G1), Rebaudioside B G2 (RB-G2), Rebaudioside B G3 (RB-G3), Rebaudioside B G4 (RB-G4), Rebaudioside B G5 (RB-G5), Rebaudioside B G6 (RB-G6), Rebaudioside B G7 (RB-G7), Rebaudioside B G8 (RB-G8), Rebaudioside B G9 (RB-G9), Rebaudioside C G1 (RC-G1), Rebaudioside C G2 (RC-G2), Rebaudioside C G3 (RC-G3), Rebaudioside C G4 (RC-G4), Rebaudioside C G5 (RC-G5), Rebaudioside C G6 (RC-G6), Rebaudioside C G7 (RC-G7), Rebaudioside C G8 (RC-G8), Rebaudioside C G9 (RC-G9), or any combination thereof can be incorporated into the sweetener compositions of the current invention. Alternatively in the current embodiments, the glycosylation process can be modified as to provide partially glycosylated steviol glycosides that can have further unique taste profiles.

A suitable method to prepare GSGs and/or GSEs can be found, for example, in Examples 1 and 2 of KR10-2008-0085811. It is also anticipated that other steviol glycosides, for example, steviolbioside, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside and dulcoside A can be enzymatically modified to afford their corresponding multiple glycosylated glycosides: Steviol G1, Steviol G2 Steviol G3, Steviol G4, Steviol G5, Steviol G6, Steviol G7, Steviol G8, Steviol G9, Steviobioside G1, Steviobioside G2, Steviobioside G3, Steviobioside G4, Steviobioside G5, Steviobioside G6, Steviobioside G7, Steviobioside G8, Steviobioside G9, Rebaudioside B G1, Rebaudioside B G2, Rebaudioside B G3, Rebaudioside B G4, Rebaudioside B G5, Rebaudioside B G6, Rebaudioside B G7, Rebaudioside B G8, Rebaudioside B G9, Rebaudioside C G1, Rebaudioside C G2, Rebaudioside C G3, Rebaudioside C G4, Rebaudioside C G5, Rebaudioside C G6, Rebaudioside C G7, Rebaudioside C G8, Rebaudioside C G9, Rebaudioside D G1, Rebaudioside D G2, Rebaudioside D G3, Rebaudioside D G4, Rebaudioside D G5, Rebaudioside D G6, Rebaudioside D G7, Rebaudioside D G8, Rebaudioside D G9, Rebaudioside E G1, Rebaudioside E G2, Rebaudioside E G3, Rebaudioside E G4, Rebaudioside E G5, Rebaudioside E G6, Rebaudioside E G7, Rebaudioside E G8, Rebaudioside E G9, Rebaudioside F G1, Rebaudioside F G2, Rebaudioside F G3, Rebaudioside F G4, Rebaudioside F G5, Rebaudioside F G6, Rebaudioside F G7, Rebaudioside F G8, Rebaudioside F G9, Rebaudioside M G1, Rebaudioside M G2, Rebaudioside M G3, Rebaudioside E G4, Rebaudioside M G5, Rebaudioside M G6, Rebaudioside M G7, Rebaudioside M G8, Rebaudioside M G9, Rubusoside G1, Rubusoside G2, Rubusoside G3, Rubusoside G4, Rubusoside G5, Rubusoside G6, Rubusoside G7, Rubusoside G8, Rubusoside G9, Dulcoside A G1, Dulcoside A G2, Dulcoside A G3, Dulcoside A G4, Dulcoside A G5, Dulcoside A G6, Dulcoside A G7, Dulcoside A G8, and Dulcoside A G9.

In a particular aspect, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) are GSGs/GSEs which are used to be combined with steviol glycosides, such as RA, RB, RD, etc. GSG-RA20 is typically prepared from RA20 as a key starting material, GSG-RA30 is typically prepared from RA30 as a key starting material, GSG-RA40 is typically prepared from RA40 as a key starting material, GSG-RA50 is typically prepared from RA50 as a key starting material, GSG-RA60 is typically prepared from RA60 as a key starting material, GSG-RA70 is typically prepared from RA70 as a key starting material, GSG-RA80 is prepared from RA80 as the key starting material, GSG-RA90 is typically prepared from RA90 as a key starting material, GSG-RA95 is typically prepared from RA95 as a key starting material, and GSG-RA97 is prepared from RA97 as a key starting material. Since each composition contains varying concentrations of GSGs, steviol glycosides and, in some embodiments, non-steviol glycoside substances and glycosylated non-steviol glycoside substances, then each composition may have different taste profiles. It is envisioned that specific ratios of GSGs and steviol glycosides may have unique and beneficial physical and chemical properties that are unknown and have not been previously disclosed. In some embodiments, such GSGs and/or GSEs are used as starting material in a Millard reaction and provide MRPs with unique and beneficial physical and chemical properties.

In another aspect, GSGs or GSEs can be combined with one or more of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside and dulcoside A to provide suitable sweetening agent compositions. The content of GSG, GSE or GSGs from any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) mixed with the disclosed steviol glycosides such as the steviol glycosides found in the *Stevia* plant or sweet tea extract can be from 1% wt/wt to 100% wt/wt. A GSG or GSGs, such as any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be included in the compositions described herein at 1% wt/wt, 2% wt/wt, 3% wt/wt, 4% wt/wt, 5% wt/wt, 6% wt/wt, 7% wt/wt, 8% wt/wt. 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example less than about 70 percentage by weight, less than about 50 percentage by weight, from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, from about 10% wt/wt to about 20% wt/wt, from about 20 to less than about 50 percentage by weight, from about 30 to less than about 50 percentage by weight, from about 40 to less than about 50 percentage by weight, and from about 20 to 45 percentage by weight of the composition. Such composition may be used as a sweetener and/or flavor, or as a starting material in a Millard reaction.

In another aspect, the one or more steviol glycosides (SG's) including steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, and dulcoside A, as well as those included in Table 2, are contained in the sweetening agent composition. The steviol glycosides of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the composition. Such composition may be used as a sweetener and/or flavor, or as a starting material in a Millard reaction.

In certain embodiments, the GSGs or GSEs used in the present application are prepared as follows: i) dissolving a glucose-donor material in water to form a liquefied glucose-donor material; ii) adding a starting SG or SE composition to liquefied glucose-donor material to obtain a mixture; iii) adding an effective amount of an enzyme to the mixture to form a reaction mixture, wherein the enzyme catalyzes the transfer of glucose moieties from the glucose-donor material to SGs in the starting SG or SE composition, and incubating the reaction mixture at a desired temperature for a desired length of reaction time to glycosylate SGs with glucose moieties present in the glucose-donor molecule. In some further embodiments, after achieving a desired ratio of GSG- and residual SG contents, the reaction mixture can be heated to a sufficient temperature for a sufficient amount of time to inactivate the enzyme. In some embodiments, the enzyme is removed by filtration in lieu of inactivation. In other embodiments, the enzyme is removed by filtration following inactivation. In some embodiments the resulting solution comprising GSG, residual SGs and dextrin is decolorized. In certain embodiments the resulting solution of GSG, residual SGs and dextrin is dried. In some embodiments, the drying is by spray drying. In some embodiments, step (i) comprises the substeps of (a) mixing a glucose-donor material with a desired amount of water to form a suspension, (b) adding a desired amount of enzyme to the suspension and (c) incubate the suspension at a desired temperature for a desired time to form liquefied glucose-donor material. Starch can be a suitable substitute for dextrin(s) and/or dextrin(s) can be obtained by the hydrolysis of starch.

B6. Mogrosides (MGs) and Swingle Extracts

Mogrosides (MGs) are defined by a family of triterpene-glycosides, which are present in the fruit of *Siraitia grosvenorii* (formerly called *Momordica grosvenori*), a member of the Curcubitaceae (gourd) family, which is native to southern China and northern Thailand. The fruit is also referred to as Luo Han Guo (luohanguo) or monk fruit. Luohanguo has been used in traditional Chinese medicine as a medicinal herb for treating cough and sore throat and is popularly considered, in southern China, to be a longevity aid. The fruit is well-known for its sweet taste, which is attributed to the triterpine glycosides present in the fruit, as well as extracts from the fruit, which are commonly referred to as "swingle" extracts.

Other members of this plant family (Gourd family) also contain remarkably sweet components, including additional species of the genus *Siraitia* (e.g., *S. siamensis, S. silomaradjae, S. sikkimensis, S. africana, S. borneensis*, and *S. taiwaniana*) and the popular herb jiaogulan (*Gynostemma pentaphyllum*). The latter herb, which has both sweet and bitter tasting triterpene glycosides in its leaves, is now sold worldwide as a tea and made into an extract for use in numerous health-care products.

Extracts from the fruits of *Siraitia grosvenorii* (Swingle), also known as *Momordica grosvenori* (Swingle), Luo Han Guo or monk fruit etc. provide a family of triterpene-glycosides and are referred to as mogroside(s) ("MGs") throughout the specification. The extracts include, for example, mogroside V, mogroside IV, siamenoside I, and 11-oxomogroside V. Constituents of the mogroside extracts are referred to by the designation "MG" followed by symbol, such as "V", therefore mogroside V is "MGV". Siamenoside I would be "SSI", 11-oxomogroside V would be "OGV".

The term "mogroside" is used with reference to a triterpene-glycoside that is recognized in the art and is intended to include the major and minor constituents from mogroside extracts.

Exemplary triterpene glycosides for use in the present application include mogrosides, such as mogroside II, mogroside IIIA, mogroside IIIE, mogroside IVA, mogroside IVE, siamenoside I, and 11-oxomogroside V.

The juice or extract monk fruit includes mainly non-sugar natural sweeteners, the triterpenoid glycosides, which include mogroside V (esgoside), mogroside IV, and D-mannitol. The natural sweetness of them is 256-344, 126, and 0.55-0.65 times of that of sugar. The juice/extract contains large amounts of glucose, 14% fructose, proteins, vitamin C, and 26 inorganic elements, such as manganese, iron, nickel, selenium, tin, iodine, molybdenum and others. The juice/extract also includes fatty acids, such as linoleic acid, oleic acid, palmitic acid, stearic acid, palmitic acid, myristic acid, lauric acid, and decanoic acid.

It should be understood that monk fruit extracts can contain, for example, a mogroside, such as MGV, in an amount of 3% by weight, 5% by weight, 20% by weight, 40% by weight, 50% by weight, 60% by weight or higher but containing other mogrosides or non-mogrosides in the extracts. In addition, some other polysaccharides or flavonoids may be present. The mogroside(s) of interest can be purified before use.

"Glycosylated mogrosides" or "GMGs" refer to mogrosides that are glycosylated at least at one or more positions in addition to those positions glycosylated in native form, and may be obtained, for example, by synthetic manipulation or by enzymatic processes.

The terms "swingle extract" and "monk fruit extract" are used interchangeably herein. The terms "glycosylated swingle extract" and "glycosylated monk fruit extract" refer to plant extracts comprising compounds obtained by transglycosylating a swingle extract containing mogrosides, or transglycosylating purified mogrosides so as to add glucose units, for example, one, two, three, four, five, or more than five glucose units to the native mogrosides by a glycosyltransferase, preferably, CGTase enzyme (cyclodextringlycosyltransferase). Herein, the glycosylated mogrosides or glycosylated swingle extracts containing glycosylated mogrosides may further comprise short chain compounds obtained by hydrolyzation of glycosylated product and also comprise non-glycosylated ingredients which include the residues of non-reacted mogrosides, or unreacted components other than mogrosides contained in the swingle extract. It should be understood that GMG(s) essentially contains glycosylated mogroside(s), but also contains unreacted mogrosides, dextrin and other non-mogroside substances found in extracts. It should also be understood that the GMG(s) can be purified and/or separated into purified/isolated components.

A swingle extract containing mogrosides may be produced by the method of extracting the fruit of *Siraitia grosvenorii* (Swingle) with an alcohol, a mixture of alcohol and water, or water to obtain mixtures of mogrosides, then purified to provide desired mogrosides, such as mogroside V. Specifically, an exemplary method for producing a swingle extract containing mogrosides may involve: extraction of the fruit of *Siraitia grosvenorii* with an alcohol, a mixture of alcohol and water, or water to obtain the mogrosides (such as mogroside V etc.) component ranging from about 0.1% to 99% by weight of the extract. In a preferred embodiment, the swingle extract contains about 10-90% by weight mogrosides. In another preferred embodiment, the swingle extract contains about 20-80% by weight mogrosides. In another preferred embodiment, the swingle extract contains about 30-70% by weight mogrosides. In another preferred embodiment, the swingle extract contains about 40-60% by weight mogrosides.

A suitable process to obtain a monk fruit extract (swingle extract) is provided as follows. Luo Han Guo fruit is extracted with water or a mixture of water/alcohol (ethanol or methanol) at a temperature of from about 40° C. to about 80° C. with the ratio of fruit to solvent being about 1:10 to about 1:20 (weight to volume). The liquid can be clarified by flocculation or membrane filtration followed by purification through a macroporous resin and ion exchange resin. Decolorization can be accomplished with activated carbon. Solids are then filtered and dried.

In one embodiment, glycosylated mogroside V (GMGV) is produced by dissolving dextrin in water (reverse osmosis water). The ratio of GMGV to water is about 1:10 (weight/volume, (w/v)). A swingle extract with a mogroside content of between 1% and 99% is added to dextrin solution. In some embodiments, the ratio of dextrin to mogrosides/extract is optimized in a ratio of between 100:1 to 1:100 with suitable ranges including 3:1, 2:1, 1.5:1 and 1:1. In one embodiment, the dextrin to swingle extract ratio is between 30:70 and 70:30. CGTase enzyme is added to the mixture (ratio of GMGV to CGTase is about 20:1 (w/v) and incubated at 60-70° C. for a desired length of reaction time (typically from about 2 hours to about 72 hours, more preferably from about 8 hours to about 48 hours, even more preferably from about 12 hours to about 24 hours) to glycosylate mogrosides with glucose molecules derived from dextrin, wherein the added amount of CGTase by volume is about 0.1-0.5 ml based on 1 g mogrosides. In one embodiment, the ratio of GMGV to CGTase is from about 10:1 to about 20:1 w/v. After the desired ratio of GMGs and residual mogroside and dextrin contents are achieved (monitored by HPLC to analyze the content of unreacted MGV), the reaction mixture is heated to 90-100° C. for 30 minutes to inactivate the CGTase, which can then be removed by filtration. The resulting solution of GMGs, residual mogroside and dextrin is decolored and spray dried.

Optionally, amylase can be added to the mixture and the mixture is incubated at 70° C. for a desired length of reaction time to shorten the length of glucose chain(s) in the GMG molecules.

Decolorization and/or spray drying the resulting mixture of GMG, residual mogrosides and dextrin can then be undertaken.

Use of the monk fruit extracts with Maillard reaction products described herein are particularly useful in the savory industry to improve overall taste.

B7. Rubusoside (RU) and Sweet Tea Extracts

Rubusoside (RU), a steviol glycoside, and kaurane-type diterpene glycosides, such as suaviosides B, G, H, I and J, constitute a variety of natural sweeteners found in leaves of the Chinese sweet tea plant (*Rubus suavissimus* S. Lee). Rubusoside is 200 times sweeter than cane sugar and is the main steviol glycoside found in the leaves of the sweet tea plant. Sweet tea plant extracts contain rubusoside, as well as the aforementioned suaviosides.

The term "glycosylated RU" refers to a glycosylated rubusoside, while the term "glycosylated sweet tea extract" refers to a *R. suavissimus* leaf extract containing glycosylated RU and/or glycosylated suaviosides B, G, H, I and J. These glycosylated compounds may be obtained by transglycosylating rubusoside or a sweet tea extract containing rubusoside and/or suaviosides so as to add glucose units, for example, one, two, three, four, five or more than five glucose units, to the native rubusoside or suavioside(s) by glycosyltransferase, preferably, CGTase enzyme (cyclodextringlycosyltransferase). Herein, the resulting glycosylated sweet tea glycosylates include short chain compounds obtained by hydrolyzation of glycosylated product and may also include non-glycosylated ingredients which are residues of non-reacted rubusoside or suavioside(s) or unreacted components other than rubusoside or suavioside(s) contained in the sweet tea extract.

B8. Neohesperidin and Naringin Glycosides

Neohesperidin and naringin are flavanone glycosides present in citrus fruits and grapefruit, and are responsible for the bitterness of citrus juices, along with limonin. Neohesperidin, naringin, and their derivatives, such as neohesperidine chalcone, naringin chalcone, phloracetophenone, neohesperidine dihydrochalcone, naringin dihydrochalcone etc. (as further described herein) are good candidates for bitter or sweet enhancers, as they have been found to be effective in masking the bitter tastes of other compounds found in citrus, including limonin and naringin.

An important natural source for these flavanone glycosides is Bitter orange (also known as Seville orange, sour orange, bigarade orange, or marmalade orange) refers to a citrus tree (Citrus×aurantium) and its fruit. It is native to Southeast Asia and has been spread by humans to many parts of the world. The bitter orange is believed to be a cross between *Citrus maxima*×*Citrus reticulate.*

Industrially, neohesperidine dihydrochalcone (NHDC) is produced by extracting neohesperidin from the bitter orange, and then hydrogenating neohesperidin to make NHDC. NHDC is roughly 1500-1800 times sweeter than sugar at threshold concentrations and about 340 times sweeter than sugar weight-for-weight. In certain embodiments, glycosylated derivatives of NHDC prepared by enzymatic processes may be employed.

In certain embodiments, the flavanone glycosides are provided in the form of metal salts. For example, a metal salt of dihydrochalcone has the following formula:

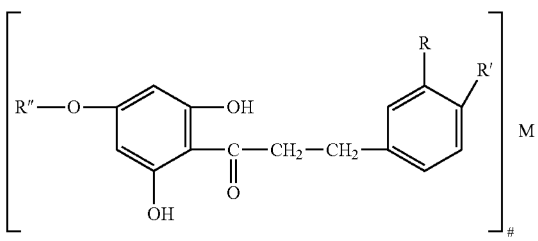

wherein R is selected from the group consisting of hydrogen and hydroxy, R' is selected from the group consisting of hydroxy, methoxy, ethoxy and propoxy, and R" is selected from the group consisting of neohesperidoxyl, B-rutinosyl and ß-D-glucosyl, M is a mono- or divalent metal selected from the group consisting of an alkali metal and an alkaline earth metal, and n is an integer from 1 to 2 corresponding to the valence of the selected metal M.

Typical compounds of the above formula are the alkali or alkaline earth metal monosalts having the following structures:

Neohesperidin dihydrochalcone (Formula I)

(I)

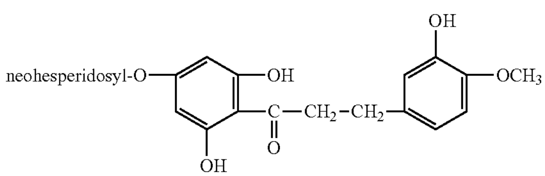

2', 4', 6', 3-tetrahydroxy-4-n-propoxydihydrochalcone 4'-ß neohesperidoside (Formula II):

(II)

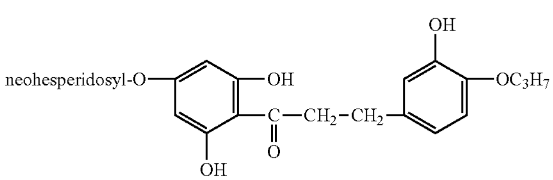

naringin dihydrochalcone (Formula III):

(III)

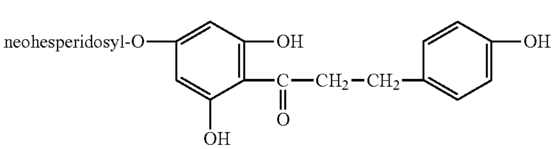

prunin dihydrochalcone (Formula IV):

(IV)

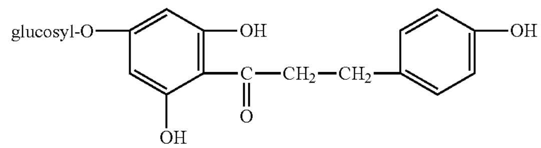

hesperidin dihydrochalcone (Formula V):

(V)

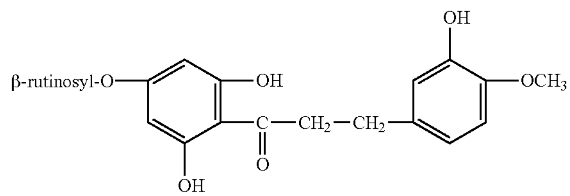

hesperitin dihydrochalcone (Formula VI):

(VI)

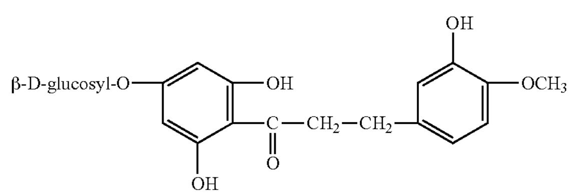

The "alkali metals" include e.g., sodium, potassium, lithium, rubidium, caesium, and ammonium, while the term "alkaline earth metals" includes e.g., calcium, magnesium, strontium, barium, etc. These may be used as salts of dihydrochalcone, along with other alkali amino acids as counterpart ions. Thus, certain embodiments of the present application comprise the use of one or more salts of dihydrochalcone.

B9. Glycyrrhizin

Glycyrrhizin (or glycyrrhizic acid or glycyrrhizinic acid) is the chief sweet-tasting constituent of *Glycyrrhiza glabra* (liquorice) root. Glycyrrhizin is obtained as an extract from licorice root after maceration and boiling in water. Licorice extract provides a source of glycyrrhizin and is sold as a liquid, paste, or spray-dried powder. When used in specified amounts, it is approved for use as a flavor and aroma in manufactured foods, beverages, candies, dietary supplements, and seasonings. It is 30 to 50 times as sweet as sucrose (table sugar). In certain embodiments, glycosylated derivatives of glycyrrhizin prepared by enzymatic processes may be employed.

B10. Fatty Acids

The inventors of the present application have surprisingly found that fatty acids can act as sugar donors in Maillard reactions in combination with *Stevia* extracts, amino acids, and optionally a reducing sugar, such as glucose. This was found by evaluating MRP products formed when subjecting a fatty acid and an amine donor, e.g., an amino acid, to the Maillard reaction. In this context, a fatty acid or its derivative refers to aliphatic acid or aliphatic esters of aliphatic acid which can be used as sugar donor in Maillard reaction. An exemplary, non-limiting list of fatty acids includes cinnamic acid, glyceryl stearate, lactic acid, linolenic acid, alpha-linolenic acid, eicosapentaenoic acid, docosahexaenoic acid, stearidonic acid, eicosatetraenoic acid, linoleic acid, gamma-linolenic acid, dihommo-gamma-linolenic acid, arachidonic acid, eicosadienoic acid, docosadienoic acid, adrenic acid, docosapentaenoic acid and combinations thereof.

B11. Additional Embodiments

Various Maillard reaction products (compositions) can be prepared with the components discussed herein including sweet tea extracts, *Stevia* extracts, swingle extracts, MG(s), SG(s), as well as components of sweet tea extract(s), GMG(s), GSG(s) glycosylated sweet tea glycosylates, in combination with an amine donor, and optionally, in combination any of the sugar donors described herein, such as glucose, fructose or galactose.

Thus, the following forty five embodiments are included as suitable Maillard reaction components (along with one or more amine donors) to provide suitable ingestible compositions from a Maillard reaction process. It should also be understood that an amine donor(s) is used in the Maillard reaction under appropriate reaction conditions (a pH from about 2 to about 14, e.g., pH≥7, elevated temperature) to produce the resultant Maillard reaction product(s).

(1) A GMG or mixtures of GMGs.

(2) A GMG in combination with a sugar donor.

(3) A GMG in combination with a GSG.

(4) A GMG in combination with an SG.

(5) A GMG in combination with an MG.

(6) A GMG, a GSG and a sugar donor.

(7) A GMG, an SG and a sugar donor.

(8) A GMG, an MG and a sugar donor.

(9) A GMG, a GSG and an SG.

(10) A GMG, a GSG and an MG.

(11) A GMG, an SG and an MG.

(12) A GMG, a GSG, an SG and an MG.

(13) A GMG, a GSG an SG and a sugar donor.

(14) A GMG, a GSG, an MG and a sugar donor.

(15) A GMG, a GSG an SG, an MG and a sugar donor.

(16) An MG, an SG, a GSG and a sugar donor.

(17) An MG and a GSG.

(18) An MG, a GSG and an SG.

(19) An MG, a GSG and a sugar donor.

(20) An MG, a GSG, an SG and a sugar donor.

(21) A *Stevia* extract.

(22) A *Stevia* extract and a sugar donor.

(23) A steviol glycoside (SG).

(24) A steviol glycoside (SG) and a sugar donor.

(25) A glycosylated steviol glycoside (GSG).

(26) A glycosylated steviol glycoside (GSG) and a sugar donor.

(27) A swingle extract (mogroside extract).

(28) A swingle extract (mogroside extract) and a sugar donor.

(29) A glycosylated swingle extract.

(30) A glycosylated swingle extract and a sugar donor.

(31) A mogroside (MG) or a mixture of MGs.

(32) A mogroside (MG) and a sugar donor.

(33) A glycosylated mogroside (GMG).

(34) A glycosylated mogroside and a sugar donor.

(35) A sweet tea extract.

(36) A sweet tea extract and a sugar donor.

(37) A glycosylated sweet tea extract.

(38) A glycosylated sweet tea extract and a sugar donor.

(39) A sweet tea component, e.g., rubusosides, suaviosides.

(40) A glycosylated sweet tea component and a sugar donor.

(41) A steviol glycoside (SG) and a glycosylated steviol glycoside (GSG).

(42) A steviol glycoside (SG), a glycosylated steviol glycoside (GSG) and a sugar donor.

(43) Any of the above forty two combinations further including one or more salts.

(44) Any of the above forty three combinations further including a sweetener.

(45) Any of the above forty four combinations further including a sweetener enhancer.

It should be understood, that in the 45 combinations noted above, that where the singular is used, e.g., a glycosylated sweet tea extract, that the plural of such is included, e.g., glycosylated sweet tea extracts.

B12. Use of Raw Materials in MRP Reactions and/or MRP-Containing Compositions In some embodiments, the reactants for the Maillard reaction may include a number of different raw materials for producing MRP compositions.

In one aspect, the raw materials may be categorized into the following groups comprising the following exemplary materials:

1) A protein nitrogen source:

Protein nitrogen containing foods (meat, poultry, eggs, dairy products, cereals, vegetable products, fruits, yeasts) and their extracts;

Hydrolysis products of the above, autolyzed yeasts, peptides, amino acids and/or their salts.

2) A carbohydrate source:

Foods containing carbohydrates (cereals, vegetable products and fruits) and their extracts Mono-, di- and polysaccharides (sugars, dextrins, starches and edible gums)

Hydrolysis products of the above.

3) A fat or fatty acid source:

Foods containing fats and oils.

Edible fats and oil from animal, marine or vegetable origin.

Hydrogenated, trans-esterified and/or fractionated fats and oils.

Hydrolysis products of the above.

4) Miscellaneous list of additional ingredients:

Foodstuffs, herbs, spices, their extracts and flavoring agents identified therein Water Thiamine and its hydrochloric salt Ascorbic, Citric, Lactic, Fumaric, Malic, Succinic, Tartaric and the Na, K, Ca, Mg and NH4 salts of these acids Guanylic acid and inosinic acid and its Na, K and Ca salts Inositol Sodium, potassium and ammonium sulphides, hydrosulphides and polysulphides Lecithin Acids, bases and salts as pH regulators:

Acetic, hydrochloric, phosphoric and sulphuric acids

Sodium, potassium, calcium and ammonium hydroxide.

Salts of the above acids and bases

Polymethylsiloxane as antifoaming agent.

In another aspect, the present application contemplates the use of any one of a number of raw materials exemplified below to produce natural products:

Sugar Syrups:

Xylose syrup, arabinose syrup and rhamnose syrup manufactured from beech wood. Ardilla Technologies supply these along with natural crystalline L-xylose, L-arabinose and L-rhamnose. Xylose syrup may also be obtained from natural sources, such as the xylan-rich portion of hemicellulose, mannose syrup from ivory nut, etc. These and other types of syrup described herein can be used as sugar donors in the compositions described herein.

Hydrolyzed gum arabic:

Thickeners, such as gum arabic can be hydrolyzed with an organic acid or by enzyme hydrolysis to produce a mixture containing arabinose. Arabinose could also be obtained from other wood-based or biomass hydrolysate. Cellulose enzymes can also be used.

Meat Extracts:

Commercially available from a number of companies, such as Henningsens (Chicken skin and meat). Gives excellent chicken notes.

Jardox: Meat and poultry extracts and stocks.

Kanegrade: Fish powders, anchovy, squid, tuna and others.

Vegetable Powders:

As well as onion and garlic powders, celery, tomato and leek powders are effective flavor contributors to reaction flavors.

Egg Yolk:

Contains 50% fat and 50% protein. The fat contains phospholipids and lecithin. The proteins are coagulating proteins and their activity must be destroyed by hydrolysis with acid or by the use of proteases prior to use. This will also liberate amino acids and peptides useful in reaction flavors. (Allergen activity)

Vegetable oils:

Peanut (groundnut) oil—Oleic acid 50%, Linoleic acid 32%—beef and lamb profile. Sunflower—linoleic acid 50-75%, oleic 25%—chicken profile.

Canola (rapeseed)—oleic 60%, linoleic 20%, alpha-linoleic 10%, gadoleic 12%.

Sauces:

Fish sauce, soy sauce, oyster sauce, miso.

Enzyme Digests:

Beef heart digest—rich in phospholipids. Liver digest—at low levels <5% gives a rich meaty character. Meat digests can also add authenticity but they are usually not as powerful as yeast extracts and HVPs.

Enzyme enhanced umami products—shitake or porcini mushrooms, kombu, etc. Enzyme digested fats—beef, lamb, etc.

All of the components of the compositions disclosed herein can be purchased or made by processes known to those of ordinary skill in the art and combined (e.g., precipitation/co-precipitation, mixing, blending, grounding, mortar and pestle, microemulsion, solvothermal, sonochemical, etc.) or treated as defined by the current invention.

C. Additional Sweeteners

Sweetener(s), including reducing sugars, non-reducing sugars, high intensity natural sweeteners, high intensity synthetic sweeteners, and sweet taste-modifying proteins, can be included in a Maillard reaction or they may be added to an MRP composition in an amount in the range of 1 to about 99 weight percent, from about 1 to about 75 weight percent 1 to about 50 weight percent, from about 1 to about 40 weight percent, from about 1 to about 30 weight percent, from 1 to about 20 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 99 weight percent including 5 weight percent, 10 weight percent, 15, weight percent, 20 weight percent including increments of 5, for example, through 95 weight percent, and alternatively from about 2 weight percent, 4 weight percent, 6 weight percent, including increments of 2, for example, through 98 weight percent.

In some embodiments, the MR reactants or the MRP composition prepared therefrom includes at least one sweetener enhancer. In certain particular embodiments, the ratio of the MR reactants to the at least one sweetener enhancer is between 20:1 and 1:1, between 15:1 and 2:1, between 10:1 and 5:1, or any ratio or any range derived from any of the aforementioned ratios.

Sweetener enhancer(s) may be present in the MRP reaction mixture or in the MRP composition in a range of from about 0.5 ppm to about 1000 ppm, from about 1 ppm to about 900 ppm, from about 2 ppm to about 800 ppm, from about 3 ppm to about 700 ppm from about 4 ppm to about 600 ppm, about 500 ppm, and all values and ranges encompassed over the range of from about 0.5 ppm to about 1000 ppm, including 5 ppm, 10 ppm, 15 ppm, 20 ppm, including increments of 5, for example, through 1000 ppm, alternatively from about 2 ppm, including 4 ppm, 6 ppm, 8 ppm, 10 ppm, including increments of 2, for example, through 1000 ppm.

Thaumatin may be included in the composition, before, during, or after the Maillard reaction, in a range from 0.01 ppm to 99.9 wt % on the basis of the total weight of the composition, including all specific values in the range and all subranges between any two specific values. For example, thaumatin may be present in the composition in an amount of 0.1%, 0.5%, 1%, 5%, 10%, 20%, 30%, 40%, 50%, 60% 70%, 80%, 90%, 95% by weight of the composition or any range derived therefrom, as well as the subranges of 0.5-95 wt %, 1-90 wt %, 5-80 wt %, 10-70 wt %, 20-60 wt % or 30-50 wt % on the basis of the total weight of the composition. Likewise, NHDC may be included in the composition, with or without thaumatin, before, during, or after the Maillard reaction in these same amounts.

In a particular embodiment, the MRP composition comprises from 0.01 ppm to 99.9 wt % of thaumatin, one or more MRPs as prepared by the present embodiments, and optionally 0.1-99.9 wt % of a sweetening agent and/or 0.1-99.9 wt % of sweetener. In another embodiment, the MRP composition comprises from 0.01 ppm to 30 wt % of thaumatin, 0.01 ppm to 50 wt % of MRP as prepared by the present embodiments, and optionally 10-30 wt % of sweetening agent, and optionally 10-30 wt % of sweetener.

In some embodiments where thaumatin is added to an MRP or S-MRP composition, the ratio of thaumatin to the MRP or S-MRP may range from 1:100 to 1:0.67, based on pure thaumatin. However, considering that in certain embodiments where the preferred dosage of thaumating is 0.5 ppm to 25 ppm, and the preferred dosage of the MRP/S-MRP composition is 10 ppm to 500 ppm, typical ratios (by weight) of thaumatin:(MRP/S-MRP) may range from 1:1000 to about 1:0.4, more preferably from about 1:200 to about 1:1. Similar ratios may be utilized when substituting or additionally incorporated NHDC.

In some embodiments, thaumatin may be used in a Maillard reaction with e.g., suitable natural sweeteners, such as SGs, *Stevia* extracts, GSGs and/or glycosylated *Stevia* extracts. In addition, NHDC may be further combined in the reaction mixture. Thus, where thaumatin (and/or NHDC) is included in a Maillard reaction with e.g., one or more amino acids (as starting materials) as described in Examples 256, 257, and 261 herein, the ratio of thaumatin to amino acid(s) may encompass exemplary ranges, such as 1:2.64, 1:0, and 1:2424, respectively. Thaumatin, a protein, can be used as an amino donor alone or in combination with other amino acid(s).

In other embodiments, the MR reactants or the MRP composition prepared therefrom includes at least one high intensity synthetic sweetener. Exemplary high intensity synthetic sweeteners include, but are not limited to sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, including salts thereof and combinations thereof. In certain particular embodiments, the ratio of the MR reactants to the at least one high intensity synthetic sweetener is between 20:1 and 1:1, between 15:1 and 2:1, between 10:1 and 5:1, or any ratio or any range derived from any of the aforementioned ratios.

In other embodiments, the MR reactants or the MRP composition prepared therefrom includes at least one at least one sweetener enhancer and at least one high intensity synthetic sweetener. In certain particular embodiments, the ratio of the MR reactants to the combination of the sweetener enhancer(s) and the high intensity synthetic sweetener (s) is between 20:1 and 1:1, between 15:1 and 2:1, between 10:1 and 5:1, or any ratio or any range derived from any of the aforementioned ratios.

D. Flavor Substances

The inventors of the present application have also developed a unique process which could preserve useful flavor substances originating from *Stevia* plants and recovered in in the form of *Stevia* extracts. Such substances are further amplified in Maillard reactions involving SGs and *Stevia* extracts in combination with various amine donors as described herein.

The flavor substances in *Stevia* plants include but are not limited to alkanes, ketones, acids, aldehydes, hydrocarbons, alkenes, aromatics, esters, alcohols, aliphatics or amines. Specifically, the acids comprise Acetic acid, Propanoic acid, Pentanoic acid, Hexanoic acid, Trans 2-hexenoic acid, Heptanoic acid, Octanoic acid, (Z)-9-Octadecenoic acid, decahydro-1-Naphthalenecarboxylic acid, 2,3-dihyd-9,12,15-Octadecatrienoic acid; the alcohols comprise 1-Azabicyclo [3.2.1]octan-6-ol, 2-Ethyl-1-dodecanol, (+) spathulenol, 1,2,3,4,4α,7,8,8a-octahy-1-Naphthalenol; the aldehydes comprise Hexanal, 2,4-Pentadienal, Octanal, Nonanal, Decanal, 1-Cyclohexene-1-carboxaldehyde, 2,5-dimethyl-5-nitrohexanal, (E)-2-Hexenal, (Z)-2-Heptenal; the amines comprise 4-methyl-Pyrimidine, O-decyl-Hydroxylamine, the esters comprise 3-Methyl pentanoic acid, 2-ethyl-4-Pentenal, Triacetin, Heptafluorobutyric acid, n-pentadecyles, Pseudosolasodine diacetate, 2,5,6-trimethyl-Decane; the ketones comprise dihydro-2(3H)-Furanone, 5-ethenyldihydro-5-methy-2(3H)-Furanone, 5-ethyldihydro-2(3H)-Furanone, 4-methyl-Cyclopentadecanone, 3,3-dimethyl-2,7-octanedione, 6,10-dimethyl-5,9-Undecadien-2-one, 3,5,6,8a-tetrahydro-2,52H-1-Benzopyran, 5,6,7,7a-tetrahydro-2(4H)-Benzofuranone, 6,10,14-trimethyl-2-Pentadecanone, trans-β-Ionone, 3-ethyl-4-methyl-1H-Pyrrole-2,5-dione, 1H-Naphtho[2,1-b]pyran, 3-ethenyldodecah; the alkanes comprises nitro-Cyclohexane, 2,6-dimethyl-Heptadecane, 2,6,7-trimethyl-Decane, 2,6,7-trimethyl-Decane, Tetradecane, 2,6,10-trimethyl-Dodecane, 2,3-Dimethyldecane, Undecane, 5-methyl-Undecane, Docosane, Dodecane, Heptadecane, Nonadecane, 1-Bromo-2-methyl-decane, 2,6,10-trimethyl-Tetradecane; the hydrocarbons comprise Bicyclo[4.4.1]undeca-1,3,5,7,9-pentaen-1, 3-Isopropoxy-1,1,1,7,7,7-hexamethyl-3,5, the alkenes comprise 3-Cyclohexene-1-methanol, Caryophyllene oxide, Junipene; the aromatics comprise Ethylbenzene, pentamethyl-Benzene, 2-methyl-Naphthalene, (+)-Aromadendrene; the aliphatics comprise 1-chloro-Nonadecane, 1-chloro-Octadecane. Additionally, the flavor substances in the *Stevia* plant should also contain any new possible flavor substances from new *Stevia* varieties by hybridizing, grafting and other cultivating methods.

A flavoring agent, other than a flavor derived from a Maillard reaction product as described herein, can be added to the compositions described herein before or after a Maillard reaction has been effected. Suitable flavoring agents include, for example, natural flavors, vitamins, such as vitamin C, artificial flavors, spices, seasonings, and the like. Exemplary flavor agents include synthetic flavor oils and flavoring aromatics and/or oils, uronic acids (e.g., glucuronic acid and galacturonic acid) or oleoresins, essences, and distillates, and a combination comprising at least one of the foregoing.

During the Maillard reaction or following completion of the Maillard reaction, "top note" agents may be added, which are often quite volatile, vaporizing at or below room temperature. "Top notes" are often what give foods their fresh flavors. Suitable top note agents include but are not limited to, for example, furfuryl mercaptan, methional, nonanal, trans,trans-2,4-decadienal, 2,2'-(dithiodimethylene) difuran, 2-methyl-3-furanthiol, 4-methyl-5-thiazoleethanol, pyrazineethanethiol, bis(2-methyl-3-furyl) disulfide, methyl furfuryl disulfide, 2,5-dimethyl-2,5-dihydroxy-1,4-dithiane, 95%, trithioacetone, 2,3-butanedithiol, methyl 2-methyl-3-furyl disulfide, 4-methylnonanoic acid, 4-methyloctanoic acid, or 2-methyl-3-tetrahydrofuranthiol.

Flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors, such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, and so forth.

Additional exemplary flavors imparted by a flavoring agent include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, a wasabi (Japanese horseradish) flavor; a nut flavor, such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Generally any flavoring agent or food additive, such as those described in "Chemicals Used in Food Processing", Publication No 1274, pages 63-258, by the National Academy of Sciences, can be used. This publication is incorporated herein by reference.

As used herein, a "flavoring agent" or "flavorant" herein refers to a compound or an ingestibly acceptable salt or solvate thereof that induces a flavor or taste in an animal or a human. The flavoring agent can be natural, semi-synthetic, or synthetic. Suitable flavorants and flavoring agent additives for use in the compositions of the present application include, but are not limited to, vanillin, vanilla extract, mango extract, cinnamon, citrus, coconut, ginger, viridiflorol, almond, bay, thyme, cedar leaf, nutmeg, allspice, sage, mace, menthol (including menthol without mint), an essential oil, such as an oil produced from a plant or a fruit, such as peppermint oil, spearmint oil, other mint oils, clove oil, cinnamon oil, oil of wintergreen, or an oil of almonds; a plant extract, fruit extract or fruit essence from grape skin extract, grape seed extract, apple, banana, watermelon, pear, peach, grape, strawberry, raspberry, cherry, plum, pineapple, apricot, a flavoring agent comprising a citrus flavor, such as an extract, essence, or oil of lemon, lime, orange, tangerine, grapefruit, citron, kumquat, or combinations thereof. Flavorants for use in the present application include both natural and synthetic substances which are safe for humans or animals when used in a generally accepted range.

Non-limiting examples of proprietary flavorants include Dohler™ Natural Flavoring Sweetness Enhancer K14323 (Dohler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

In the any of the embodiments described in the present application, the flavoring agent is present in the composition of the present application in an amount effective to provide a final concentration of about 0.1 ppm, 0.5 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120 ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm, 380 ppm, 400 ppm, 425 ppm, 450 ppm, 475 ppm, 500 ppm, 550 ppm, 600 ppm, 650 ppm, 700 ppm, 750 ppm, 800 ppm, 850 ppm, 900 ppm, 950 ppm, 1000 ppm, 1500 ppm, 2000 ppm, 2500 ppm, 3000 ppm, 3500 ppm, 4000 ppm, 4500 ppm, 5000 ppm, 6000 ppm, 7000 ppm, 8000 ppm, 9000 ppm, 10,000 ppm, 11,000 ppm, 12,000 ppm, 13,000 ppm, 14,000 ppm, or 15,000 ppm; or to provide a final concentration corresponding to any one of the aforementioned values in this paragraph; or to provide a final concentration range corresponding to any pair of the aforementioned values in this paragraph.

In more particular embodiments, the flavoring agent is present in the composition of the present application in an amount effective to provide a final concentration ranging from 10 ppm to 1000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 75 ppm to 600 ppm, from 75 ppm to 500 ppm, from 75 ppm to 400 ppm, from 75 ppm to 300 ppm, from 75 ppm to 200 ppm, from 75 ppm to 100 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm; or to provide a final concentration corresponding to any one of the aforementioned values in this paragraph; or to provide a final concentration range corresponding to any pair of the aforementioned values in this paragraph.

E. Maillard Reaction Conditions

Maillard reaction conditions are affected by temperature, pressure, pH, reaction times, ratio of different reactants, type of solvent(s) and solvents-to-reactants ratio. Accordingly, in certain embodiments, the reaction mixture may include a pH regulator, which can be an acid or a base. Suitable base regulators include, for example, sodium hydroxide, potassium hydroxide, baking powder, baking soda any useable food grade base salts including alkaline amino acids. Additionally, the Maillard reaction can be conducted in the presence of alkalinic amino acids without the need of an additional base where the alkaline amino acid serves as the base itself. The pH of the reaction mixture can be maintained at any pH suitable for the Maillard reaction. In certain embodiments, the pH is maintained at a pH of from about 2 to about 14, from about 2 to about 7, from about 3 to about 9, from about 4 to about 6, from about 7 to about 14, from about 8 to about 10, from about 9 to about 11, from about 10 to about 12, or any pH range derived from these integer values. In certain embodiments, the reaction mixture contains less than 95 wt %, less than 90 wt %, less than 80 wt %, less than 70 wt %, less than 60 wt %, less than 50 wt %, less than 40 wt %, less than 30 wt %, less than 20 wt %, less than 15 wt %, or less than 10 wt % or less than 5 wt %, less than 1 wt % solvent.

In any of the embodiments described in the present application, the reaction temperature in any of the MRP reaction mixtures described in the present application may be 0° C., 5° C., 10° C., 20° C., 25° C., 30° C., 35° C., 40° C., 50° C., 55° C., 60° C., 65° C., 70° C., 80° C., 90° C., 100° C., 110° C., 120° C., 125° C., 130° C., 135° C., 140° C., 150° C., 155° C., 160° C., 165° C., 170° C., 180° C., 190° C., 200° C., 210° C., 220° C., 225° C., 230° C., 235° C., 240° C., 250° C., 255° C., 260° C., 265° C., 270° C., 280° C., 290° C., 300° C., 400° C., 500° C., 600° C., 700° C., 800° C., 900° C., 1000° C., or any temperature range defined by any two temperature values in this paragraph.

In more particular embodiments, the reaction temperature in any of the MRP reaction mixtures described in the present application may range from 0° C. to 1000° C., 10° C. to 300° C., from 15° C. to 250° C., from 20° C. to 250° C., from 40° C. to 250° C., from 60° C. to 250° C., from 80° C. to 250° C., from 100° C. to 250° C., from 120° C. to 250° C., from 140° C. to 250° C., from 160° C. to 250° C., from 180° C. to 250° C., from 200° C. to 250° C., from 220° C. to 250° C., from 240° C. to 250° C., from 30° C. to 225° C., from 50° C. to 225° C., from 70° C. to 225° C., from 90° C. to 225° C., from 110° C. to 225° C., from 130° C. to 225° C., from 150° C. to 225° C., from 170° C. to 225° C., from 190° C. to 225° C., from 210° C. to 225° C., from 80° C. to 200° C., from 100° C. to 200° C., from 120° C. to 200° C., from 140° C. to 200° C., from 140° C. to 200° C., from 160° C. to 200° C., from 180° C. to 200° C., from 90° C. to 180° C., from 100° C. to 180° C., from 110° C. to 180° C., from 120° C. to 180° C., from 130° C. to 180° C., from 140° C. to 180° C., from 150° C. to 180° C., from 160° C. to 180° C., from 80° C. to 160° C., from 90° C. to 160° C., from 100° C. to 160° C., from 110° C. to 160° C., from 120° C. to 160° C., from 130° C. to 160° C., from 140° C. to 160° C., from 150° C. to 160° C., from 80° C. to 140° C., from 90° C. to 140° C., from 100° C. to 140° C., from 110° C. to 140° C., from 120° C. to 140° C., from 130° C. to 140° C., from 80° C. to 120° C., from 85° C. to 120° C., from 90° C. to 120° C., from 95° C. to 120° C., from 100° C. to 120° C., from 110° C. to 120° C., from 115° C. to 120° C., from 80° C. to 100° C., from 85° C. to 100° C., from 90° C. to 100° C., from 95° C. to 100° C.; or any aforementioned temperature value in this paragraph, or a temperature range defined by any pair of the aforementioned temperature values in this paragraph.

Maillard reaction(s) can be conducted either under open or sealed conditions. The reaction time is generally from a few seconds to about 100 hours, more particularly from about a few minutes to about 24 hours, from about a few minutes to about 12 hours, from about a few minutes to about 8 hours, from a few minutes to about 5 hours, from about 10 minutes to about 1 hour, from about 20 minutes to about 40 minutes, from about 1 hour to about 3 hours, from about 2 hours to about 4 hours, or any time range thereof. Depending on the desired taste, the reaction can be terminated at any time. The Maillard reaction mixture can contain unreacted reactants, degraded substances from the reactants, pH regulator(s), and/or salt(s).

The Maillard reactions can be conducted at atmospheric pressure or under pressure. When conducted under pressure, the reaction mixture may be subjected to constant pressure or it may be subjected to varying pressures over time. In certain embodiments, the pressure in the reaction vessel is at least 10 MPa, at least 20 MPa, at least 30 MPa, at least 40 MPa, at least 50 MPa, at least 75 MPa, at least 100 MPa, at least 150 MPa, at least 200 MPa, at least 250 MPa, at least 300 MPa, at least 400 MPa, at least 500 MPa, at least 600 MPa, at least 700 MPa, at least 800 MPa, and any pressure range derived from the aforementioned pressure values.

In some embodiments, it is desirable to suppress the Maillard reaction, in part. This can be achieved by exercising one or more of the following approaches, including the use of raw materials that are not susceptible to browning, adjusting the factors affecting the browning velocity of Maillard reaction, lowering the temperature, lowering pH, adjusting water activity, increasing the level of oxygen, using oxidant, introducing enzymes, etc.

In certain embodiments, the use of low solubility- or insoluble amino acids in the Maillard reaction may result in insoluble reactants present in the final MRP composition. In such cases, filtration may be used to remove any insoluble components present in the MRP compositions.

F. Reactant Contents and Reaction Products

In the embodiments of the present application, any one of the high intensity natural sweetening agents described herein, such as steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, and dulcoside A, mogrosides, glycosylated mogrosides, GSGs, SGs, rubusosides, glycosylated rubusosides, suaviosides, glycosylated suaviosides, sweet tea extracts, glycosylated sweet tea extracts, as well as those included in Table A; high intensity synthetic sweetening agents described herein; any one of the sweetener enhancers described herein; any one of the reducing sugars described herein; any one of the sweetening agents described herein; any one of the non-reducing sugars described herein; any NSG substances and glycosylated NSG substance described herein, and any one of the amine donors described herein; may be present, individually or collectively in the Maillard reaction, the MRP composition or compositions described herein in an amount of 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt % and all ranges between 1 and 100 wt %, for example less than about 70 wt %, less than about 50 wt %, from about 1 wt % to about 99 wt %, from about 1 wt % to about 98 wt %, from about 1 wt % to about 97 wt %, from about 1 wt % to about 95 wt %, from about 1 wt % to about 90 wt %, from about 1 wt % to about 80 wt %, from about 1 wt % to about 70 wt %, from about 1 wt % to about 60 wt %, from about 1 wt % to about 50 wt %, from about 1 wt % to about 40 wt %, from about 1 wt % to about 30 wt %, from about 1 wt % to about 20 wt %, from about 1 wt % to about 10 wt %, from about 1 wt % to about 5 wt %, from about 2 wt % to about 99 wt %, from about 2 wt % to about 98 wt %, from about 2 wt % to about 97 wt %, from about 2 wt % to about 95 wt %, from about 2 wt % to about 90 wt %, from about 2 wt % to about 80 wt %, from about 2 wt % to about 70 wt %, from about 2 wt % to about 60 wt %, from about 2 wt % to about 50 wt %, from about 2 wt % to about 40 wt %, from about 2 wt % to about 30 wt %, from about 2 wt % to about 20 wt %, from about 2 wt % to about 10 wt %, from about 2 wt % to about 5 wt %, from about 3 wt % to about 99 wt %, from about 3 wt % to about 98 wt %, from about 3 wt % to about 97 wt %, from about 3 wt % to about 95 wt %, from about 3 wt % to about 90 wt %, from about 3 wt % to about 80 wt %, from about 3 wt % to about 70 wt %, from about 3 wt % to about 60 wt %, from about 3 wt % to about 50 wt %, from about 3 wt % to about 40 wt %, from about 3 wt % to about 30 wt %, from about 3 wt % to about 20 wt %, from about 3 wt % to about 10 wt %, from about 3 wt % to about 5 wt %, from about 5 wt % to about 99 wt %, from about 5 wt % to about 98 wt %, from about 5 wt % to about 97 wt %, from about 5 wt % to about 95 wt %, from about 5 wt % to about 90 wt %, from about 5 wt % to about 80 wt %, from about 5 wt % to about 70 wt %, from about 5 wt % to about 60 wt %, from about 5 wt % to about 50 wt %, from about 5 wt % to about 40 wt %, from about 5 wt % to about 30 wt %, from about 5 wt % to about 20 wt %, from about 5 wt % to about 10 wt %, from about 10 wt % to about 99 wt %, from about 10 wt % to about 98 wt %, from about 10 wt % to about 97 wt %, from about 10 wt % to about 95 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40 wt %, from about 10 wt % to about 30 wt %, from about 10 wt % to about 20 wt %, from about 20 to less than about 50 wt %, from about 30 wt % to about 50 wt %, from about 40 to about 50 percentage by weight, and from about 20 to 45 percentage by weight of the sweetening agent composition.

In a particular embodiment, where the Maillard reaction (MR) reactants are limited to a high intensity natural sweetening agent in combination with one or more amino donors, such as one or more amino acids, the ratio of the high intensity natural sweetening agent to the one or more amino acids may be between 99:1 and 85:15, between 95:5 and 90:10, between 90:10 and 85:15, or any ratio or any range derived from any of the aforementioned ratios. Further among these embodiments, where two amino donors or two amino acids are used in the Maillard reaction, the ratio of the amino donors or amino acids to one another may range between 5:1 and 1:5, between 4:1 and 1:4, between 3:1 and 1:3, between 2:1 and 1:2, or any ratio or any range derived from any of the aforementioned ratios.

In one aspect, in an exemplary composition having two different components, the components can have ratios of from 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51 and 50:50, and all ranges therebetween wherein the ratios are from 1:99 and vice versa, e.g., a ratio of from 1:99 to 50:50, from 30:70 to 42:58, etc.

It should be understood that the different components can be sweeteners, non-nutritive sweeteners, individual components of sweeteners, such as RA, RB, RD, RM, etc., components of *Stevia* extracts, components of mogroside extracts, etc.

Generally in the compositions described herein, there is an excess of Maillard reaction product(s) so if there is a sweetener or sweetener enhancer present, it is present in a lesser amount by weight in comparison to the Maillard reaction product(s). Ratios of Maillard reaction product(s) to sweetener enhancer(s) may range from e.g., 100:1 to 1:100 with all ratios therebetween, including for example 10:1, 20:1, 30:1, 40:1, 50:1, 60:1, 70:1, 80:1, 90:1 and including integer values there between, including for example, 2:1, 3:1, 4:1, 5:1, 6:1, 7:1, 8:1, 9:1, 11:1, 12:1, etc. Alternatively, the ratios are from 1:10, 1:20, 1:30, 1:40, 1:50, 1:60, 1:70, 1:80, 1:90 and including integer values there between, including for example, 1:2, 1:3, 1:4, 1:5, 1:6, 1:7, 1:8, 1:9, 1:11, 1:12, etc.

In another aspect, in an exemplary MRP composition having three different components, e.g., SGs, the components can have ratios of from 1:1:98, 1:2:97, 1:3:96, 1:4:95, 1:5:94, 1:6:93, 1:7:92, 1:8:91, 1:9:90, 1:10:89, 1:11:88, 1:12:87, 1:13:86, 1:14:85, 1:15:84, 1:16:83, 1:17:82, 1:18:81, 1:19:80, 1:20:79, 1:21:78, 1:22:77, 1:23:76, 1:24:75, 1:25:74, 1:26:73, 1:27:72, 1:28:71, 1:29:70, 1:30:69, 1:31:68, 1:32:67, 2:3:95, 2:4:94, 2:5:93, 2:6:92, 2:7:91, 2:8:90, 2:9:89, 2:10:88, 2:11:87, 2:12:86, 2:13:85, 2:14:84, 2:15:83, 2:16:82, 2:17:81, 2:18:80, 2:19:79, 2:20:78, 2:21:77, 2:22:76, 2:23:75, 2:24:74, 2:25:73, 2:26:72, 2:27:71, 2:28:70, 2:29:69, 2:30:68, 2:31:67, 2:32:66, 2:3:95, 3:3:94, 3:4:93, 3:5:92, 3:6:91, 3:7:90, 3:8:89, 3:9:88, 3:10:87, 3:11:86, 3:12:85, 3:13:84, 3:14:83, 3:15:82, 3:16:81, 2:17:80, 3:18:79, 3:19:78, 3:20:77, 3:21:76, 3:22:75, 3:23:74, 3:24:73, 3:25:72, 3:26:71, 3:27:70, 3:28:69, 3:29:68, 3:30:67, 3:31:66, 3:32:65, 4:4:92, 4:5:91, 4:6:90, 4:7:89, 4:8:88, 4:9:87, 4:10:86, 4:11:85, 4:12:84, 4:13:83, 4:14:82, 4:15:81, 4:16:80, 4:17:79, 4:18:78, 4:19:77, 4:20:76, 4:21:75, 4:22:74, 4:23:73, 4:24:72, 4:25:71, 4:26:70, 4:27:69, 4:28:68, 4:29:67, 4:30:66, 4:31:65, 4:32:64, 5:5:90, 5:6:89, 5:7:88, 5:8:87, 5:9:86, 5:10:85, 5:11:84, 5:12:83, 5:13:82, 5:14:81, 5:15:80, 5:16:79, 5:17:78, 5:18:77, 5:19:76, 5:20:75, 5:21:74, 5:22:73, 5:23:72, 5:24:71, 5:25:70, 5:26:69, 5:27:68, 5:28:67, 5:29:66, 5:30:65, 5:31:64, 5:32:63, 6:6:88, 6:7:87, 6:8:86, 6:9:85, 6:10:84, 6:11:83, 6:12:82, 6:13:81, 6:14:80, 6:15:79, 6:16:78, 6:17:77, 6:18:76, 6:19:75, 6:20:74, 6:21:73, 6:22:72, 6:23:71, 6:24:70, 6:25:69, 6:26:68, 6:27:67, 6:28:66, 6:29:65, 6:30:64, 6:31:63, 6:32:62, 7:7:86, 7:8:85, 7:9:84, 7:10:83, 7:11:82, 7:12:81, 7:13:80, 7:14:79, 7:15:78, 7:16:77, 7:17:76, 7:18:75, 7:19:74, 7:20:73, 7:21:72, 7:22:71, 7:23:70, 7:24:69, 7:25:68, 7:26:67, 7:27:66, 7:28:65, 7:29:64, 7:30:63, 7:31:62, 7:32:61, 8:8:84, 8:9:83, 8:10:82, 8:11:81, 8:12:80, 8:13:79, 8:14:78, 8:15:77, 8:16:76, 8:17:75, 8:18:74, 8:19:73, 8:20:72, 8:21:71, 8:22:70, 8:23:69, 8:24:68, 8:25:67, 8:26:66, 8:27:65, 8:28:64, 8:29:63, 8:30:62, 8:31:61, 8:32:60, 9:9:82, 9:10:81, 9:11:80, 9:12:79, 9:13:78, 9:14:77, 9:15:76, 9:16:75, 9:17:74, 9:18:73, 9:19:72, 9:20:71, 9:21:70, 9:22:69, 9:23:68, 9:24:67, 9:25:66, 9:26:65, 9:27:64, 9:28:63, 9:29:62, 9:30:61, 9:31:60, 9:32:59, 10:10:80, 10:11:79, 10:12:78, 10:13:77, 10:14:76, 10:15:75, 10:16:74, 10:17:73, 10:18:72, 10:19:71, 10:20:70, 10:21:69, 10:22:68, 10:23:67, 10:24:66, 10:25:65, 10:26:64, 10:27:63, 10:28:62, 10:29:61, 10:30:60, 10:31:59, 10:32:58, 11:11:78, 11:12:77, 11:13:76, 11:14:75, 11:15:74, 11:16:73, 11:17:72, 11:18:71, 11:19:70, 11:20:69, 11:21:68, 11:22:67, 11:23:66, 11:24:65, 11:25:64, 11:26:63, 11:27:62, 11:28:61, 11:29:60, 11:30:59, 11:31:58, 11:32:57, 12:12:76, 12:13:75, 12:14:74, 12:15:73, 12:16:72, 12:17:71, 12:18:70, 12:19:69, 12:20:68, 12:21:67, 12:22:66, 12:23:65, 12:24:64, 12:25:63, 12:26:62, 12:27:61, 12:28:60, 12:29:59, 12:30:58, 12:31:57, 12:32:56, 13:13:74, 13:14:73, 13:15:72, 13:16:71, 13:17:70, 13:18:69, 13:19:68, 13:20:67, 13:21:66, 13:22:65, 13:23:64, 13:24:63, 13:25:62, 13:26:61, 13:27:60, 13:28:59, 13:29:58, 13:30:57, 13:31:56, 13:32:55, 14:14:72, 14:15:71, 14:16:70, 14:17:69, 14:18:68, 14:19:67, 14:20:66, 14:21:65, 14:22:64, 14:23:63, 14:24:62, 14:25:61, 14:26:60, 14:27:59, 14:28:58, 14:29:57, 14:30:56, 14:31:55, 14:32:54, 15:15:70, 15:16:69, 15:17:68, 15:18:67, 15:19:66, 15:20:65, 15:21:64, 15:22:63, 15:23:62, 15:24:61, 15:25:60, 15:26:59, 15:27:58, 17:28:57, 15:29:56, 15:30:55, 15:31:54, 15:32:53, 16:16:68, 16:17:67, 16:18:66, 16:19:65, 16:20:64, 16:21:63, 16:22:62, 16:23:61, 16:24:60, 16:25:59, 16:26:58, 16:27:57, 16:28:56, 16:29:55, 16:30:54, 16:31:53, 16:32:52, 17:17:66, 17:18:65, 17:19:64, 17:20:63, 17:21:62, 17:22:61, 17:23:60, 17:24:59, 17:25:58, 17:26:57, 17:27:56, 17:28:55, 17:29:54, 17:30:53, 17:31:52, 17:32:51, 18:18:64, 18:19:63, 18:20:62, 18:21:61, 18:22:60, 18:23:59, 18:24:58, 18:25:57, 18:26:56, 18:27:55, 18:28:54, 18:29:53, 18:30:52, 18:31:51, 18:32:50, 19:19:62, 19:20:61, 19:21:60, 19:22:59, 19:23:58, 19:24:57, 19:25:56, 19:26:55, 19:27:54, 19:28:53, 19:29:52, 19:30:51, 19:31:50, 19:32:49, 20:20:60, 20:21:59, 20:22:58, 20:23:57, 20:24:56, 20:25:55, 20:26:54, 20:27:53, 20:28:52, 20:29:51, 20:30:50, 20:31:49, 20:32:48, 21:21:58, 21:22:57, 21:23:56, 21:24:55, 21:25:54, 21:26:53, 21:27:52, 21:28:51, 21:29:50, 21:30:49, 21:31:48, 21:32:47, 22:22:56, 22:23:55, 22:24:54, 22:25:53, 22:26:52, 22:27:51, 22:28:50, 22:29:49, 22:30:48, 22:31:47, 22:32:46, 23:23:54, 23:24:53, 23:25:52, 23:26:51, 23:27:50, 23:28:49, 23:29:48, 23:30:47, 23:31:46, 23:32:45, 24:24:52, 24:25:51, 24:26:50, 24:27:49, 24:28:48, 24:29:47, 24:30:46, 24:31:45, 24:32:44, 25:25:50, 25:26:49, 25:27:48, 25:28:47, 25:29:46, 25:30:45, 25:31:44, 25:32:43, 26:26:48, 26:27:47, 26:28:46, 26:29:45, 26:30:44, 26:31:43, 26:32:42, 27:27:46, 27:28:45, 27:29:44, 27:30:43, 27:31:42, 27:32:41, 28:28:44, 28:29:43, 28:30:42, 28:31:41, 28:32:40, 29:29:42, 29:30:41, 29:31:40, 29:32:39, 30:30:40, 30:31:39, 30:32:38, 31:31:38, 31:32:37, 32:32:36, 32:33:35, and 33.3:33.3:33.3, and all ranges therebetween wherein the ratios are from 1:1:98 and vice versa, e.g., a ratio of from 1:1:98 to 33.3:33.3:33.3, from 10:30:70 to 15:40:45, etc.

It should be understood that the different components can be sweeteners, non-nutritive sweeteners, individual components of sweeteners, such as RA, RB, RD, RM, etc., components of *Stevia* extracts, components of mogroside extracts, etc.

It should be noted that the present disclosure is not limited to compositions having only two or three different components, e.g., SGs, MGs, GSGs, GMGs, non-nutritive sweeteners, etc. herein, and that the exemplary ratios are non-limiting. Rather, the same formula can be followed for establishing ratios of as many different components as are contained within a given composition. As a further example, in a composition that comprises 20 different components described herein, the components can have ratios of from 1:1:1:1:1:1:1:1:1:1:1:1:1:1:1:1:1:1:1:81 to 5:5:5:5:5:5:5:5:5:5:5:5:5:5:5:5:5:5:5:5, and all possible combinations of ratios therebetween. In some embodiments, a composition of the present disclosure may have up to and including a combination of all compounds, for example but not limited to, those in Table 2.

In any of the embodiments described in the present application, one or more components may be added before, during, or after the Maillard reaction to a composition or product, or may be added to an MRP composition, or may be added to a consumable product, such as beverage product or food product, wherein any one of the components is present in any of the aforementioned composition(s) or product(s) at a parts-per-million (ppm) basis (or concentration) relative to the other contents in a composition or product, wherein the one or more components are selected from any one of the high intensity natural sweeteners described herein; any one of the high intensity synthetic sweeteners described herein; any one of the sweetener enhancers described herein; any one of the reducing sugars described herein; any one of the sweetening agents described herein; any one of the non-reducing sugars described herein; any one of the amine donors described herein; any one of the flavor substances described herein, or any of the additional additives described herein, such that any one of these component(s) is present in a reaction mixture, composition or consumable product at a final concentration of about 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In any of the embodiments described in the present application, one or more components may be added before, during, or after the Maillard reaction to a composition or product, or may be added to an MRP composition, or may be added to a consumable product, such as beverage product or food product, wherein any one of the components is present in any of the aforementioned composition(s) or product(s) at a parts-per-million (ppm) basis (or concentration) relative to the other contents in a composition or product, wherein the one or more components are selected from any one of the high intensity natural sweeteners described herein; any one of the high intensity synthetic sweeteners described herein; any one of the sweetener enhancers described herein; any one of the reducing sugars described herein; any one of the sweetening agents described herein; any one of the non-reducing sugars described herein; any one of the amine donors described herein; any one of the flavor substances described herein, or any of the additional additives described herein, such that any one of these component(s) is present in a reaction mixture, composition or consumable product at a final concentration from about 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph.

As used herein, "final concentration" refers to the concentration of, for example, any one of the aforementioned components present in any final composition or final orally consumable product (i.e., after all ingredients and/or compounds have been added to produce the composition or to produce the orally consumable product).

In some embodiments, one or more components may be added to the Maillard reaction or added to an MRP composition formed therefrom, wherein any one of the components is expressed in terms of its purity. Thus, with regard to any one of the high intensity natural sweetening agents described herein; any one of the high intensity synthetic sweetening agents described herein; any one of the sweetener enhancers described herein; any one of the reducing sugars described herein; any one of the sweetening agents described herein; any one of the non-reducing sugars described herein; and any one of the amine donors described herein; any one of the components may be characterized by a level of purity of about 50% to about 100% by weight, about 55% to about 100% by weight, about 60% to about 100% by weight, about 65% to about 100% by weight, about 70% to about 100% by weight, about 75% to about 100% by weight, about 80% to about 100% by weight, about 85% to about 100% by weight, about 86% to about 100% by weight, about 87% to about 100% by weight, about 88% to about 100% by weight, about 89% to about 100% by weight, about 90% to about 100% by weight, about 91% to about 100% by weight, about 92% to about 100% by weight, about 93% to about 100% by weight, about 94% to about 100% by weight, about 95% to about 100% by weight, about 96% to about 100% by weight, about 97% to about 100% by weight, about 98% to about 100% by weight, about 99% to about 100% by weight, or any range defined by any two of the aforementioned values. Alternatively, the purity of the component (w/w) may be at least 50%, at least 55%, at least 60%, at least 65%, at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, at least 99.9%, at least 100%, or any range defined by any two of the aforementioned values.

A general method to prepare *Stevia* derived Maillard reaction product(s) is described as follows. Briefly, an SG or *Stevia* extract is dissolved with or without a sugar donor, and together with amino acid donor in water, followed by heating of the solution at an elevated temperature, for example from about 50 to about 200 degrees centigrade. The reaction time can be varied from more than one second to a few days, more generally a few hours, until Maillard reaction products (MRPs) are formed or the reaction components have been exhausted or the reaction has been completed, with or without formation of caramelization reaction products (CRPs), which are further described below. When required, a pH adjuster or pH buffer can be added to regulate the pH of the reaction mixture before, during or after reaction as further described herein. The resultant solution is dried by spray dryer or hot air oven to remove the water and to obtain the MRP(s).

Interestingly, when a reaction mixture is dried to a powder, such as by spray drying, the resultant powders only have a slight smell associated with them. This is in contrast to regular powdered flavoring agents that generally have a strong smell. The dried powdered reaction mixtures of the embodiments, when dissolved in a solvent, such as water or alcohol or mixtures thereof, release the smell. This demonstrates that the volatile substances of the Maillard reaction products can be preserved by steviol glycosides present in the reaction products and processes employing the compositions of the present application. Powders with strong odor can be obtained too, particularly where the carrier, such as *Stevia* extract, is much less compared with MRPs flavors or strong flavor substances are used during Maillard reaction.

The Maillard reaction is conducted with a suitable solvent. Additionally, solvents can be employed along with water. Suitable solvents approved for oral use include, for example, alcohols, such as low molecular weight alcohols, e.g., methanol, ethanol, propanol, butanol, pentanol, hexanol, ethylene glycol, propylene glycol, butyl glycol, etc. The following additional solvents may be used in the Maillard reaction or may act as carriers for Maillard reaction products: acetone, benzyl alcohol, 1,3-butylene glycol, carbon dioxide, castor oil, citric acid esters of mono- and diglycerides, ethyl acetate, ethyl alcohol, ethyl alcohol denatured with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

Although recognizing that other suitable solvents may be used for flavoring agents, the The International Organization of the Flavor Industry (IOFI) Code of Practice (Version 1.3, dated Feb. 29, 2012) lists the following solvents as being appropriate for use in flavoring agents: acetic acid, benzyl alcohol, edible oils, ethyl alcohol, glycerol, hydrogenated vegetable oils, iso-propy alcohol, mannitol, propylene glycol, sorbitol, sorbitol syrup, water, and xylitol. Accordingly, in certain embodiments, these are preferred solvents.

In some embodiments, the Maillard reaction mixtures may further include one or more carriers (or flavor carriers) considered acceptable for use in flavoring agents are therefore suitable for use as solvents for the Maillard reaction: acetylated distarch adipate, acetylated distarch phosphate, agar agar, alginic acid, beeswax, beta-cyclodextrine, calcium carbonate, calcium silicate, calcium sulphate, candelilla wax, carboxymethyl cellulose, Na salt, carnauba wax, carrageenan, microcrystalline cellulose, dextran, dextrin, diammonium phosphate, distarch phosphate, edible fats, elemi resin, ethyl lactate, ethyl cellulose, ethyl hydroxyethyl cellulose, ethyl tartrate, gelatin, gellan gum, ghatti gum, glucose, glyceryl diacetate, glyceryl diesters of aliphatic fatty acids C6-C18, glyceryl monoesters of aliphatic fatty acids C6-C18, gyceryl triacetate (triacetin), glyceryl triesters of aliphatic fatty acids C6-C18, glyceryl tripropanoate, guar gum, gum arabic, hydrolyzed vegetable protein, hydroxyproplymethyl cellulose, hydroxypropyl cellulose, hydroxypropyl distarch phosphate, hydroxypropyl starch, karaya gum, konjac gum, lactic acid, lactose, locust bean gum (carob bean gum), magnesium carbonate, magnesium salts of fatty acids, maltodextrin, methyl cellulose, medium chain triglyceride, modified starches, such as acetylated distarch adipate, acetylated oxidized starch, acid-treated starch, alkaline treated starch, bleached starch, roasted starch dextrins, distarch phosphate, hydroxypropyl distarch phosphate, acetylated distarch phosphate, hydroxypropyl starch, monostarch phosphate, oxidized starch, phosphated distarch phosphate, starch acetate, starch sodium octenyl succinate, and enzyme treated starches; mono-, di- and tri-calcium orthophosphate, Na, K, $NH_4$ and Ca alginate, pectins, processed euchema seaweed, propylene glycol alginate, sodium chloride (salt), silicon dioxide, sodium aluminium diphosphate, sodium aluminium silicate, Sodium, potassium and calcium salts of fatty acids, starch, starch (sodium) octenyl succinate, starch acetate, sucro glycerides, sucrose, sucrose esters of fatty acids, type I and type II sucrose oligoesters, taragum, tragacanth, triethylcitrate, whey powder, and xanthan gum.

Generally, the amount of solvent is sufficient to dissolve the components or provide a heterogeneous mixture. For example, on a weight by weight basis, the amount of water to reaction products ratio is from about 100:1 to about 1:100, for example from about 6:1, 1:1 to about 1:4. Ratios for the Maillard reaction components to solvent are thus from 100:1 to 1:100, e.g., 1:99 to 80:20, with all ratios there between, including for example 10:1, 20:1, 30:1, 40:1, 50:1, 60:1, 70:1, 80:1, 90:1 and including integer values there between, including for example, 2:1, 3:1, 4:1, 5:1, 6:1, 7:1, 8:1, 9:1, 11:1, 12:1, etc. Alternatively, the ratios are from 1:10, 1:20, 1:30, 1:40, 1:50, 1:60, 1:70, 1:80, 1:90 and including integer values there between, including for example, 1:2, 1:3, 1:4, 1:5, 1:6, 1:7, 1:8, 1:9, 1:11, 1:12, etc.

When the reaction is completed, the product mixture does not need to be neutralized or it can be neutralized. Water and/or solvent(s) do not necessarily need to be removed but can be removed by distillation, spray drying or other known methods if the product is desired as a powder or liquid, whatever the case may be.

It should be understood that the Maillard reaction products can include one or more of the following components after the reaction has occurred. These components include, for example, remaining sweetening agent(s), remaining reducing sugar (sugar donor(s)), remaining amine donor(s), degraded sweetening agent(s); degraded sugar donor(s), degraded amine donor(s), possible salt(s) that occur naturally from the Maillard reaction process and/or added salt(s), remaining sweetener(s), degraded sweetener(s), remaining sweetener enhancer(s), degraded sweetener enhancer(s), MRP(s), CRP(s), additional MRP(s) added to the reaction product and/or additional CRP(s) added to the reaction product.

It should also be understood, for example, that the Maillard reaction can be performed such that there can be an excess of amine donor(s) in comparison to reducing sugar(s) or much less than the amount of reducing sugar present. In the first instance then the resultant Maillard reaction mixture would include remaining amine donor(s), degraded amine donor(s) and/or residue(s) or amine donor(s). Conversely, when there is less amine donor(s) present in the Maillard reaction, the amine donor(s) would be reacted during the course of the reaction. Likewise, in surprising results, where the reducing sugar is replaced with a sweetening agent (e.g., a material such as a *Stevia* extract that does not include a reactive aldehydic or ketone moiety) and subjected to amine donor(s), the amine donor(s) may be present in amounts that would be fully consumed by a Maillard type reaction or be present in an amount that would provide excess amine donor(s) and consequently amine donor(s), amine donor residue(s) and/or amine degradation product(s) would be present in the Maillard reaction mixture.

There are many ways to control the resulting MRPs. For instance, adjusting pH value, pressure, reaction time, addition of different ingredients, to optimize the ratio of raw materials etc. On top of it, the inventors found separation of MRPs products could be another method to have different types of flavor enhancers and flavors. MRPs consist of volatile substances and non-volatile substances. By evaporating the volatile substances, purified non-volatile substances can be obtained. These non-volatile substances (or products) can be used as flavor modifiers or with the top note of final products.

The volatile substances can be used as flavor or flavors enhancers, too. Partial separation of MRPs to remove partial volatile substances, further separation of volatile substances for instance by distillation etc., and non-volatile substances for instance by recrystallization, chromatograph etc. could be done to meet different targets of taste and flavor. Therefore, in this specification, MRPs include a composition including one or more volatile substances, one or more non-volatile substances or mixtures thereof. Non-volatile substances in MRPs or isolated from MRPs can provide a good mouth feel, umami and Kukumi taste.

*Stevia* extracts and MRP compositions derived therefrom contain volatile and unvolatile terpine and/or terpinoid substances that can be further purified in order to obtain substance providing a tasteful, sweet and/or aromatic profile. Treatment of *Stevia* extracts and S-MRP compositions using column chromatography, separation resins, and/or other separation methods, such as distillation, can be employed to retain most of the tasteful aroma terpine and/or terpinoid substances containing oxygen in the structure, while removing other unpleasant taste substances.

In some embodiments, a *Stevia* extract can be enriched for the presence of aromatic terpene substances containing oxygen in the structure. In particular, the inventors of the present application have found a way to enhance a citrus or tangerine taste by heat-treating a terpine- and/or terpinoid rich *Stevia* extract under acidic conditions comprising e.g., citric acid, tartaric acid, fumaric acid, lactic acid, malic acid etc., more preferably citric acid. In addition, substances such as linalool can react with citric acid with or without Maillard reaction. Vacuum distillation of fractions or column chromatography employing macroporous resins and/or silica gels, including ion exchange resins produced by Dow and Sunresin can be used for further purification.

In one embodiment, the present application provides a composition comprising a tangerine (or citrus) flavored *Stevia* extract and method for producing the same as further described in the Examples. In a particular embodiment, a method to produce a citrus flavored *Stevia* extract involves a heat process with or without Maillard reaction under acid conditions, more preferably in a Maillard reaction with citric acid.

One embodiment includes compositions comprising flavor substances from the *Stevia* plant or other natural sweetener plants described herein, including leaves, roots, seeds, etc. therefrom.

In some embodiments, vanilla, maltol or other flavor modifier product(s) "FMPs" can be added to the compositions described herein to further improve the taste. FMPs, such as maltol, ethyl-maltol, vanillin, ethyl vanillin, m-methylphenol, and m-n-propylphenol can further enhance the mouthfeel, sweetness and aroma of the MRP compositions described herein. Thus, in some embodiments, one or more FMPs may be added before or after the Maillard reaction, such as maltol, ethyl-maltol, vanillin, ethyl vanillin, m-methylphenol, m-n-propylphenol, or combinations thereof. In certain embodiments, MRPs and/or sweeteners may be combined with one or more FMPs. Particular MRP/FMP combinations include MRPs and maltol; MRPs and vanillin; sweetener(s) and maltol; sweetener(s) and vanillin etc. Such compositions may be used in any of the food or beverage products described herein.

Production of MRPs or S-MRPs may comprise the use of any of the following methodologies, including reflux at atmospheric pressure, reaction under pressure, oven drying, vacuum oven drying, roller/drum drying, surface scraped heat exchange, and/or extrusion.

G. Taste Profiles and Taste Testing of MRP and Other Compositions

The MRP and other compositions and methods described herein are useful for improved taste and aroma profiles relative to control samples and for other natural sweeteners and mixtures therefrom, including but not limited to licorice, thaumatin etc., and mixtures with steviol glycosides, mogrosides, rubusosides etc. The phrase "taste profile", which is interchangeable with "sensory profile" and "sweetness profile", may be defined as the temporal profile of all basic tastes of a sweetener. The "temporal profile" may be considered to represent the intensity of sweetness perceived over time in tasting of the composition by a human, especially a trained "taster". Carbohydrate and polyol sweeteners typically exhibit a quick onset followed by a rapid decrease in sweetness, which disappears relatively quickly on swallowing a food or beverage containing the same. In contrast, high intensity natural sweeteners typically have a slower sweet taste onset reaching a maximal response more slowly, followed by a decline in intensity more slowly than with carbohydrate and polyol sweeteners. This decline in sweetness is often referred to as "sweetness linger" and is a major limitation associated with the use of high intensity natural sweeteners.

In the context of taste tasting, the terms "improve", "improved" and "improvement" are used interchangeably with reference to a perceived advantageous change in a composition or consumable product upon introduction of an MRP or other composition of the present application from the original taste profile of the composition or consumable product without the added MRP or other composition in any aspect, such as less bitterness, better sweetness, better sour taste, better aroma, better mouth feel, better flavor, less aftertaste, etc. Depending on the nature of the reactants, ingredients added, and dosages used in the reaction mixtures or MRP and other compositions described herein, the terms "improve" or "improvement" can refer to a slight change, a change, or a significant change of the original taste profile, etc., which makes the composition more palatable to an individual.

In some embodiments, the MRP and other compositions and methods described herein are useful for improving the taste and aroma profiles for other synthetic sweeteners, including but not limited to sucralose, ACE-K, aspartame, sodium saccharin, and mixtures thereof.

In some embodiments, the MRP and other compositions of the present application may be evaluated with reference to the degree of their sucrose equivalence. Accordingly, the MRP and other compositions of the present application may be diluted or modified with respect to its ingredients to conform with this sucrose equivalence.

The onset and decay of sweetness when an MRP or other composition of the present application is consumed can be perceived by trained human tasters and measured in seconds from first contact with a taster's tongue ("onset") to a cutoff point (typically 180 seconds after onset) to provide a "temporal profile of sweetness". A plurality of such human tasters is called a "sensory panel." In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness". Aromas from aroma producing substances are volatile compounds which are perceived by the odor receptor sites of the smell organ, i.e., the olfactory tissue of the nasal cavity. They reach the receptors when drawn in through the nose (orthonasal detection) and via the throat after being released by chewing (retronasal detection). The concept of aroma substances, like the concept of taste substances, is to be used loosely, since a compound might contribute to the typical odor or taste of one food, while in another food it may cause a faulty odor or taste, or both, resulting in an off-flavor. Thus, sensory profile may include evaluation of aroma as well.

The term "mouth feel" involves the physical and chemical interaction of a consumable in the mouth. More specifically, as used herein, the term "mouth feel" refers to the fullness sensation experienced in the mouth, which relates to the body and texture of the consumable such as its viscosity. Mouth feel is one of the most important organoleptic properties and the major criteria that consumers use to judge the quality and freshness of foods. Subtle changes in a food and beverage product's formulation can change mouth feel significantly. Simply taking out sugar and adding a high intensity sweetener can cause noticeable alterations in mouth feel, making a formerly good product unacceptable to consumers. Sugar not only sweetens, it also builds body and viscosity in food and beverage products, and leaves a slight coating on the tongue. For example, reducing salt levels in soup changes not only taste, but can alter mouth feel as well. Primarily it is the mouth feel that is always the compliant with non-sugar sweeteners.

The inventors have surprisingly found Maillard reaction products, commonly taken as volatile substances, can provide great mouth feel and increase consumers' acceptance of using high intensity sweeteners in food and beverage products, preferably high intensity sweetener(s) involved during the Maillard reaction. Maillard reaction products can be used individually or combined with other sweeteners, especially "sugar-free" natural or synthetic sweeteners used for foods and beverages, such as tea, milk, coffee, chocolate etc. Advantageously, when using Maillard reaction products with high intensity sweeteners such as sucralose, the inventors surprisingly found that Maillard reaction products can act as flavor modifier products to improve the taste profile of high intensity natural sweeteners, such as steviol glycosides and/or high intensity synthetic sweeteners, such as sucralose, as reflected in overall-likeability, less lingering, less astringency, less bitterness, quick upfront sweetness, umami, sensation enjoyment, fullness etc. Therefore, MRPs can be excellent flavor enhancers when blended with e.g., steviol glycosides and/or sucralose. This can extend the utility of SGs and others natural or synthetic intensive sweeteners when used in beverages, dairy products, condiments, baked goods, oral care products and other consumable products, as described herein. Depending on the desired target, Maillard reaction products can provide high or low volatile substances especially low volatile flavors to enhance the overall enjoyment of steviol glycosides, sucralose and/or other natural, synthetic intensity sweeteners. Thus, the MRPs disclosed herein can be used as mouth feel enhancers.

The phrase "sweetness detection threshold" refers to the minimum concentration at which panelists consisting of 1-10 persons are able to detect sweetness in a composition, liquid or solid. This is further defined as provided in the Examples herein and are conducted by the methods described in *Sensory Testing for Flavorings with Modifying Properties* by Christie L. Harman, John B. Hallagan, and the FEMA Science, Committee Sensory Data Task Force, November 2013, Volume 67, No. 11 and Appendix A attached thereto, the teachings of which are incorporated herein by reference.

"Threshold of sweetness" refers to a concentration of a material below which sweetness cannot be detected, but can still impart a flavor to a consumable (including water). When half of a trained panel of testers determines something is "sweet" at a given concentration, then the sample meets the threshold. When less than half of a panel of testers cannot discern sweetness at a given concentration, then concentrations of the substance below the sweetness level are considered a flavoring agent.

It should be understood that the flavoring agents described herein, including non-steviol glycoside substances, glycosylated non-steviol glycoside substances and Maillard reaction products, can be used in combination with *Stevia* blends, including steviol glycosides, to encapsulate and reduce or eliminate the unwanted off taste of the *Stevia* component(s) present in the composition. There is a sequence of steps in Maillard reaction(s) that can be used to produce flavor(s). That is, there can be a first step where a first reaction takes place between a first sugar donor and a first amine donor under appropriate conditions followed by a second reaction with a second sugar donor and a second amine donor, and possible subsequent reactions to provide a complex flavorant composition that is a combination of various Maillard reaction products between, for example, the first sugar donor and first amine donor, along with the reaction between the first sugar donor and a second amine donor or a second sugar donor reacting with the first sugar donor, etc. under the Maillard reaction conditions described herein. The processes described herein can be used to preserve flavors.

For example, to dissolve any flavor or flavor combination in a dissolved steviol glycosides solution, afterwards, the solution could be ready to use, or it could be further concentrated to syrup or powder form. For evaluating the taste profile of a given MRP composition, a sample may be tested by e.g., a panel of 1-10 people. In some cases, a trained taster may independently taste the sample(s) first. The taster may be asked to describe the taste profile and score 0-5 according to the increasing sugar like, bitterness, aftertaste and lingering taste profiles. The taster may be allowed to re-taste, and then make notes for the sensory attributes perceived. Afterwards, another group of 1-10 tasters may similarly taste the sample(s), record its taste attributes and discuss the samples openly to find a suitable description. Where more than 1 taster disagrees with the results, the tasting may be repeated. For example, a "5" for sugar like is the best score for having a taste that is sugar like and conversely a value of 0 or near zero is not sugar like. Similarly, a "5" for bitterness, aftertaste and lingering is not desired. A value of zero or near zero means that the bitterness, aftertaste and/or lingering is reduced or is removed. Other taste attributes may include astringency and overall likeability.

H. Additional Additives

In some embodiments, the MRP or other composition of the present application further comprises one or more additional additives. For the MRP composition, the additives described herein may be added before or after the Maillard reaction. Exemplary additives include, but are not limited to, non-steviol glycoside substances, glycosylated non-steviol glycoside substances, salts, flavoring agents, minerals, organic acids and inorganic acids, polyols, nucleotides, bitter compounds, astringent compounds, proteins or protein hydrolysates, surfactants, gums and waxes, antioxidants, polymers, fatty acids, vitamins, preservatives, hydration agents, dietary fiber, glucosamine, probiotics, prebiotics, weight management agents, osteoporosis management agents, phytoestrogens, and phytosterols, as further described below.

H1. Salts

The Maillard reaction mixture and MRP products can further include a salt. The salt can be added during the Maillard reaction or after the reaction is complete. Suitable salts include, for example, sodium carbonate, sodium bicarbonate, sodium chloride, potassium chloride, magnesium chloride, sodium sulfate, magnesium sulfate, potassium sulfate or mixtures thereof. Salts may form during the Maillard reaction itself from reactants or degraded reactants and be present in the Maillard reaction product(s).

The salt(s) present in the Maillard reaction mixture can be from about 0 percent by weight to about 50 percent by weight, more particularly from about 0 percent to about 15 percent by weight, even more particularly from about 0 percent to about 5 percent by weight, e.g., 0.1, 0.2, 0.5, 0.75, 1, 2, 3 or 4 percent by weight of the Maillard reaction mixture.

The Maillard reaction product(s) and reaction mixture can include a sweetener. The sweetener can be added before, during the Maillard reaction or after the reaction is completed. Suitable sweeteners include non-nutritive sweeteners, such as for example, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, saccharin, or mixtures thereof.

The composition of the present application can comprise one or more salts. As used herein, the term "salt" refers to salts that retain the desired chemical activity of the compositions of the present application and are safe for human or animal consumption in a generally acceptable range.

The one or more salts may be organic or inorganic salts. Nonlimiting examples of salts include sodium carbonate, sodium bicarbonate, sodium chloride, potassium chloride, magnesium chloride, sodium sulfate, magnesium sulfate, and potassium sulfate, or any edible salt, for example calcium salts, metal alkali halides, metal alkali carbonates, metal alkali bicarbonates, metal alkali phosphates, metal alkali sulfates, biphosphates, pyrophospates, triphosphates, metaphosphates, and metabisulfates.

In some embodiments, the one or more salts are salts formed with metal cations such as calcium, bismuth, barium, magnesium, aluminum, copper, cobalt, nickel, cadmium, sodium, potassium, and the like, or with a cation formed from ammonia, N, N-dibenzylethylenediamine, D-glucosamine, ethanolamine, diethanolamine, triethanolamine, N-methylglucamine tetraethylammonium, or ethylenediamine.

In some embodiments, the one or more salts are formed with inorganic acids, such as hydrochloric acid, hydrobromic acid, sulfuric acid, nitric acid, phosphoric acid, and the like; or formed with organic acids, such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethane-disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid and muconic acid.

In particular embodiments, non-limiting inorganic salts may be selected from the group consisting of sodium chloride, sodium carbonate, sodium bicarbonate, sodium acetate, sodium sulfide, sodium sulfate, sodium phosphate, potassium chloride, potassium citrate, potassium carbonate, potassium bicarbonate, potassium acetate, europium chloride ($EuCl_3$), gadolinium chloride ($GdCl_3$), terbium chloride ($TbCl_3$), magnesium sulfate, alum, magnesium chloride, mono-, di-, tri-basic sodium or potassium salts of phosphoric acid (e.g., inorganic phosphates), salts of hydrochloric acid (e.g., inorganic chlorides), sodium carbonate, sodium bisulfate, and sodium bicarbonate. Exemplary organic salts may be selected from the group consisting of choline chloride, alginic acid sodium salt (sodium alginate), glucoheptonic acid sodium salt, gluconic acid sodium salt (sodium gluconate), gluconic acid potassium salt (potassium gluconate), guanidine HCl, glucosamine HCl, amiloride HCl, monosodium glutamate (MSG), adenosine monophosphate salt, magnesium gluconate, potassium tartrate (monohydrate), and sodium tartrate (dihydrate).

In certain embodiments, the salt is a metal or metal alkali halide, a metal or metal alkali carbonate or bicarbonate, or a metal or metal alkali phosphate, bisphosphate, pyrophosphate, triphosphate, metaphosphate, or metabisulfate thereof. In certain particular embodiments, the salt is an inorganic salt that comprises sodium, potassium, calcium, or magnesium. In some embodiments, the salt is a sodium salt or a potassium salt.

The salt forms can be added to the sweetener compositions in the same amounts as their acid or base forms.

Alternative salts include various chloride or sulfate salts, such as sodium chloride, potassium chloride, magnesium chloride, sodium sulfate, magnesium sulfate, and potassium sulfate, or any edible salt.

In some embodiments, the one or more salts comprise one or more salts of steviol glycosides (SG salts) and/or salts of glycosylated steviol glycosides (GSG-salts). In some further embodiments, the one or more SG salts comprise a salt of RB and/or STB.

In some embodiments, the one or more salts comprise one or more salts of non-steviol glycoside substance (NSG salts) and/or salts of glycosylated non-steviol glycoside substances (GNSG-salts).

In some embodiments, the one or more salts comprise one or more amino acid salts. In some embodiments, the one or more salts comprise one or more poly-amino acid salts.

In some embodiments, the one or more salts comprise one or more sugar acid salts, including e.g., aldonic, uronic, aldaric, alginic, gluconic, glucuronic, glucaric, galactaric, galacturonic, and their salts (e.g., sodium, potassium, calcium, magnesium salts or other physiologically acceptable salts), and combinations thereof.

The one or more salts can make up anywhere from about 0.01 wt. % to about 30 wt. % of the composition of the present application, specifically about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, and all ranges there between, including for example from about 0.01 wt % to about 10 wt %, about 0.03 wt % to about 10 wt %, about 0.05 wt % to about 10 wt %, about 0.07 wt % to about 10 wt %, about 0.1 wt % to about 10 wt %, about 0.3 wt % to about 10 wt %, about 0.5 wt % to about 10 wt %, about 0.7 wt % to about 10 wt %, about 1 wt % to about 10 wt %, about 3 wt % to about 10 wt %, about 5 wt % to about 10 wt %, about 7 wt % to about 10 wt %, about 0.01 wt % to about 3 wt %, about 0.03 wt % to about 3 wt %, about 0.05 wt % to about 3 wt %, about 0.07 wt % to about 3 wt %, about 0.1 wt % to about 3 wt %, about 0.3 wt % to about 3 wt %, about 0.5 wt % to about 3 wt %, about 0.7 wt % to about 3 wt %, about 1 wt % to about 3 wt %, about 0.01 wt % to about 1 wt %, about 0.03 wt % to about 1 wt %, about 0.05 wt % to about 1 wt %, about 0.07 wt % to about 1 wt %, about 0.1 wt % to about 1 wt %, about 0.3 wt % to about 1 wt %, about 0.5 wt % to about 1 wt %, about 0.7 wt % to about 1 wt %, about 0.01 wt % to about 0.3 wt %, about 0.03 wt % to about 0.3 wt %, about 0.05 wt % to about 0.3 wt %, about 0.07 wt % to about 0.3 wt %, about 0.1 wt % to about 0.3 wt %, about 0.01 wt % to about 0.1 wt %, about 0.03 wt % to about 0.1 wt %, about 0.05 wt % to about 0.1 wt %, about 0.07 wt % to about 0.1 wt %, about 0.01 wt % to about 0.03 wt %, about 0.01 wt % to about 0.05 wt %, about 0.01 wt % to about 0.07 wt %, about 5 wt. % to about 30 wt. %, from about 10 wt. % to about 30 wt. %, or from about 20 wt. % to about 30 wt. % of the composition of the present application.

Regardless of the salt used in the present compositions, the salt content in a composition is calculated based on the weight of sodium chloride. More specifically, the salt content (based on weight of NaCl) may be determined by determining the total ash content of a sample according to the general method for determining total ash content as set forth in FAO JECFA MONOGRAPHS, vol. 4, 2007. The weight of sodium chloride is determined from the weight of sodium oxide multiplied by a factor of 1.89. For example, if the total ash content of 100 g the composition of the present application is 1 g, the composition of the present application has a salt content of 1.89 wt %.

H2. Minerals

Minerals comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts. Bulk minerals generally are required in amounts greater than or equal to about 100 mg per day and trace minerals are those that are required in amounts less than about 100 mg per day.

In some embodiments of the present application, the minerals are chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In some embodiments, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. In some embodiments, the minerals are in their ionic form, having either a positive or negative charge. For example, sulfur and phosphorous often are found naturally as sulfates, sulfides, and phosphates. In some embodiment, the minerals are present in their molecular form.

In some embodiments, minerals are present in the composition of the present application in an amount effective to provide an amount of from about 25 ppm to about 25,000 ppm in the final product.

H3. Organic Acids and Inorganic Acids

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In some embodiments, the organic acid additive is present in the composition of the present application in an amount effective to provide an amount of from about 0.5 ppm to about 5,000 ppm in the final product.

Organic acids also include amino acids such as, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid (α-, β-, and/or δ-isomers), glutamine, hydroxyproline, taurine, norvaline and sarcosine. The amino acid may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids.

As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-a-lysine or poly-L-s-lysine), poly-L-ornithine (e.g., poly-L-a-ornithine or poly-L-s-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-a-lysine with a MW of 1,500, MW of 6,000, MW of 25,200, MW of 63,000, MW of 83,000, or MW of 300,000.

In some embodiments, the amino acid is present in the composition of the present application in an amount effective to provide an amount of from about 10 ppm to about 50,000 ppm in the final product.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

In some embodiments, the in organic acid is present in the composition of the present application in an amount effective to provide an amount of from about 25 ppm to about 25,000 ppm in the final product.

H4. Polyols

The term "polyol," as used herein, refers to a molecule that contains more than one hydroxyl group.

A polyol may be a diol, triol, or a tetraol which contains 2, 3, and 4 hydroxyl groups respectively. A polyol also may comprise more than 4 hydroxyl groups, such as a pentaol, hexaol, heptaol, or the like, which comprise 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

In some embodiments, polyol is present in the compositions of the present application in an amount effective to provide an amount of from about 100 ppm to about 250,000 ppm in the final product.

H5. Nucleotides

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, or combinations thereof. The nucleotides described herein also may comprise nucleotide-related additives, such as nucleosides or nucleic acid bases (e.g., guanine, cytosine, adenine, thymine, uracil).

In some embodiments, nucleotide is present in the compositions of the present application in an amount effective to provide an amount of from about 5 ppm to about 1,000 ppm in the final product.

H6. Bitter Compounds

Suitable bitter compound additives include, but are not limited to, caffeine, quinine, urea, bitter orange oil, naringin, quassia, and salts thereof.

In some embodiments, bitter compounds are present in the compositions of the present application in an amount effective to provide an amount of from about 25 ppm to about 25,000 ppm in the final product.

H7. Astringent Compounds

Suitable astringent compound additives include, but are not limited to, tannic acid, europium chloride (EuCl3), gadolinium chloride (GdCl3), terbium chloride (TbCl3), alum, tannic acid, and polyphenols (e.g., tea polyphenols).

In some embodiments, astringent compound is present in the compositions of the present application in an amount effective to provide an amount of from about 0.5 ppm to about 5,000 ppm in the final product.

H8. Proteins or Protein Hydrolysates

Suitable protein or protein hydrolysate additives include, but are not limited to, bovine serum albumin (BSA), whey protein (including fractions or concentrates thereof such as 90% instant whey protein isolate, 34% whey protein, 50%>hydrolyzed whey protein, and 80%>whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

In some embodiments, proteins or protein hydrolysates are present in the compositions of the present application in an amount effective to provide an amount of from about 100 ppm to about 50,000 ppm in the final product.

H9. Surfactants

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltnmethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

In some embodiments, surfactants are present in the compositions of the present application in an amount effective to provide an amount of from about 20 ppm to about 20,000 ppm in the final product.

H10. Gums and Waxes

Gums and mucilages represent a broad array of different branched structures. Guar gum is a galactomannan produced from the ground endosperm of the guar seed. Guar gum is commercially available (e.g., Benefiber by Novartis AG). Other gums, such as gum arabic and pectins, have still different structures. Still other gums include xanthan gum, gellan gum, tara gum, psylium seed husk gum, and locust been gum.

Waxes are esters of ethylene glycol and two fatty acids, generally occurring as a hydrophobic liquid that is insoluble in water.

In some embodiments, gums or waxes are present in the compositions of the present application in an amount effective to provide an amount of from about 100 ppm to about 100,000 ppm in the final product.

H11. Antioxidants

As used herein "antioxidant" refers to any substance which inhibits, suppresses, or reduces oxidative damage to cells and biomolecules. Without being bound by theory, it is believed that antioxidants inhibit, suppress, or reduce oxidative damage to cells or biomolecules by stabilizing free radicals before they can cause harmful reactions. As such, antioxidants may prevent or postpone the onset of some degenerative diseases.

Examples of suitable antioxidants for embodiments of this application include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, or combinations thereof. In some embodiments, the antioxidant is vitamin A, vitamin C, vitamin E, ubiquinone, mineral selenium, manganese, melatonin, a-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyanidin, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-a-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this application include, but are not limited to, fruits, vegetables, tea, cocoa, chocolate, spices, herbs, rice, organ meats from livestock, yeast, whole grains, or cereal grains.

Although recognizing that other suitable antioxidants may be used for flavoring agents, the IOFI has acknowledged the following antioxidants for use in flavoring agents: ascorbic acid and salts thereof, ascorbyl palmitate, butylated hydroxyanisole (BHA), butylated hydroxytoluene (BHT), dodecyl gallate, erythorbic acid and salts thereof, octyl gallate, propyl gallate, tert-butyl hydroquinone (TBHQ), natural tocopherols, and synthetic tocopherols.

Particular antioxidants belong to the class of phytonutrients called polyphenols (also known as "polyphenolics"), which are a group of chemical substances found in plants, characterized by the presence of more than one phenol group per molecule. A variety of health benefits may be derived from polyphenols, including prevention of cancer, heart disease, and chronic inflammatory disease and improved mental strength and physical strength, for example. Suitable polyphenols for embodiments of this application include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, or combinations thereof.

For example, polyphenolic flavonoids are an important and widespread group of plant natural products that possess many biological activities and are present in many human dietary sources. Neohesperidin and naringin are flavanone glycosides present in citrus fruits and grapefruit, and are responsible for the bitterness of citrus juices. Neohesperidin, naringin, and their derivatives, such as neohesperidine chalcone, naringin chalcone, phloracetophenone, neohesperidine dihydrochalcone, naringin dihydrochalcone etc. (as further described herein) are good candidates for bitter or sweet enhancers. It has been surprisingly found that adding these components to the MRP compositions of the present invention can help to mask the bitterness and/or aftertaste of other ingredients and make the taste cleaner.

In some embodiments, the antioxidant is a citrus flavonoid or flavanone glycoside, such as hesperidin or naringin. Suitable natural sources of citrus flavonoids, such as hesperidin or naringin, for embodiments of this application include, but are not limited to, oranges, grapefruits, and citrus juices. The ratio of flavonoids in the MRP and other compositions of the present application can range from 0.1 ppm to 99.9% (w/w).

In some embodiments, the antioxidant is a catechin such as, for example, epigallocatechin gallate (EGCG). Suitable sources of catechins for embodiments of this application include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this application include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this application include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this application include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is reservatrol. Suitable sources of reservatrol for embodiments of this application include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this application include, but are not limited to, soy beans, soy products, legumes, alfalfa sprouts, chickpeas, peanuts, and red clover.

In some embodiments, the antioxidant is curcumin. Suitable sources of curcumin for embodiments of this application include, but are not limited to, turmeric and mustard.

In particular embodiments, the antioxidant is chosen from punicalagin, ellagitannin or combinations thereof. Suitable sources of punicalagin and ellagitannin for embodiments of this application include, but are not limited to, pomegranate, raspberry, strawberry, walnut, and oak-aged red wine.

In particular embodiments, the antioxidant is chlorogenic acid. Suitable sources of chlorogenic acid for embodiments of this application include, but are not limited to, green coffee, yerba mate, red wine, grape seed, red grape skin, purple grape skin, red grape juice, purple grape juice, apple juice, cranberry, pomegranate, blueberry, strawberry, sunflower, Echinacea, pycnogenol, and apple peel.

In some embodiments, antioxidants are present in the compositions of the present application in an amount effective to provide an amount of from about 100 ppm to about 250,000 ppm in the final product.

H12. Polymers

Suitable polymer additives include, but are not limited to, chitosan, pectin, pectic, pectinic, polyuronic, polygalacturonic acid, starch, food hydrocolloid or crude extracts thereof (e.g., gum acacia Senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

In some embodiments, a polymer is present in the compositions of the present application in an amount effective to provide an amount of from about 10 ppm to about 10,000 ppm in the final product.

H13. Fatty Acids

As used herein, a "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, a "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, an "omega-6 fatty acid" refers to any polyunsaturated fatty acid having a first double bond as the sixth carbon-carbon bond from the terminal methyl end of its carbon chain.

Suitable omega-3 fatty acids for use in embodiments of the present application can be produced from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid or combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be produced from commercially available omega-3 fatty acid oils, such as Microalgae DHA oil (from Martek, Columbia, Md.), OmegaPure (from Omega Protein, Houston, Tex.), Marinol C-38 (from Lipid Nutrition, Channahon, Ill.), Bonito oil and MEG-3 (from Ocean Nutrition, Dartmouth, NS), Evogel (from Symrise, Holzminden, Germany), Marine Oil, from tuna or salmon (from Arista Wilton, Conn.), OmegaSource 2000, Marine Oil, from menhaden and Marine Oil, from cod (from OmegaSource, RTP, NC).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid, or combinations thereof.

Suitable esterified fatty acids for embodiments of the present application may include, but are not limited to, monoacylgycerols containing omega-3 and/or omega-6 fatty acids, diacylgycerols containing omega-3 and/or omega-6 fatty acids, triacylgycerols containing omega-3 and/or omega-6 fatty acids, or combinations thereof.

In some embodiments, fatty acids are present in the compositions of the present application in an amount from about 100 ppm to about 100,000 ppm.

H14. Vitamins

Vitamins are organic compounds that the human body needs in small quantities for normal functioning. The body uses vitamins without breaking them down, unlike other nutrients such as carbohydrates and proteins. To date, thirteen vitamins have been recognized, and one or more can be used in the compositions herein. Suitable vitamins and their alternative chemical names are provided in the accompanying parentheses which follow include, vitamin A (retinol, retinaldehyde), vitamin D (calciferol, cholecalciferol, lumisterol, ergocalciferol, dihydrotachysterol, 7-dehydrocholesterol), vitamin E (tocopherol, tocotrienol), vitamin K (phylloquinone, naphthoquinone), vitamin B1 (thiamin), vitamin B2 (riboflavin, vitamin G), vitamin B3 (niacin, nicotinic acid, vitamin PP), vitamin B5 (pantothenic acid), vitamin B6 (pyridoxine, pyridoxal, pyridoxamine), vitamin B7 (biotin, vitamin H), vitamin B9 (folic acid, folate, folacin, vitamin M, pteroyl-L-glutamic acid), vitamin B12 (cobalamin, cyanocobalamin), and vitamin C (ascorbic acid).

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

In some embodiments, the vitamin is a fat-soluble vitamin chosen from vitamin A, D, E, K or combinations thereof. In other embodiments, the vitamin is a water-soluble vitamin chosen from vitamin B1, vitamin B2, vitamin B3, vitamin B6, vitamin B12, folic acid, biotin, pantothenic acid, vitamin C or combinations thereof.

In some embodiments, vitamins are present in the compositions of the present application in an amount effective to provide an amount of from about 10 ppm to about 10,000 ppm in the final product.

H15. Preservatives

In some embodiments of this application, the preservative is chosen from antimicrobials, antienzymatics or combinations thereof.

Non-limiting examples of antimicrobials include sulfites, propionates, benzoates, sorbates, nitrates, nitrites, bacteriocins such as nisin, salts, sugars, acetic acid, dimethyl dicarbonate (DMDC), ethanol, and ozone.

Sulfites include, but are not limited to, sulfur dioxide, sodium bisulfite, and potassium hydrogen sulfite. Propionates include, but are not limited to, propionic acid, calcium propionate, and sodium propionate. Benzoates include, but are not limited to, sodium benzoate and benzoic acid. Sorbates include, but are not limited to, potassium sorbate, sodium sorbate, calcium sorbate, and sorbic acid. Nitrates and nitrites include, but are not limited to, sodium nitrate and sodium nitrite.

Non-limiting examples of antienzymatics suitable for use as preservatives in particular embodiments of the application include ascorbic acid, citric acid, and metal chelating agents such as ethylenediaminetetraacetic acid (EDTA). In certain embodiments, preservatives are present in the compositions of the present application in an amount from about 100 ppm to about 5000 ppm.

H16. Hydration Agents

Hydration agents help the body to replace fluids that are lost through excretion. For example, fluid is lost as sweat in order to regulate body temperature, as urine in order to excrete waste substances, and as water vapor in order to exchange gases in the lungs. Fluid loss can also occur due to a wide range of external causes, non-limiting examples of which include physical activity, exposure to dry air, diarrhea, vomiting, hyperthermia, shock, blood loss, and hypotension. Diseases causing fluid loss include diabetes, cholera, gastroenteritis, shigellosis, and yellow fever. Forms of malnutrition causing fluid loss include excessive consumption of alcohol, electrolyte imbalance, fasting, and rapid weight loss.

In some embodiments, the hydration agent helps the body replace fluids that are lost during exercise. Accordingly, in some embodiments, the hydration agent is an electrolyte, non-limiting examples of which include sodium, potassium, calcium, magnesium, chloride, phosphate, bicarbonate, or combinations thereof. Suitable electrolytes for use in some embodiments of this application are also described in U.S. Pat. No. 5,681,569, the disclosure of which is expressly incorporated herein by reference. In some embodiments, the electrolytes are obtained from their corresponding water-soluble salts. Non-limiting examples of salts for use in some embodiments include chlorides, carbonates, sulfates, acetates, bicarbonates, citrates, phosphates, hydrogen phosphates, tartrates, sorbates, citrates, benzoates, or combinations thereof. In other embodiments, the electrolytes are provided by juice, fruit extracts, vegetable extracts, tea, or tea extracts.

In some embodiments, the hydration agent is a flavanol that provides cellular rehydration. Flavanols are a class of natural substances present in plants, and generally comprise a 2-phenylbenzopyrone molecular skeleton attached to one or more chemical moieties. Non-limiting examples of flavanols suitable for use herein include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In some embodiments, the hydration agent is a glycerol solution to enhance exercise endurance. The ingestion of a glycerol containing solution has been shown to provide beneficial physiological effects, such as expanded blood volume, lower heart rate, and lower rectal temperature.

In some embodiments, hydration agents are present in the compositions of the present application in an amount effective to provide an amount of from about 100 ppm to about 250,000 ppm in the final product.

In other embodiments, the composition of the present application further comprises one or more functional ingredients. Examples of additional additives include, but are not limited to, dietary fiber sources, glucosamine, probiotics, prebiotics, weight management agents, osteoporosis management agents, phytoestrogens, phytosterols and combinations thereof.

H17. Dietary Fiber

In certain embodiments, the functional ingredient is at least one dietary fiber source. As used herein, the at least one dietary fiber source can comprise a single dietary fiber source or a plurality of dietary fiber sources as a functional ingredient for the compositions provided herein. Generally, according to particular embodiments of this invention, the at least one dietary fiber source is present in the composition in an amount sufficient to promote health and wellness.

Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

Polysaccharides are complex carbohydrates composed of monosaccharides joined by glycosidic linkages. Non-starch polysaccharides are bonded with β-linkages, which humans are unable to digest due to a lack of an enzyme to break the β-linkages. Conversely, digestible starch polysaccharides generally comprise α(1-4) linkages.

Lignin is a large, highly branched and cross-linked polymer based on oxygenated phenylpropane units. Cellulose is a linear polymer of glucose molecules joined by a β(1-4) linkage, which mammalian amylases are unable to hydrolyze. Methylcellulose is a methyl ester of cellulose that is often used in foodstuffs as a thickener, and emulsifier. It is commercially available (e.g., Citrucel by GlaxoSmithKline, Celevac by Shire Pharmaceuticals). Hemicelluloses are highly branched polymers consisting mainly of glucurono- and 4-O-methylglucuroxylans. β-glucans are mixed-linkage (1-3), (1-4) β-D-glucose polymers found primarily in cereals, such as oats and barley. Pectins, such as beta pectin, are a group of polysaccharides composed primarily of D-galacturonic acid, which is methoxylated to variable degrees.

Gums and mucilages represent a broad array of different branched structures. Guar gum, derived from the ground endosperm of the guar seed, is a galactomannan. Guar gum is commercially available (e.g., Benefiber by Novartis AG). Other gums, such as gum arabic and pectins, have still different structures. Still other gums include xanthan gum, gellan gum, tara gum, psylium seed husk gum, and locust been gum.

Waxes are esters of ethylene glycol and two fatty acids, generally occurring as a hydrophobic liquid that is insoluble in water.

Inulins comprise naturally occurring oligosaccharides belonging to a class of carbohydrates known as fructans. They generally are comprised of fructose units joined by β(2-1) glycosidic linkages with a terminal glucose unit. Oligosaccharides are saccharide polymers containing typically three to six component sugars. They are generally found either 0- or N-linked to compatible amino acid side chains in proteins or to lipid molecules. Fructooligosaccharides are oligosaccharides consisting of short chains of fructose molecules.

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Although dietary fiber generally is derived from plant sources, indigestible animal products such as chitins are also classified as dietary fiber. Chitin is a polysaccharide composed of units of acetylglucosamine joined by β(1-4) linkages, similar to the linkages of cellulose.

Sources of dietary fiber often are divided into categories of soluble and insoluble fiber based on their solubility in water. Both soluble and insoluble fibers are found in plant foods to varying degrees depending upon the characteristics of the plant. Although insoluble in water, insoluble fiber has passive hydrophilic properties that help increase bulk, soften stools, and shorten transit time of fecal solids through the intestinal tract.

Unlike insoluble fiber, soluble fiber readily dissolves in water. Soluble fiber undergoes active metabolic processing via fermentation in the colon, increasing the colonic microflora and thereby increasing the mass of fecal solids. Fennentation of fibers by colonic bacteria also yields end-products with significant health benefits. For example, fermentation of the food masses produces gases and short-chain fatty acids. Acids produced during fermentation include butyric, acetic, propionic, and valeric acids that have various beneficial properties such as stabilizing blood glucose levels by acting on pancreatic insulin release and providing liver control by glycogen breakdown. In addition, fiber fermentation may reduce atherosclerosis by lowering cholesterol synthesis by the liver and reducing blood levels of LDL and triglycerides. The acids produced during fermentation lower colonic pH, thereby protecting the colon lining from cancer polyp formation. The lower colonic pH also increases mineral absorption, improves the barrier properties of the colonic mucosal layer, and inhibits inflammatory and adhesion irritants. Fermentation of fibers also may benefit the immune system by stimulating production of T-helper cells, antibodies, leukocytes, splenocytes, cytokinins and lymphocytes.

H18. Glucosamine

In certain embodiments, the functional ingredient is glucosamine.

Generally, according to particular embodiments of this invention, glucosamine is present in the compositions in an amount sufficient to promote health and wellness.

Glucosamine, also called chitosamine, is an amino sugar that is believed to be an important precursor in the biochemical synthesis of glycosylated proteins and lipids. D-glucosamine occurs naturally in the cartilage in the form of glucosamine-6-phosphate, which is synthesized from fructose-6-phosphate and glutamine. However, glucosamine also is available in other forms, non-limiting examples of which include glucosamine hydrochloride, glucosamine sulfate, N-acetyl-glucosamine, or any other salt forms or combinations thereof. Glucosamine may be obtained by acid hydrolysis of the shells of lobsters, crabs, shrimps, or prawns using methods well known to those of ordinary skill in the art. In a particular embodiment, glucosamine may be derived from fungal biomass containing chitin, as described in U.S. Patent Publication No. 2006/0172392.

The compositions can further comprise chondroitin sulfate.

H19. Probiotics/Prebiotics

In certain embodiments, the functional ingredient is chosen from at least one probiotic, prebiotic and combination thereof.

As used herein, the at least one probiotic or prebiotic may be single probiotic or prebiotic or a plurality of probiotics or prebiotics as a functional ingredient for the compositions provided herein. Generally, according to particular embodiments of this invention, the at least one probiotic, prebiotic or combination thereof is present in the composition in an amount sufficient to promote health and wellness.

Probiotics, in accordance with the teachings of this invention, comprise microorganisms that benefit health when consumed in an effective amount. Desirably, probiotics beneficially affect the human body's naturally-occurring gastrointestinal microflora and impart health benefits apart from nutrition. Probiotics may include, without limitation, bacteria, yeasts, and fungi.

Prebiotics, in accordance with the teachings of this invention, are compositions that promote the growth of beneficial bacteria in the intestines. Prebiotic substances can be consumed by a relevant probiotic, or otherwise assist in keeping the relevant probiotic alive or stimulate its growth. When consumed in an effective amount, prebiotics also beneficially affect the human body's naturally-occurring gastrointestinal microflora and thereby impart health benefits apart from just nutrition. Prebiotic foods enter the colon and serve as substrate for the endogenous bacteria, thereby indirectly providing the host with energy, metabolic substrates, and essential micronutrients. The body's digestion and absorption of prebiotic foods is dependent upon bacterial metabolic activity, which salvages energy for the host from nutrients that escaped digestion and absorption in the small intestine.

According to particular embodiments, the probiotic is a beneficial microorganism that beneficially affects the human body's naturally-occurring gastrointestinal microflora and imparts health benefits apart from nutrition. Examples of probiotics include, but are not limited to, bacteria of the genus *Lactobacillus, Bifidobacteria, Streptococcus*, or combinations thereof, that confer beneficial effects to humans.

In particular embodiments of the invention, the at least one probiotic is chosen from the genus *Lactobacillus*. Lactobacilli (i.e., bacteria of the genus *Lactobacillus*, hereinafter "L.") have been used for several hundred years as a food preservative and for promoting human health. Non-limiting examples of *Lactobacillus* species found in the human intestinal tract include *L. acidophilus, L. casei, L. fermentum, L. saliva roes, L brevis, L. leichmannii, L. plantarum, L. cellobiosus, L. reuteri, L. rhamnosus, L. bulgaricus*, and *L. thermophilus.*

According to other particular embodiments of this invention, the probiotic is chosen from the genus *Bifidobacteria. Bifidobacteria* also are known to exert a beneficial influence on human health by producing short chain fatty acids (e.g., acetic, propionic, and butyric acids), lactic, and formic acids as a result of carbohydrate metabolism. Non-limiting species of *Bifidobacteria* found in the human gastrointestinal tract include *B. angulatum, B. animalis, B. asteroides, B. bifdum, B. bourm, B. breve, B. catenulatum, B. choerinum. B. coryneforme, B. cuniculi, B. dentiumn, B. gallicum, B. gallinarum, B indicum, B. longwn, B. magnum, B. merycicum, B. minimum, B. pseudocatenulatum, B. pseudolongwn, B. psychraerophilum, B. pullorum, B. ruminantium, B. saeculare, B. scardovil, B. simiae, B. subtile, B. thermacidophilum, B. thermophilum, B. urinalis*, and other *B.* sp.

According to other particular embodiments of this invention, the probiotic is chosen from the genus *Streptococcus. Streptococcus thermophilus* is a gram-positive facultative anacrobe. It is classified as a lactic acid bacterium, is commonly found in milk and milk products, and is used in the production of yogurt. Other non-limiting probiotic species include *Streptococcus salivarus* and *Streptococcus cremoris.*

Probiotics that may be used in accordance with this invention are well-known to those of skill in the art. Non-limiting examples of foodstuffs comprising probiotics include yogurt, sauerkraut, kefir, kimchi, fermented vegetables, and other foodstuffs containing a microbial element that beneficially affects the host animal by improving the intestinal microbalance.

Prebiotics, in accordance with the embodiments of this invention, include, without limitation, mucopolysaccharides, oligosaccharides, polysaccharides, amino acids, vitamins, nutrient precursors, proteins and combinations thereof.

According to a particular embodiment of this invention, the prebiotic is chosen from dietary fibers, including, without limitation, polysaccharides and oligosaccharides. These compounds have the ability to increase the number of probiotics, which leads to the benefits conferred by the probiotics. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, transgalacto-oligosaccharides, and xylo-oligosaccharides.

According to other particular embodiments of the invention, the prebiotic is an amino acid. Although a number of known prebiotics break down to provide carbohydrates for probiotics, some probiotics also require amino acids for nourishment.

Prebiotics are found naturally in a variety of foods including, without limitation, bananas, berries, asparagus, garlic, wheat, oats, barley (and other whole grains), flaxseed, tomatoes, Jerusalem artichoke, onions and chicory, greens (e.g., dandelion greens, spinach, collard greens, chard, kale, mustard greens, turnip greens), and legumes (e.g., lentils, kidney beans, chickpeas, navy beans, white beans, black beans).

H20. Weight Management Agents

In certain embodiments, the functional ingredient is at least one weight management agent.

As used herein, the at least one weight management agent may be single weight management agent or a plurality of weight management agents as a functional ingredient for the compositions provided herein. Generally, according to particular embodiments of this invention, the at least one weight management agent is present in the composition in an amount sufficient to promote health and wellness.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" refers to macronutrients, herbal extracts, exogenous hormones, anorectics, anorexigenics, pharmaceutical drugs, and combinations thereof, that when delivered in effective amount(s), suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in effective amount(s), activate or otherwise enhance a person's thermogenesis or metabolism.

Suitable weight management agents include macronutrient selected from the group consisting of proteins, carbohydrates, dietary fats, and combinations thereof. Consumption of proteins, carbohydrates, and dietary fats stimulates the release of peptides with appetite-suppressing effects. For example, consumption of proteins and dietary fats stimulates the release of the gut hormone cholecytokinin (CCK), while consumption of carbohydrates and dietary fats stimulates release of Glucagon-like peptide 1 (GLP-1).

Suitable macronutrient weight management agents also include carbohydrates. Carbohydrates generally comprise sugars, starches, cellulose and gums that the body converts into glucose for energy. Carbohydrates often are classified into two categories, digestible carbohydrates (e.g., monosaccharides, disaccharides, and starch) and non-digestible carbohydrates (e.g., dietary fiber). Studies have shown that non-digestible carbohydrates and complex polymeric carbohydrates having reduced absorption and digestibility in the small intestine stimulate physiologic responses that inhibit food intake. Accordingly, the carbohydrates embodied herein desirably comprise non-digestible carbohydrates or carbohydrates with reduced digestibility. Non-limiting examples of such carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein.

In another particular embodiment weight management agent is a dietary fat. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agent is an herbal extract. Extracts from numerous types of plants have been identified as possessing appetite suppressant properties. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from *Gymnema sylvestre, Citrus aurantium, Griffonia simplicifolia, Paullinia cupana* (also known as Guarana), kola nut, Yerba mate, myrrh, guggul lipid, and black current seed oil.

The herbal extracts may be prepared from any type of plant material or plant biomass. Non-limiting examples of plant material and biomass include the stems, roots, leaves, dried powder obtained from the plant material, and sap or dried sap. The herbal extracts generally are prepared by extracting sap from the plant and then spray-drying the sap. Alternatively, solvent extraction procedures may be employed. Following the initial extraction, it may be desirable to further fractionate the initial extract (e.g., by column chromatography) in order to obtain an herbal extract with enhanced activity. Such techniques are well known to those of ordinary skill in the art.

In a particular embodiment, the herbal extract is derived from a plant of the genus *Hoodia*, species of which include *H. alstonii, H. currorii, H. dregei, H. flava, H. gordonii, H. julatae, H. mossamedensis, H. oficinalis, H. parviflorai, H. pedicellata, H. pilifera, H. ruschii*, and *H. triebneri. Hoodia* plants are stem succulents native to southern Africa. A sterol glycoside of *Hoodia*, known as P57, is believed to be responsible for the appetite-suppressant effect of the *Hoodia* species.

In another particular embodiment, the herbal extract is derived from a plant of the genus *Caralluma*, species of which include *C. indica, C. fimbriata, C. attenuate, C. ruberculata, C. edulis, C. adscendens, C. stalagmifera, C. umbellate, C. penicillata, C. russeliana, C. retrospicens, C. Arabica, and C. lasiantha. Carralluma* plants belong to the same Subfamily as *Hoodia* and *Asclepiadaceae. Caralluma* are small, erect and fleshy plants native to India having medicinal properties, such as appetite suppression, that generally are attributed to glycosides belonging to the pregnane group of glycosides, non-limiting examples of which include caratuberside A, caratuberside B, bouceroside I, bouceroside II, bouceroside III, bouceroside IV, bouceroside V, bouceroside VI, bouceroside VII, bouceroside VIII, bouceroside IX, and bouceroside X.

In another particular embodiment, the at least one herbal extract is derived from a plant of the genus *Trichocaulon. Trichocaulon* plants are succulents that generally are native to southern Africa, similar to *Hoodia*, and include the species *T. piliferum* and *T. oficinale.*

In another particular embodiment, the herbal extract is derived from a plant of the genus *Slapelia* or *Orbea*, species of which include *S. gigantean* and *O. variegate*, respectively. Both *Stapelia* and *Orbea* plants belong to the same Subfamily as *Hoodia* and *Asclepiadaceae*. Not wishing to be bound by any theory, it is believed that the compounds exhibiting appetite suppressant activity are saponins, such as pregnane glycosides, which include stavarosides A, B, C, D, E, F, G, H, I, J, and K.

In another particular embodiment, the herbal extract is derived from a plant of the genus *Asclepias. Asclepias* plants also belong to the *Asclepiadaceae* family of plants. Non-limiting examples of *Asclepias* plants include *A. incarnate, A. curassayica, A. syriaca*, and *A. tuberose*. Not wishing to be bound by any theory, it is believed that the extracts comprise steroidal compounds, such as pregnane glycosides and pregnane aglycone, having appetite suppressant effects.

In a particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In another embodiment, the weight management agent is a pharmaceutical drug. Non-limiting examples include phentenime, diethylpropion, phendimetrazine, sibutramine, rimonabant, oxyntomodulin, floxetine hydrochloride, ephedrine, phenethylamine, or other stimulants.

H21. Osteoporosis Management Agents

In certain embodiments, the functional ingredient is at least one osteoporosis management agent.

As used herein, the at least one osteoporosis management agent may be single osteoporosis management agent or a plurality of osteoporosis management agent as a functional ingredient for the compositions provided herein. Generally, according to particular embodiments of this invention, the at least one osteoporosis management agent is present in the composition in an amount sufficient to promote health and wellness.

Osteoporosis is a skeletal disorder of compromised bone strength, resulting in an increased risk of bone fracture. Generally, osteoporosis is characterized by reduction of the bone mineral density (BMD), disruption of bone micro-architecture, and changes to the amount and variety of non-collagenous proteins in the bone.

In certain embodiments, the osteoporosis management agent is at least one calcium source. According to a particular embodiment, the calcium source is any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof.

According to a particular embodiment, the osteoporosis management agent is a magnesium source. The magnesium source is any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium.

In other embodiments, the osteoporosis agent is chosen from vitamins D, C, K, their precursors and/or beta-carotene and combinations thereof.

Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera, Artemisia, Acorus, Carthamus, Carum, Cnidium, Curcwna, Cyperus, Juniperus, Prunus, Iris, Cichorium, Dodonaea, Epimedium, Erigonoum, Soya, Mentha, Ocimum, Thymus, Tanacetum, Planiago, Spearmint, Bixa, Vitis, Rosemarinus, Rhus*, and *Anethum*, as disclosed in U.S. Patent Publication No. 2005/0079232.

H22. Phytoestrogens

In certain embodiments, the functional ingredient is at least one phytoestrogen.

As used herein, the at least one phytoestrogen may be single phytoestrogen or a plurality of phytoestrogens as a functional ingredient for the compositions provided herein. Generally, according to particular embodiments of this invention, the at least one phytoestrogen is present in the composition in an amount sufficient to promote health and wellness.

Phytoestrogens are compounds found in plants which can typically be delivered into human bodies by ingestion of the plants or the plant parts having the phytoestrogens. As used herein, "phytoestrogen" refers to any substance which, when introduced into a body causes an estrogen-like effect of any degree. For example, a phytoestrogen may bind to estrogen receptors within the body and have a small estrogen-like effect.

Examples of suitable phytoestrogens for embodiments of this invention include, but are not limited to, isoflavones, stilbenes, lignans, resorcyclic acid lactones, coumestans, coumestrol, equol, and combinations thereof. Sources of suitable phytoestrogens include, but are not limited to, whole grains, cereals, fibers, fruits, vegetables, black cohosh, agave root, black currant, black haw, chasteberries, cramp bark, dong quai root, devil's club root, false unicorn root, ginseng root, groundsel herb, licorice, liferoot herb, motherwort herb, peony root, raspberry leaves, rose family plants, sage leaves, sarsaparilla root, saw palmetto berried, wild yam root, yarrow blossoms, legumes, soybeans, soy products (e.g., miso, soy flour, soymilk, soy nuts, soy protein isolate, tempen, or tofu) chick peas, nuts, lentils, seeds, clover, red clover, dandelion leaves, dandelion roots, fenugreek seeds, green tea, hops, red wine, flaxseed, garlic, onions, linseed, borage, butterfly weed, caraway, chaste tree, vitex, dates, dill, fennel seed, gotu kola, milk thistle, pennyroyal, pomegranates, southernwood, soya flour, tansy, and root of the kudzu vine (pueraria root) and the like, and combinations thereof.

Isoflavones belong to the group of phytonutrients called polyphenols. In general, polyphenols (also known as "polyphenolics"), are a group of chemical substances found in plants, characterized by the presence of more than one phenol group per molecule.

Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Suitable sources of isoflavones for embodiments of this invention include, but are not limited to, soy beans, soy products, legumes, alfalfa sprouts, chickpeas, peanuts, and red clover.

H23. Phytosterols

In certain embodiments, the functional ingredient is at least one phytosterol, phytostanol or combination thereof.

Generally, according to particular embodiments of this invention, the at least one phytosterol, phytostanol or combination thereof is present in the composition in an amount sufficient to promote health and wellness.

As used herein, the phrases "stanol", "plant stanol" and "phytostanol" are synonymous.

Plant sterols and stanols are present naturally in small quantities in many fruits, vegetables, nuts, seeds, cereals, legumes, vegetable oils, bark of the trees and other plant sources. Although people normally consume plant sterols and stanols every day, the amounts consumed are insufficient to have significant cholesterol-lowering effects or other health benefits. Accordingly, it would be desirable to supplement food and beverages with plant sterols and stanols.

Sterols are a subgroup of steroids with a hydroxyl group at C-3. Generally, phytosterols have a double bond within the steroid nucleus, like cholesterol; however, phytosterols also may comprise a substituted sidechain (R) at C-24, such as an ethyl or methyl group, or an additional double bond. The structures of phytosterols are well known to those of skill in the art.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols (e.g., β-sitosterol, campesterol, stigmasterol, brassicasterol, 22-dehydrobrassicasterol, and Δ5-avenasterol), 4-monomethyl sterols, and 4, 4-dimethyl sterols (triterpene alcohols) (e.g., cycloartenol, 24-methylenecycloartanol, and cyclobranol).

As used herein, the phrases "stanol", "plant stanol" and "phytostanol" are synonymous. Phytostanols are saturated sterol alcohols present in only trace amounts in nature and also may be synthetically produced, such as by hydrogenation of phytosterols. According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals).

The phytosterols and phytostanols of the present invention also may be in their ester form. Suitable methods for deriving the esters of phytosterols and phytostanols are well known to those of ordinary skill in the art, and are disclosed in U.S. Pat. Nos. 6,589,588, 6,635,774, 6,800,317, and U.S. Patent Publication Number 2003/0045473, the disclosures of which are incorporated herein by reference in their entirety. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

H24. Miscellaneous Additives

Other additives can be used in the MRP compositions described herein to enhance flavor characteristics that are sweet, fruity, floral, herbaceous, spicy, aromatic, pungent, "nut-like" (e.g., almond, pecan), "spicy" (e.g., cinnamon, clove, nutmeg, anise and wintergreen), "non-citrus fruit"

flavor (e.g., strawberry, cherry, apple, grape, currant, tomato, gooseberry and blackberry), "citrus fruit" flavor (e.g., orange, lemon and grapefruit), and other useful flavors, including coffee, cocoa, peppermint, spearmint, vanilla and maple.

Thickening agents can be included in the compositions described herein. Examples of the thickening agents include, but are not limited to, carbomers, cellulose base materials, gums, algin, agar, pectins, carrageenan, gelatin, mineral or modified mineral thickeners, polyethylene glycol and polyalcohols, polyacrylamide and other polymeric thickeners. Thickening agents which provide stability and optimal flow characteristics of the composition are preferably used.

Emulsification agents can also be included in the compositions described herein. Suitable examples of emulsification agents include, but are not limited to, agar, albumin, alginates, casein, egg yolk, glycerol monostearate, gums, Irish moss, lecithin, and some soaps.

Generally, the amount of functional ingredients in the composition may vary widely depending on the particular composition and the desired functional ingredient.

V. Caramelization Reaction Products (CRPs) and CRP-Containing Compositions

In addition to Maillard reaction products, caramelization can occur with the compositions disclosed herein. Caramelization may sometimes cause browning in which Maillard reactions occur, but the two processes are distinct. They both are promoted by heating, but the Maillard reaction involves amino acids, as discussed above, whereas caramelization involves the pyrolysis of certain sugars. Such pyrolyzed materials are referred to caramelization reaction products (CRPs). CRPs are also included within the scope of the present embodiments. Thus, embodiments disclosed herein may include MRP(s), CRP(s), or combinations thereof.

Like the Maillard reaction, caramelization is a type of non-enzymatic browning. However, unlike the Maillard reaction, caramelization is pyrolytic, as opposed to being a reaction with amino acids. When caramelization involves the disaccharide sucrose, it is broken down into the monosaccharides fructose and glucose.

The caramelization process is temperature-dependent. Specific sugars each have their own point at which the reactions begin to proceed readily. Impurities in the sugar, such as the molasses remaining in brown sugar, greatly speed the reactions.

In certain embodiments, the present application provides methods and compositions producing caramelized products from high intensity natural sweeteners, such as steviol glycosides, NSG-containing steviol glycosides, glycosylated steviol glycosides, glycosylated NSG-containing steviol glycosides, *Stevia* extracts, NSG-containing *Stevia* extracts, glycosylated *Stevia* extracts and glycosylatred NSG-containing *Stevia* extracts. This can be accomplished by heating these sweeteners at high temperatures that are sufficient to cause caramelization reactions to occur (e.g., from about 100° C. to about 250° C.). The resulting caramelized products, including caramelized steviol glycoside(s) can be further dried to a powder or made into syrup. These embodiments provide a *Stevia* composition having a strong caramel aroma.

In certain exemplary embodiments, caramelization reaction is initiated by heating a solution comprising a carbohydrate and acid to a temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., or any temperature range derived from any of the aforementioned temperatures.

In certain non-limiting embodiments, when utilizing fructose as a substrate, the reaction solution may be heated to a temperature between about 100° C. and 120° C. In other non-limiting embodiments, when utilizing glucose, galactose, or sucrose, the reaction solution may be heated to a temperature between about 150° C. and 170° C. When utilizing maltose, the reaction solution may be heated to a temperature between about 170° C. and 190° C.

Caramelization reactions are also sensitive to the chemical environment. By controlling the level of acidity (pH), the reaction rate (or the temperature at which the reaction occurs readily) can be altered. The rate of caramelization is generally lowest at near-neutral acidity (pH around 7), and accelerated under both acidic (especially pH below 3) and basic (especially pH above 9) conditions.

In exemplary embodiments, the method of the present invention is carried out under acid conditions. In certain embodiments, the pH of the reaction mixture is maintained between about 1.2 and about 3.0, or more particularly, between about 1.5 and about 1.8. In one embodiment, the pH of the reaction mixture is between about 1.2 and about 3.0, or more particularly, about 1.2 and about 2.0, and even more particularly, about 1.5 and about 1.8. In a particular embodiment, the pH of the reaction mixture is about 1.2, about 1.3, about 1.4, about 1.5, about 1.6, about 1.7 or about 1.8.

In one embodiment, a method for producing caramelization products (CRPs) includes the steps of: (a) providing a solution comprising a sweetening agent and an acid; (b) initiating a caramelization reaction; (d) adding ammonium and sulfite to the caramelization reaction; and (e) continuing the caramelization reaction, thereby producing one or more CRPs.

In exemplary embodiments, all ammonium and sulfite to be used in the method are added after the caramelization reaction has initiated, i.e., after step (b). In exemplary embodiments, at least a portion of the ammonium and sulfite to be utilized in the method is added before the caramelization reaction has begun, i.e., before step (b).

Caramelization can occur in the course of Maillard reaction. Exemplary caramelization reactions include, for example, equilibration of anomeric and ring forms sucrose inversion to fructose and glucose, condensation, intramolecular bonding, isomerization of aldoses to ketoses, dehydration reactions, fragmentation reactions, and unsaturated polymer formation In some embodiments, one or more of these non-volatile flavor compounds may be produced, along with unreacted sugar donor(s), unreacted amino donor(s), and may further includes caramelized substances such as disaccharides, trisaccharides, tetrasaccharides etc. formed from sugar donors, dimer-peptides, tri-peptides, tetra-peptides etc. resulting from reactions between amine donors, glycosylamine and their derivatives, such as amadori compounds, heyns compounds, enolisated compounds, sugar fragments, amino acid fragments, as well as non-volatile flavor compounds formed by Maillard reactions of sugar- and amine donors.

It should be understood that throughout this specification, when reference is made to a caramelized reaction products or CRPs, the citation is meant to be inclusive and applicable to all applications of MRPs described herein when possible or feasible, unless otherwise noted, or unless the context expressly excludes such an application.

VI. Consumable Products Comprising Compositions of the Present Application

As described in the previous section, the compositions and methods described herein are useful in a wide range of orally consumable products.

In one aspect, the present application provides an orally consumable product comprising one or more composition(s) of the present application described herein. The term "consumables", as used herein, refers to substances which are contacted with the mouth of man or animal, including substances, which are taken into and subsequently ejected from the mouth, substances which are drunk, eaten, swallowed or otherwise ingested, and are safe for human or animal consumption when used in a generally acceptable range.

The compositions of the present application can be incorporated into any oral consumable, including but not limited to, for example, beverages and beverage products, food products or foodstuffs (e.g., confections, condiments, baked goods, cereal compositions, dairy products, chewing compositions, and tabletop sweetener compositions), pharmaceutical compositions, smoking compositions, oral hygiene compositions, dental compositions, and the like. Consumables can be sweetened or unsweetened. Consumables employing the compositions of the present application are also suitable for use in processed agricultural products, livestock products or seafood; processed meat products such as sausage and the like; retort food products, pickles, preserves boiled in soy sauce, delicacies, side dishes; soups; snacks, such as potato chips, cookies, or the like; as shredded filler, leaf, stem, stalk, homogenized leaf cured and animal feed.

The compositions of the present application can be added to the consumable composition to provide a sweetened consumable composition or a flavored consumable composition. In some embodiments, the compositions of the present application is an MRP composition. As described above, the MRP composition(s) may be combined, before or after the Maillard reaction, with one or more sweetening enhancers, one or more high intensity natural sweeteners, one or more high intensity synthetic sweeteners, and/or one or more additives and/or functional ingredients described herein.

A. Beverages and Beverage Products

In some embodiments, a beverage or beverage product comprises a composition of the present application, or a sweetener composition comprising the same. The beverage may be sweetened or unsweetened. The composition of the present application, or sweetener composition comprising the same, may be added to a beverage to sweeten the beverage or enhance its existing sweetness or flavor profile. In some embodiments, the composition of the present application comprises one or more substances selected from the group consisting of steviol glycosides, NSG-containing steviol glycosides, glycosylated steviol glycosides, glycosylated NSG-containing steviol glycosides, *Stevia* extracts, NSG-containing *Stevia* extracts, glycosylated *Stevia* extracts and glycosylatred, NSG-containing *Stevia* extracts.

A "beverage" or "beverage product," is used herein with reference to a ready-to-drink beverage, beverage concentrate, beverage syrup, or powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g., lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g., black tea, green tea, red tea, oolong tea), coffee, cocoa drink, broths, beverages comprising milk components (e.g., milk beverages, coffee comprising milk components, cafe au lait, milk tea, fruit milk beverages), beverages comprising cereal extracts, and smoothies. Beverages may be frozen, semi-frozen ("slush"), non-frozen, ready-to-drink, concentrated (powdered, frozen, or syrup), dairy, non-dairy, probiotic, prebiotice, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free.

The resulting beverages may be dispensed in open containers, cans, bottles or other packaging. Such beverages and beverage preparations can be in ready-to-drink, ready-to-cook, ready-to-mix, raw, or ingredient form and can use the composition as a sole sweetener or as a co-sweetener.

A significant challenge in the beverage industry is to preserve flavor in drinks. Normally, essential oils and their fractions are used as key flavors. They are prone to be oxidized to create unpleasant flavor(s) or the components easily evaporate to cause the food or beverage to lose their initial designed flavors as they sit on shelves. The embodiments herein provide new methods and compositions to overcome those disadvantages and provide new solutions to the food and flavor industry.

Compared with conventional flavors, which are mainly preserved in different oils or oil soluble solvents, the present embodiments provide new methods to provide water soluble solutions, syrups and powders for flavoring agents.

Compared to conventional isolated flavors, often as extracts from plant or animal sources, which are not always compatible for top note flavor and/or taste when sugar replacement sweeteners are added, the current embodiments provide new types of combined multi components which are compatible for a designed flavor.

The embodiments surprisingly create sugar reduced sweeteners which have better taste than sugar including, for example, sweetening agents such as *Stevia*, monk fruit, licorice, etc. and synthetic sweetener such as sucralose.

Beverage concentrates and beverage syrups can be prepared with an initial volume of liquid matrix (e.g., water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e., the basic ingredient in which the ingredients—including the compositions of the present application—are dissolved. In one embodiment, a beverage comprises water of beverage quality as the matrix, such as, for example deionized water, distilled water, reverse osmosis water, carbon-treated water, purified water, demineralized water or combinations thereof, can be used. Additional suitable matrices include, but are not limited to phosphoric acid, phosphate buffer, citric acid, citrate buffer and carbon-treated water.

The beverage concentrations below can be provided by the composition of the present application or sweetener composition of the present application.

Compared with simple blends of all ingredients together, the degradation of steviol glycosides generates different compositions of sugar donors, which react with amine donors, and have interactions with the taste profile of remaining steviol glycosides, remaining added sugar donor, MRPs, *Stevia*-derived NSG substances and caramelized substances, thus creating complicated, compatible tastes and aromas with steviol glycosides and other flavors, and substantially enriches the stereoscopic feeling of aroma and taste profile.

Traditionally, the use of regular guar gum and other thickeners have been limited to certain applications due to their notable "beany" or "grassy" off notes in both flavor and odor. These "off notes" are the result of volatile organic compounds such as hexanal and hexanoic acid etc. These compounds can influence the sensation of many delicate flavors in food and beverage applications. The MRPs, as well as the compositions and components described herein, can modify the taste of thickeners, such as guar gum, caragum, xanthan gum etc. so that the taste is more pleasing to the consumer. The MRPs described herein could also partially or totally replace thickeners used in the food and beverage industry. There is a synergy between the MRPs and thickeners to obtain a balance of taste and cost. Use of the MRP compositions described herein can reduce the amount of thickener, antioxidants, emulsifiers etc. required when applied to food and beverages. A desired taste and aroma of a food or beverage product can be obtained by adjusting the type of steviol glycosides and ratio of reactants and reaction conditions, such as temperature, pressure, reaction time etc.

The size of bubbles in a carbonated beverage can significantly affect the mouth feel and flavor of the beverage. It is desirable to manipulate one or more properties of the bubbles produced in a beverage. Such properties can include the size of bubbles produced, the shape of bubbles, the amount of bubbles generated, and the rate at which bubbles are released or otherwise generated. Taste tests revealed a preference for carbonated beverage containing bubbles of smaller size. The inventors of the present application have surprisingly found that adding (1) MRPs, (2) MRPs with sweetening agent(s), or (3) MRPs, sweetening agent(s) and thaumatin can minimize the size of bubbles, thus improving the mouth feel and flavor of beverages. Accordingly, in some embodiments, compositions of MRPs, MRPs with sweetening agent(s), MRPs, sweetening agent(s) and thaumatin, with or without other additives, can be used as additives to manipulate the size of bubbles, preferably for reducing the size of bubbles.

The inventors surprisingly found that inclusion of thaumatin in the Maillard reaction or inclusion of thaumatin in combination of MRPs can significantly improve the overall taste profile of food and beverages to have a better mouth feel, a creamy taste, a reduction of bitterness of other ingredients in food and beverage, such as astringency of tea, protein, or their extracts, acidic nature and bitterness of coffee, etc. It can also reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as an additive for improving the taste performance of food and beverage products comprising one or more sweetening agents or sweeteners such as sucralose, acesulfame-K, aspartame, steviol glycosides, swingle extract, sweet tea extracts, allulose, sodium saccharin, sodium cyclamate or siratose.

A probiotic beverage normally is made by fermenting milk, or skimmed milk powder, sucrose and/or glucose with selected bacteria strains, by manufacturers such as Yakult or Weichuan. Normally, a large amount of sugar is added to the probiotic beverage to provide nutrients to the probiotics in order to keep them alive during shelf life. Actually, the main function of such a large amount of sugar is also needed to counteract the sourness of probiotic beverage and enhance its taste. Sweetness and the thickness are the two key attributes that are most affected for the acceptability of the beverage. It is a challenge for the manufacturers to produce tasteful probiotic beverages of reduced sugar versions. The inventors surprisingly found that adding compositions described herein, such as MRPs, sweetening agent(s) and MRPs, sweetening agent(s), MRPs and thaumatin or NSG-containing SEs, could substantially improve the overall-likeability, aroma, and mouth feel of probiotic beverages, especially for reduced sugar, or reduced fat versions. Thus embodiments of probiotic beverages include those with MRPs, combinations of MRPs and thaumatin, combinations of sweeting agent(s) and MRPs, combination of MRPs, sweetening agent and thaumatin, or NSG-containing SEs.

In any of the embodiments described in the present application, the final concentration of the MRP and/or sweetening agent and/or NSG-containing SEs in the beverage may be 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In more particular embodiments, the MRPs, sweetening agent and/or NSG-containing SEs may be present in the beverage at a final concentration ranging from 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph. As used herein, "final concentration" refers to the concentration of, for example, any one of the aforementioned components present in any final composition or final orally consumable product (i.e., after all ingredients and/or compounds have been added to produce the composition or to produce the orally consumable product).

B. Confections

In some embodiments, the orally consumable composition comprising an MRP or other composition of the present application is a confection. In some embodiments, a "confection" refers to a sweet, a lollipop, a confectionery, or similar term. The confection generally contains a base composition component and a sweetener component. A "base composition" refers to any composition which can be a food item and provides a matrix for carrying the sweetener component. An MRP or other composition of the present application comprising the same can serve as the sweetener component. The confection may be in the form of any food that is typically perceived to be rich in sugar or is typically sweet.

In other embodiments of the present application, the confection may be a bakery product, such as a pastry, Bavarian cream, blancmange, cake, brownie, cookie, mousse and the like; a dessert, such as yogurt, a jelly, a drinkable jelly, a pudding; a sweetened food product eaten at tea time or following meals; a frozen food; a cold confection, such as ice, ice milk, lacto-ice and the like (food products in which sweeteners and various other types of raw materials are added to milk products, and the resulting mixture is agitated and frozen); ice confections, such as sherbets, dessert ices and the like (food products in which various other types of raw materials are added to a sugary liquid, and the resulting mixture is agitated and frozen); general confections, e.g., baked confections or steamed confections such as crackers, biscuits, buns with bean-jam filling, halvah, alfajor, and the like; rice cakes and snacks; table top products; general sugar confections such as chewing gum (e.g., including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; cremes including butter cremes, flour pastes, whipped cream and the like; jams including strawberry jam, marmalade and the like; and breads including sweet breads and the like or other starch products, or combinations thereof.

Suitable base compositions for embodiments of this application may include flour, yeast, water, salt, butter, eggs, milk, milk powder, liquor, gelatin, nuts, chocolate, citric acid, tartaric acid, fumaric acid, natural flavors, artificial flavors, colorings, polyols, sorbitol, isomalt, maltitol, lactitol, malic acid, magnesium stearate, lecithin, hydrogenated glucose syrup, glycerine, natural or synthetic gum, starch, and the like, or combinations thereof. Such components generally are recognized as safe (GRAS) and/or are U.S. Food and Drug Administration (FDA)-approved.

In any of the condiments described herein, an MRP or other composition of the present application may be present in the condiment at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP or other composition of the present application may be present in any of the condiments described herein at a final weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

The base composition of the confection may optionally include other artificial or natural sweeteners, bulk sweeteners, or combinations thereof. Bulk sweeteners include both caloric and non-caloric compounds. Non-limiting examples of bulk sweeteners include sucrose, dextrose, maltose, dextrin, dried invert sugar, fructose or fruit sugar, levulose, honey, unrefined sweetener, galactose, syrups, such as agave syrup or agave nectar, maple syrup, corn syrup, including high fructose corn syrup (HFCS); solids, tagatose, polyols (e.g., sorbitol, mannitol, xylitol, lactitol, erythritol, and maltitol), hydrogenated starch hydrolysates, isomalt, trehalose, or mixtures thereof. Generally, the amount of bulk sweetener present in the confection ranges widely depending on the particular embodiment of the confection and the desired degree of sweetness. Those of ordinary skill in the art will readily ascertain the appropriate amount of bulk sweetener.

C. Condiments

In some embodiments, the consumable MRP-containing or NSG-containing composition of the present application is a condiment. Condiments, as used herein, are compositions used to enhance or improve the flavor of a food or beverage. Non-limiting examples of condiments include ketchup (catsup); mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings (e.g., oil and vinegar, Caesar, French, ranch, bleu cheese, Russian, Thousand Island, Italian, and balsamic vinaigrette), salsa; sauerkraut; soy sauce; steak sauce; syrups; tartar sauce; and Worcestershire sauce.

Condiment bases generally comprise a mixture of different ingredients, non-limiting examples of which include vehicles (e.g., water and vinegar); spices or seasonings (e.g., salt, pepper, garlic, mustard seed, onion, paprika, turmeric, or combinations thereof); fruits, vegetables, or their products (e.g., tomatoes or tomato-based products (paste, puree), fruit juices, fruit juice peels, or combinations thereof); oils or oil emulsions, particularly vegetable oils; thickeners (e.g., xanthan gum, food starch, other hydrocolloids, or combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, or combinations thereof). Recipes for condiment bases and methods of making condiment bases are well known to those of ordinary skill in the art.

Generally, condiments also comprise caloric sweeteners, such as sucrose, high fructose corn syrup, molasses, honey, or brown sugar. In exemplary embodiments of the condiments provided herein, an MRP or other composition of the present application is used instead of traditional caloric sweeteners. Accordingly, a condiment composition desirably comprises an MRP or other composition of the present application and a condiment base.

The condiment composition optionally may include other natural and/or synthetic high-potency sweeteners, bulk sweeteners, pH modifying agents (e.g., lactic acid, citric acid, phosphoric acid, hydrochloric acid, acetic acid, or combinations thereof), fillers, functional agents (e.g., pharmaceutical agents, nutrients, or components of a food or plant), flavoring agents, colorings, or combinations thereof.

In any of the confections described herein, an MRP or other composition of the present application may be present in the confection at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP or other composition of the present application may be present in any of the confections described herein, at a final weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

D. Dairy Products

A wide variety of dairy products can be made using the methods and MRP or other compositions of the present invention. Such products include without limitation, milk, whole milk, buttermilk, skim milk, infant formula, condensed milk, dried milk, evaporated milk, fermented milk, butter, clarified butter, cottage cheese, cream cheese, and various types of cheese.

In any of the solid dairy compositions described herein, an MRP or other composition of the present application may be present in the solid dairy composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP or other composition of the present application may be present in any of the confections described herein, at a weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

Alternatively, in any of the liquid dairy compositions described herein, an MRP or other composition of the present application may be present in the liquid dairy composition at a final concentration of 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In more particular embodiments, the MRP or other composition may be present in the liquid dairy composition at a final concentration ranging from 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph.

E. Cereal Compositions

In some embodiments, the consumable comprising an MRP or other composition of the present application is a cereal composition. Cereal compositions typically are eaten either as staple foods or as snacks. Non-limiting examples of cereal compositions for use in some embodiments include ready-to-eat cereals as well as hot cereals. Ready-to-eat cereals are cereals which may be eaten without further processing (i.e., cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, oatmeal, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in some embodiments include maize, wheat, rice, barley, bran, bran endosperm, bulgur, sorghums, millets, oats, rye, triticale, buckwheat, fonio, quinoa, bean, soybean, amaranth, teff, spelt, and kaniwa.

The cereal composition comprises an MRP or other composition of the present application and at least one cereal ingredient. An MRP or other composition of the present application may be added to the cereal composition in a variety of ways, such as, for example, as a coating, as a frosting, as a glaze, or as a matrix blend (i.e., added as an ingredient to the cereal formulation prior to the preparation of the final cereal product).

Accordingly, in some embodiments, an MRP or other composition of the present application is added to the cereal composition as a matrix blend. In one embodiment, the MRP or other composition of the present application is blended with a hot cereal prior to cooking to provide a sweetened hot cereal product. In another embodiment, an MRP or other composition of the present application is blended with the cereal matrix before the cereal is extruded.

In some embodiments, the MRP or other composition of the present application is added to the cereal composition as a coating, such as, for example, in combination with food grade oil and applying the mixture onto the cereal. In a different embodiment, an MRP or other composition of the present application and the food grade oil may be applied to the cereal separately, by applying either the oil or the sweetener first. Non-limiting examples of food grade oils for use some embodiments include vegetable oils such as corn oil, soybean oil, cottonseed oil, peanut oil, coconut oil, canola oil, olive oil, sesame seed oil, palm oil, palm kernel oil, or mixtures thereof. In yet another embodiment, food grade fats may be used in place of the oils, provided that the fat is melted prior to applying the fat onto the cereal.

In another embodiment, the MRP or other composition of the present application is added to the cereal composition as a glaze. Non-limiting examples of glazing agents for use in some embodiments include corn syrup, honey syrups and honey syrup solids, maple syrups and maple syrup solids, sucrose, isomalt, polydextrose, polyols, hydrogenated starch hydrolysate, aqueous solutions thereof, or mixtures thereof. In another such embodiment, an MRP or other composition of the present application is added as a glaze by combining with a glazing agent and a food grade oil or fat and applying the mixture to the cereal. In yet another embodiment, a gum system, such as, for example, gum acacia, carboxymethyl cellulose, or algin, may be added to the glaze to provide structural support. In addition, the glaze also may include a coloring agent, and also may include a flavor.

In another embodiment, an MRP or other composition of the present application is added to the cereal composition as a frosting. In one such embodiment, the MRP or other composition of the present application is combined with water and a frosting agent and then applied to the cereal. Non-limiting examples of frosting agents for use in some embodiments include maltodextrin, sucrose, starch, polyols, or mixtures thereof. The frosting also may include a food grade oil, a food grade fat, a coloring agent, and/or a flavor.

In any of the cereal compositions described herein, an MRP or other composition of the present application may be present in the cereal composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP or other composition of the present application may be present in any of the cereal compositions described herein, at a weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

F. Chewing Compositions

In some embodiments, the consumable comprising an MRP or other composition of the present application is a chewing composition. The term "chewing compositions" include chewing gum compositions, chewing tobacco, smokeless tobacco, snuff, chewing gum and other compositions which are masticated and subsequently expectorated.

Chewing gum compositions generally comprise a water-soluble portion and a water-insoluble chewable gum base portion. The water soluble portion, which typically includes an MRP or other composition of the present application, dissipates with a portion of the flavoring agent over a period of time during chewing while the insoluble gum base portion is retained in the mouth. The insoluble gum base generally determines whether a gum is considered chewing gum, bubble gum, or a functional gum.

The insoluble gum base, which is generally present in the chewing gum composition in an amount in the range of about 15 to about 35 weight percent of the chewing gum composition, generally comprises combinations of elastomers, softeners (plasticizers), emulsifiers, resins, and fillers. Such components generally are considered food grade, recognized as safe (GRA), and/or are U.S. Food and Drug Administration (FDA)-approved.

Elastomers, the primary component of the gum base, provide the rubbery, cohesive nature to gums and can include one or more natural rubbers (e.g., smoked latex, liquid latex, or guayule); natural gums (e.g., jelutong, perillo, sorva, massaranduba balata, massaranduba chocolate, nispero, rosindinha, chicle, and gutta hang kang); or synthetic elastomers (e.g., butadiene-styrene copolymers, isobutylene-isoprene copolymers, polybutadiene, polyisobutylene, and vinyl polymeric elastomers). In a particular embodiment, the elastomer is present in the gum base in an amount in the range of about 3 to about 50 weight percent of the gum base.

Resins are used to vary the firmness of the gum base and aid in softening the elastomer component of the gum base. Non-limiting examples of suitable resins include a rosin ester, a terpene resin (e.g., a terpene resin from α-pinene, β-pinene and/or D-limonene), polyvinyl acetate, polyvinyl alcohol, ethylene vinyl acetate, and vinyl acetate-vinyl laurate copolymers. Non-limiting examples of rosin esters include a glycerol ester of a partially hydrogenated rosin, a glycerol ester of a polymerized rosin, a glycerol ester of a partially dimerized rosin, a glycerol ester of rosin, a pentaerythritol ester of a partially hydrogenated rosin, a methyl ester of rosin, or a methyl ester of a partially hydrogenated rosin. In some embodiment, the resin is present in the gum base in an amount in the range of about 5 to about 75 weight percent of the gum base.

Softeners, which also are known as plasticizers, are used to modify the ease of chewing and/or mouth feel of the chewing gum composition. Generally, softeners comprise oils, fats, waxes, and emulsifiers. Non-limiting examples of oils and fats include tallow, hydrogenated tallow, large, hydrogenated or partially hydrogenated vegetable oils (e.g., soybean, canola, cottonseed, sunflower, palm, coconut, corn, safflower, or palm kernel oils), cocoa butter, glycerol monostearate, glycerol triacetate, glycerol abietate, lecithin, monoglycerides, diglycerides, triglycerides acetylated monoglycerides, and free fatty acids. Non-limiting examples of waxes include polypropylene/polyethylene/Fisher-Tropsch waxes, paraffin, and microcrystalline and natural waxes (e.g., candelilla, beeswax and carnauba). Microcrystalline waxes, especially those with a high degree of crystallinity and a high melting point, also may be considered as bodying agents or textural modifiers. In some embodiments, the softeners are present in the gum base in an amount in the range of about 0.5 to about 25 weight percent of the gum base.

Emulsifiers are used to form a uniform dispersion of the insoluble and soluble phases of the chewing gum composition and also have plasticizing properties. Suitable emulsifiers include glycerol monostearate (GMS), lecithin (phosphatidyl choline), polyglycerol polyricinoleic acid (PPGR), mono and diglycerides of fatty acids, glycerol distearate, tracetin, acetylated monoglyceride, glycerol triacetate, and magnesium stearate. In some embodiments, the emulsifiers are present in the gum base in an amount in the range of about 2 to about 30 weight percent of the gum base.

The chewing gum composition also may comprise adjuvants or fillers in either the gum base and/or the soluble portion of the chewing gum composition. Suitable adjuvants and fillers include lecithin, inulin, polydextrin, calcium carbonate, magnesium carbonate, magnesium silicate, ground limestone, aluminum hydroxide, aluminum silicate, talc, clay, alumina, titanium dioxide, and calcium phosphate. In some embodiments, lecithin can be used as an inert filler to decrease the stickiness of the chewing gum composition. In other some embodiments, lactic acid copolymers, proteins (e.g., gluten and/or zein) and/or guar can be used to create a gum that is more readily biodegradable. The adjuvants or fillers are generally present in the gum base in an amount up to about 20 weight percent of the gum base. Other optional ingredients include coloring agents, whiteners, preservatives, and flavors.

In some embodiments of the chewing gum composition, the gum base comprises about 5 to about 95 weight percent of the chewing gum composition, more desirably about 15 to about 50 weight percent of the chewing gum composition, and even more desirably from about 20 to about 30 weight percent of the chewing gum composition.

The soluble portion of the chewing gum composition may optionally include other artificial or natural sweeteners, bulk sweeteners, softeners, emulsifiers, flavoring agents, coloring agents, adjuvants, fillers, functional agents (e.g., pharmaceutical agents or nutrients), or combinations thereof. Suitable examples of softeners and emulsifiers are described above.

Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, or mixtures thereof. In some embodiments, the bulk sweetener is present in the chewing gum composition in an amount in the range of about 1 to about 75 weight percent of the chewing gum composition.

Flavoring agents may be used in either the insoluble gum base or soluble portion of the chewing gum composition. Such flavoring agents may be natural or artificial flavors. In some embodiments, the flavoring agent comprises an essential oil, such as an oil produced from a plant or a fruit, peppermint oil, spearmint oil, other mint oils, clove oil, cinnamon oil, oil of wintergreen, bay, thyme, cedar leaf, nutmeg, allspice, sage, mace, and almonds. In another embodiment, the flavoring agent comprises a plant extract or a fruit essence such as apple, banana, watermelon, pear, peach, grape, strawberry, raspberry, cherry, plum, pineapple, apricot, or mixtures thereof. In still another embodiment, the flavoring agent comprises a citrus flavor, such as an extract, essence, or oil of lemon, lime, orange, tangerine, grapefruit, citron, or kumquat.

In some embodiments, the chewing gum composition comprises an MRP or other composition of the present application and a gum base.

In any of the chewing gum compositions described herein, an MRP or other composition of the present application may be present in the chewing gum composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP or other composition of the present application may be present in any of the chewing gum compositions described herein, at a weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

G. Tabletop Sweetener Compositions

In general, tabletop sugar replacements lack certain taste attributes associated with sugar, especially for solid tabletop sweeteners. In addressing this need, the inventor of the present application has developed more palatable tabletop sugar replacements than commonly known. Specifically, in some embodiments, the present application provides an orally consumable composition comprising an MRP or other composition of the present application in the form of an orally consumable tabletop sweetener composition. In one embodiment, the orally consumable tabletop sweetener composition has a taste similar to molasses (Example 241).

In some embodiments, the tabletop sweetener replacement includes one or more *Stevia*-based MRP compositions utilizing glycosylated steviol glycosides as described in the present application. Compared with standard steviol glycosides, such as RA50/SG 95 and RA80/SG 95, adding MRPs or S-MRPs in tabletop sweeteners can tastefully enhance, for example, the flavor of tea or coffee. Similarly, these MRPs or S-MRPs can play a similar role when applied to powdered beverages.

In some embodiments, the tabletop sweetener composition may further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, or mixtures thereof. Additionally, in accordance with still other embodiments of the application, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refers to any composition which assists in content uniformity and uniform dissolution. In some embodiments, non-limiting examples of anti-caking agents include cream of tartar, aluminium silicate (Kaolin), calcium aluminium silicate, calcium carbonate, calcium silicate, magnesium carbonate, magnesium silicate, mono-, di- and tri-calcium orthophosphate, potassium aluminium silicate, silicon dioxide, soldium aluminium silicate, salts of stearic acid, microcrystalline cellulose (Avicel, FMC BioPolymer, Philadelphia, Pa.), and tricalcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (~8 g). The amount of an MRP composition of the present application in a dry-blend tabletop sweetener formulation can vary. In some embodiments, a dry-blend tabletop sweetener formulation may comprise a Composition of the present application in an amount from about 1% (w/w) to about 10% (w/w) of the tabletop sweetener composition.

Solid tabletop sweetener embodiments include cubes and tablets. A non-limiting example of conventional cubes is equivalent in size to a standard cube of granulated sugar, which is approximately 2.2×2.2×2.2 $cm^3$ and weighs approximately 8 g. In one embodiment, a solid tabletop sweetener is in the form of a tablet or any other form known to those skilled in the art.

A tabletop sweetener composition also may be embodied in the form of a liquid, wherein an MRP or other composition of the present application is combined with a liquid carrier. Suitable non-limiting examples of carrier agents for liquid tabletop sweeteners include water, alcohol, polyol, glycerin base or citric acid base dissolved in water, or mixtures thereof. The sweetness equivalent of a tabletop sweetener composition for any of the forms described herein or known in the art may be varied to obtain a desired sweetness profile. For example, a tabletop sweetener composition may have a degree of sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

In any of the tabletop sweetener compositions described herein, an MRP or other composition of the present application may be present in the tabletop sweetener composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt %, or a weight concentration range defined by any two of the aforementioned weight percentages in this paragraph.

In more particular embodiments, an MRP or other composition of the present application may be present in any of the tabletop sweetener compositions described herein, at a weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

H. Medicinal Compositions

In certain embodiments, the MRP or other compositions of the present application may be used in medicinal compositions. As used herein, the term "medicinal composition" includes solids, gases and liquids which are ingestible materials having medicinal value, such as cough syrups, cough drops, medicinal sprays, vitamins, and chewable medicinal tablets that are administered orally or used in the oral cavity in the form of e.g., a pill, tablet, spray, capsule, syrup, drop, troche agent, powder, and the like.

I. Oral Hygiene Compositions

In some embodiments, the MRP or other compositions of the present application may be used in an oral hygiene composition. As used herein, the "oral hygiene composition" includes mouthwashes, mouth rinses, breath fresheners, toothpastes, tooth polishes, dentifrices, mouth sprays, teeth whitening agents, soaps, perfumes, and the like.

J. Cosmetic Compositions

In some embodiments, the MRP or other compositions of the present application may be utilized in a cosmetic composition for enhancing the aroma of a cosmetic or skin-care product. As used herein, the term "cosmetic composition" means a composition that is formulated for topical application to skin, which has a pleasant colour, odour and feel, and which does not cause unacceptable discomfort (stinging, tautness or redness) liable to discourage the consumer from using it.

Cosmetic composition may be preferably formulated in the form of an emulsion, e.g., W/O (water-in-oil), O/W (oil-in-water), W/O/W (water-in-oil-in-water), O/W/O (oil-in-water-in-oil) emulsion, PIT emulsion, Pickering emulsion, emulsion with a low oil content, micro- or nanoemulsion, a solution, e.g., in oil (fatty oils or fatty acid esters, in particular $C_6$-$C_{32}$ fatty acid $C_2$-$C_{30}$ esters) or silicone oil, dispersion, suspension, creme, lotion or milk, depending on the production method and ingredients, a gel (including hydrogel, hydrodispersion gel, oleogel), spray (e.g., pump spray or spray with propellant) or a foam or an impregnating solution for cosmetic wipes, a detergent, e.g., soap, synthetic detergent, liquid washing, shower and bath preparation, bath product (capsule, oil, tablet, salt, bath salt, soap, etc.), effervescent preparation, a skin care product such as e.g., an emulsion (as described above), ointment, paste, gel (as described above), oil, balsam, serum, powder (e.g., face powder, body powder), a mask, a pencil, stick, roll-on, pump, aerosol (foaming, non-foaming or post-foaming), a deodorant and/or antiperspirant, mouthwash and mouth rinse, a foot care product (including keratolytic, deodorant), an insect repellent, a sunscreen, aftersun preparation, a shaving product, aftershave balm, pre- and aftershave lotion, a depilatory agent, a hair care product such as e.g., shampoo (including 2-in-1 shampoo, anti-dandruff shampoo, baby shampoo, shampoo for dry scalps, concentrated shampoo), conditioner, hair tonic, hair water, hair rinse, styling creme, pomade, perm and setting lotion, hair spray, styling aid (e.g., gel or wax), hair smoothing agent (detangling agent, relaxer), hair dye such as e.g., temporary direct-dyeing hair dye, semi-permanent hair dye, permanent hair dye, hair conditioner, hair mousse, eye care product, make-up, make-up remover or baby product.

K. Smokable Compositions

In some embodiments, the MRP or other compositions of the present application may be used in a smokable composition. The term "smokable composition," as used herein, includes any material that can be smoked or inhaled, such as tobacco and cannabis, as well as any smokable material that is burned to provide desirable aromas (e.g., charcoal briquettes for grilling foods, incense etc). The smoking compositions may encompass cigarettes, electronic cigarettes (e-cigarettes), cigars, pipe and cigar tobacco, chew tobacco, vaporizable liquids, and all forms of tobacco such as shredded filler, leaf, stem, stalk, homogenized leaf cured, reconstituted binders, reconstituted tobacco from tobacco dust, fines, or other sources in sheet, pellet or other forms. "Smokable compositions" also include cannabis compositions (e.g., flower materials, leaf materials, extracts, oils, edible candies, vaporizable liquids, cannabis-infused beverages, etc.) and tobacco substitutes formulated from non-tobacco materials.

VII. Use of the MRP and Other Compositions

The compositions and methods described herein are useful in a wide range of orally consumable products. A non-limiting outline of products for application of the MRP or other compositions described herein includes the following:

1 Dairy Products
1.1 Milk and dairy—based drinks
Milk and buttermilk
Buttermilk (plain)
Dairy based drinks, flavored and/or fermented
1.2 Fermented, renneted milk products (excluding drinks)
1.3 Condensed milk and analogues
Condensed milk (plain)
Beverage whiteners
1.4 Cream (plain) and similar products
Pasteurized cream
Sterilized, UHT, whipping or whipped and reduced-fat creams
Clotted cream
Cream analogues
1.5 Milk or cream powders
Milk or cream powders
Milk or cream powders analogues
1.6 Cheese
Unripened cheese
Ripened cheese
Whey cheese
Processed cheese
Cheese analogues
1.7 Dairy-based desserts (e.g., ice cream, ice milk, pudding, fruit or flavored yogurt)
1.8 Whey and whey products, excluding whey cheese
2 Fats and oils and fat emulsions (type water-in-oil)
2.1 Fats and oils essentially free from water
2.2 Fat emulsions, water-in-oil 2.3 Fat emulsions other than 2.2, including mixed and/or flavored products based on fat emulsions.
2.4 Fat-based desserts (excluding dairy-based desserts)
3 Edible ices, including sherbet and sorbet
4, Fruits and vegetables (including mushrooms and fungi, roots and tubers, pulses and legumes) and nuts and seeds
4.1 Fruit
4.1.1 Fresh fruit
Untreated fruit
Surface—treated fruit
Peeled or cut fruit
4.1.2 Processed fruit
Frozen fruit
Dried fruit
Fruit in vinegar, oil or brine
Canned or bottled (pasteurized) fruit
Jams, jellies and marmalades
Fruit—based spread
Candied fruit
Fruit preparations, including pulp and fruit toppings
Fruit-based desserts, including fruit-flavored water-based desserts
Fermented fruit products
Fruit fillings for pastries
Cooked or fried fruits
4.2 Vegetables (including mushrooms and fungi, roots and tubers, pulses and legumes) and nuts and seeds
4.2.1 Fresh vegetables
Untreated vegetables
Surface treated vegetables
Peeled or cut vegetables
4.2.2 Processed vegetable and nuts and seeds
Frozen vegetable
Dried vegetables
Vegetables in vinegar, oil or brine
Canned or bottled (pasteurized) vegetables
Vegetable, nut and seed purees and spreads
Vegetable, nut and seed pulps and preparations
Fermented vegetable products
Cooked or fried vegetables
5 Confectionery
5.1 Cocoa products and chocolate products, including imitations and chocolate substitutes
Cocoa mixes (powder and syrups)
Cocoa based spreads, including fillings
Cocoa and chocolate products (e.g., milk chocolate bars, chocolate flakes, white chocolate)
Imitation chocolate and chocolate substitute products
5.2 Sugar-based confectionery other than 5.1, 5.3 and 5.4, including hard and soft candy and nougats
5.3 Chewing gum
5.4 Decorations (e.g., for fine bakery wares), toppings (non-fruit) and sweet sauces
6 Cereals and cereal products, including flours and starches from roots and tubers, and pulses and legumes, excluding bakery wares
Whole, broken or flaked grain, including rice
Flours and starches
Breakfast cereals, including rolled oats
Pastas and noodles
Cereals and starch-based desserts (e.g., rice pudding, tapioca pudding)
Batters (e.g., for fish or poultry)
7 Bakery wares
7.1 Bread and ordinary bakery wares
Breads and rolls
Crackers, excluding sweet crackers
Other ordinary bakery products (e.g., bagels, pitta, English muffins)
Bread-type products, including bread stuffing and breadcrumbs
7.2 Fine bakery wares
Cakes, cookies and pies (e.g., fruit-filled or custard types)
Other fine bakery products (e.g., doughnuts, sweet rolls, scones and muffins)
Mixes for fine bakery wares (e.g., cakes, pancakes)
8 Meat and meat products, including poultry and game
8.1 Fresh meat, poultry and game
Fresh meat, poultry and game, whole pieces or cuts
Fresh meat, poultry and game, comminuted
8.2 Processed meat, poultry and game products in whole pieces or cuts
8.3 Processed comminuted meat, poultry and game products
8.4 Edible casings (e.g., sausage casings)
9, Fish and fish products, including mollusks, crustaceans and echinoderms
9.1 Fish and fish products
9.2 Processed fish and fish products
9.3 Semi-preserved fish and fish products
9.4 Fully preserved fish and fish products
10 Eggs and egg products
10.1 Fresh egg
10.2 Egg products
10.3 Preserved eggs
10.4 Egg-based desserts
11 Sweeteners, including honey
11.1 White and semi-white sugar (sucrose or sacharose), fructose, glucose (dextrose), xylose, sugar solutions and syrups, and (partially) inverted sugars, including molasses, treacle and sugar toppings.
11.2 Other sugar and syrups (e.g., brown sugar, maple syrup)
11.3 Honey
11.4 Table—top sweeteners, including those containing high-intensity sweeteners, other than 11.1-11.3
12 Salt, spices, soups, sauces, salads, protein products, etc
12.1 Salt
12.2 Herbs, spices, seasonings (including salt substitutes) and condiments
12.3 Vinegars
12.4 Mustards
12.5 Soups and broths
Ready-to-eat soups and broths, including canned, bottled and frozen
Mixes for soups and broths
12.6 Sauces and similar products
Emulsified sauces (e.g., mayonnaise, salad dressing)
Non-emulsified sauces (e.g., ketchup, cheese sauce, cream sauce, brown gravy)
Mixes for sauces and gravies
12.7 Salads (e.g., macaroni salad, potato salad) and sandwich spreads (excluding cocoa- and nut-based spreads)
12.8 Yeast
12.9 Protein products
13 Foodstuffs intended for particular nutritional uses
13.1 Infant formulae and follow-up formulae
13.2 Foods for young children (weaning food)
13.3 Diabetic foods intended for special medical purposes
13.4 Diabetic formulae for slimming purposes and weight reduction
13.5 Diabetic foods other than 13.1-13.4
13.6 Food supplements 14 Beverage excluding dairy products
14.1 Non-alcoholic ("soft") beverages
14.1.1 Waters
Natural mineral waters and source waters
Table waters and soda waters
14.1.2 Fruit and vegetable juices
Canned or bottled (pasteurized) fruit juice
Canned or bottled (pasteurized) vegetable juice
Concentrates (liquid or solid) for fruit juice
Concentrates (liquid or solid) for vegetable juice
14.1.3 Fruit and vegetable nectars
Canned or bottled (pasteurized) fruit nectar
Canned or bottled (pasteurized) vegetable nectar
Concentrate (liquid or solid) for fruit nectar
Concentrate (liquid or solid) for vegetable nectar
14.1.4 Water-based flavored drinks, including 'sport' or 'electrolyte" drinks
Carbonated drinks
Non-carbonated drinks, including punches
Concentrates (liquid or solid) for drinks
14.1.15 Coffee, coffee substitutes, tea, herbal infusions and other hot cereal beverages, excluding cocoa
14.2 Alcoholic beverages, including alcohol-free and low-alcoholic counterparts
14.2.1 Beer or malt beverage
14.2.2 Cider and perry
14.2.3 Wines
Still wine
Sparking and semi-sparkling wines
Fortified wine and liquor wine
Aromatized wine
14.2.4 Fruit wine
14.2.5 Mead
14.2.6 Spirituous beverages
Spirituous beverage containing at least 15% alcohol
Spirituous beverage containing less than 15% alcohol
15 Ready-to-eat savories
Snacks, potato-, cereal-, flour-, or starch-based (from roots and tubers, pulses and legumes)
Processed nuts, including coated nuts and nut mixtures (with e.g., dried fruit)
16 Composite foods (e.g., casseroles, meat pies, mince-meat)—foods that could not be placed in categories 1-15.

The MRP or other compositions of the present application address needs in various industries. For example, in view of the increasing demand of natural flavors, such as vanilla, citrus, cocoa, coffee etc., the food and beverage industries face a big challenge to meet consumers' requirements. For example, the harvest of citrus in recent years has been heavily influenced by fruit disease which has created a shortage. Vanilla, coffee and cocoa supply is always strongly influenced by climate. To increase their availability, farmers have to use more land to compete with other necessary cultivation of food and vegetable products, thus there is an additional danger of deforestation. Therefore, there is a need to find alternative sources to complement the market demand. The inventors surprisingly found that adding MRPs could significantly improve the taste profile of flavors, lower the threshold of flavors and reduce the amount of flavors to be used. An embodiment comprises MRPs (or mixture of MRPs and sweetening agent, or mixture of MRPs, sweetening agent and thaumatin) and flavor.

While consumers demand "cleaner" labels, retailers demand longer shelf life. The use of natural antioxidants such as tocopherols and rosemary extracts can solve these problems simultaneously. However, natural antioxidants always retain their own characteristic aroma, which makes it difficult to incorporate them in food and beverages. There is a need to look for alternative solutions. The inventors surprisingly found that adding MRPs to food or beverages can significantly reduce the negative aroma of antioxidants and provide a synergy of positive antioxidant properties. In one embodiment, a composition comprising MRPs (or a mixture of MRPs and sweetening agent(s) with or without thaumatin) and a natural antioxidant is disclosed.

Thaumatin is a good alternative solution for sugar reduction. However, its lingering taste makes it difficult to be used at higher dosages. The inventors surprisingly found adding MRPs could substantially reduce the lingering and bitterness of thaumatin and widen its usage in foods and beverages. In one aspect, compositions comprising MRPs and thaumatin are disclosed, including food or beverages comprising MRPs and thaumatin. Addition, of a sweetening agent, such as *Stevia*, together with MRPs can significantly improve the taste profile of thaumatin, reducing its lingering taste. Thaumatin has synergy with MRPs to reduce the bitterness and/or aftertaste of *Stevia*.

It should be understood throughout that various compositions can include combinations of one or more MRP(s); or one or more MRP(s) with thaumatin (or one or more sweetener(s)); or one or more MRP(s) with one or more sweetening agent(s); or one or more MRP(s) with one or more sweetening agent(s) and one or more sweeteners, e.g., thaumatin.

The intense sweetness and flavor/aroma enhancement properties associated with the MRP technology described herein provides useful applications in improving the palatability of medicines, traditional Chinese medicine, food supplements, beverage, food containing herbs, particularly those with unpleasant long-lasting active ingredients not easily masked by sugar or glucose syrups, let alone sweetening agents or synthetic high intensity sweeteners. The inventor of the present application has surprisingly found that the compositions described herein can mask the unpleasant taste and smell for products containing these substances, for instance Goji berries juice, sea buckthorn juice, milk thistle extract, *Ginkgo biloba* extract etc. Thus, in medicinal compositions, including traditional Chinese medicine, and in food supplements, one or more of compositions described herein may be particularly useful as masking agents.

Thickeners, including hydrocolloids and polyols, may be included in a liquid composition to improve the mouth feel by increasing viscosity, and may also be used in solid base products, as fillers for low cost sugar products. However, they could create a chalky or a floury taste, and higher viscosities would make a beverage less palatable. Therefore, there is a need to find a solution to reduce the amount of thickeners to be used for food and beverage especially for sugar, fat and salt reduction products. The inventors surprisingly found that adding MRPs could enhance the mouth feel of thickeners and have a synergistic effect without necessarily increasing the viscosity, thus improving the palatability of the food or beverage. An embodiment comprises MRPs (or mixture of MRPs and sweetening agent(s), or mixture of MRPs, sweetening agents and thaumatin) and a thickener, wherein the thickener is selected from one or more hydrocolloids and/or polyols.

MRPs create significant challenges for the food industry. A lot of resources have been expended to prevent Maillard reactions in food proceeding in order to preserve food quality. Therefore, there is a need to find methods to produce useful MRPs which the food and beverage industry could benefit from.

In one aspect, 2-Amino-1-methyl-6-phenylimidazo (4, 5-b)pyridine (PhlP) is formed in high amounts and is usually responsible for around 80% of the aromatic amines present in cooked meat products. It is listed on the IARC list of carcinogens. It is now understood that (HAAs) are over 100 fold more mutagenic than Aflatoxin B1. For example, heterocyclic aromatic amines (HAAs) can be formed under mild conditions—when glucose, glycine and creatine/creatinine are left at room temperature in a phosphate buffer for 84 days HAA's are formed. HAA's are reported in all kinds of cooked meat and fish products especially those that have been grilled, barbecued or roasted. Traditional restaurant food preparation tends to produce more HAA's than fast food outlets. With chicken, deep fat frying produces the highest levels of HAA's. Increasing mutagenic activity correlates with increased weight loss during cooking. In BBQ'd beef additional mutagenic components are present.

Acrylamide, for example, was first identified in 2002 by Margaret Tornquist of Stockholm University. She compared the blood samples of Swedish tunnel builders working with a sealant containing acrylamide with those of the general population. The results showed that the general population was regularly exposed to high levels of acrylamide. Rat feeding studies revealed that acrylamide increased the rates of several types of cancer. All these results showed that there is a need to find alternative solutions to provide the desired taste without these harmful substances, especially for bread, grilled meat, roasted coffee and chocolate.

The inventors' solution was to select suitable sugars and amine donors to create tastes or flavors, which can be added in food or beverages, especially for sweet foods and beverages. The addition of healthier MRPs can allow for conditions of baking, frying, grilling, and roasting of foods to be conducted at lower temperatures, to have shorter heating times, and to reduce the amount of harmful substances, and/or avoid creating harmful substances compared with traditional food process methods. Meanwhile, traditional methods for heating whole foods consume a lot of energy and create more pollution when compared to the methods and compositions of the present invention. The present invention facilitates the use of new methods of baking, frying, grilling and roasting without compromising taste. In one aspect, a food or beverage can include healthier and less harmful MRPs.

The naturally formed MRPs in bread upon baking or in meat products upon grilling do not necessarily provide predictable and/or reproducible aromas or tastes when prepared. The MRP technology employed herein can serve to render the aroma and taste profiles of food and beverages to be more predictable and reproducible, since the same amount(s) of MRPs can be added from different batches to yield the same aroma/taste in the same product.

Proteins constitute an important constituent in foods and beverages for promoting health. However, protein's raw egg taste and smell is an obstacle for wider use. Bean protein, whey protein and coconut protein possess characteristic unpleasant tastes after drying. Accordingly, there is a need for solutions to make them more palatable. The present inventors have surprisingly found that adding compositions of this invention can significantly block the unpleasant taste of certain proteins so as to make them more palatable to consumers.

For example, one embodiment pertains to a composition of protein(s) and MRPs (or mixtures of MRPs and sweetening agent(s), or mixtures of MRPs, sweetening agent(s) and thaumatin), or proteins and *Stevia*-derived NSG substances. Such compostions may be included in food products and beverages.

Reduced fat foods and beverages are prevalent in the market. However, lack of mouth feel and saturated fat taste on the tongue make them unpalatable for some consumers. Thus, there exists a need to address this problem. The inventors have surprisingly found that adding compositions this invention can significantly improve the mouth feel and overall taste of reduced fat foods and beverages. One embodiment pertains to compositions comprising fats and MRPs (or mixtures of MRPs and sweetening agent(s), or mixture(s) of MRPs, sweetening agent(s) and thaumatin), or fats and *Stevia*-derived NSG substances. Another embodiment pertains to partially or completely reduced fat foods and beverages comprising *Stevia*-derived NSG substances, MRPs, mixture(s) of MRPs and sweetening agent(s), or mixture(s) of MRPs, sweetening agent(s) and thaumatin. Furthermore, the present inventors further surprisingly discovered that the Maillard reaction products as prepared herein can be used as a fat substitute in the food and beverage industries.

Reduced salt foods and beverages are in high demand. However, the taste is not very satisfying to most consumers. Thus, there is a need to find a solution to enhance the salty taste without increasing sodium intake. The inventors surprisingly found there is synergy of MRPs, mixture(s) of MRPs and sweetening agent(s), mixture(s) of MRPs and sweetening agent(s) and thaumatin with salt. One embodiment pertains to reduced compositions of salt with MRPs, or mixture(s) of MRPs and sweetening agent(s), mixture(s) of MRPs and sweetening agent(s) and thaumatin. Other embodiments provide salted foods or beverages with *Stevia*-derived NSGs, MRPs, mixture(s) of MRPs and sweetening agent(s), or mixture(s) of MRPs, sweetening agent(s) and thaumatin.

Foods and beverages containing vegetable or vegetable juices, especially garlic, ginger, beet root etc. have strong characteristic flavors, which can present significant taste barriers for certain consumers. Thus, there is need to neutralize negative tastes and/or enhance positive tastes corresponding to such foods or beverages. The inventors have surprisingly found that adding the compositions the present application can harmonize the taste of such foods and beverages so as to make them more palatable and delicious to consumers. One embodiment provides vegetable-containing foods and beverages comprising *Stevia*-derived NSGs, MRPs, mixture(s) of MRPs and sweetening agent(s), or mixture(s) of MRPs, sweetening agent(s) and thaumatin.

Vegetables with a bitter taste, such as artichokes, broccoli, radicchio, arugula, brussels sprouts, chicory, white asparagus, endives, kale, brassica plants, dandelions, eggplant and bitter melon provide healthy and nutritious nutrients when present in foods and beverages. However, in view of their bitter and/or otherwise undesirable tastes, there is a need to neutralize or mask the bitter tastes associated with these vegetables. The inventors of the present application have surprisingly found that adding the compositions of the present application can harmonize the taste of such foods and beverages and make them more palatable and delicious. One embodiment pertain to vegetable containing foods and beverages comprising *Stevia*-derived NSGs, MRPs, mixture(s) of MRPs and sweetening agent(s), or mixture of MRPs, sweetening agent(s) and thaumatin.

Foods and beverages containing juices, juice concentrate, or fruit extract such as cranberry, pomegranate, bilberry, raspberry, lingonberry, grapefruit, lime and citrus have a sour and astringent taste. The inventors surprisingly found that adding compositions of this invention could harmonize the taste and make it acceptable to consumers. One embodiment contains fruit or fruit juice foods or beverages comprising *Stevia*-derived NSGs, MRPs, or mixture(s) of MRPs and sweetening agent(s), or mixture of MRPs, sweetening agent(s) and thaumatin.

Foods and beverages containing minerals and trace elements can have a metallic taste. There is a need to find a solution to overcome this drawback. The inventors surprisingly found that adding compositions of this invention could block the metallic taste of minerals, thus improving the palatable taste of foods and beverages to consumers. One embodiment pertains to mineral enriched foods or beverages with *Stevia*-derived NSGs, MRPs, or mixture(s) of MRPs and sweetening agent(s), or mixture(s) of MRPs, sweetening agent(s) and thaumatin.

Vitamin fortified foods and beverages provide challenges to acceptable taste due to bitterness or stale taste associated with Vitamin B series and sour and tingling tastes for Vitamin C. The inventors surprisingly found that adding composition of this invention could block the bitterness of Vitamin B series and improve the taste and mouth feel of Vitamin C as well as overall likeability. One embodiment is a vitamin fortified food or beverage with *Stevia*-derived NSGs, MRPs, or mixture(s) of MRPs and sweetening agent(s), or mixture of MRPs, sweetening agent(s) and thaumatin.

Foods and beverages containing amino acids such as arginine, aspartic acid, cysteine HCl, glutamine, histidine HCl, isoleucine, lysine HCl, methionite, proline, tryptophan and valine have bitter, metallic or an alkaline taste. A solution is required to overcome these drawbacks. The inventors surprisingly found that adding compositions of this invention to amino acids could block the bitter, metallic or alkaline taste. One embodiment pertains to amino acid enriched foods and beverages with *Stevia*-derived NSGs, MRPs, or mixture(s) of MRPs and sweetening agent(s), or mixture(s) of MRPs, sweetening agent(s) and thaumatin.

Foods and beverages containing fatty acids such as linoleic acid, linolenic acid and palmitoleic acid have a mineral or pungent taste. There is a need to find a solution to overcome these drawbacks. The inventors surprisingly found that adding composition of this invention could block the mineral or pungent taste of fatty acids. One embodiment pertains to fatty acid containing foods and beverages with *Stevia*-derived NSGs, MRPs, or mixture(s) of MRPs and sweetening agent(s), or mixture(s) of MRPs, sweetening agent(s) and thaumatin.

Foods and beverages that contain natural herbs, natural herb extracts, concentrates, purified substances from herbs such as tonic water, etc. have earthy, grassy, herb tastes which are unpalatable to a lot of consumers. There is need to find a solution. The inventors surprisingly found that adding the compositions this invention could significantly mask or reduce the grassy, earthy or herb taste in such foods and beverages. One embodiment provides an herb or herb extract enriched food or beverage with *Stevia*-derived NSGs, MRPs, or mixture(s) of MRPs and sweetening agent(s), or mixture of MRPs, sweetening agent(s) and thaumatin.

Foods and beverages that contain caffeine, tea extract, ginseng juice or ginseng extract, taurine or guarana that function to boost energy, while having an earthy or bitter taste, which requires a solution. The inventors surprisingly found that adding the compositions of this invention could significantly mask or reduce the earthy or bitter taste of such foods and beverages. One embodiment provides an energy food or beverage with *Stevia*-derived NSGs, MRPs, or mixture(s) of MRPs and sweetening agent(s), or mixture(s) of MRPs, sweetening agent(s) and thaumatin.

Foods and beverages that contain cocoa powder or coffee powder, cocoa or coffee extract, have a bitter taste. The inventors surprisingly found that adding the compositions of this invention could significantly mask the bitter taste and/or enhance the flavor of such foods and beverages. One embodiment provides a cocoa or coffee containing foods or beverages comprising *Stevia*-derived NSGs, MRPs, or mixture(s) of MRPs and sweetening agent(s), or mixture(s) of MRPs, sweetening agent(s) and thaumatin.

Foods and beverages that contain tea powder or tea extract, or flavored tea have a bitter taste or astringent mouth feel. The inventors surprisingly found that adding the compositions of this invention could significantly mask the bitter taste and/or improve the mouth feel.

An embodiment provides a tea containing food or beverage with *Stevia*-derived NSGs, MRPs, or mixture(s) of MRPs and sweetening agent(s), or mixture(s) of MRPs, sweetening agent(s) and thaumatin.

Alcoholic products such as wine, liquor, whisky etc. have huge variations in taste due to changes in quality of raw materials from year to year. Also there are customers that can not accept the astringent taste etc. of the alcohol, thus, there is a need to find a solution to produce tasty alcohol products. The inventors surprisingly found that adding the compositions of this invention could block the astringent taste and make the product taste more full. One embodiment of alcohol in products includes *Stevia*-derived NSGs, MRPs, or mixture(s) of MRPs and sweetening agent(s), or mixture(s) of MRPs, sweetening agent(s) and thaumatin.

Sauces, such as soy bean sauces, jams, chocolate, butter, cheese etc. can not depend upon fermentation to create flavors to meet consumers' demands. There is a need to find a simple solution to enhance the taste and flavor of these products. The inventors found that adding the compositions of this invention could improve the overall taste of these fermented products. One embodiment provides sauces or fermented products with *Stevia*-derived NSGs, MRPs, or mixture(s) of MRPs and sweetening agent(s), or mixture(s) of MRPs, sweetening agent(s) and thaumatin With the increase of obesity and a diabetic population, limiting sugar has become a top concern for consumers seeking healthy diet choices worldwide, with consumers preferring low sugar foods and beverages, but without the sacrifice in taste. High intensive natural sugar alternatives, such as *Stevia* extract, swingle extract and sweet tea extract, and artificial high intensive sweetener, such as sucralose, ACE-K and aspartame can be utilized to provide reduced sugar foods and beverages, where these highly intensive sugar alternatives have a unique taste profile, but do not taste exactly like sugar. Some bring bitter or metallic off notes, which result in low sugar food and beverages having an unsatisfactory taste to consumers' palates. A solution to improve the taste of low sugar foods and beverages is imperative in the promotion of a healthy diet.

Current beverages with low sugar or sugar free, such as fruit juices and concentrates for fruit juice, vegetable juice and concentrate for vegetable juice, fruit nectars and concentrates from fruit nectar, vegetable nectar and concentrate from vegetable nectar, tastes flat and watery with an unpleasant aftertaste. The inventors surprisingly found that adding the composition of this invention could improve the taste profile, remove bitter or metallic aftertaste, and make the beverage taste more like sugar. One embodiment of low sugar or sugar free beverages includes *Stevia*-derived NSGs, MRPs, or mixture(s) of MRPs and sweetening agent(s), or mixture(s) of MRPs, sweetening agent(s) and thaumatin.

Water-based flavored beverages, including "sport", "energy" or "electrolyte" beverages and in particular, beverages such as carbonated water-based flavored beverages, non-carbonated water based flavored beverages, concentrates (liquid or solid) for water-based flavored beverages, often taste flat and watery with an unpleasant aftertaste. The inventors surprisingly found that by adding the compositions of this invention to the beverages could improve the taste profile, remove bitter or metallic aftertaste, and/or the flavor is enhanced. One embodiment pertains to low sugar or sugar free water-based flavored beverages with *Stevia*-derived NSGs, MRPs, or mixture(s) of MRPs and sweetening agent(s), or mixture(s) of MRPs, sweetening agent(s) and thaumatin.

Low sugar or sugar free dairy foods and beverages such as milk and flavored milk, butter milk and flavored butter milk, fermented and renneted milk, flavored fermented and renneted milk, condensed milk and flavored condensed milk, and flavored ice-cream taste flat and watery with an unpleasant aftertaste. The inventors surprisingly found that adding the compositions of this invention can improve the taste profile, remove bitter or metallic aftertaste(s), enhance flavor, improve mouth feel, and/or improve overall likeability. One embodiment pertains to low sugar or sugar free dairy products with *Stevia*-derived NSGs, MRPs, or mixture(s) of MRPs and sweetening agent(s), or mixture(s) of MRPs, sweetening agent(s) and thaumatin.

Nicotine has a bitter or astringent taste and aroma when inhaled. Popular electronic cigarettes require an improved taste and aroma. Adding the compositions of this invention to nicotine could mask nicotine's unpleasant taste. One embodiment pertains to nicotine contained in a cigarette product, either in solid or liquid form, with *Stevia*-derived NSGs, MRPs, or mixture(s) of MRPs and sweetening agent(s), or mixture of MRPs, sweetening agent(s) and thaumatin.

Compositions of the present application can be applied to products from the cosmetic industry, pharmaceutical industry, feed industry etc. Such products may employ *Stevia*-derived NSGs and/or MRPs, including MRPs with other additives, such as thickener(s), flavor(s), salt(s), fat(s), sweetening agent(s), thaumatin, and combinations thereof.

MRPs produced from Maillard reactions when cooking foods or heating beverages can taste bitter, especially when the reaction times are increased, when the heating is conducted at elevated temperatures, or when the MRPs are produced at higher dosages. For bitterness-sensitive people, however, MRPs are bitter at extended concentrations in foods or in beverages. The inventors have surprisingly found that combining sweetening agent(s) into MRPs can block the bitterness of the MRPs. Moreover, the resulting MRP compositions can modify the lingering, bitterness, aftertaste etc. Surprisingly, the bitterness from MRPs and *Stevia* are not superimposed or multiplied.

Further, although thaumatin has a slow onset of sweetness, the inventors have surprisingly found that when combining MRPs, sweetening agent(s) and thaumatin together, the lingering of *Stevia* and thaumatin are not superimposed or multiplied. Moreover, the bitterness of *Stevia* and MRPs are not superimposed or multiplied, either. On the contrary, *Stevia* acts as bridge between MRPs and thaumatin, such that MRPs act as a bridge between *Stevia* and thaumatin to create a more pleasant integrated taste profile.

In some embodiments, MRP or other compositions of the present application comprising thaumatin described herein can be added to a food or beverage product. The amount of the thaumatin in the food or beverage product can be from 0.05-20 ppm based on the total weight of the composition and the food or beverage product(s), including any specific value in the range, and all subranges between any two specific values. For example, the specific values may include 0.1 ppm, 0.2 ppm, 0.5 ppm, 1 ppm, 2 ppm, 3 ppm, 4 ppm, 5 ppm, 6 ppm, 8 ppm, 10 ppm, 15 ppm and 20 ppm; and the subranges may include 0.1-15 ppm, 0.2-10 ppm, 0.5-8 ppm, 1-3 ppm, etc. based on the total weight of the composition and the food or beverage product(s).

The inventors surprisingly found the combination of MRPs with thaumatin could significantly improve the overall taste profile of food and beverage to have a better mouth feel, creamy taste, a reduction of bitterness of other ingredients in food and beverage, such as astringency of tea, protein, or their extracts, acidic nature and bitterness of coffee, etc. It could also reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as additives to improve taste performance of food and beverage products comprising one or more sweetening agents or sweeteners such as sucralose, acesulfame K, aspartame, sodium saccharin, sodium cyclamate or siratose.

Depending on the flavor or flavor enhancing intensity requirements for a given use, sweetener-derived MRPs can be further blended with additional sweetening agent(s), or other ingredients to obtain acceptable taste and aroma profiles.

In one aspect, a flavoring agent(s) in combination with one or more steviol glycosides is provided. It has been found that steviol glycoside(s) surprisingly protect the flavoring agent. Not to be bound by theory, there is a surprising protective effect exerted by the *Stevia* material on the flavoring agent(s).

For example, unlike typical powdered flavoring agents, which have a strong odor, the inventors have surprisingly found that the combination of steviol glycoside(s) and flavoring agent(s) can result in a composition with minimal smell. However, when the steviol glycoside(s)/flavoring agent(s) are dissolved in a solution (e.g., water, alcohol or mixtures thereof), the odor of the flavoring agent(s) are released so as to produce a strong odor.

The above observations are not meant to be limited to powders. The steviol glycoside(s) and the flavoring agent(s) can be part of a liquid composition, such as syrup.

In some embodiments, the reaction products of the embodiments described herein can be dissolved at neutral pH.

The embodiments described above are applicable for any synthetic sweetener, blends thereof and other natural sweeteners, blends thereof, or mixtures of synthetic and natural sweetener(s), especially sucralose.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

EXAMPLES

Example 1: Analysis of Steviol Glycosides and Volatile Organic Compounds in Stevia Extracts by Liquid Chromatography and Comprehensive Two Dimensional Gas Chromatography Time-of-Flight Mass Spectrometry Samples

*Stevia* extracts 1-1 #, 1-2 #, 1-3 #, 1-4 #. All of the samples are available from Sweet Green Fields, LLC.

Method

Assay for steviol glycosides

Steviol glycosides were detected by HPLC at 210 nm according to JECFA 2010.

Assay for volatile organic compounds

Sample preparation

Solid phase micro-extraction (SPME) was employed using a manual fibre holder (Supelco, USA) and a PDMS/CAR/DVB fiber (Supelco, USA). Each sample (0.8 g) was placed in a 20 mL headspace vial, dissolved in 0.2 g/ml NaCl aqueous solution (5 ml), and conditioned for 15 min at 60° C. After 30 min extraction of sample, the fiber was thermally desorbed in the injector port of the GC at 250° C. for 3 min.

Instrument

Agilent 7890B GC

Solid State Modulator SSM 1810, J&X Technologies

EI-0610 TOFMS, Hexin Mass Spectrometry

Software

Canvas GC×GC Data Processing Software

NIST 17 Mass Spectral Librar

Column

1st column: DB-WAX 30 m*0.25 mm*0.25 μm

2$^{nd}$ column: DB-17MS 1.195 m*0.25 mm*0.15 μm

Modulation column HV (C5-C30) 1.1 m

GC

Oven: 40° C. (5 min) to 250° C. (0 min) @ 3° C./min

Carrier Gas: He@1.0 mL/min

Injection: 250° C. (splitless)

SSM1810

Hot zone (entry): +30° C. (offset to GC oven)

Hot zone (exit): +120° C. (offset to GC oven, capped at 320° C.)

Trap: −51° C.

Modulation Period: 4 s

TOFMS

Ion source temp: 230° C.

Transfer line: 250° C.

Mass Range: 40-400 m/z

Scan rate: 100 Hz

Results and Discussion

Steviol Glycosides

The percentage of nine major seviol glycosides (TSG(9)), rebaudioside D (RD), stevioside (SD), rebaudioside A (RA), rebaudioside F (RF), rebaudioside C (RC), rubusoside (RUB), rebaudioside B (RB), steviobiosides (SB) and dulcoside A (DA), was listed in Table 1-S1.

TABLE 1-S1

| sample # | composition | | | | | | | | | |
|---|---|---|---|---|---|---|---|---|---|---|
| | RD | RA | SD | RF | RC | DA | RUB | RB | SB | TSG(9) |
| 1-1# | 0.3 | 15.95 | 4.14 | 0.33 | 1.47 | 0 | 0.11 | 0.4 | 0.12 | 22.82 |
| 1-2# | 0.46 | 15.18 | 3.8 | 0.3 | 1.5 | 0.04 | 0 | 0 | 0 | 21.29 |
| 1-3# | 0.88 | 49.89 | 13.13 | 0.96 | 5.48 | 0.18 | 0.53 | 0.26 | 0.65 | 71.97 |
| 1-4# | 1.57 | 55.13 | 10.83 | 0.52 | 3.46 | 1 | 0.15 | 0.42 | 0.23 | 72.32 |

The amount of the totally nine SGs, abbreviation as for TSG(9), is less than 23% in 1-1 # and 1-2 #, and no more than 73% in 1-3 # and 1-4 #, respectively. The RA content in these samples are from 15.95% to 55.13%. The amount of non-SG(9)s in these samples are in the range of 27.68%-72.32%.

However, the embodiment of this invention should not be limited by these examples. The inventors also found samples containing about 5 wt % or 9 wt % RA had a similar performance in taste. In some embodiments, the amount of RA in the composition of the present application is 1 wt % or less, 5 wt % or less, 10 wt % or less, 30 wt % or less, 50 wt % or less, 70 wt % or less, or 99 wt % or less. In some embodiments, the amount of TSG(9) in the composition of the present application is 1 wt % or less, 5 wt % or less, 10 wt % or less, 30 wt % or less, 50 wt % or less, 70 wt % or less, or 99 wt % or less. In some embodiments, the amount of *Stevia*-derived non-steviol glycosides substances in the composition of the present application is 0.1 wt % or above, 1 wt % or above, 5 wt % or above, 10 wt % or above, 30 wt % or above, 50 wt % or above, 70 wt % or above, 90% or above, or 90% or above.

Volatile Organic Compounds

FIGS. 1-8 show total ion chromatograms (TIC) of the samples detected by SPME-GC×GC-TOFMS.

Data processing was performed using Canvas GC×GC Data Processing Software (J&X Technologies. Version 1.5). Compounds identification was achieved based on mass spectra comparison with NIST 17. Compounds with a Foreward and Reverse matching degree ≥700 and a peak area percentage ≥0.02% were selected for inclusion in the peak list. A series of n-alkanes (C8-C25) were injected separately to establish first-dimension retention indices (RI1). Experimental retention indices (RI) were calculated using the n-alkanes RI values and compared to literature values (NIST RI) for further confirmation. A blank run was also performed for background correction of the samples. Hundreds of volatile organic compounds (VOCs) are identified in 1-1 #, 1-2 #, 1-3 # and 1-4 # products, respectively.

The major compositions of VOCs in 1-1 # and 1-2 # (relative percentage of area ≥0.4%) are listed in Table 1-2. Although the chromatograms of 1-1 # and 1-2 # are similar, they taste citrus and fruity respectively. It is inferred that the minor compositions attribute largely to the flavor difference. The VOCs that attribute to a citrus/orange flavor in 1-1 # are listed in Table 1-3. The VOCs that attribute to a fruity flavor in 1-2 # are listed in Table 1-4, which are rich of aldehydes, alcohols, ketones, esters and acids.

TABLE 1-2

| Volatile compounds observed in 1-1# and 1-2# products. | | | | |
|---|---|---|---|---|
| | | Relative percentage % (≥0.4%) | | |
| Volatile Compounds | RI | 1-1# | 1-2# | Odor/Flavor |
| Hydrocarbons | | | | |
| Aliphatic | | | | |
| Tetradecane | 1400 | 3.56 | 0.88 | |
| Pentadecane | 1500 | 3.31 | 0.79 | |
| Hexadecane | 1598 | 2.64 | 0.71 | |
| Pentadecane, 2,6,10,14-tetramethyl- | 1676 | 0.83 | 0.43 | |
| Heptadecane | 1698 | 1.12 | 0.43 | |
| Dodecane, 2,6,11-trimethyl- | 1769 | 0.41 | | |
| Hexadecane, 2,6,10,14-tetramethyl- | 1782 | 0.62 | | |
| Octadecane | 1800 | 0.78 | | |
| Monoterpene | | | | |
| Bornylene | 1496 | | 0.46 | |
| Aldehydes | | | | |
| Aliphatic | | | | |
| Hexanal | 1058 | | 0.50 | |
| Heptanal | 1154 | | 0.83 | |
| 2-Hexenal | 1192 | | 1.00 | |
| Nonanal | 1372 | 1.75 | 1.98 | Aldehydic |
| Monoterpene | | | | |
| 3-Cyclohexene-1-acetaldehyde, α,4-dimethyl- | 1585 | | 0.63 | Spicy herbal/ |
| Safranal | 1613 | | 2.2 | Herbal/Woody |
| Aromatic | | | | |
| Benzaldehyde | 1492 | 5.18 | 2.93 | Fruity |
| Ketones | | | | |
| 2,3-Butanedione | — | 0.50 | 1.41 | |
| 2,3-Pentanedione | 1039 | | 1.01 | |
| 2-Cyclohexen-1-one | 1412 | | 0.85 | Roasted |
| Ethanone, l-(6-methyl-7-oxabicyclo[4.1.0]hept-1-yl)- | 1437 | | 0.57 | |
| 2(1H)-Naphthalenone, 3,4,4a,5,6,7-hexahydro-1,1,4a-trimethyl- | 1504 | | 0.80 | |
| Ethanone, 1-(2-methyl-1-cyclopenten-1-yl)- | 1567 | | 0.46 | |
| Acids | | | | |
| Aliphatic | | | | |
| Acetic acid | 1436 | 1.28 | 9.83 | Acidic/ Sour |
| Propanoic acid | 1522 | | 0.70 | |
| Butanoic acid | 1609 | | 1.45 | |
| Pentanoic acid | 1719 | | 0.44 | |
| Hexanoic acid | 1825 | | 0.48 | Fatty/cheesy |
| Cyclohexanecarboxylic acid | 2061 | | 1.18 | Fruity |
| Alcohols | | | | |
| Aliphatic | | | | |
| 1-Hexanol, 2-ethyl- | 1479 | 0.74 | 1.22 | Citrus/Fatty |
| 5,8,10-Undecatrien-3-ol | 1756 | | 0.69 | |
| Monoterpene | | | | |
| 2,3-Butanediol, [S-(R*,R*)]- | 1526 | | 0.52 | |
| Hotrienol | 1591 | | 1.10 | Tropical/Floral |
| p-Mentha-1,5-dien-8-ol | 1702 | | 0.51 | |
| Aromatic | | | | |
| Benzenemethanol, α,α-dimethyl- | 1734 | 0.47 | | Green/ |
| Benzyl alcohol | 1848 | 0.307 | 2.97 | Floral/Fruity |
| Phenylethyl Alcohol | 1881 | 0.401 | 1.27 | Floral |
| Ester | | | | |
| Pentanedioic acid, dimethyl ester | 1675 | 1.03 | 0.638 | Estery floral/ |
| 3,7-Dimethyl-6-nonen-1-ol acetate | 1824 | | 1.497 | |

TABLE 1-2-continued

| Volatile compounds observed in 1-1# and 1-2# products. | | | | |
|---|---|---|---|---|
| | | Relative percentage % (≥0.4%) | | |
| Volatile Compounds | RI | 1-1# | 1-2# | Odor/Flavor |
| Hexadecanoic acid, methyl ester | 2195 | 0.41 | | Waxy/ |
| δ-Octalactone | 1927 | | 1.30 | Coconut |
| 2(4H)-Benzofuranone, 5,6,7,7a-tetrahydro-4,4,7a-trimethyl- | 2289 | | 0.81 | Fruity |

TABLE 1-3

Volatile organic compounds that demonstrate *Citrus* or orange odor/flavor of 1-1# product.

| | Relative percentage % | Odor/Flavor | Odor strength |
|---|---|---|---|
| Total Aldehydes | 3.21 | | |
| Nonanal | 1.75 | Odor: waxy aldehydic rose fresh orris orange peel fatty peely<br>Flavor: effervescent, aldehydic citrus, cucumber and melon rindy, with raw potato and oily nutty and coconut like nuances | high |
| Decanal | 0.32 | Odor: sweet aldehydic waxy orange peel citrus floral<br>Flavor: waxy, fatty, citrus and orange peel with a slight green melon nuance | high |
| Undecanal | 0.03 | Odor: waxy soapy floral aldehydic citrus green fatty fresh laundry<br>Flavor: waxy, aldehydic, soapy with a citrus note and slight laundry detergent nuance | high |
| Tetradecanal | 0.03 | Odor: fatty waxy amber incense dry citrus peel musk<br>Flavor: fatty, lactonic, coconut, woody and fishy with a fruity nuance | medium |
| Alcohols | | | |
| 1-Hexanol, 2-ethyl- | 0.74 | Odor: citrus fresh floral oily sweet<br>Flavor: sweet fatty fruity | medium |
| 1-Decanol | 0.02 | Odor: fatty waxy floral orange sweet clean watery<br>Flavor: waxy green fatty floral *costus* watery citrus | medium |
| (3R,6R)-2,2,6-Trimethyl-6-vinyltetrahydro-2H-pyran-3-ol | 0.18 | Odor: citrus green | medium |
| Ketones | | | |
| 5-Hepten-2-one, 6-methyl- | 0.06 | Odor: citrus green lemongrass apple<br>Flavor: green, vegetative, apple, banana and green bean-like | medium |
| Hydrocarbons | | | |
| 1,3,8-p-Menthatriene | 0.07 | Odor: turpentine camphor herbal woody<br>Flavor: oily, terpy, camphoreous, cooling, thymol, herbal, woody and pine with a slight citrus nuance | medium |
| p-Cymene | 0.03 | Odor: fresh citrus terpene woody spice<br>Flavor: terpy and rancid with slightly woody oxidized citrus notes. it has spice nuances of green pepper and oregano | high |

TABLE 1-4

Volatile organic compounds that demonstrate fruity odor/flavor of 1-2# product.

| | Relative percentage % | Odor/Flavor | Odor strength |
|---|---|---|---|
| Total Aldehydes | 25.99 | | |
| Hexanal | 0.50 | Odor: fresh green fatty aldehydic grass leafy fruity sweaty<br>Flavor: green, woody, vegetative, apple, grassy, citrus and orange with a fresh, lingering aftertaste | high |
| 2-Butenal, 2-methyl- | 0.05 | Odor: pungent green ethereal nutty anisic fruity<br>Flavor: fresh, fruity, green, pulpy and almond nutty | high |
| 2-Hexenal | 1.00 | Odor: sweet almond fruity green leafy apple plum vegetable | medium |
| Safranal | 2.20 | Odor: fresh herbal phenolic metallic rosemary tobacco spicy<br>Flavor: woody, medicinal, phenolic, spicy and camphoreous with a fruity, herbal nuance | high |
| Benzaldehyde, 3-methyl- | 0.27 | Odor: sweet fruity cherry benzaldehyde phenolic<br>Flavor: sweet fruity bitter almond cherrv tropical nutty | medium |
| Alcohols | | | |
| 1-Hexanol | 0.05 | Odor: ethereal fusel oil fruity alcoholic sweet green<br>Flavor: green, fruity, apple-skin and oily | medium |
| 3-Hexen-1-ol, (Z)- | 0.02 | Odor: fresh green cut grass foliage vegetable herbal oily<br>Flavor: fresh, green, raw fruity with a pungent depth | high |
| 1-Hexanol, 2-ethyl- | 1.22 | Odor: citrus fresh floral oily sweet<br>Flavor: sweet fatty fruity | medium |
| Benzyl alcohol | 2.97 | Odor: floral rose phenolic balsamic<br>Flavor: fruity cherry almond balsamic bitter | medium |
| Phenols | | | |
| Maltol | 0.05 | Odor: sweet caramel cotton candy jam fruity baked bread<br>Flavor: sweet, cotton candy, caramellic, with jammy fruity and berry notes | high |
| Esters | | | |
| Allyl acetate | 0.05 | Odor: fruity | |
| Acetic acid, butyl ester | 0.10 | Odor: ethereal solvent fruity banana<br>Flavor: sweet, ripe banana, tutti frutti, tropical and candy-like with green nuances | high |
| Butanoic acid, butyl ester | 0.06 | Odor: fruity banana pineapple green cherry tropical fruit ripe fruit juicy fruit<br>Flavor: sweet fruity ethereal tropical rummy cherry ripe fruit elderberry fattyuit juicy fruit | medium |
| Linalyl formate | 0.02 | Odor: citrus green herbal bergamot fruity rose | medium |
| Butanedioic acid, dimethyl ester | 0.11 | Odor: sweet fruity green floral<br>Flavor: sweet, fruity, green, with a soapy waxy nuance | medium |
| 2(4H)-Benzofuranone, 5,6,7,7a-tetrahydro-4,4,7a-trimethyl- | 0.81 | Odor: ripe apricot fruity berry woody | high |
| Benzeneethanol, α,α-dimethyl-, acetate | 0.03 | Odor: sweet floral fruity rose green pear berry jasmin powdery<br>Flavor: floral green spicy tropical jasmin balsamic powdery | medium |
| γ-Octalactone | 0.12 | Odor: sweet coconut waxy creamy tonka dairy fatty<br>Flavor: lactonic, coconut, creamy, toasted, coumarin, fruity, apricot and peach | medium |

TABLE 1-4-continued

| Volatile organic compounds that demonstrate fruity odor/flavor of 1-2# product. | | | |
|---|---|---|---|
| | Relative percentage % | Odor/Flavor | Odor strength |
| δ-Octalactone | 1.30 | Odor: sweet fatty coconut tonka tropical dairy<br>Flavor: coconut, sweet, creamy, lactonic and fruity with a milky and oily depth | |
| Butyrolactone | 0.11 | Odor: creamy oily fatty caramel<br>Flavor: milky, creamy with fruity peach-like afternotes | medium |
| Ketones | | | |
| 2,6,6-Trimethyl-2-cyclohexene-1,4-dione | 0.06 | Odor: woody sweet tea tobacco leaf<br>Flavor: citrus, floral, tea like with green sweet fruity nuances | medium |
| Acetophenone | 0.13 | Odor: sweet pungent hawthorn mimosa almond acacia<br>Flavor: powdery, bitter almond cherry pit-like with coumarinic and fruity nuances | high |
| 5,9-Undecadien-2-one, 6,10-dimethyl-, (E)- | 0.05 | Odor: fresh green fruity waxy rose woody magnolia tropical<br>Flavor: floral fruity green tropical pear banana ylang fatty | medium |
| Ethanone, 1-(1H-pyrrol-2-yl)- | 0.04 | Odor: nut skin maraschino cherry coumarinic licorice walnut bready<br>Flavor: sweet fruity cherry nutty wasabi mustard tea | medium |
| Furan derivatives | | | |
| Furan, 2-pentyl- | 0.59 | Odor: fruity green earthy beany vegetable metallic<br>Flavor: green, waxy, with cooked caramellic nuances | medium |
| Acids | | | |
| Acetic acid | 9.83 | Odor: sharp pungent sour vinegar<br>Flavor: pungent sour overripe fruit | high |
| Propanoic acid | 0.70 | Odor: pungent acidic cheesy vinegar<br>Flavor: acidic, dairy with a pronounced fruity lift | high |
| Butanoic acid | 1.45 | Odor: sharp acetic cheese butter fruit<br>Flavor: acidic sour, cheesy, dairy, creamy with a fruity nuance | high |
| Pentanoic acid | 0.44 | Odor: sickening putrid acidic sweaty rancid; acidic sharp cheesy sour milky tobacco fruity<br>Flavor: acidic, dairy-like with milky and cheese nuances | high |
| Hexanoic acid | 0.48 | Odor: sour fatty sweat cheese<br>Flavor: cheesy fruity phenolic fatty goaty | medium |
| Cyclohexanecarboxylic acid | 1.18 | Odor: fruity acidic metallic cheese tropical<br>Flavor: fruity, woody, berry-like with green dirty nuances | |
| Heptanoic acid | 0.03 | Odor: rancid sour cheesy sweat<br>Flavor: waxy, cheesy, fruity, dirty and fatty | high |

The major compositions of VOCs in 1-3 # and 1-4 # (relative percentage of area ≥0.4%) are listed in Table 1-5.

TABLE 1-5

Volatile organic compounds observed in 1-3# and 1-4# products.

| Compounds | Relative percentage (%) 1-3# | 1-4# | RI | NIST RI | Odor/flavor | Odor strength |
|---|---|---|---|---|---|---|
| Hydrocarbons Monoterpenes | | | | | | |
| β-Myrcene | 2.13 | 1.07 | 1137 | 1161-P | Odor: peppery terpene spicy balsam plastic Flavor: woody, vegetative, citrus, fruity with a tropical mango and slight leafy minty nuances | high |
| L-limonene | 7.38 | 3.97 | 1170 | 1199-P | Odor: terpene pine herbal peppery Flavor: terpenic cilantro green juniper berry | medium |
| Cosmene | 1.19 | 1.13 | 1423 | 1460-P | | |
| Bornylene | 1.33 | 1.21 | 1499 | — | | |
| Sesquiterpenes | | | | | | |
| Cyprotene | 4.49 | 3.23 | 1504 | — | | |
| Benzene, 1-methyl-4-(1-methylethenyl)- | 2.88 | 2.53 | 1412 | 1444-P | Odor: phenolic spicy styrene clove guaiacol Flavor: spicy, balsamic, and eugenol/guaiacol-like with a nutty nuance | high |
| Alcohols Monoterpenes | | | | | | |
| beta-terpineol | 1.63 | 1.26 | 1611 | 1627-P | Odor: pungent earthy woody | medium |
| (Z)-linalool oxide | 0.79 | 0.74 | 1423 | 1445-P | Odor: earthy floral sweet woody | medium |
| Linalool | 0.73 | 1.61 | 1532 | 1547-P | Odor: citrus floral sweet bois de rose woody green blueberry Flavor: citrus, orange, lemon, floral, waxy, aldehydic and woody | medium |
| α-Terpineol | 2.23 | 1.76 | 1675 | 1697-P | Odor: pine terpene lilac citrus woody floral Flavor: citrus woody with a lemon and lime nuance. it has a slight soapy mouth feel | medium |
| Aromatic | | | | | | |
| Phenylethyl Alcohol | 0.46 | 1.74 | 1881 | 1906-P | Odor: floral rose dried rose flower rose water Flavor: floral, sweet, rosey and bready | medium |
| Benzyl alcohol | 0.69 | 4.77 | 1846 | 1870-P | Odor: floral rose phenolic balsamic Flavor: fruity cherry almond balsamic bitter | medium |
| Aldehydes | | | | | | |
| Nonanal | 2.3 | 4.4 | 1372 | 1391-P | Odor: waxy aldehydic rose fresh orris orange peel fatty peely Flavor: effervescent, aldehydic citrus, cucumber and melon rindy, with raw potato and oily nutty and coconut like nuances | high |
| Monoterpenes | | | | | | |
| Safranal | 0.5 | 0.42 | 1614 | 1616-P | Odor: fresh herbal phenolic metallic rosemary tobacco spicy Flavor: woody, | high |

TABLE 1-5-continued

Volatile organic compounds observed in 1-3# and 1-4# products.

| Compounds | Relative percentage (%) 1-3# | 1-4# | RI | NIST RI | Odor/flavor | Odor strength |
|---|---|---|---|---|---|---|
| | | | | | medicinal, phenolic, spicy and camphoreous with a fruity, herbal nuance | |
| 3-Cyclohexene-4-1-acetaldehyde, 5-α,4-dimethyl- | 5.13 | 2.5 | 1589 | 1620-P | Odor: spicy herbal | high |
| Furan derivatives | | | | | | |
| 5-methyl furfural | 3.77 | 3.55 | 1545 | 1570-P | Odor: spice caramel maple Flavor: sweet, brown, caramellic, grain, maple-like | medium |
| Furfural | 5.57 | 5.06 | 1437 | 1462-P | Odor: sweet woody almond fragrant baked bread Flavor: brown, sweet, woody, bready, nutty, caramellic with a burnt astringent nuance | medium |
| Aromatic | | | | | | |
| Benzaldehyde | 1.79 | 4.3 | 1492 | 1520-P | Odor: strong sharp sweet bitter almond cherry Flavor: sweet, oily, almond, cherry, nutty and woody | high |
| Ketones | | | | | | |
| 6-Hepten-2-one, 7-6-methyl- | 0.92 | 0.64 | 1316 | 1338-P | Odor: citrus green lemongrass apple Flavor: green, vegetative, apple, banana and green bean-like | medium |
| Ethanone, 1-(2-furanyl)- | 1.12 | 1.01 | 1478 | 1499-P | Odor: sweet balsam almond cocoa caramel coffee Flavor: sweet, nutty and roasted with a sweet, baked-goods body | high |
| Ester | | | | | | |
| 2-Propenoic acid, 3-butyl ester | 0.84 | 0.47 | 1154 | 1193-P | | |

Summary

Every individual stevia extract in this invention contains hundreds of VOCs, including terpenes, ketones, aldehydes and alcohols. The aroma substances among these VOCs play an important role in the flavor of the product. 1-1 # tastes citrus, while 1-2 # tastes fruity. Besides, the aroma substances contribute to the richness and intensity of the flavor. An embodiment of stevia extract comprises one or more of these VOC, where concentration of individual VOCs are more than 1 ppb, or more than 1 ppm. An embodiment of a food or beverage comprises these VOCs originated from stevia plants, where the total VOCs are above 1 ppb, or above 1 ppm.

The products in examples below are evaluated by the following method.

Sensory Evaluation Method:

Products were evaluated in terms of sweetness profile and mouthfeel. The score was used to evaluate the overall taste of the products. The overall-like score is the average of the score of sweet profile and mouthfeel.

For sweetness profile, 3 factors such as bitterness, metallic aftertaste and sweet lingering were evaluated. Because the stronger the degree of these three parameters, the higher the score, thus the worse the sweetness profile. So the score of sweetness profile is the result of 6 minus the average of the 3 factors.

For mouthfeel, 1 factor, kokumi, was evaluated.

A panel of 6 trained testers evaluated the samples and gave scores of 1-5 according to the followed standards. The score of each factor is the average of the panel.

1) Kokumi Level

Evaluation Standard:

Prepare a 5% sucrose solution with neutral water. This solution was used as a standard solution which kokumi degree is set 5.

A 250 ppm RA solution was prepared with neutral water. This solution was used as a standard solution to which the kokumi degree was set as 1.

An appropriate amount of yeast extract (available from Leiber, 44400P-145) was dissolved in a 250 ppm aqueous solution of RA97 such that the degree of kokumi of the resulting solution was consistent with the standard solution of kokumi degree of 5 (5% sucrose). After evaluation by a panel of 6 testers, it was determined that a solution of 100 ppm the yeast extract dissolved in 250 ppm RA97 was substantially identical to the degree of kokumi of the 5% sucrose solution. Thus, the criteria for determining the degree of kokumi are as follows.

TABLE 1-6

| | RA97 250 ppm Range of yeast extract concentration | | | | |
|---|---|---|---|---|---|
| | <25 ppm | 25-50 ppm | 50-75 ppm | 75-100 ppm | >100 ppm |
| Score of kokumi level | 1 | 2 | 3 | 4 | 5 |

Evaluation Method:

The sample to be evaluated was dissolved in neutral deionized water to make the concentration of steviol glycosides equal to 250 ppm. The tester placed 20-30 mL of the evaluation solution in their mouth. After 5 seconds the solution was spit out. After a mouthwash step with water, the standard solution was taken. If the degree of Kokumi was similar, the Kokumi degree of the sample solution can be determined as the Kokumi degree value of the standard solution. Otherwise it was necessary to take additional standard solutions and try again until the Kokumi degree value was determined.

2) Bitterness

Quinine (99% purity) concentration of $10^{-8}$-$10^{-4}$ mol/L was the bitterness standard, and the specific bitterness scoring standards are shown in the following table.

TABLE 1-7

| | Range of quinine concentration mol/L | | | | |
|---|---|---|---|---|---|
| | $<8 \times 10^{-7}$ | $8 \times 10^{-7}$~$3 \times 10^{-6}$ | $7 \times 10^{-6}$~$2 \times 10^{-5}$ | $2 \times 10^{-5}$~$1 \times 10^{-4}$ | $>1 \times 10^{-4}$ |
| Score of bitterness | 1 | 2 | 3 | 4 | 5 |

The sample to be evaluated was dissolved in neutral deionized water to make the concentration of steviol glycosides equal to 250 ppm. The tester placed 20-30 mL of the evaluation solution in their mouth. After 5 seconds the sample was spit out. After a rinse step with water, the standard solution was tasted. If the bitter taste was similar, the bitterness of the sample can be determined as the bitterness value of the standard solution. Otherwise it was necessary to take additional standard solution(s) and try again until the bitterness value was determined.

3) Metallic Aftertaste

Sucralose (available from Anhui Jinhe Industrial Co., Ltd) was used as a standard reference. The specific metallic aftertaste scoring standards are shown in the table below.

TABLE 1-8

| | Range of sucralose concentration | | | | |
|---|---|---|---|---|---|
| | <50 ppm | 50-100 ppm | 100-150 ppm | 150-200 ppm | >200 ppm |
| Score of metallic aftertaste | 1 | 2 | 3 | 4 | 5 |

The sample to be evaluated was dissolved in neutral deionized water to make the concentration of steviol glycosides equal to 250 ppm. The tester places 20-30 mL of the evaluation solution in their mouth. After 5 seconds, the solution is spit out. After a rinse step with water the standard solution was tasted. If the metallic aftertaste was similar, the metallic aftertaste of the sample was determined as the metallic aftertaste score of the standard liquid, otherwise it was necessary to take additional standard liquid samples and taste it again until the metallic aftertaste score was determined.

4) Sweet Lingering

The sample to be evaluated was dissolved in neutral deionized water to make the concentration of steviol glycosides equal to 250 ppm. The tester placed 20-30 mL of the evaluation solution in their mouth, and timing was started to record the sweetness start time and peak time. The test solution was then spit out. Recording of time continued for the time when the sweetness disappeared completely. The time at which the sweetness completely disappeared was compared to the time in the table below to determine the value of sweet lingering.

TABLE 1-9

| | Time at which the sweetness completely disappears | | | | |
|---|---|---|---|---|---|
| | <20 s | 20-30 s | 30-40 s | 40-50 s | >50 s |
| Score of sweet lingering | 1 | 2 | 3 | 4 | 5 |

In the Example 2 to Example 18 below, the details of the stevia extract samples used are as shown in the following tables.

TABLE 2-1

| Product | Lot # | Source | Details |
|---|---|---|---|
| *Stevia* extract | 2-2# | Sweet Green Fields, LLC | The composition of the product and its preparation are similar to *Stevia* extract 1-2# in Example 1 |
| *Stevia* extract | 2-4# | Sweet Green Fields, LLC | The composition of the product and its preparation are similar to *Stevia* extract 1-4# in Example 1 |

The content of TSG(9) were analyzed according to the methods same as the ones in Example 1. The result is shown in the table below.

TABLE 2-2

| Sample | Composition | | | | | | | | | | Non-SG |
|---|---|---|---|---|---|---|---|---|---|---|---|
| # | RD | RA | SD | RF | RC | DA | RU | RB | SB | TSG(9) | Substances |
| 2-2# | <0.01 | 13.1 | 3.66 | 0.26 | 1.25 | <0.01 | 0.25 | 0.74 | <0.01 | 19.3 | 76.72 |
| 2-4# | 1.87 | 42.8 | 31.5 | 0.72 | 5.79 | 0.54 | 0.45 | 0.32 | 0.13 | 84.1 | 7.73 |

Example 2. Preparation of Flavored Stevia Extract 2-4 #-MRP-TG from Stevia Extract, Glutamic Acid and Galactose

*Stevia* extract: lot #2-4 #, available from Sweet Green Fields, LLC.

10 g stevia extract 2-4 #, 0.27 g galactose and 0.83 g glutamic acid were mixed. The ratio of galactose to glutamic acid was 3:1 and the ratio of stevia extract to the mixture of galactose and glutamic acid is 9:1. Then obtained mixture was dissolved into 35 g pure water. No need to add any pH regulator and let the pH like what it really is (about 5). Then heat the solution at about 100 degrees centigrade for 2 hours. When the reaction completes, filter the reaction mixture by filter paper and the filtrate was dried by spray dryer. Thus obtain about 9 g of off white powder 2-4 #-MRP-TG.

Example 3. Preparation of Glycosylated Steviol Glycosides 2-4 #-GSG from Stevia Extract 2-4 #

Prepare the glycosylated product of stevia extract 2-4 # according to the following method.

i) 15 g Tapioca dextrin was dissolved in 45 ml deionized water ii) 15 g stevia extract 2-4 # was added to liquefied dextrin.

iii) 0.75 ml CGTase enzyme and 15 ml deionized water were added to mixture and incubated at 69° C. for 20 hours to glycosylate the stevia extract 2-4 # with glucose molecules derived from Tapioca dextrin.

v) The reaction mixture is heated to 85° C. for 10 min to inactivate the CGTase, which is then removed by filter.

vi) The resulting solution of 2-4 #-GSG comprises glycosylated stevia glycosides, unreacted stevia glycosides, other non-stevia glycosides, and unreacted dextrin. It is further discolored and spray dried. Thus yield 25 g white powder 2-4 #-GSG.

Example 4. Preparation of Flavored Glycosylated Steviol Glycosides 2-4 #-GSG-MRP from Stevia Extract 2-4 #-GSG, Glutamic Acid and Galactose

*Stevia* extract 2-4 #-GSG: the product of Example 3.

10 g glycosylated stevia glycosides 2-4 #-GSG, 0.27 g galactose and 0.83 g glutamic acid were mixed. The ratio of galactose to glutamic acid was 3:1 and the ratio of stevia extract to the mixture of galactose and glutamic acid is 9:1. Thus obtained mixture was dissolved into 35 g pure water. No need to add any pH regulator and let the pH like what it really is (about 5). Then heat the solution at about 100 degrees centigrade for 1.5 hours. When the reaction completes, filter the reaction mixture by filter paper and the filtrate was dried by spray dryer. Thus obtain about 9.2 g of off white powder 2-4 #-GSG-MRP.

Example 5. The Improvement of Stevia Extract 2-2 # Products to the Taste and Mouthfeel of RA97

Common process: *Stevia* extract 2-2 # products and RA97 were weighed and uniformly mixed according to the weight shown in Table 5-1, dissolved in 100 ml pure water, and subjected to a mouthfeel evaluation test.

TABLE 5-1

The weight of *stevia* extract 2-2# products and RA97.

| NO. | The ratio of RA97 to *stevia* extract 2-2# products | Weight of RA97 (mg) | Weight of *stevia* extract 2-2# products (mg) | Volume of pure water (mL) |
|---|---|---|---|---|
| 5-01 | 10/0 | 20 | 0 | 100 |
| 5-02 | 10/1 | 20 | 2 | 100 |
| 5-03 | 10/3 | 20 | 6 | 100 |
| 5-04 | 10/5 | 20 | 10 | 100 |
| 5-05 | 10/7 | 20 | 14 | 100 |
| 5-06 | 10/10 | 20 | 20 | 100 |
| 5-07 | 10/40 | 20 | 80 | 100 |
| 5-08 | 10/70 | 20 | 140 | 100 |

Experiments: Several mixtures of stevia extract 2-2 # products and RA97 were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of RA97 in the sample solution was the same, 200 ppm. The results are shown in Table 5-2.

TABLE 5-2

The score in sensory evaluation.

| | sensory evaluation | | | | | |
|---|---|---|---|---|---|---|
| | | sweet profile | | | | |
| NO. | mouthfeel kokumi | sweet lingering | bitterness | metallic aftertaste | score of sweet profile | overall like |
| 5-01 | 1 | 3 | 3 | 3 | 3.00 | 2.00 |
| 5-02 | 2 | 1 | 0.5 | 2 | 4.83 | 3.42 |
| 5-03 | 2.5 | 1 | 0.5 | 1.5 | 5.00 | 3.75 |
| 5-04 | 2.5 | 2 | 0.5 | 1.5 | 4.67 | 3.58 |
| 5-05 | 3 | 2.5 | 1 | 1.5 | 4.33 | 3.67 |
| 5-06 | 3 | 2.5 | 0.5 | 1.5 | 4.50 | 3.75 |
| 5-07 | 3.5 | 3 | 3 | 1.5 | 3.50 | 3.50 |
| 5-08 | 3.5 | 3 | 4 | 1.5 | 3.17 | 3.33 |

Figure 9:
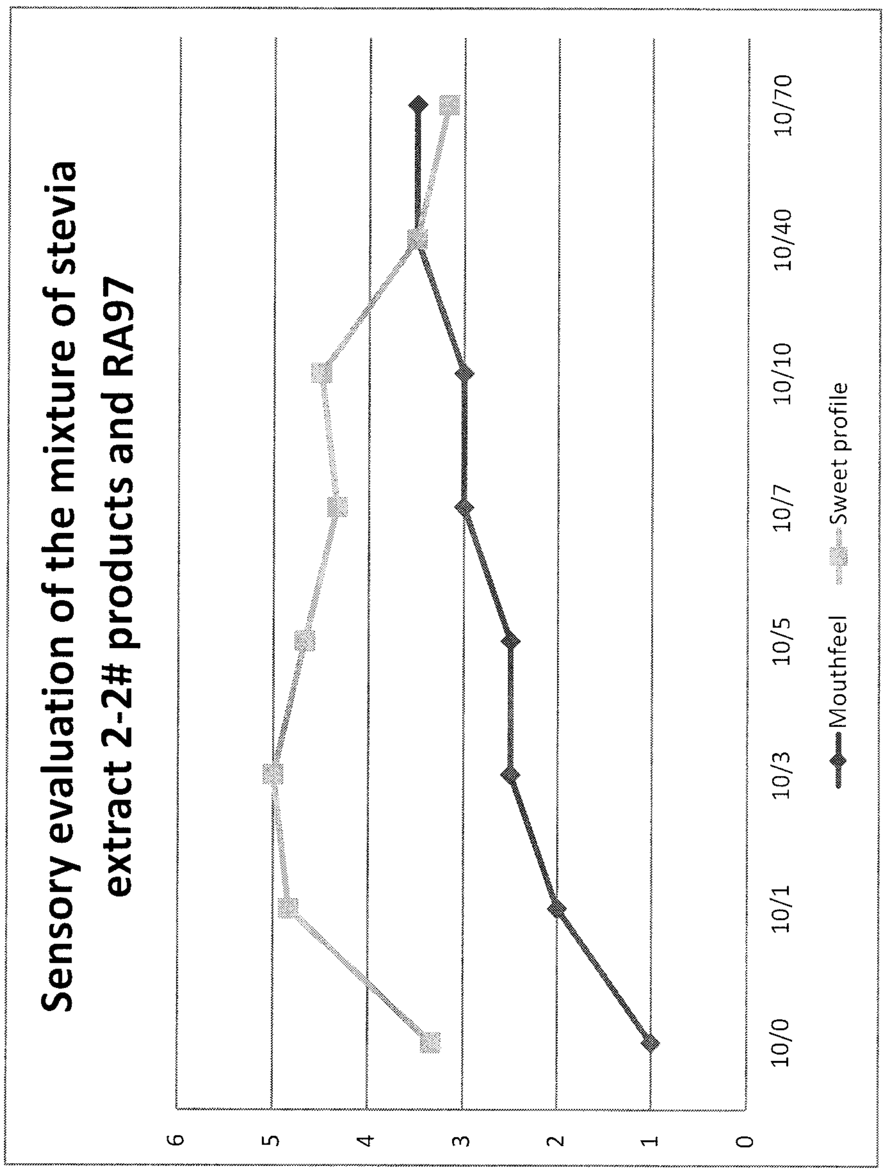
FIG. 9 shows the relationship between the sensory evaluation results to the ratio of RA97 to stevia extract 2-2 # products.
Figure 10:
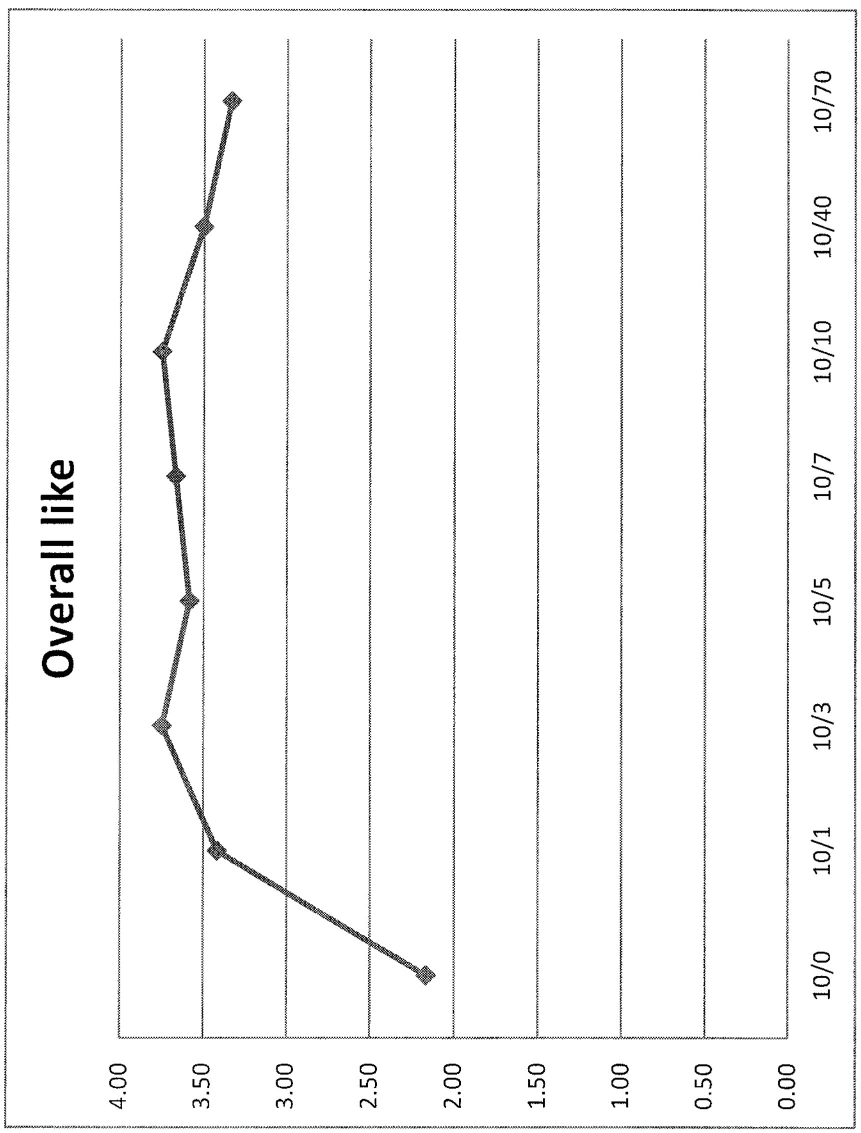
FIG. 10 shows the relationship between the overall like results to the ratio of RA97 to stevia extract 2-2 # products.

Data analysis: The relationship between the sensory evaluation results to the ratio of RA97 to stevia extract 2-2 # products in this example is as shown in FIG. 9. The relationship between the overall like results to the ratio of RA97 to stevia extract 2-2 # products in this example is shown in FIG. 10.

Conclusion: The result showed that stevia extract comprises non-stevia glycosides substances such as stevia extract 2-2 # product, could significantly improve taste profile, flavor intensity and mouthfeel of purified stevia glycosides such as RA97. All range in tested ratio of RA97 to stevia extract 2-2 # products from 10:1 to 10:70 has good taste (overall like score >2.5), preferably when the ratio ranges from 10:5 to 10:10, the products will give very good taste (score >3). Surely the conclusion could be extended to 1:99 and 99:1 for all types of purified stevia glycosides or other type of natural high intensity sweeteners and stevia extract containing non-stevia glycosides. This example demonstrates that stevia extract 2-2 # products can improve taste profile, flavor intensity and mouthfeel of artificial sweetener such as RA97. An embodiment of stevia extract comprises non-stevia glycosides substances originated from stevia plant could improve the taste profile of high intensity natural sweeteners.

Example 6. The Improvement of Stevia Extract 2-2 # Products to the Taste and Mouthfeel of Sucralose Common process: stevia extract 2-2 # products and sucralose were weighed and uniformly mixed according to the weight shown in Table 6-1, dissolved in 100 ml pure water, and subjected to a mouthfeel evaluation test.

TABLE 6-1 the weight of *stevia* extract 2-2# products and sucralose

| NO. | The ratio of sucralose to *stevia* extract 2-2# products | Weight of sucralose (mg) | Weight of *stevia* extract 2-2# products (mg) | Volume of pure water (mL) |
|---|---|---|---|---|
| 6-01 | 10/0 | 15 | 0 | 100 |
| 6-02 | 10/1 | 15 | 1.5 | 100 |

TABLE 6-1-continued

| the weight of *stevia* extract 2-2# products and sucralose | | | | |
|---|---|---|---|---|
| NO. | The ratio of sucralose to *stevia* extract 2-2# products | Weight of sucralose (mg) | Weight of *stevia* extract 2-2# products (mg) | Volume of pure water (mL) |
| 6-03 | 10/3 | 15 | 4.5 | 100 |
| 6-04 | 10/5 | 15 | 7.5 | 100 |
| 6-05 | 10/7 | 15 | 10.5 | 100 |
| 6-06 | 10/9 | 15 | 13.5 | 100 |
| 6-07 | 10/10 | 15 | 15 | 100 |
| 6-08 | 10/40 | 15 | 60 | 100 |
| 6-09 | 10/70 | 15 | 105 | 100 |
| 6-10 | 10/100 | 15 | 150 | 100 |

Experiments: Several mixtures of stevia extract 2-2 # products and sucralose were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 150 ppm. The results are shown in Table 6-2.

TABLE 6-2

| The score in sensory evaluation | | | | | | |
|---|---|---|---|---|---|---|
| | sensory evaluation | | | | | |
| | | sweet profile | | | | |
| NO. | mouthfeel kokumi | sweet lingering | bitterness | metallic aftertaste | score of sweet profile | overall like |
| 6-01 | 1 | 3 | 1 | 3.5 | 3.50 | 2.25 |
| 6-02 | 3 | 2 | 0 | 2 | 4.67 | 3.83 |
| 6-03 | 3.5 | 2.5 | 0 | 2 | 4.50 | 4.00 |
| 6-04 | 3.5 | 2.5 | 0.5 | 2 | 4.33 | 3.92 |
| 6-05 | 3.5 | 2.5 | 0.5 | 1.5 | 4.50 | 4.00 |
| 6-06 | 3.5 | 2.5 | 1 | 1 | 4.50 | 4.00 |
| 6-07 | 3.5 | 2.5 | 2 | 1 | 4.17 | 3.83 |
| 6-08 | 3.5 | 3 | 2 | 1 | 4.00 | 3.75 |
| 6-09 | 3.5 | 3 | 2 | 1 | 4.00 | 3.75 |
| 6-10 | 3.5 | 4 | 2 | 1 | 3.67 | 3.58 |

Figure 11:
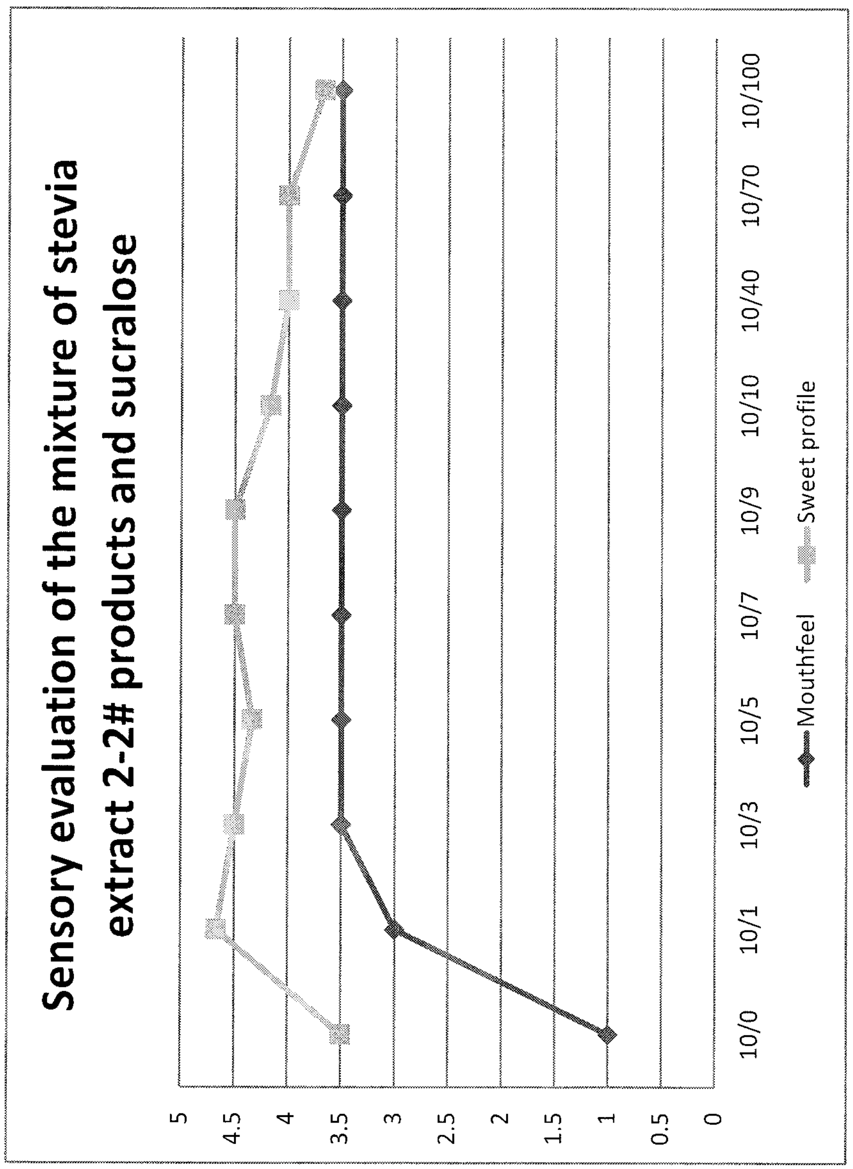
FIG. 11 shows the relationship between the sensory evaluation results to the ratio of sucralose to stevia extract 2-2 # products.
Figure 12:
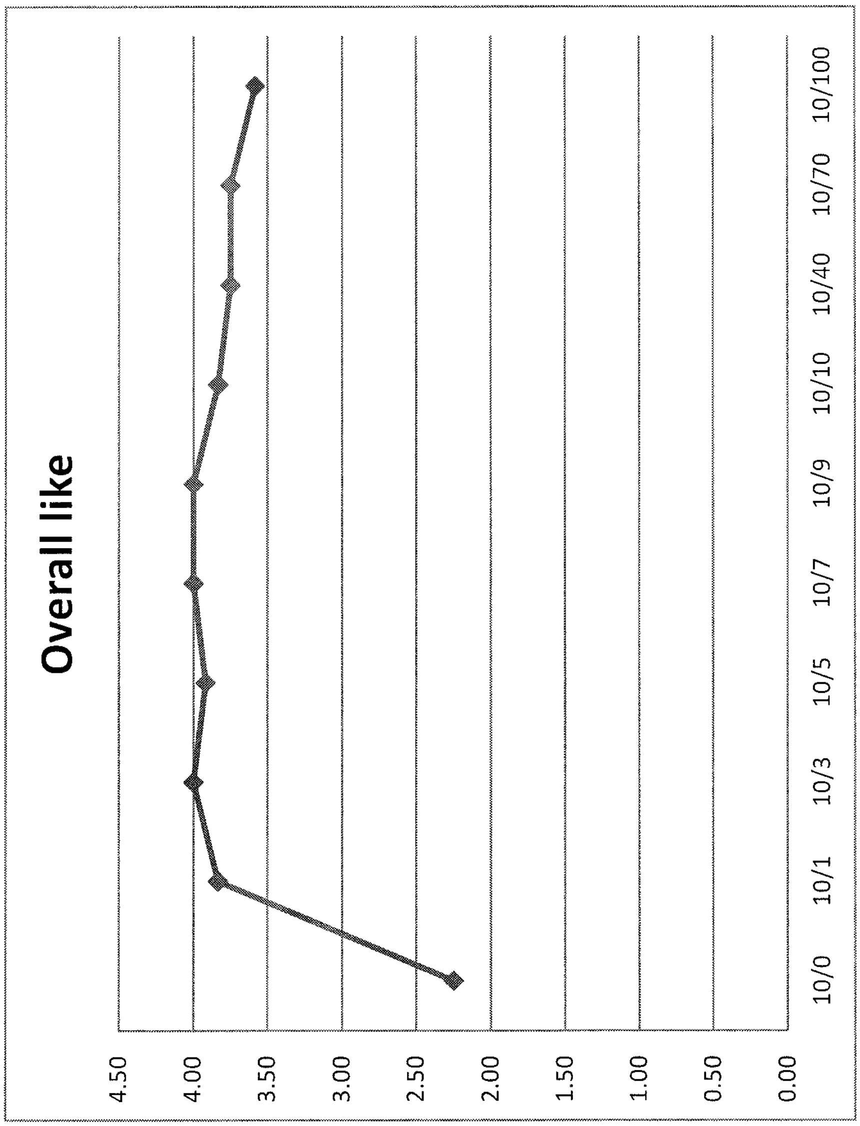
FIG. 12 shows the relationship between the overall like results to the ratio of sucralose to stevia extract 2-2 # products.

Data analysis: The relationship between the sensory evaluation results to the ratio of sucralose to stevia extract 2-2 # products in this example is shown in FIG. 11. The relationship between the overall like results to the ratio of sucralose to stevia extract 2-2 # products in this example is as shown in FIG. 12.

Conclusion: The result showed that stevia extract 2-2 # products could significantly improve taste profile, flavor intensity and mouthfeel of sucralose. All range in tested ratio of sucralose to stevia extract 2-2 # products from 10:1 to 10:100 has good taste (overall like score >2.5), preferably when the ratio ranges from 10:3 to 10:10, the products will give very good taste (score >3.5). Surely the conclusion could be extended to 1:99 and 99:1 for all high intensity synthetic sweeteners to stevia extract containing non-stevia glycosides substances. This example demonstrates that stevia extract 2-2 # products can improve taste profile, flavor intensity and mouthfeel of artificial sweetener such as sucralose. An embodiment of stevia extract comprising non-stevia glycosides could improve the taste of high intensity synthetic sweeteners.

Example 7. The Improvement of Stevia Extract 2-2 # Product to the Taste and Mouthfeel of Acesulfame-K Common process: stevia extract 2-2 # product and Acesulfame-K were weighed and uniformly mixed according to the weight shown in Table 7-1, dissolved in 100 ml pure water, and subjected to a mouthfeel evaluation test.

TABLE 7-1

| The weight of *stevia* extract 2-2# product and Acesulfame-K | | | | |
|---|---|---|---|---|
| # | The ratio of Acesulfame-K to *stevia* extract 2-2# products | Weight of Acesulfame-K (mg) | Weight of *stevia* extract 2-2# products (mg) | Volume of pure water (mL) |
| 7-01 | 10/0 | 20 | 0 | 100 |
| 7-02 | 10/1 | 20 | 2 | 100 |
| 7-03 | 10/3 | 20 | 6 | 100 |
| 7-04 | 10/5 | 20 | 10 | 100 |
| 7-05 | 10/7 | 20 | 14 | 100 |
| 7-06 | 10/10 | 20 | 20 | 100 |
| 7-07 | 10/40 | 20 | 80 | 100 |
| 7-08 | 10/70 | 20 | 140 | 100 |

Experiments: Several mixtures of stevia extract 2-2 # products and Acesulfame-K were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 200 ppm. The results are shown in Table 7-2.

TABLE 7-2

The score in sensory evaluation

| NO. | sensory evaluation: mouthfeel kokumi | sweet profile: sweet lingering | bitterness | metallic aftertaste | score of sweet profile | overall like |
|---|---|---|---|---|---|---|
| 7-01 | 2 | 3 | 3 | 3 | 3.00 | 2.50 |
| 7-02 | 2 | 2 | 2 | 2.5 | 3.83 | 2.92 |
| 7-03 | 2 | 2 | 2 | 2 | 4.00 | 3.00 |
| 7-04 | 2 | 1 | 1.5 | 3.5 | 4.00 | 3.00 |
| 7-05 | 2 | 2 | 0.5 | 3.5 | 4.00 | 3.00 |
| 7-06 | 2 | 2 | 1 | 2.5 | 4.17 | 3.08 |
| 7-07 | 2.5 | 2.5 | 2.5 | 3 | 3.33 | 2.92 |
| 7-08 | 2.5 | 3 | 2.5 | 3 | 3.17 | 2.83 |

Figure 13:
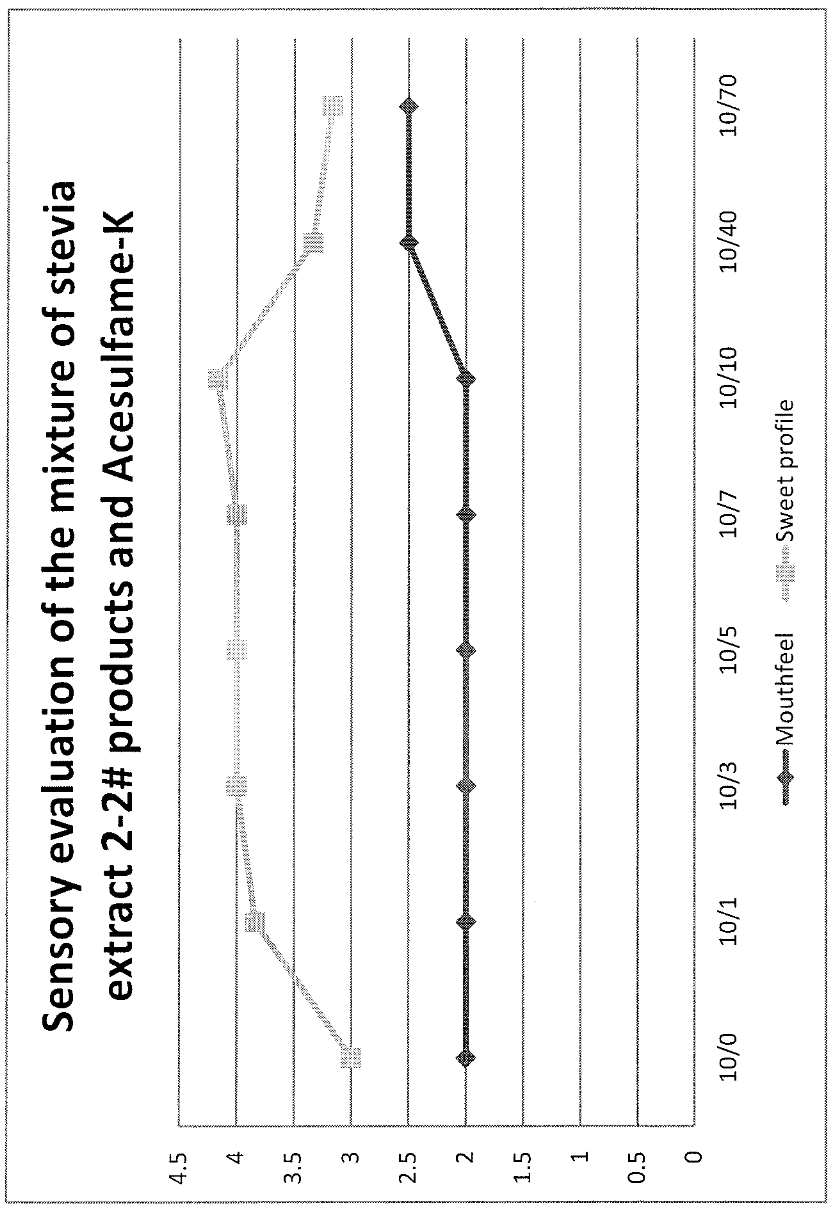
FIG. 13 shows the relationship between the sensory evaluation results to the ratio of Acesulfame-K to stevia extract 2-2 # products.
Figure 14:
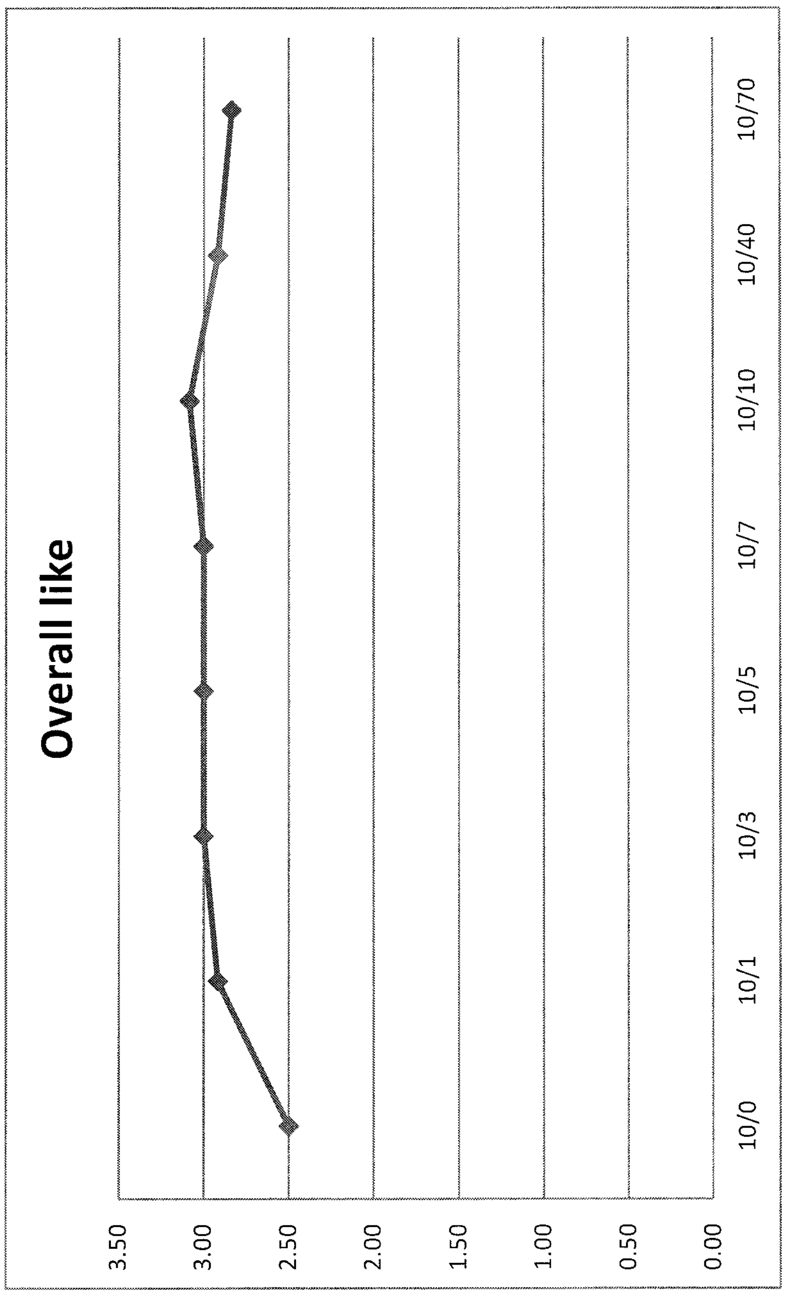
FIG. 14 shows the relationship between the overall like results to the ratio of Acesulfame-K to stevia extract 2-2 # products.

Data analysis: The relationship between the sensory evaluation results to the ratio of Acesulfame-K to stevia extract 2-2 # products in this example is shown in FIG. 13. The relationship between the overall like results to the ratio of Acesulfame-K to stevia extract 2-2 # products in this example is shown in FIG. 14.

Conclusion: The result showed that stevia extract 2-2 # products could significantly improve taste profile of Acesulfame K. All range in tested ratio of Acesulfame-K to stevia extract 2-2 # products from 10:1 to 10:70 has good taste (overall like score >2.5), preferably when the ratio ranges from 10:3 to 10:10, the products will give very good taste (score >3). Surely the conclusion could be extended to 1:99 and 99:1 for any type of synthetic high intensity sweeteners to stevia extract containing non-stevia glycosides substances. This example demonstrates that stevia extract 2-2 # products can improve taste profile, flavor intensity and mouthfeel of artificial sweetener such as Acesulfame-K. An embodiment of stevia extract comprises non-stevia glycosides could improve the high intensity synthetic sweeteners.

Example 8. The Improvement of Stevia Extract 2-4 # to the Taste and Mouthfeel of RA97

Common process: *Stevia* extract 2-4 # and RA97 were weighed and uniformly mixed according to the weight shown in Table 8-1, dissolved in 100 ml pure water, and subjected to a mouthfeel evaluation test.

TABLE 8-1

The weight of *stevia* extract 2-4# and RA97

| # | The ratio of RA97 to *stevia* extract 2-4# | Weight of RA97 (mg) | Weight of *stevia* extract 2-4# (mg) | Volume of pure water (ml) |
|---|---|---|---|---|
| 8-00 | 10/0 | 20 | 0 | 100 |
| 8-01 | 10/1 | 20 | 2 | 100 |
| 8-02 | 10/3 | 20 | 6 | 100 |
| 8-03 | 10/5 | 20 | 10 | 100 |
| 8-04 | 10/7 | 20 | 14 | 100 |
| 8-05 | 10/9 | 20 | 18 | 100 |
| 8-06 | 10/10 | 20 | 20 | 100 |
| 8-07 | 10/40 | 20 | 80 | 100 |
| 8-08 | 10/70 | 20 | 140 | 100 |
| 8-09 | 10/100 | 20 | 200 | 100 |

Experiments: Several mixtures of stevia extract 2-4 # and RA97 were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of RA97 in the sample solution was the same, 200 ppm. The results are shown in Table 8-2.

TABLE 8-2

The score in sensory evaluation

| # | sensory evaluation: mouthfeel kokumi | sweet profile: sweet lingering | bitterness | metallic aftertaste | score of sweet profile | overall like |
|---|---|---|---|---|---|---|
| 8-00 | 1 | 3 | 3 | 3 | 3.00 | 2.00 |
| 8-01 | 2 | 3 | 3 | 3 | 3.00 | 2.50 |
| 8-02 | 2 | 2 | 2 | 3 | 3.67 | 2.83 |
| 8-03 | 3 | 2 | 2 | 2 | 4.00 | 3.50 |
| 8-04 | 3 | 2 | 2 | 1 | 4.33 | 3.67 |
| 8-05 | 3 | 3 | 1 | 1 | 4.33 | 3.67 |
| 8-06 | 3 | 3 | 2 | 2 | 3.67 | 3.33 |
| 8-07 | 3 | 3.5 | 3 | 2 | 3.17 | 3.08 |
| 8-08 | 4 | 4 | 3.5 | 3 | 2.50 | 3.25 |
| 8-09 | 4 | 4 | 4 | 3 | 2.33 | 3.17 |

Figure 15:
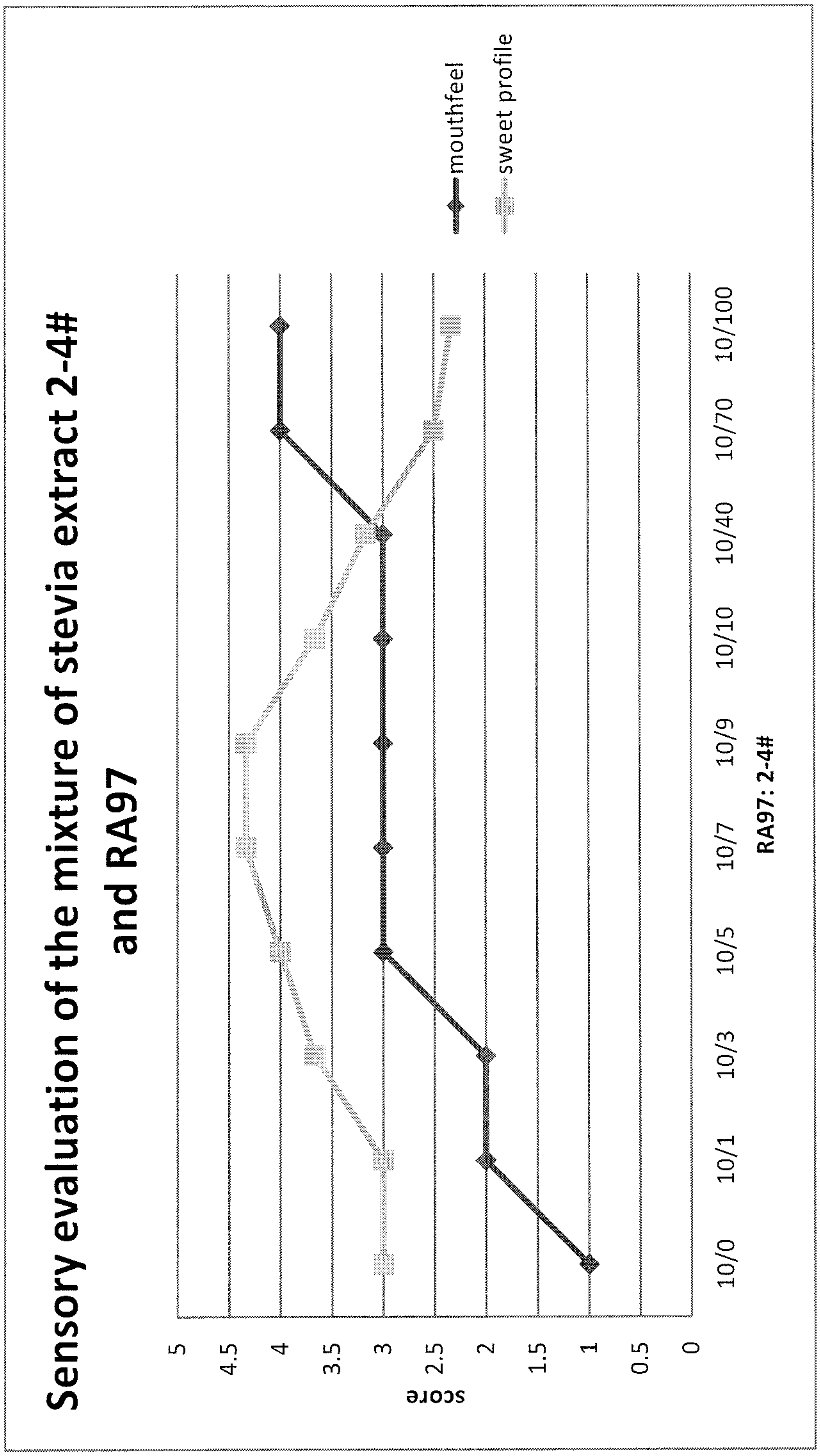
FIG. 15 shows the relationship between the sensory evaluation results to the ratio of RA97 to stevia extract 2-4 # products.
Figure 16:
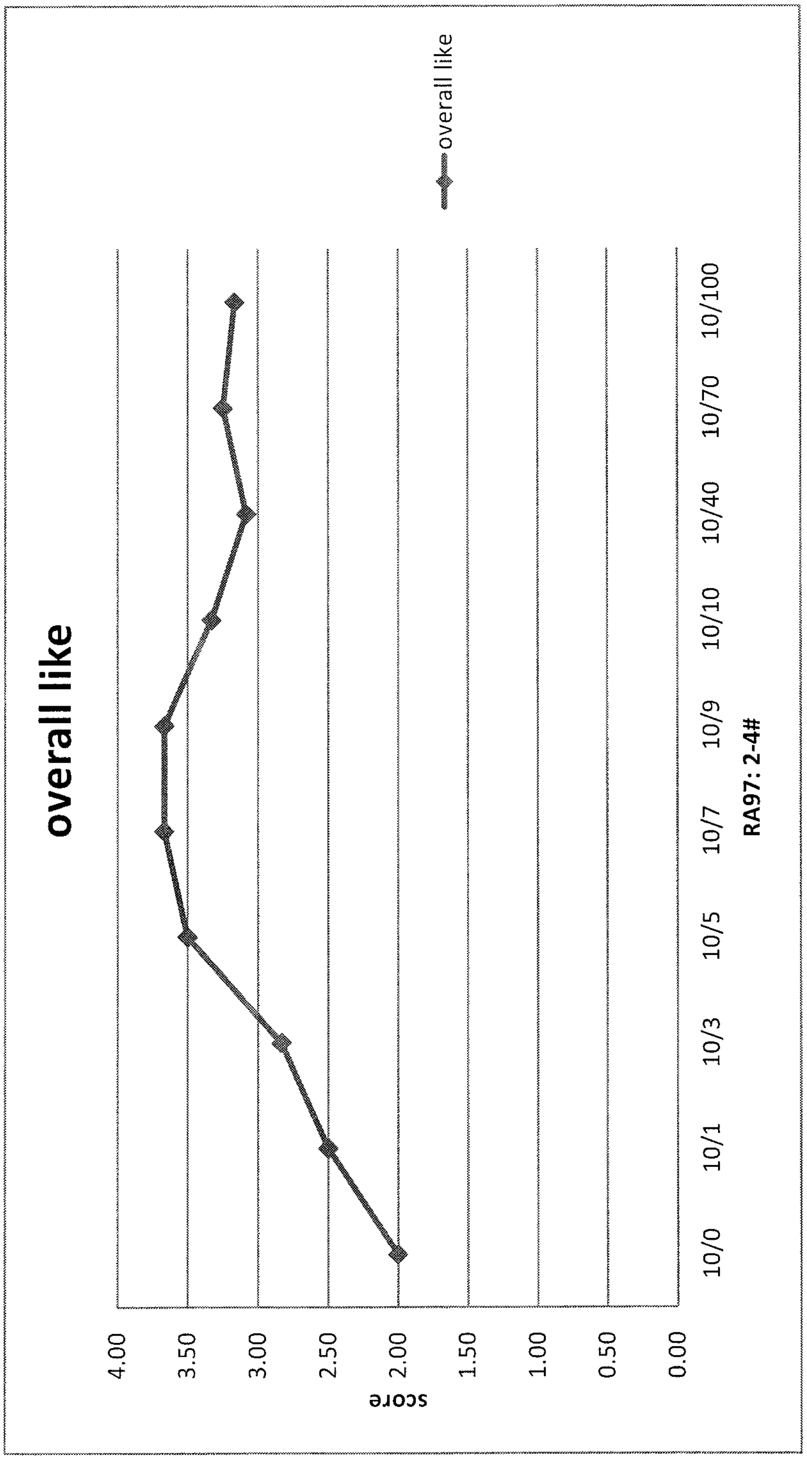
FIG. 16 shows the relationship between the overall like results to the ratio of RA97 to stevia extract 2-4 # products.

Data analysis: The relationship between the sensory evaluation results to the ratio of RA97 to stevia extract 2-4 # in this example is as shown in FIG. 15. The relationship between the overall like results to the ratio of RA97 to stevia extract 2-4 # in this example is as shown in FIG. 16.

Conclusion: The result showed that stevia extract 2-4 # could significantly improve taste profile, flavor intensity and mouthfeel of RA97. All range in tested ratio of RA97 to stevia extract 2-4 # from 10:1 to 10:100 has good taste improvement, preferably when the ratio ranges from 10:5 to 10:100, the products will give very good taste (score >3). Surely the conclusion could be extended to 1:99 and 99:1 for all purified stevia glycosides or any other types of high intensity natural sweeteners to stevia extract containing non-stevia glycosides substances. This example demonstrates that stevia extract 2-4 # can improve taste profile, flavor intensity and mouthfeel of natural sweetener such as RA97. An embodiment of stevia extract comprises non-stevia glycosides could improve the taste of high intensity natural sweeteners. An embodiment of food or beverage comprises a stevia extract containing non-stevia glycosides, and an embodiment further comprises a natural high intensity sweetener.

Example 9. The Improvement of Stevia Extract 2-4 # to the Taste and Mouthfeel of Sucralose Common process: *Stevia* extract 2-4 # and sucralose were weighed and uniformly mixed according to the weight shown in Table 9-1, dissolved in 100 ml pure water, and subjected to a mouthfeel evaluation test.

TABLE 9-1

The weight of *stevia* extract 2-4# and sucralose

| # | The ratio of sucralose to *stevia* extract 2-4# | Weight of sucralose (mg) | Weight of *stevia* extract 2-4# (mg) | Volume of pure water (mL) |
|---|---|---|---|---|
| 9-00 | 10/0 | 15 | 1.5 | 100 |
| 9-01 | 10/1 | 15 | 4.5 | 100 |
| 9-02 | 10/3 | 15 | 7.5 | 100 |
| 9-03 | 10/5 | 15 | 10.5 | 100 |
| 9-04 | 10/7 | 15 | 13.5 | 100 |
| 9-05 | 10/9 | 15 | 15 | 100 |
| 9-06 | 10/10 | 15 | 60 | 100 |
| 9-07 | 10/40 | 15 | 105 | 100 |
| 9-08 | 10/70 | 15 | 150 | 100 |
| 9-09 | 10/100 | 15 | 1.5 | 100 |

Experiments: Several mixtures of stevia extract 2-4 # and sucralose were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 150 ppm. The results are shown in Table 9-2.

TABLE 9-2

The score in sensory evaluation

| # | sensory evaluation | | | | | |
|---|---|---|---|---|---|---|
| | | sweet profile | | | | |
| | mouthfeel kokumi | sweet lingering | bitterness | metallic aftertaste | score of sweet profile | overall like |
| 9-00 | 1 | 3 | 1 | 3.5 | 3.50 | 2.25 |
| 9-01 | 1 | 3 | 1 | 3 | 3.67 | 2.33 |
| 9-02 | 1 | 2.5 | 1 | 2 | 4.17 | 2.58 |
| 9-03 | 2 | 2 | 1 | 1 | 4.67 | 3.33 |
| 9-04 | 3 | 2 | 1 | 1 | 4.67 | 3.83 |
| 9-05 | 4 | 2 | 1 | 1 | 4.67 | 4.33 |
| 9-06 | 4 | 3 | 2 | 2 | 3.67 | 3.83 |
| 9-07 | 5 | 4 | 3 | 3 | 2.67 | 3.83 |
| 9-08 | 5 | 4 | 3.5 | 4.5 | 2.00 | 3.50 |
| 9-09 | 5 | 4 | 4 | 5 | 1.67 | 3.33 |

Figure 17:
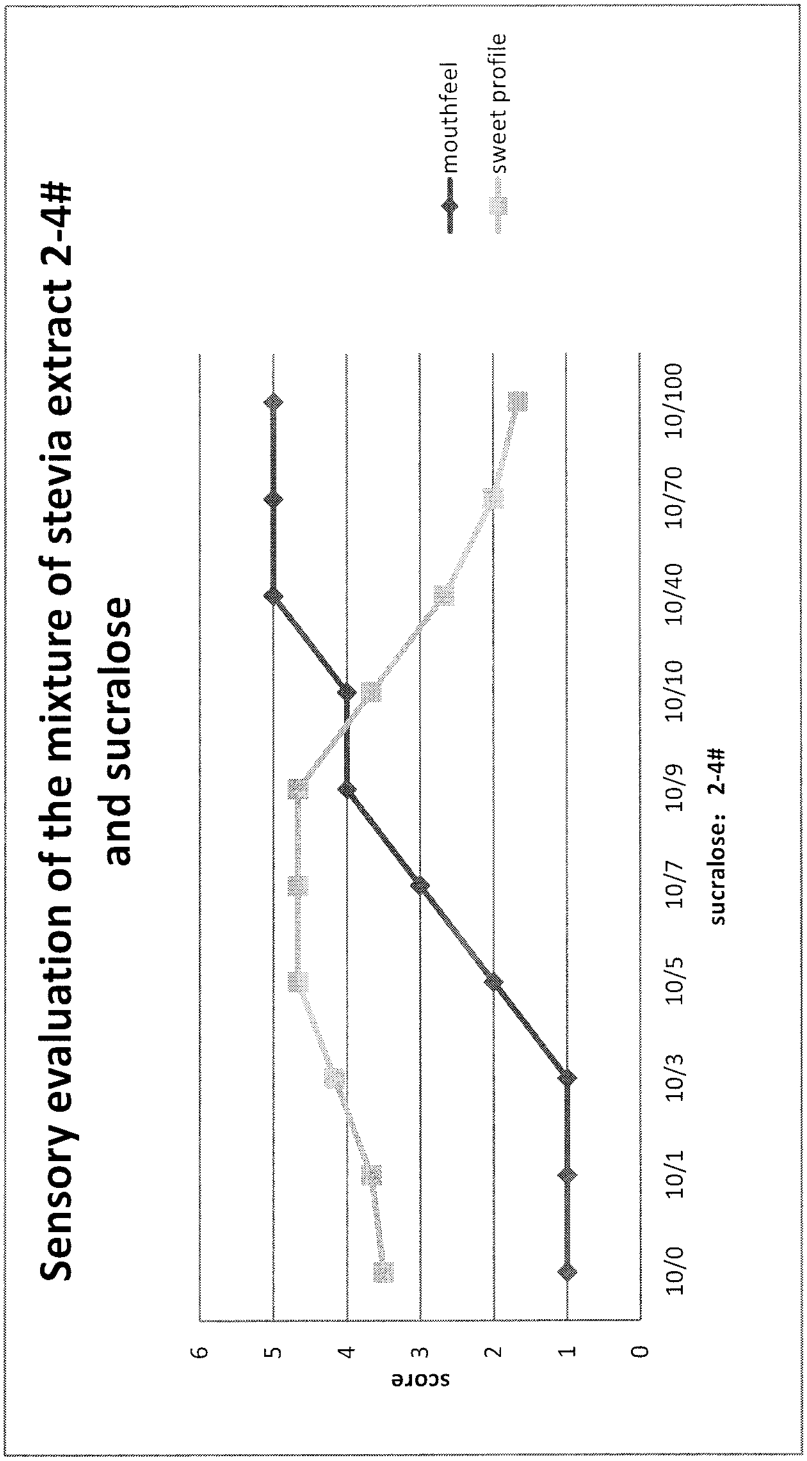
FIG. 17 shows the relationship between the sensory evaluation results to the ratio of sucralose to stevia extract 2-4 # products.
Figure 18:
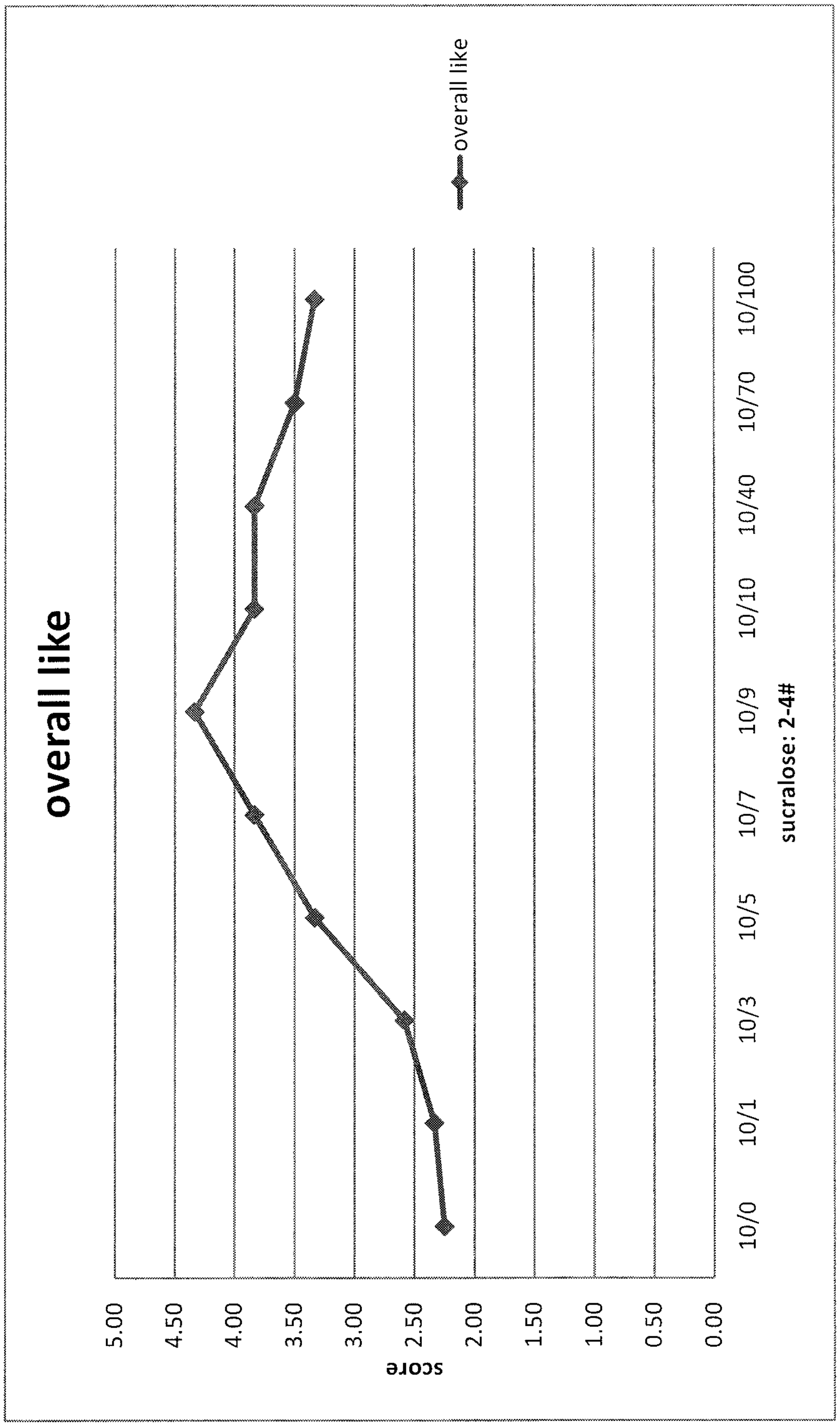
FIG. 18 shows the relationship between the overall like results to the ratio of sucralose to stevia extract 2-4 # products.

Data analysis: The relationship between the sensory evaluation results to the ratio of sucralose to stevia extract 2-4 # in this example are shown in FIG. 17. The relationship between the overall like results to the ratio of sucralose to stevia extract 2-4 # in this example are shown in FIG. 18.

Conclusion: The result showed that stevia extract 2-4 # could significantly improve taste profile, flavor intensity and mouthfeel of sucralose. All range in tested ratio of sucralose to stevia extract 2-4 # from 10:1 to 10:100 has good taste improvement, preferably when the ratio ranges from 10:5 to 10:100, the products will give very good taste (score >3). Surely the conclusion could be extended to 1:99 and 99:1 for any high intensity synthetic sweeteners to stevia extract containing non-stevia glycosides. This example demonstrates that stevia extract 2-4 # can improve taste profile, flavor intensity and mouthfeel of artificial sweetener such as sucralose. An embodiment of stevia extract comprises non-stevia glycosides could improve the taste profile of synthetic high intensity sweeteners. An embodiment of food or beverage comprises stevia extract containing non-stevia glycosides substances, and an embodiment further comprises a high intensity sweetener.

Example 10. The Improvement of Stevia Extract 2-4 # Products to the Taste and Mouthfeel of Acesulfame-K Common process: *Stevia* extract 2-4 # products and Acesulfame-K were weighed and uniformly mixed according to the weight shown in Table 10-1, dissolved in 100 ml pure water, and subjected to a mouthfeel evaluation test.

TABLE 10-1 the weight of *stevia* extract 2-4# products and Acesulfame-K

| NO. | The ratio of Acesulfame-K to *stevia* extract 2-4# products | Weight of Acesulfame-K (mg) | Weight of *stevia* extract 2-4# products (mg) | Volume of pure water (mg) |
|---|---|---|---|---|
| 10-01 | 10/0 | 20 | 0 | 100 |
| 10-02 | 10/1 | 20 | 2 | 100 |
| 10-03 | 10/3 | 20 | 6 | 100 |
| 10-04 | 10/5 | 20 | 10 | 100 |

TABLE 10-1-continued

| the weight of *stevia* extract 2-4# products and Acesulfame-K | | | | |
|---|---|---|---|---|
| NO. | The ratio of Acesulfame-K to *stevia* extract 2-4# products | Weight of Acesulfame-K (mg) | Weight of *stevia* extract 2-4# products (mg) | Volume of pure water (mg) |
| 10-05 | 10/7 | 20 | 14 | 100 |
| 10-06 | 10/10 | 20 | 20 | 100 |
| 10-07 | 10/40 | 20 | 80 | 100 |
| 10-08 | 10/70 | 20 | 140 | 100 |

Experiments: Several mixtures of stevia extract 2-4 # products and Acesulfame-K were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of Acesulfame-K in the sample solution was the same, 200 ppm. The results are shown in Table 10-2.

TABLE 10-2

| The score in sensory evaluation | | | | | | |
|---|---|---|---|---|---|---|
| | sensory evaluation | | | | | |
| | | sweet profile | | | | |
| NO. | mouthfeel kokumi | sweet lingering | bitterness | metallic aftertaste | score of sweet profile | overall like |
| 10-01 | 2 | 3 | 3 | 3 | 3.00 | 2.50 |
| 10-02 | 1.5 | 0.5 | 2 | 2.5 | 4.33 | 2.92 |
| 10-03 | 1.5 | 1 | 1 | 2 | 4.67 | 3.08 |
| 10-04 | 2.5 | 1.2 | 1 | 1 | 4.93 | 3.72 |
| 10-05 | 3 | 1.5 | 1 | 1 | 4.83 | 3.92 |
| 10-06 | 3.5 | 3.5 | 2.4 | 3 | 3.03 | 3.27 |
| 10-07 | 3.5 | 4 | 3.5 | 3 | 2.50 | 3.00 |
| 10-08 | 3.8 | 4 | 5 | 3 | 2.00 | 2.90 |

Figure 19:
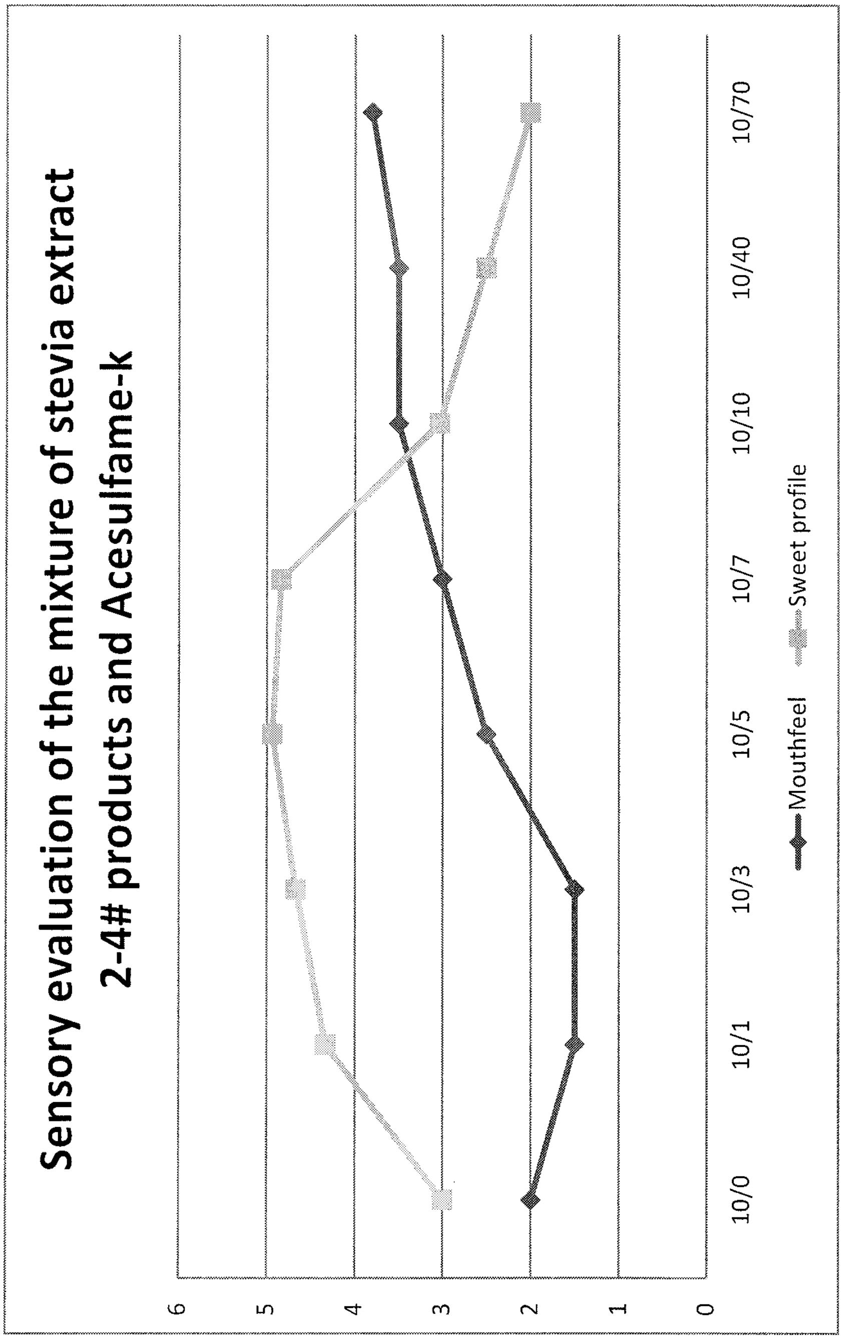
FIG. 19 shows the relationship between the sensory evaluation results to the ratio of Acesulfame-K to stevia extract 2-4 # products.
Figure 20:
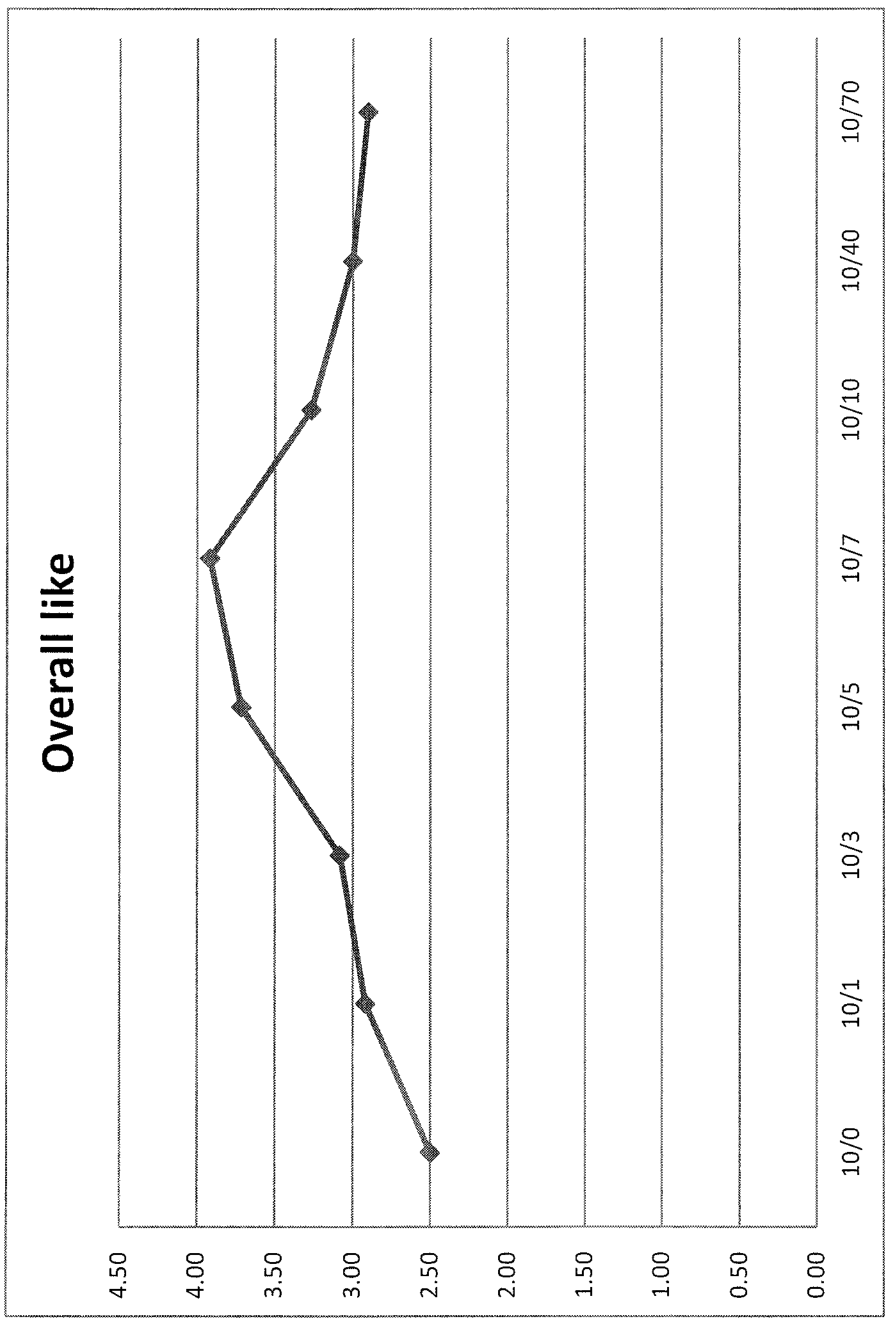
FIG. 20 shows the relationship between the overall like results to the ratio of Acesulfame-K to stevia extract 2-4 # products.

Data analysis: The relationship between the sensory evaluation results to the ratio of Acesulfame-K to stevia extract 2-4 # products in this example are shown in FIG. 19. The relationship between the overall like results to the ratio of Acesulfame-K to stevia extract 2-4 # products in this example are shown in FIG. 20.

Conclusion: The result showed that stevia extract 2-4 # products could significantly improve taste profile, flavor intensity and mouthfeel of Acesulfame-K. All range in tested ratio of Acesulfame-K to stevia extract 2-4 # products from 10:1 to 10:70 has good taste (overall like score >2.5), preferably when the ratio ranges from 10:5 to 10:10, the products will give very good taste (score >3). Surely the conclusion could be extended to 1:99 and 99:1 for any type of high intensity synthetic sweeteners to stevia extract containing non-stevia glycosides. This example demonstrates that stevia extract 2-4 # products can improve taste profile, flavor intensity and mouthfeel of artificial sweetener such as Acesulfame-K. A food or beverage comprises stevia extract containing non-stevia glycosides substances, and an embodiment further comprises a high intensity synthetic sweetener.

Example 11. The Improvement of Glycosylated Steviol Glycosides 2-4 #-GSG to the Taste and Mouthfeel of RA97

Common process: Glycosylated steviol glycosides 2-4 #-GSG (the product of Example 3) and RA97 were weighed and uniformly mixed according to the weight shown in Table 11-1, dissolved in 100 ml pure water, and subjected to a mouthfeel evaluation test.

TABLE 11-1

| The weight of 2-4#-GSG and RA97 | | | | |
|---|---|---|---|---|
| # | The ratio of RA97 to 2-4#-GSG | Weight of RA97 (mg) | Weight of 2-4#-GSG (mg) | Volume of pure water (mL) |
| 11-01 | 10/0 | 20 | 0 | 100 |
| 11-02 | 10/1 | 20 | 2 | 100 |
| 11-03 | 10/3 | 20 | 6 | 100 |
| 11-04 | 10/5 | 20 | 10 | 100 |
| 11-05 | 10/7 | 20 | 14 | 100 |
| 11-06 | 10/9 | 20 | 18 | 100 |
| 11-07 | 10/10 | 20 | 20 | 100 |
| 11-08 | 10/40 | 20 | 80 | 100 |
| 11-09 | 10/70 | 20 | 140 | 100 |
| 11-10 | 10/100 | 20 | 200 | 100 |

Experiments: Several mixtures of 2-4 #-GSG and RA97 were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of RA97 in the sample solution was the same, 200 ppm. The results are shown in Table 11-2.

TABLE 11-2

| The score in sensory evaluation | | | | | | |
|---|---|---|---|---|---|---|
| | sensory evaluation | | | | | |
| | | sweet profile | | | | |
| NO. | mouthfeel kokumi | sweet lingering | bitterness | metallic aftertaste | score of sweet profile | overall like |
| 11-01 | 1 | 3 | 3 | 3 | 3.00 | 2.00 |
| 11-02 | 1.5 | 3 | 2.50 | 3.00 | 3.17 | 2.33 |
| 11-03 | 2 | 2.5 | 2.00 | 2.50 | 3.67 | 2.83 |
| 11-04 | 3 | 2.5 | 1.50 | 2.50 | 3.83 | 3.42 |
| 11-05 | 3.5 | 3 | 1.00 | 2.00 | 4.00 | 3.75 |
| 11-06 | 4 | 3 | 2.50 | 2.00 | 3.50 | 3.75 |
| 11-07 | 4 | 3.5 | 3.00 | 3.00 | 2.83 | 3.42 |
| 11-08 | 4.5 | 3.5 | 3.50 | 3.50 | 2.50 | 3.50 |
| 11-09 | 5 | 4 | 4.00 | 4.5 | 1.83 | 3.42 |
| 11-10 | 5 | 5 | 5.00 | 5 | 1.00 | 3.00 |

Figure 21:
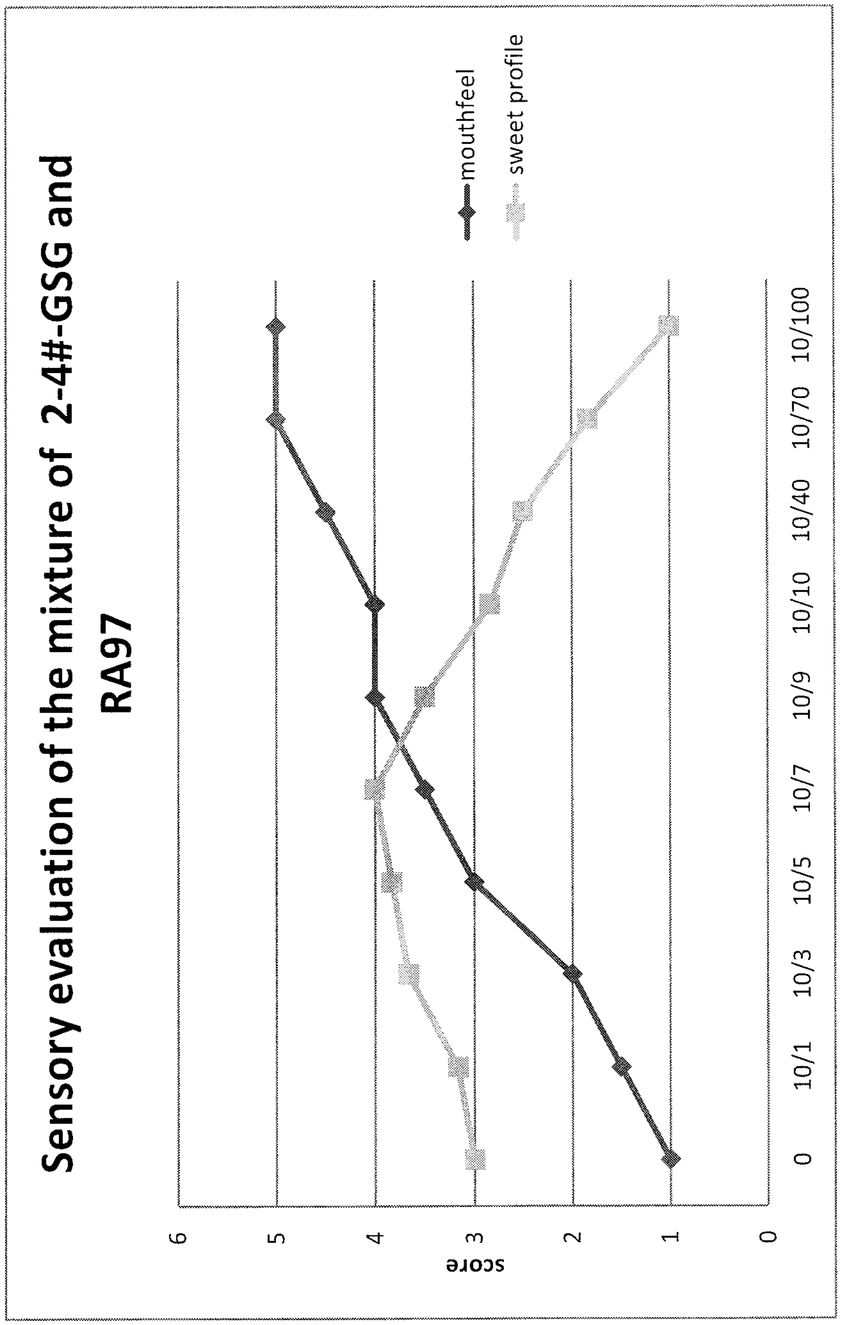
FIG. 21 shows the relationship between the sensory evaluation results to the ratio of RA97 to glycosylated steviol glycosids 2-4 #-GSG products.
Figure 22:
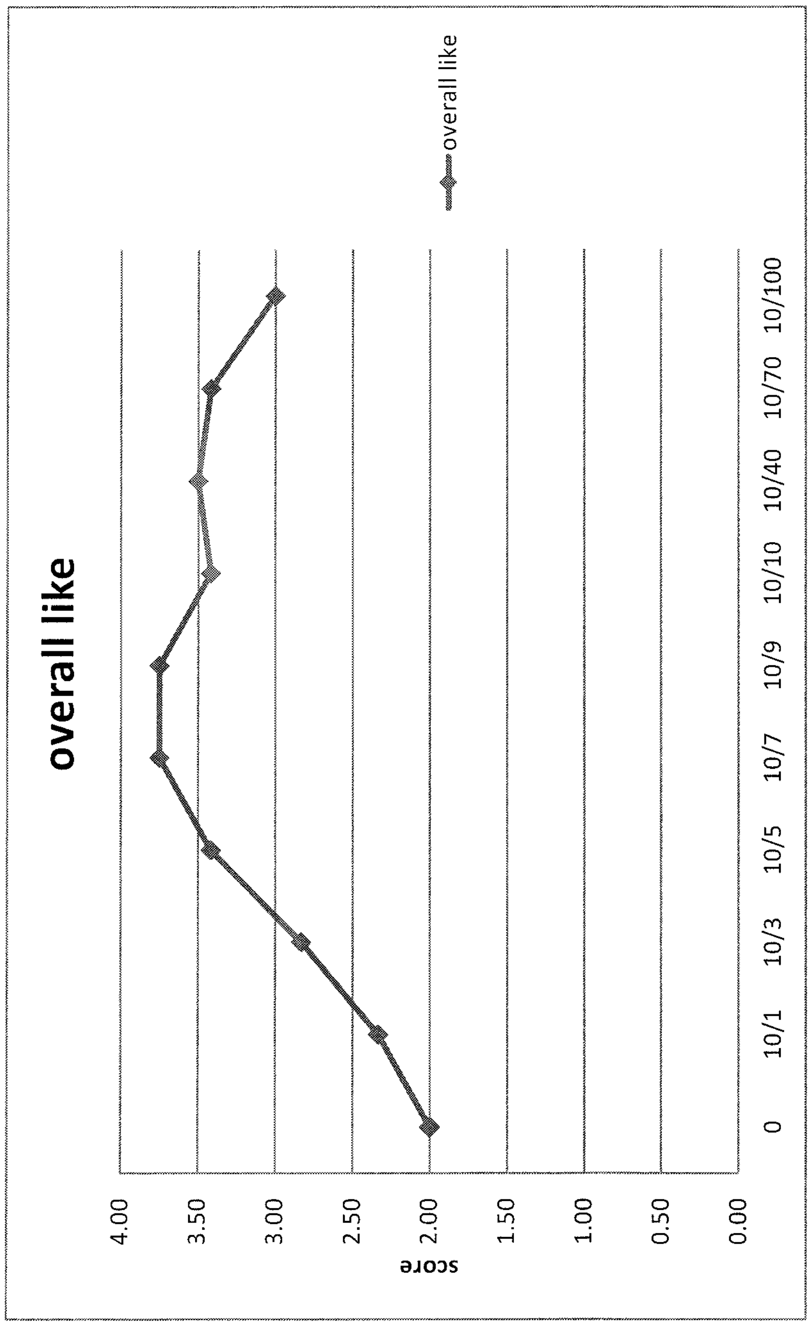
FIG. 22 shows the relationship between the overall like results to the ratio of RA97 to glycosylated steviol glycosids 2-4 #-GSG products.

Data analysis: The relationship between the sensory evaluation results to the ratio of RA97 to glycosylated steviol glycosides 2-4 #-GSG in this example is shown in FIG. 21. The relationship between the overall like results to the ratio of RA97 to glycosylated steviol glycosides 2-4 #-GSG in this example is shown in FIG. 22.

Conclusion: The result showed that glycosylated steviol glycosides 2-4 #-GSG could significantly improve taste profile, flavor intensity and mouthfeel of RA97. Range in tested ratio of RA97 to 2-4 #-GSG from 10:1 to 10:100 has good taste (overall like score >2.5), preferably when the ratio ranges from 10:5 to 10:10, the products will give very good taste (score >3.5). Surely the conclusion could be extended to 1:99 and 99:1 for purified stevia glycosides or any other types of natural high intensity sweeteners to glycosylated stevia glycosides containing non-stevia glycosides and glycosylated non-stevia glycosides. This example demonstrates that glycosylated steviol glycosides 2-4 #-GSG can improve taste profile, flavor intensity and mouthfeel of natural sweetener such as RA97. An embodiment of glycosylated steviol glycosides composition comprises non-stevia glycosides originated from stevia plants and or glycosylated non-stevia glycosides substances could improve the taste profile of natural high intensity sweeteners; the ratio of such blends could be in range of 1:99 to 99:1 as mentioned above. An embodiment of food or beverage comprises a composition containing glycosylated stevia glycosides containing non-stevia glycosides originated from stevia plant and or glycosylated non-stevia glycosides substances, and an embodiment further comprises a high intensity natural sweetener.

Example 12. The Improvement of Glycosylated Steviol Glycosides 2-4 #-GSG to the Taste and Mouthfeel of Sucralose Common process: Glycosylated steviol glycosides 2-4 #-GSG (the product of example 3) and sucralose were weighed and uniformly mixed according to the weight shown in Table 12-1, dissolved in 100 ml pure water, and subjected to a mouthfeel evaluation test.

TABLE 12-1

| The weight of 2-4#-GSG and sucralose | | | | |
|---|---|---|---|---|
| # | The ratio of sucralose to 2-4#-GSG | Weight of sucralose (mg) | Weight of 2-4#-GSG (mg) | Volume of pure water (mg) |
| 12-01 | 10/0 | 15 | 0 | 100 |
| 12-02 | 10/1 | 15 | 1.5 | 100 |
| 12-03 | 10/3 | 15 | 4.5 | 100 |
| 12-04 | 10/5 | 15 | 7.5 | 100 |
| 12-05 | 10/7 | 15 | 10.5 | 100 |
| 12-06 | 10/9 | 15 | 13.5 | 100 |
| 12-07 | 10/10 | 15 | 15 | 100 |
| 12-08 | 10/40 | 15 | 60 | 100 |
| 12-09 | 10/70 | 15 | 105 | 100 |
| 12-10 | 10/100 | 15 | 150 | 100 |

Experiments

Several mixtures of glycosylated steviol glycosides 2-4 #-GSG and sucralose were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 150 ppm. The results are shown in Table 12-2.

TABLE 12-2

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 12-01 | 1 | 3 | 1 | 3.5 | 3.50 | 2.25 |
| 12-02 | 1.5 | 3 | 1.00 | 3 | 3.67 | 2.58 |
| 12-03 | 2 | 2.5 | 1.00 | 3 | 3.83 | 2.92 |
| 12-04 | 2 | 2.5 | 1.00 | 2.50 | 4.00 | 3.00 |
| 12-05 | 2 | 3 | 1.00 | 2.50 | 3.83 | 2.92 |

TABLE 12-2-continued

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 12-06 | 2.5 | 3 | 1.50 | 3.00 | 3.50 | 3.00 |
| 12-07 | 2.5 | 3.5 | 2.00 | 4 | 2.83 | 2.67 |
| 12-08 | 2.5 | 3.5 | 3.00 | 4 | 2.50 | 2.50 |
| 12-09 | 3 | 4 | 3.50 | 4.5 | 2.00 | 2.50 |
| 12-10 | 3 | 3 | 3.50 | 4.50 | 2.00 | 2.50 |

Figure 23:
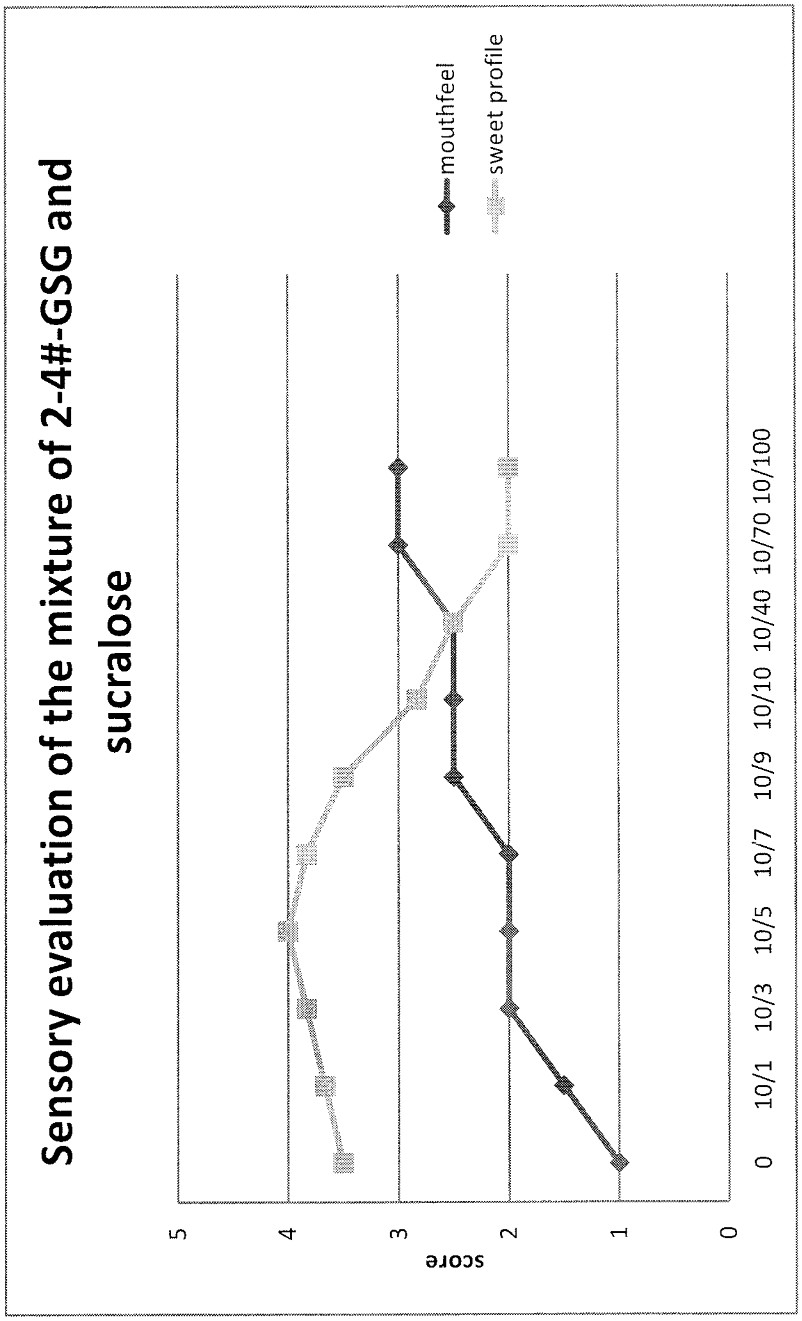
FIG. 23 shows the relationship between the sensory evaluation results to the ratio of sucralose to glycosylated steviol glycosids 2-4 #-GSG products.
Figure 24:
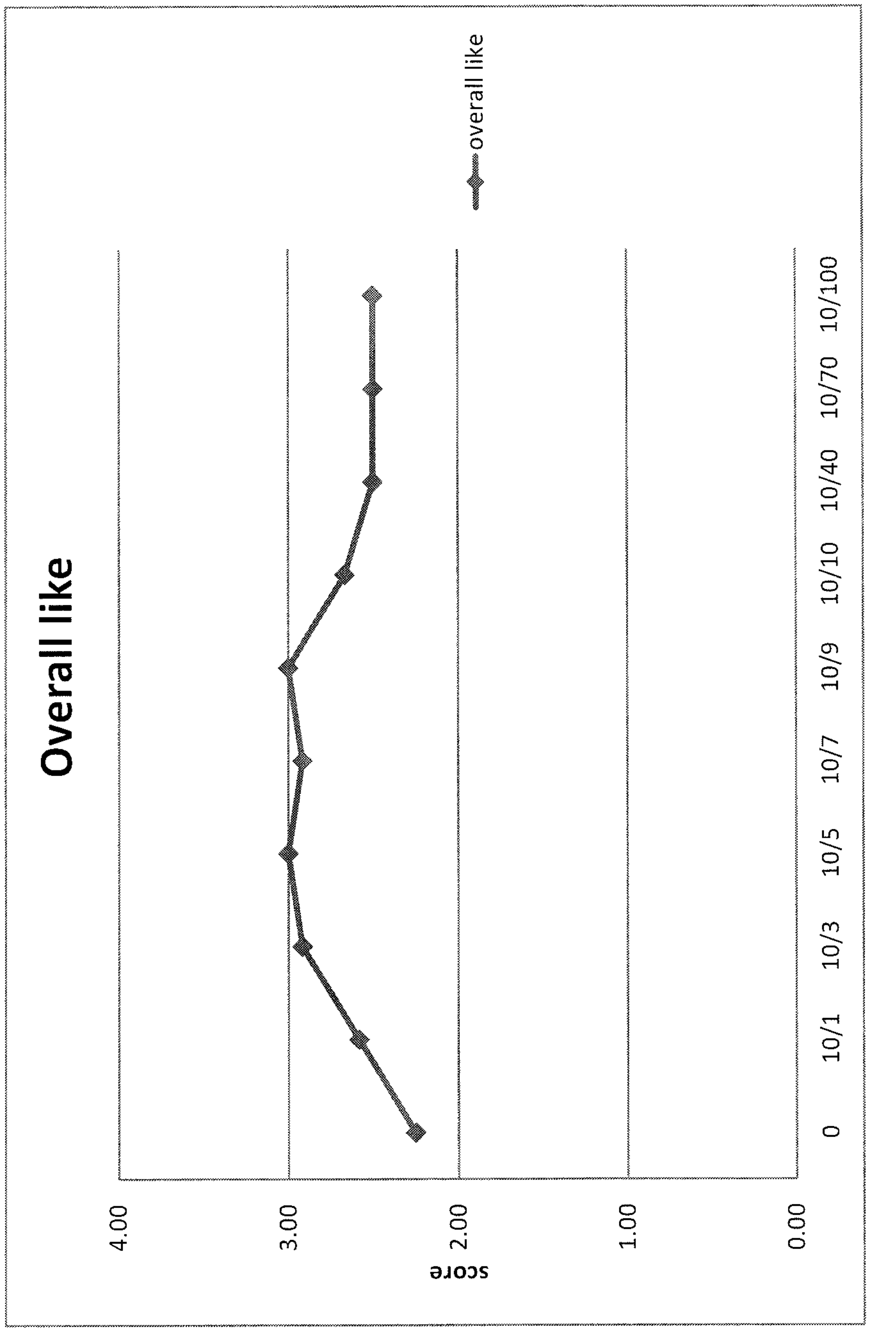
FIG. 24 shows the relationship between the overall like results to the ratio of sucralose to glycosylated steviol glycosids 2-4 #-GSG products.

Data analysis: The relationship between the sensory evaluation results to the ratio of sucralose to glycosylated steviol glycosides 2-4 #-GSG in this example is as shown in FIG. 23. The relationship between the overall like results to the ratio of sucralose to glycosylated steviol glycosides 2-4 #-GSG in this example is as shown in FIG. 24.

Conclusion: The result showed that glycosylated steviol glycosides 2-4 #-GSG could significantly improve taste profile, flavor intensity and mouthfeel of sucralose. Range in tested ratio of sucralose to 2-4 #-GSG from 10:1 to 10:70 has good taste (overall like score >2.5). Surely the conclusion could be extended to 1:99 to 99:1 for any high intensity synthetic sweetener to glycosylated steviol glycosides containing non-stevia glycosides and glycosylated non-stevia glycosides. This example demonstrates that glycosylated steviol glycosides 2-4 #-GSG can improve taste profile, flavor intensity and mouthfeel of artificial sweetener such as sucralose. An embodiment of glycosylated stevia glycosides composition comprises non-stevia glycosides originated from stevia plants and or glycosylated non-stevia glycosides substances could improve the taste profile of high intensity synthetic sweeteners. The ratio of blends could be in range of 1:99 and 99:1 as mentioned above. An embodiment of food or beverage comprises glycosylated stevia glycosides containing non-stevia glycosides originated from stevia plant and or glycosylated non-stevia glycosides substances, and an embodiment further comprises a high intensity synthetic sweetener.

Example 13. The Improvement of Glycosylated Steviol Glycosides 2-4 #-GSG to the Taste and Mouthfeel of Acesulfame-K Common process: Glycosylated steviol glycosides 2-4 #-GSG (the product of example 3) and acesulfame-K were weighed and uniformly mixed according to the weight shown in Table 13-1, dissolved in 100 ml pure water, and subjected to a mouthfeel evaluation test.

TABLE 13-1

| The weight of 2-4#-GSG and acesulfame-K | | | | |
|---|---|---|---|---|
| # | The ratio of acesulfame-K to 2-4#-GSG | Weight of acesulfame-K (mg) | Weight of 2-4#-GSG (mg) | Volume of pure water (mL) |
| 13-01 | 10/0 | 20 | 0 | 100 |
| 13-02 | 10/1 | 20 | 2 | 100 |
| 13-03 | 10/3 | 20 | 6 | 100 |
| 13-04 | 10/5 | 20 | 10 | 100 |
| 13-05 | 10/7 | 20 | 14 | 100 |
| 13-06 | 10/9 | 20 | 18 | 100 |
| 13-07 | 10/10 | 20 | 20 | 100 |
| 13-08 | 10/40 | 20 | 80 | 100 |
| 13-09 | 10/70 | 20 | 140 | 100 |
| 13-10 | 10/100 | 20 | 200 | 100 |

Experiments: Several mixtures of glycosylated steviol glycosides 2-4 #-GSG and acesulfame-K were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of acesulfame-K in the sample solution was the same, 200 ppm. The results are shown in Table 13-2.

TABLE 13-2

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 13-01 | 2 | 3 | 3 | 3 | 3.00 | 2.50 |
| 13-02 | 2.5 | 3 | 2.5 | 2.5 | 3.33 | 2.92 |
| 13-03 | 2.5 | 2.5 | 2.0 | 2.0 | 3.83 | 3.17 |
| 13-04 | 3 | 2.5 | 1.5 | 2.0 | 4.00 | 3.50 |
| 13-05 | 3.5 | 3 | 1.0 | 3.0 | 3.67 | 3.58 |
| 13-06 | 4 | 3 | 2.5 | 3.0 | 3.17 | 3.58 |
| 13-07 | 4 | 3.5 | 3.0 | 4 | 2.50 | 3.25 |
| 13-08 | 4.5 | 3.5 | 3.5 | 4 | 2.33 | 3.42 |
| 13-09 | 5 | 4 | 4.0 | 4.5 | 1.83 | 3.42 |
| 13-10 | 5 | 5 | 5.0 | 5 | 1.00 | 3.00 |

Figure 25:
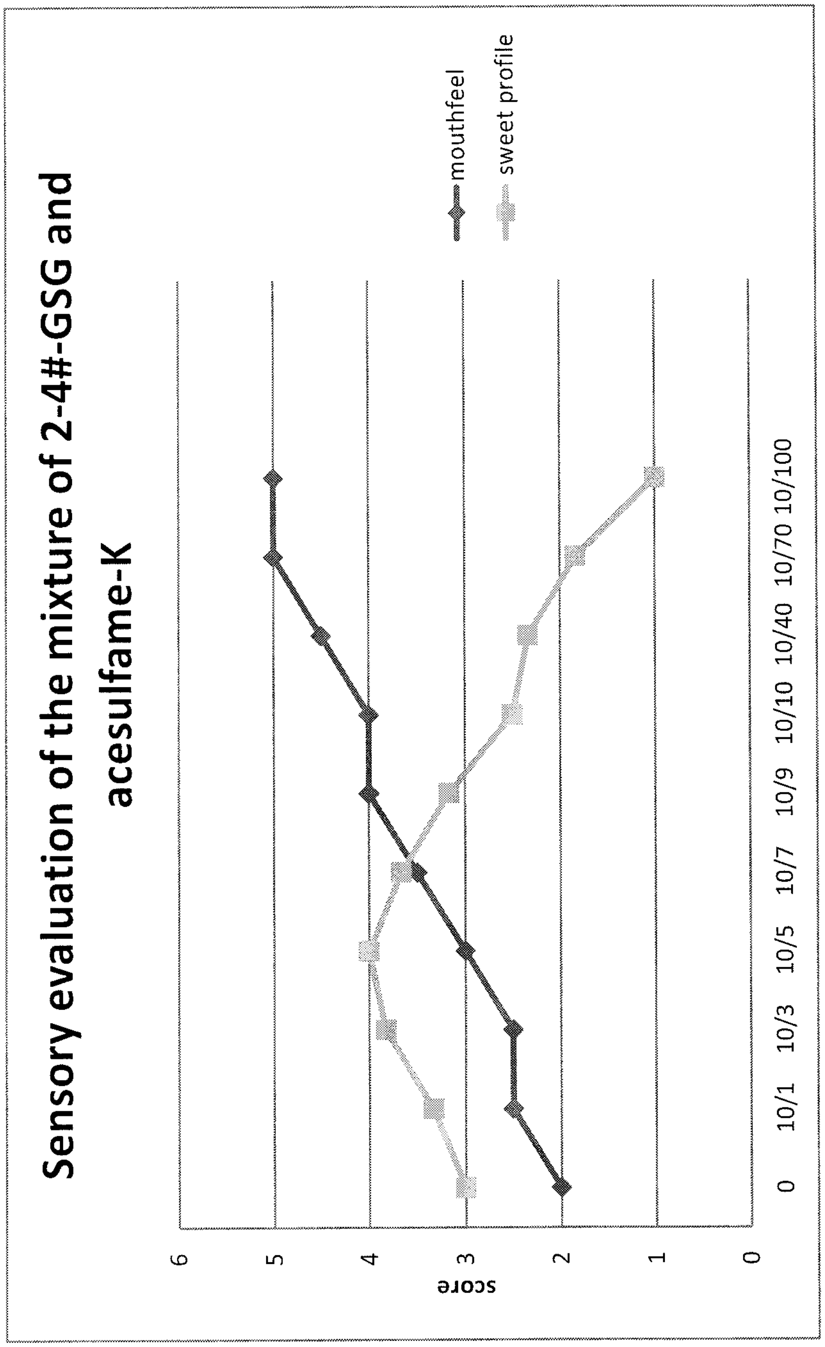
FIG. 25 shows the relationship between the sensory evaluation results to the ratio of Acesulfame-K to glycosylated steviol glycosids 2-4 #-GSG products.
Figure 26:
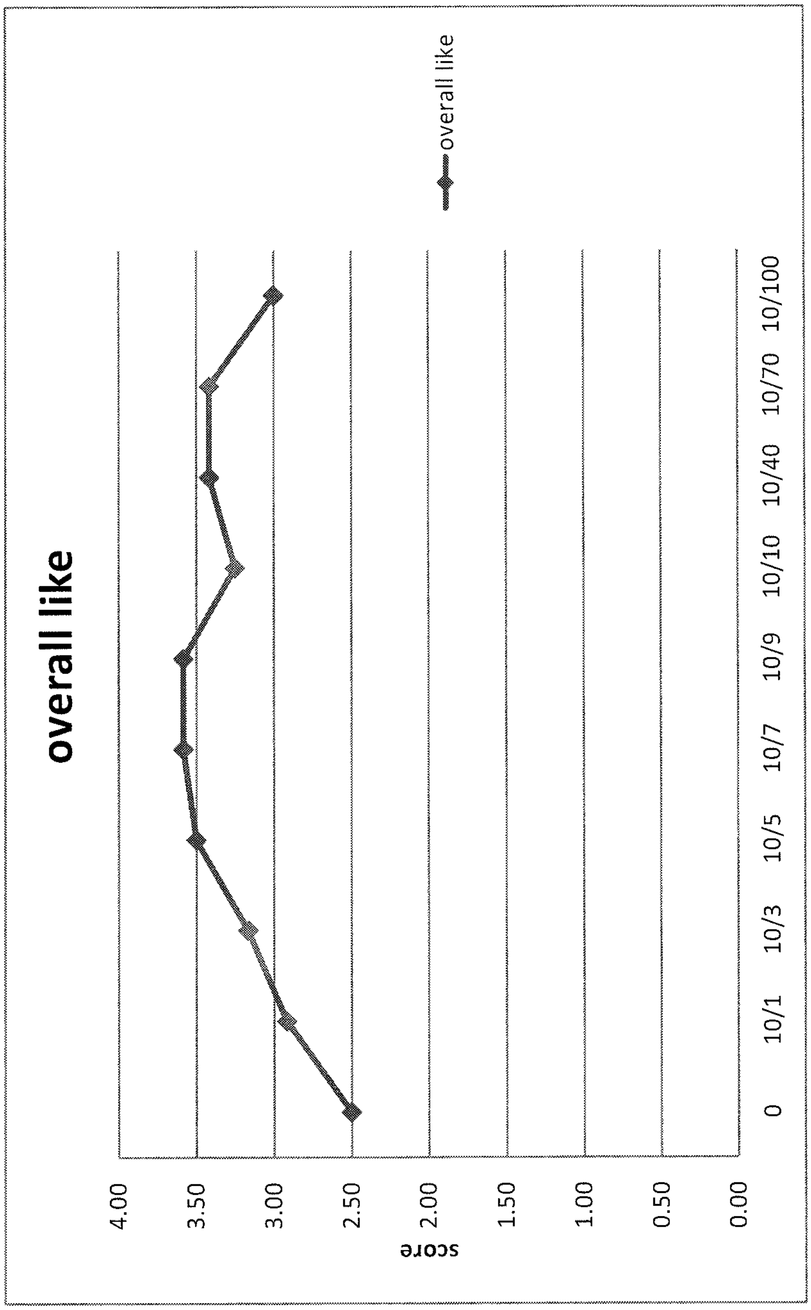
FIG. 26 shows the relationship between the overall like results to the ratio of Acesulfame-K to glycosylated steviol glycosids 2-4 #-GSG products.

Data analysis: The relationship between the sensory evaluation results to the ratio of acesulfame-K to glycosylated steviol glycosides 2-4 #-GSG in this example is as shown in FIG. 25. The relationship between the overall like results to the ratio of acesulfame-K to glycosylated steviol glycosides 2-4 #-GSG in this example is as shown in FIG. 26.

Conclusion: The result showed that glycosylated steviol glycosides 2-4 #-GSG could significantly improve taste profile, flavor intensity and mouthfeel of acesulfame-K. Range in tested ratio of acesulfame-K to 2-4 #-GSG from 10/1 to 10/100 has good taste (overall like score >2.5), preferably when the ratio ranges from 10:5 to 10:9, the products will give very good taste (score >3.5). Surely the conclusion could be extended to 1:99 and 99:1. This example demonstrates that glycosylated steviol glycosides 2-4 #-GSG can improve taste profile, flavor intensity and mouthfeel of artificial sweetener such as acesulfame-K. An embodiment of glycosylated stevia glycosides composition comprises non-stevia glycosides originated from stevia plant and or glycosylated non-stevia glycosides substances could improve the taste profile of high intensity synthetic sweeteners. The ratio of blends could be in range of 1:99 and 99:1 as mentioned above. An embodiment of food or beverage comprises glycosylated stevia composition containing non-stevia glycoside originated from stevia plant and or glycosylated non-stevia glycosides substances. An embodiment of food or beverage composition further comprises a high intensity synthetic sweetener. The term of stevia glycosides and steviol glycosides are exchangeable in this specification.

Example 14. The Improvement of Flavored Glycosylated Steviol Glycosides 2-4 #-GSG-MRP to the Taste and Mouthfeel of RA97

Common process: Flavored glycosylated steviol glycosides 2-4 #-GSG-MRP (the product of example 4) and RA97 were weighed and uniformly mixed according to the weight shown in Table 14-1, dissolved in 100 ml pure water, and subjected to a mouthfeel evaluation test.

TABLE 14-1

| The weight of 2-4#-GSG-MRP and RA97 | | | | |
|---|---|---|---|---|
| NO. | The ratio of RA97 to 2-4#-GSG-MRP | Weight of RA97 (mg) | Weight of 2-4#-GSG-MRP (mg) | Volume of pure water (mL) |
| 14-01 | 10/0 | 20 | 0 | 100 |
| 14-02 | 10/1 | 20 | 2 | 100 |
| 14-03 | 10/3 | 20 | 6 | 100 |
| 14-04 | 10/5 | 20 | 10 | 100 |
| 14-05 | 10/7 | 20 | 14 | 100 |
| 14-06 | 10/10 | 20 | 20 | 100 |
| 14-07 | 10/40 | 20 | 80 | 100 |
| 14-08 | 10/70 | 20 | 140 | 100 |

Experiments: Several mixtures of flavored glycosylated steviol glycosides 2-4 #-GSG-MRP and RA97 were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of RA97 in the sample solution was the same, 200 ppm. The results are shown in Table 14-2.

TABLE 14-2

| The score in sensory evaluation | | | | | | |
|---|---|---|---|---|---|---|
| | sensory evaluation | | | | | |
| | | sweet profile | | | | |
| NO. | mouthfeel kokumi | sweet lingering | bitterness | metallic aftertaste | score of sweet profile | overall like |
| 14-01 | 1 | 3 | 3 | 3 | 3.00 | 2.00 |
| 14-02 | 1 | 2 | 2.5 | 1 | 4.17 | 2.58 |
| 14-03 | 1 | 1.5 | 2 | 1 | 4.50 | 2.75 |
| 14-04 | 1.5 | 2.5 | 1.5 | 1.5 | 4.17 | 2.83 |
| 14-05 | 3.5 | 2.5 | 1 | 1.5 | 4.33 | 3.92 |
| 14-06 | 3.5 | 2.5 | 0.5 | 1.5 | 4.50 | 4.00 |
| 14-07 | 3.5 | 3.5 | 1.5 | 1.5 | 3.83 | 3.67 |
| 14-08 | 3 | 4 | 3 | 2.5 | 2.83 | 2.92 |

Figure 27:
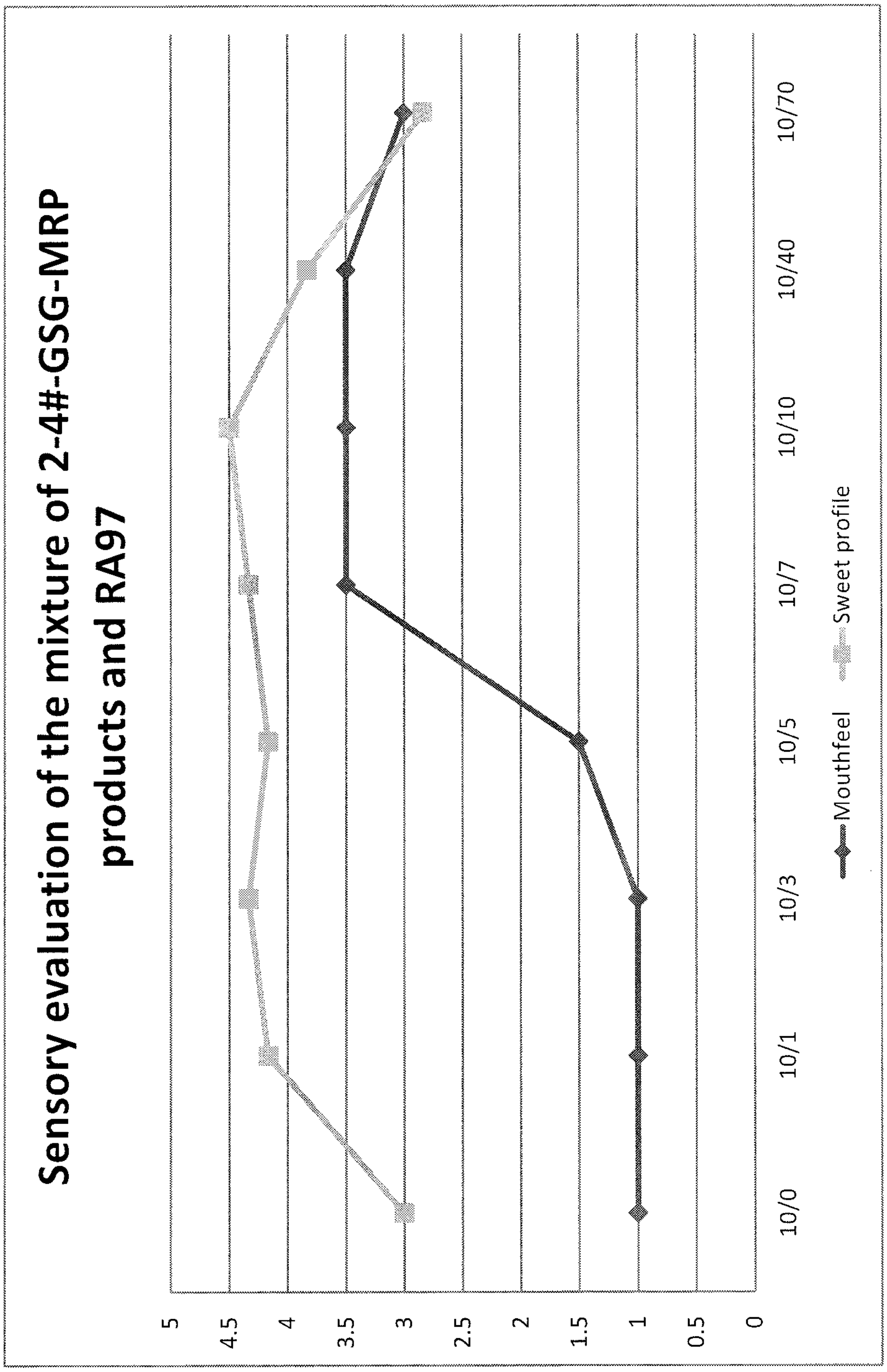
FIG. 27 shows the relationship between the sensory evaluation results to the ratio of RA97 to flavored glycosylated steviol glycosids 2-4 #-GSG-MRP.

Data analysis: The relationship between the sensory evaluation results to the ratio of RA97 to flavored glycosylated steviol glycosides 2-4 #-GSG-MRP in this example is as shown in FIG. 27.

Figure 28:
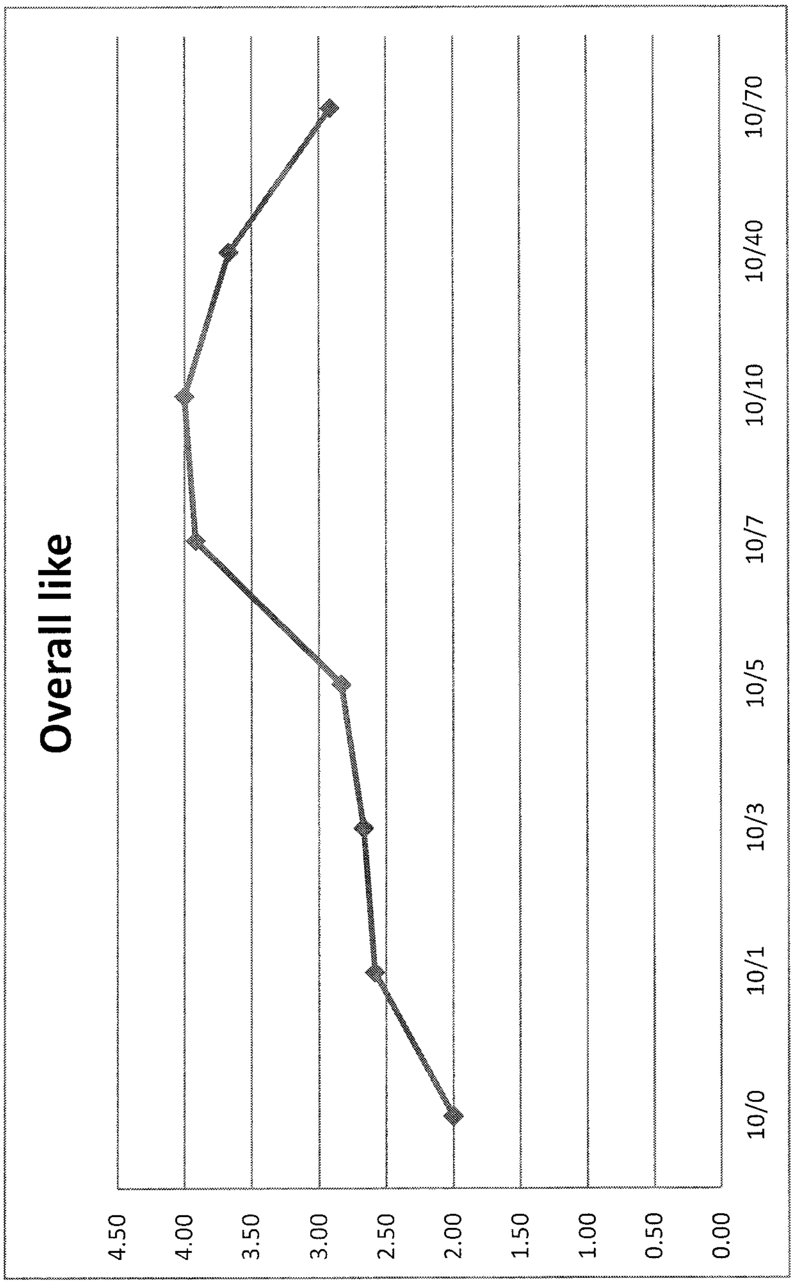
FIG. 28 shows the relationship between the overall like results to the ratio of RA97 to flavored glycosylated steviol glycosids 2-4 #-GSG-MRP.

The relationship between the overall like results to the ratio of RA97 to flavored glycosylated steviol glycosides 2-4 #-GSG-MRP in this example is as shown in FIG. 28.

Conclusion: The result showed that flavored glycosylated steviol glycosides 2-4 #-GSG-MRP could significantly improve taste profile, flavor intensity and mouthfeel of RA97. All range in tested ratio of RA97 to 2-4 #-GSG-MRP from 10:1 to 10:70 has good taste (overall like score >2.5), preferably when the ratio ranges from 10:7 to 10:40, the products will give very good taste (score >3.5). Surely the conclusion could be extended to 1:99 and 99:1. This example demonstrates that flavored glycosylated steviol glycosides 2-4 #-GSG-MRP can improve taste profile, flavor intensity and mouthfeel of artificial sweetener such as RA97. An embodiment of Maillard reacted glycosylated stevia glycosides composition comprises non-stevia glycosides originated from stevia plant and or glycosylated non-stevia glycosides substances could improve the taste profile of high intensity natural sweeteners. An embodiment of food or beverage comprises Maillard reacted glycosylated steviol glycosides containing non-stevia glycosides and or glycosylated non-stevia glycosides substances, and an embodiment further comprises a natural sweetener.

Example 15. The Improvement of Flavored Glycosylated Steviol Glycosides 2-4 #-GSG-MRP to the Taste and Mouthfeel of Sucralose Common process: Flavored glycosylated steviol glycosides 2-4 #-GSG-MRP (the product of example 4) and sucralose were weighed and uniformly mixed according to the weight shown in Table 15-1, dissolved in 100 ml pure water, and subjected to a mouthfeel evaluation test.

TABLE 15-1

| The weight of 2-4#-GSG-MRP and sucralose | | | | |
|---|---|---|---|---|
| # | The ratio of sucralose to 2-4#-GSG-MRP | Weight of sucralose (mg) | Weight of 2-4#-GSG-MRP (mg) | Volume of pure water (mL) |
| 15-00 | 10/0 | 15 | 1.5 | 100 |
| 15-01 | 10/1 | 15 | 4.5 | 100 |
| 15-02 | 10/3 | 15 | 7.5 | 100 |
| 15-03 | 10/5 | 15 | 10.5 | 100 |
| 15-04 | 10/7 | 15 | 13.5 | 100 |
| 15-05 | 10/9 | 15 | 15 | 100 |
| 15-06 | 10/10 | 15 | 60 | 100 |
| 15-07 | 10/40 | 15 | 105 | 100 |
| 15-08 | 10/70 | 15 | 150 | 100 |
| 15-09 | 10/100 | 15 | 1.5 | 100 |

Experiments: Several mixtures of flavored glycosylated steviol glycosides 2-4 #-GSG-MRP and sucralose were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 150 ppm. The results are shown in Table 15-2.

TABLE 15-2

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 15-00 | 1 | 3 | 1 | 3.5 | 3.50 | 2.25 |
| 15-01 | 1 | 3 | 1 | 3 | 3.67 | 2.33 |
| 15-02 | 1 | 2.5 | 1 | 3 | 3.83 | 2.42 |
| 15-03 | 2 | 2 | 1 | 1.5 | 4.50 | 3.25 |
| 15-04 | 3 | 2 | 1 | 1 | 4.67 | 3.83 |
| 15-05 | 3.5 | 2 | 1.5 | 1 | 4.50 | 4.00 |
| 15-06 | 4 | 3.5 | 2 | 2 | 3.50 | 3.75 |
| 15-07 | 4 | 3.5 | 3 | 2 | 3.17 | 3.58 |
| 15-08 | 5 | 4 | 3.5 | 4.5 | 2.00 | 3.50 |
| 15-09 | 5 | 4 | 4 | 5 | 1.67 | 3.33 |

Figure 29:
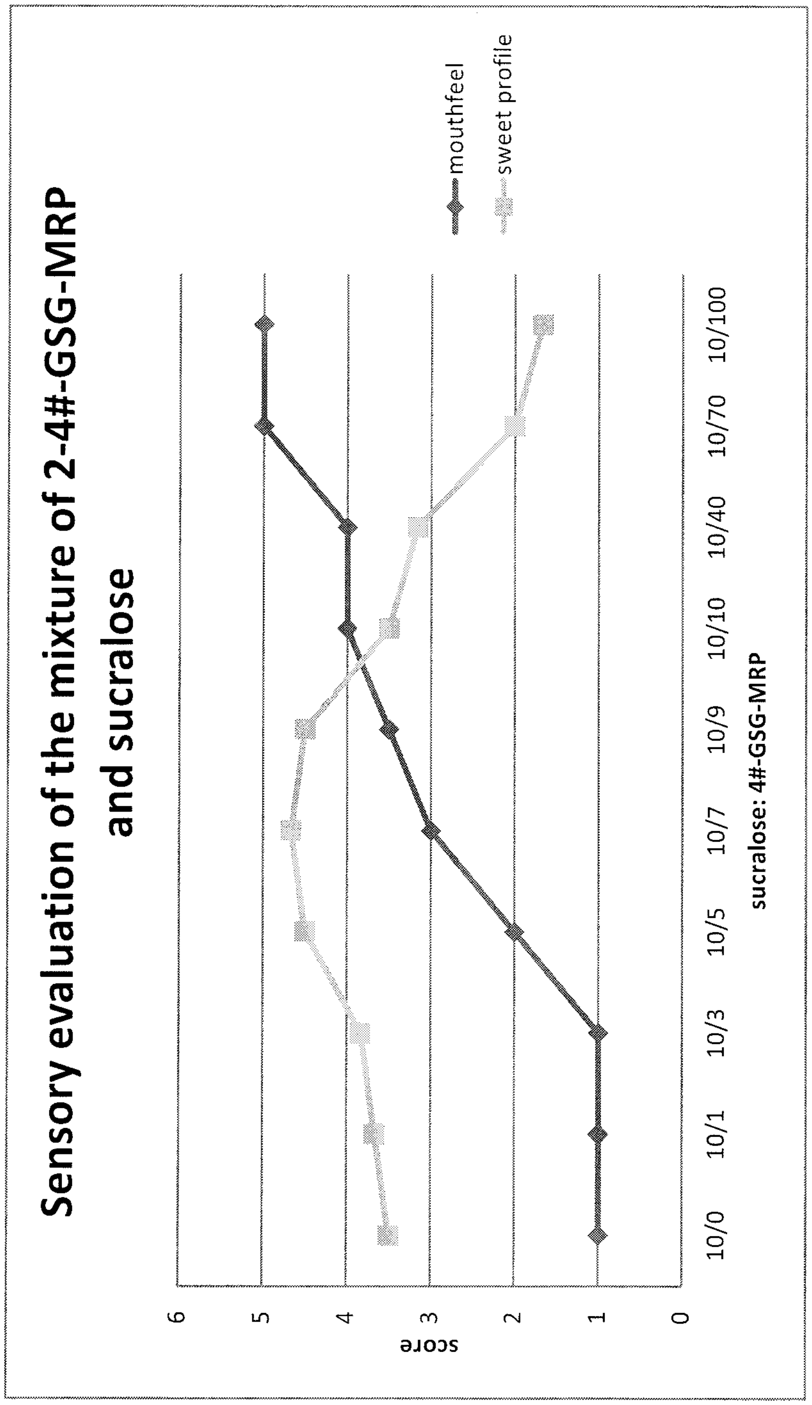
FIG. 29 shows the relationship between the sensory evaluation results to the ratio of sucralose to flavored glycosylated steviol glycosids 2-4 #-GSG-MRP.
Figure 30:
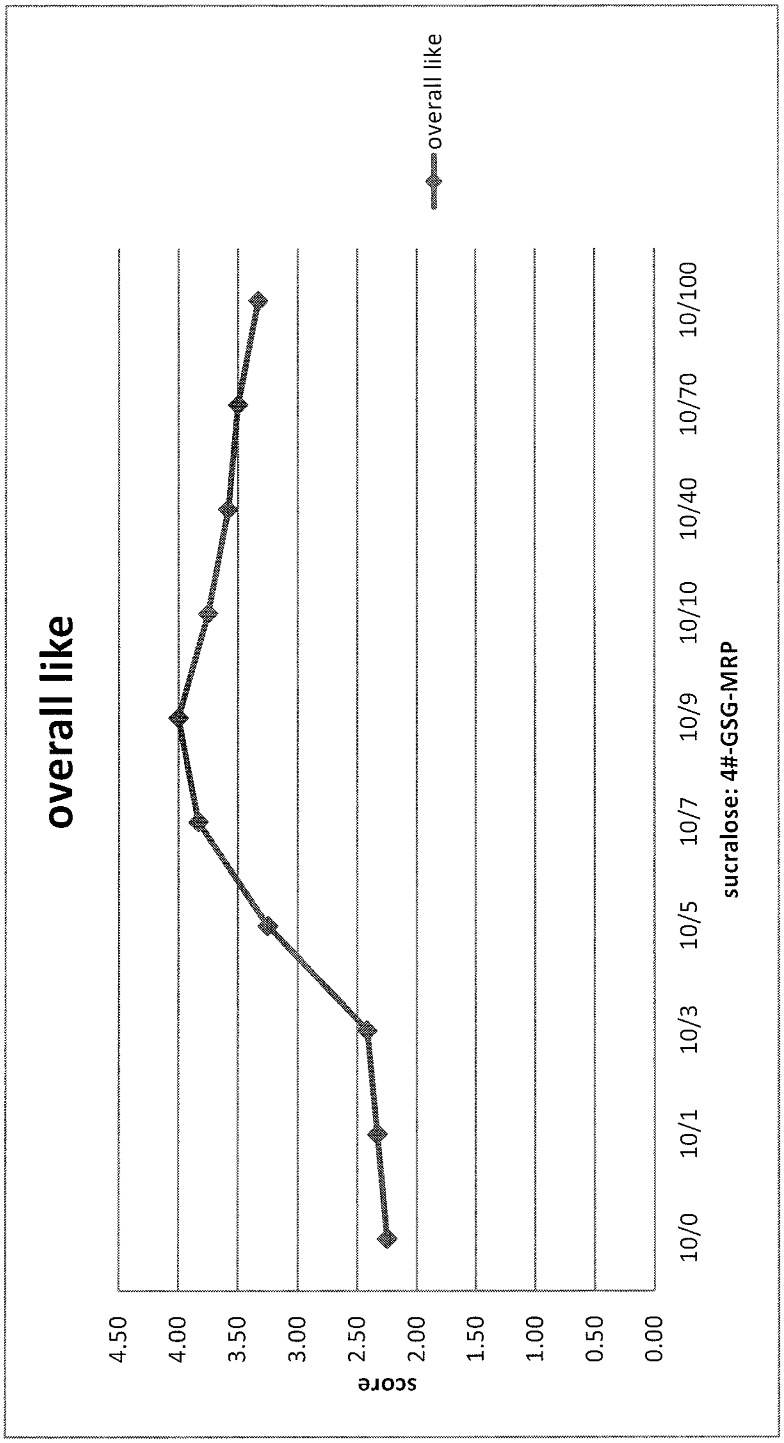
FIG. 30 shows the relationship between the overall like results to the ratio of sucralose to flavored glycosylated steviol glycosids 2-4 #-GSG-MRP.

Data analysis: The relationship between the sensory evaluation results to the ratio of sucralose to flavored glycosylated steviol glycosides 2-4 #-GSG-MRP in this example is as shown in FIG. 29. The relationship between the overall like results to the ratio of sucralose to flavored glycosylated steviol glycosides 2-4 #-GSG-MRP in this example is as shown in FIG. 30.

Conclusion: The result showed that flavored glycosylated steviol glycosides 2-4 #-GSG-MRPs could significantly improve taste profile, flavor intensity and mouthfeel of sucralose. All range in tested ratio of sucralose to 2-4 #-GSG-MRP from 10:1 to 10:100 has good taste improvement, preferably when the ratio ranges from 10:5 to 10:70, the products will give very good taste (score >3). Surely the conclusion could be extended to 1:99 and 99:1. This example demonstrates that flavored glycosylated steviol glycosides 2-4 #-GSG-MRPs can improve taste profile, flavor intensity and mouthfeel of artificial sweetener such as sucralose. An embodiment of Maillard reacted glycosylated stevia glycosides comprises non-stevia glycosides originated from stevia plant and or glycosylated stevia glycosides could improve the taste profile of high intensity synthetic sweetener. An embodiment of a food or beverage comprises Maillard reacted glycosylated stevia glycosides containing non-stevia glycosides originated form stevia plant and or glycosylated non-stevia glycosides substances, and an embodiment further comprises a high intensity synthetic sweetener.

Example 16. The Improvement of Flavored Glycosylated Steviol Glycosides 2-4 #-GSG-MRP to the Taste and Mouthfeel of Acesulfame-K Common process: Flavored glycosylated steviol glycosides 2-4 #-GSG-MRP (the product of example 4) and acesulfame-K were weighed and uniformly mixed according to the weight shown in Table 16-1, dissolved in 100 ml pure water, and subjected to a mouthfeel evaluation test.

TABLE 16-1

| The weight of 2-4#-GSG-MRP and acesulfame-K | | | | |
|---|---|---|---|---|
| # | The ratio of acesulfame-K to 2-4#-GSG-MRP | Weight of acesulfame-K (mg) | Weight of 2-4#-GSG-MRP (mg) | Volume of pure water (mL) |
| 16-00 | 10/0 | 20 | 0 | 100 |
| 16-01 | 10/1 | 20 | 2 | 100 |
| 16-02 | 10/3 | 20 | 6 | 100 |
| 16-03 | 10/5 | 20 | 10 | 100 |
| 16-04 | 10/7 | 20 | 14 | 100 |
| 16-05 | 10/9 | 20 | 18 | 100 |

TABLE 16-1-continued

The weight of 2-4#-GSG-MRP and acesulfame-K

| # | The ratio of acesulfame-K to 2-4#-GSG-MRP | Weight of acesulfame-K (mg) | Weight of 2-4#-GSG-MRP (mg) | Volume of pure water (mL) |
|---|---|---|---|---|
| 16-06 | 10/10 | 20 | 20 | 100 |
| 16-07 | 10/40 | 20 | 80 | 100 |
| 16-08 | 10/70 | 20 | 140 | 100 |
| 16-09 | 10/100 | 20 | 200 | 100 |

Experiments: Several mixtures of flavored glycosylated steviol glycosides 2-4 #-GSG-MRP and acesulfame-K were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of acesulfame-K in the sample solution was the same, 200 ppm. The results are shown in Table 16-2.

TABLE 16-2

The score in sensory evaluation

| # | sensory evaluation | | | | | |
|---|---|---|---|---|---|---|
| | | sweet profile | | | | |
| | mouthfeel kokumi | sweet lingering | bitterness | metallic aftertaste | score of sweet profile | overall like |
| 16-00 | 2 | 3 | 2 | 3 | 3.33 | 2.67 |
| 16-01 | 2 | 3 | 1.5 | 3 | 3.50 | 2.75 |
| 16-02 | 2 | 2 | 1 | 2 | 4.33 | 3.17 |
| 16-03 | 3 | 1 | 1 | 2 | 4.67 | 3.83 |
| 16-04 | 3 | 2 | 1 | 2 | 4.33 | 3.83 |
| 16-05 | 3 | 2 | 1 | 2 | 4.33 | 3.67 |
| 16-06 | 3 | 3 | 2 | 2 | 3.67 | 3.33 |
| 16-07 | 4 | 4 | 3 | 3 | 2.67 | 3.33 |
| 16-08 | 4 | 4 | 3.5 | 4.5 | 2.00 | 3.00 |
| 16-09 | 4 | 4 | 4 | 5 | 1.67 | 2.83 |

Figure 31:
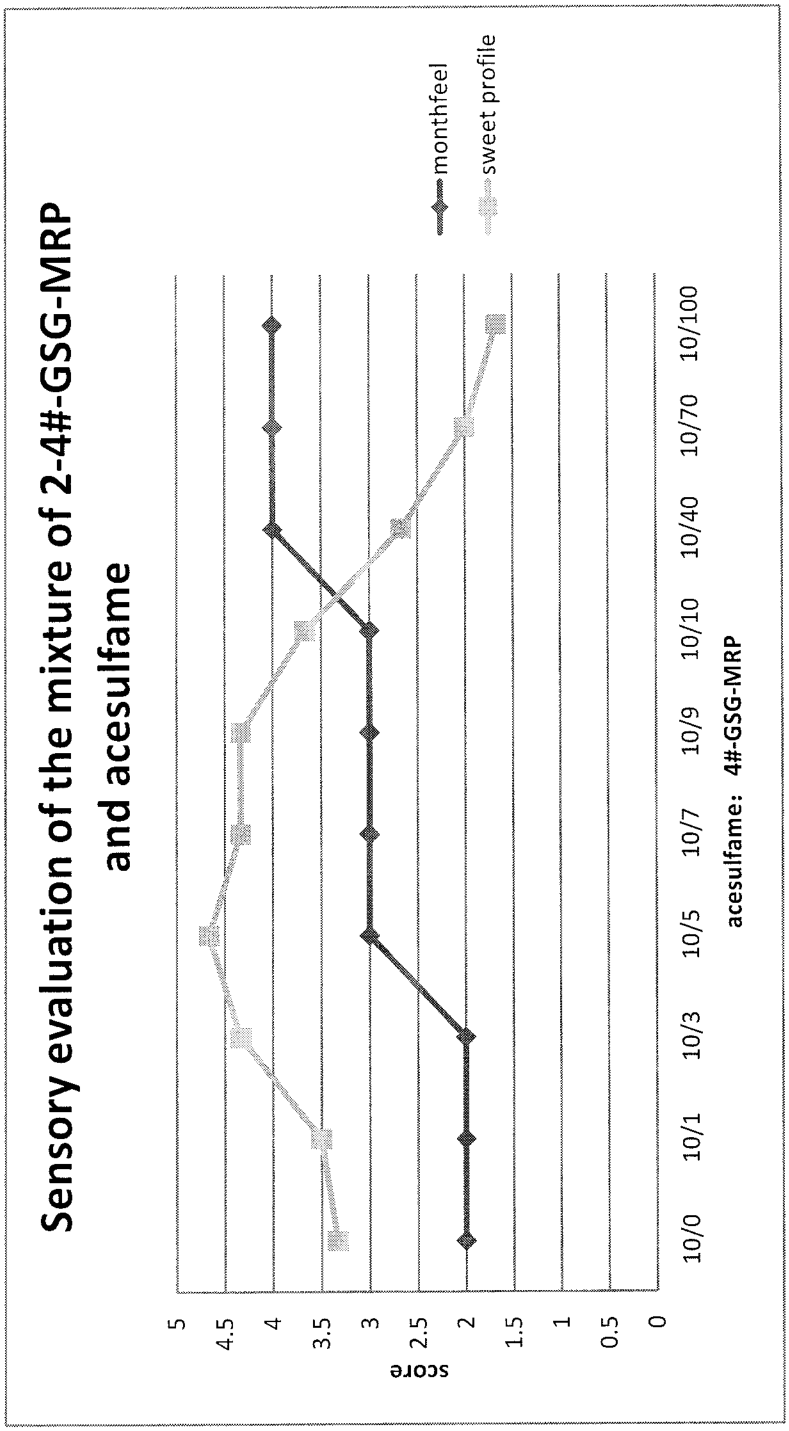
FIG. 31 shows the relationship between the sensory evaluation results to the ratio of Acesulfame-K to flavored glycosylated steviol glycosids 2-4 #-GSG-MRP.
Figure 32:
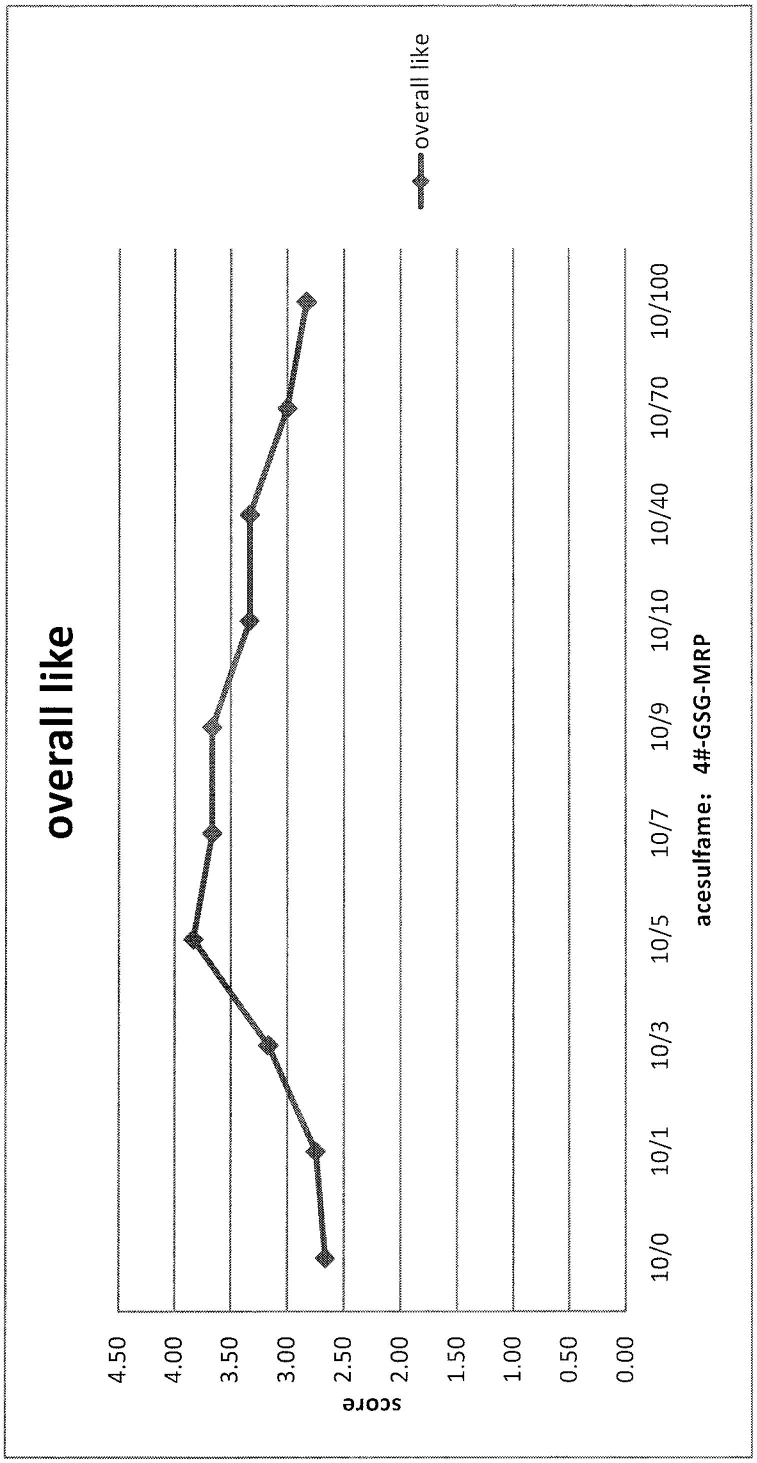
FIG. 32 shows the relationship between the overall like results to the ratio of Acesulfame-K to flavored glycosylated steviol glycosids 2-4 #-GSG-MRP.

Data analysis: The relationship between the sensory evaluation results to the ratio of acesulfame-K to flavored glycosylated steviol glycosides 2-4 #-GSG-MRP in this example is as shown in FIG. 31. The relationship between the overall like results to the ratio of acesulfame-K to flavored glycosylated steviol glycosides 2-4 #-GSG-MRP in this example is as shown in FIG. 32.

Conclusion: The result showed that flavored glycosylated steviol glycosides 2-4 #-GSG-MRPs could significantly improve taste profile, flavor intensity and mouthfeel of acesulfame-K. All range in tested ratio of acesulfame-K to 2-4 #-GSG-MRP from 10:1 to 10:100 has good taste improvement, preferably when the ratio ranges from 10:3 to 10:70, the products will give very good taste (score >3). Surely the conclusion could be extended to 1:99 and 99:1. This example demonstrates that flavored glycosylated steviol glycosides 2-4 #-GSG-MRPs can improve taste profile, flavor intensity and mouthfeel of artificial sweetener such as acesulfame-K.

Example 17. The Improvement of Flavored Stevia Extract 2-4 #-MRP-TG to the Taste and Mouthfeel of Sucralose Common process: Flavored stevia extract 2-4 #-MRP-TG (the product of example 2) and sucralose were weighed and uniformly mixed according to the weight shown in Table 17-1, dissolved in 100 ml pure water, and subjected to a mouthfeel evaluation test.

TABLE 17-1

The weight of 2-4#-MRP-TG and sucralose

| # | The ratio of sucralose to 2-4#-MRP-TG | Weight of sucralose (mg) | Weight of 2-4#-MRP-TG (mg) | Volume of pure water (mL) |
|---|---|---|---|---|
| 17-01 | 10/0 | 15 | 0 | 100 |
| 17-02 | 10/1 | 15 | 1.5 | 100 |
| 17-03 | 10/3 | 15 | 4.5 | 100 |
| 17-04 | 10/5 | 15 | 7.5 | 100 |
| 17-05 | 10/7 | 15 | 10.5 | 100 |
| 17-06 | 10/9 | 15 | 13.5 | 100 |
| 17-07 | 10/10 | 15 | 15 | 100 |
| 17-08 | 10/40 | 15 | 60 | 100 |
| 17-09 | 10/70 | 15 | 105 | 100 |
| 17-10 | 10/100 | 15 | 150 | 100 |

Experiments: Several mixtures of flavored stevia extract 2-4 #-MRP-TG and sucralose were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of sucralose in the sample solution was the same, 150 ppm. The results are shown in Table 17-2.

TABLE 17-2

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 17-01 | 1 | 3 | 1 | 3.5 | 3.50 | 2.25 |
| 17-02 | 1.5 | 3 | 1.00 | 3.50 | 3.50 | 2.50 |
| 17-03 | 1.5 | 2.5 | 1.00 | 3 | 3.83 | 2.67 |
| 17-04 | 2 | 2.5 | 1.00 | 2.50 | 4.00 | 3.00 |
| 17-05 | 2 | 3 | 1.00 | 2.00 | 4.00 | 3.00 |
| 17-06 | 2.5 | 3 | 1.50 | 2.50 | 3.67 | 3.08 |
| 17-07 | 2.5 | 3.5 | 2.00 | 3.00 | 3.17 | 2.83 |
| 17-08 | 2.5 | 3.5 | 3.00 | 3.00 | 2.83 | 2.67 |
| 17-09 | 3 | 4 | 3.50 | 4.00 | 2.17 | 2.58 |
| 17-10 | 3 | 4 | 3.50 | 4.50 | 2.00 | 2.50 |

Figure 33:
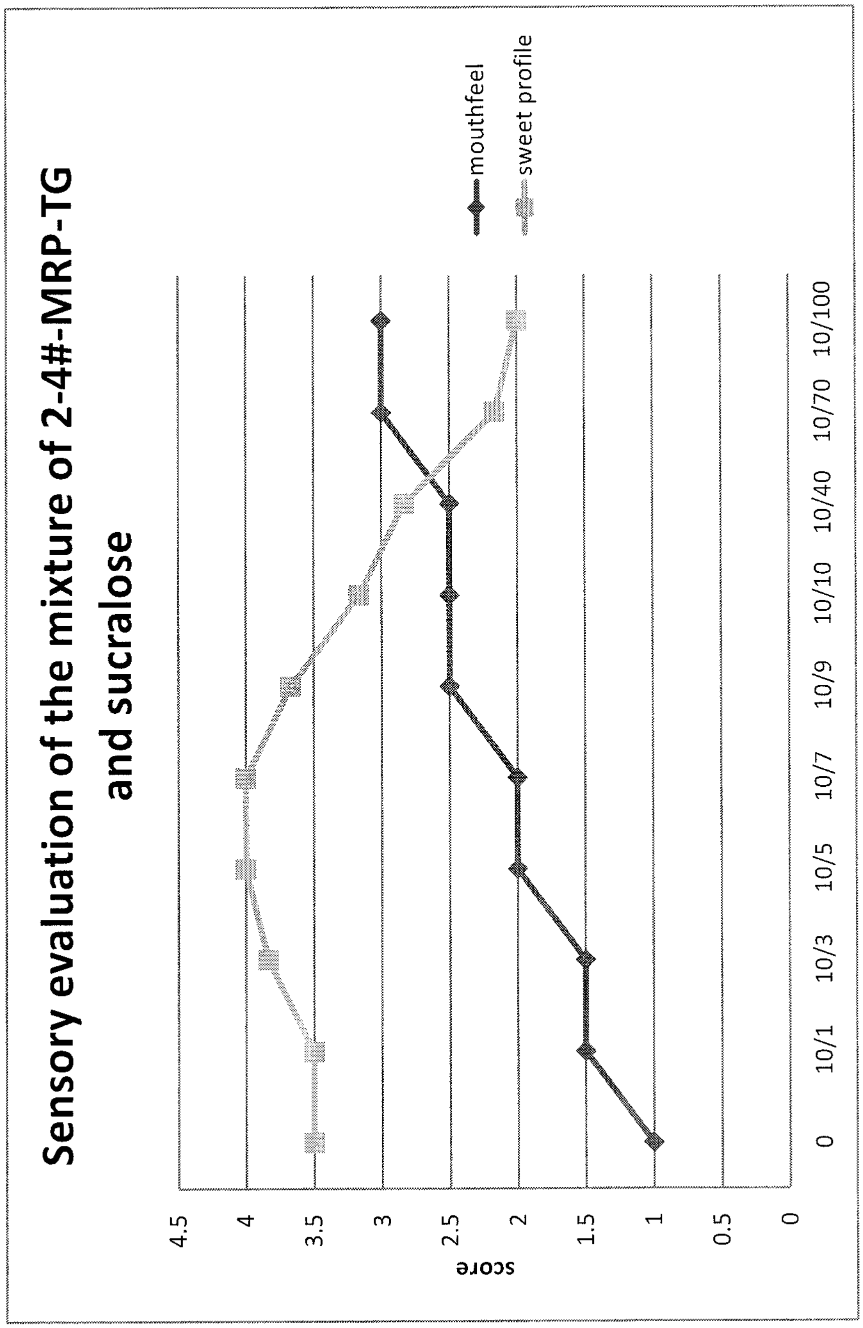
FIG. 33 shows the relationship between the sensory evaluation results to the ratio of sucralose to flavored glycosylated steviol glycosids 2-4 #-GSG-MRP-TG.
Figure 34:
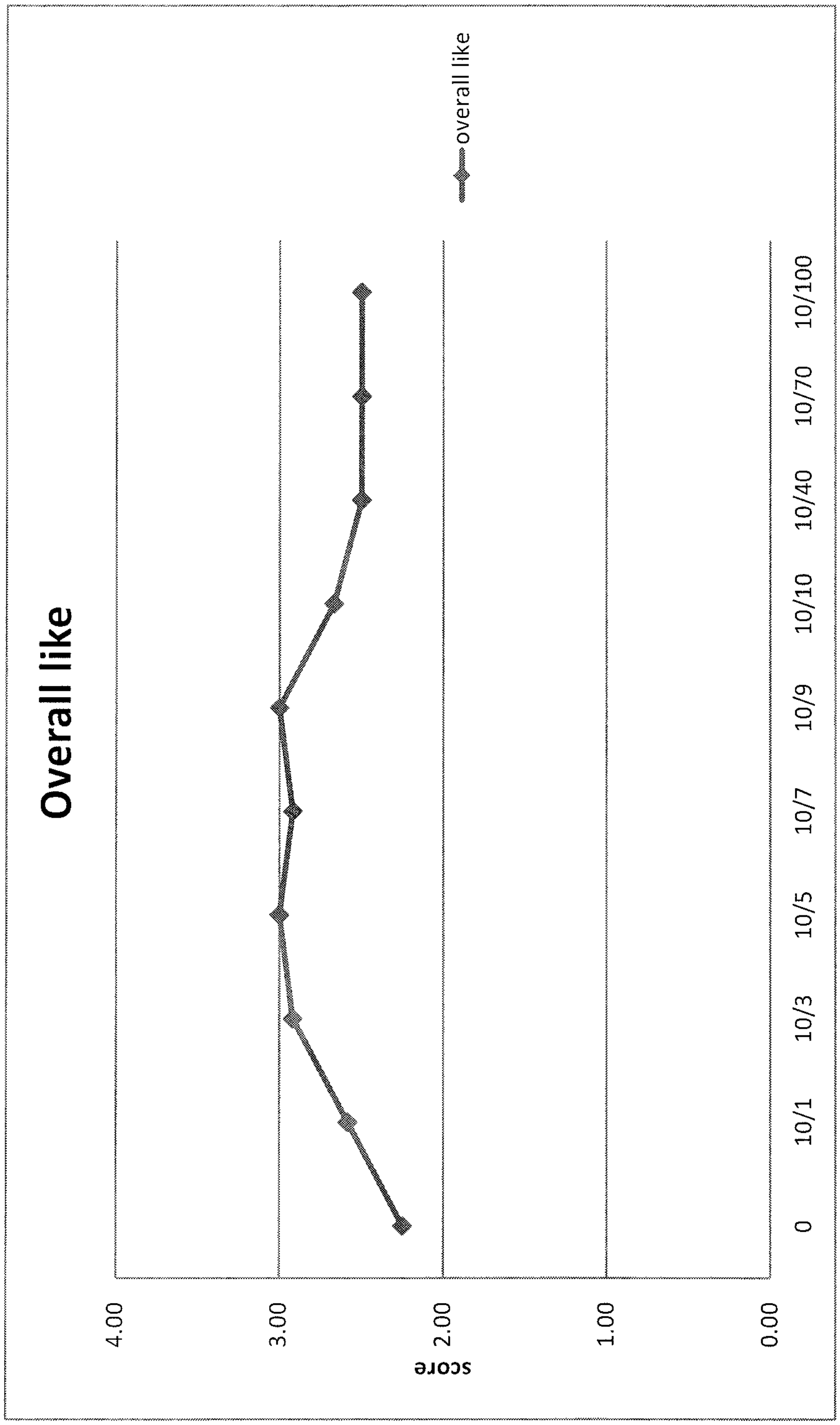
FIG. 34 shows the relationship between the overall like results to the ratio of sucralose to flavored glycosylated steviol glycosids 2-4 #-GSG-MRP-TG.

Data analysis: The relationship between the sensory evaluation results to the ratio of sucralose to flavored stevia extract 2-4 #-MRP-TG in this example is as shown in FIG. 33. The relationship between the overall like results to the ratio of sucralose to flavored stevia extract 2-4 #-MRP-TG in this example is as shown in FIG. 34.

Conclusion: The result showed that flavored stevia extract 2-4 #-MRP-TG could significantly improve taste profile, flavor intensity and mouthfeel of sucralose. Range in tested ratio of sucralose to 2-4 #-MRP-TG from 10:1 to 10:70 has good taste (overall like score >2.5). Surely the conclusion could be extended to 1:99 and 99:1. This example demonstrates that flavored stevia extract 2-4 #-MRP-TG can improve taste profile, flavor intensity and mouthfeel of artificial sweetener such as sucralose. An embodiment of Maillard reacted stevia glycosides comprises non-stevia glycosides substances could improve the taste profile of high intensity sweetener. An embodiment of food or beverage comprises maillard reacted stevia glycosides containing non-stevia glycosides substances, and an embodiment further comprises a high intensity sweetener.

Example 18. The Improvement of Flavored Stevia Extract 2-4 #-MRP-TG to the Taste and Mouthfeel of Acesulfame-K Common process: Flavored stevia extract 2-4 #-MRP-TG (the product of example 2) and acesulfame-K were weighed and uniformly mixed according to the weight shown in Table 18-1, dissolved in 100 ml pure water, and subjected to a mouthfeel evaluation test.

TABLE 18-1

| The weight of 2-4#-MRP-TG and acesulfame-K | | | | |
|---|---|---|---|---|
| # | The ratio of acesulfame-K to 2-4#-MRP-TG | Weight of acesulfame-K (mg) | Weight of 2-4#-MRP-TG (mg) | Volume of pure water (mL) |
| 18-01 | 10/0 | 20 | 0 | 100 |
| 18-02 | 10/1 | 20 | 2 | 100 |
| 18-03 | 10/3 | 20 | 6 | 100 |
| 18-04 | 10/5 | 20 | 10 | 100 |
| 18-05 | 10/7 | 20 | 14 | 100 |
| 18-06 | 10/9 | 20 | 18 | 100 |
| 18-07 | 10/10 | 20 | 20 | 100 |
| 18-08 | 10/40 | 20 | 80 | 100 |
| 18-09 | 10/70 | 20 | 140 | 100 |
| 18-10 | 10/100 | 20 | 200 | 100 |

Experiments: Several mixtures of flavored stevia extract 2-4 #-MRP-TG and acesulfame-K were mixed in this example. Each sample was evaluated according to the aforementioned sensory evaluation method, and the average score of the panel was taken as the evaluation result data. The taste profile of the mixture is as follows. It should be noted that according to the sensory evaluation method, in these evaluations, the concentration of acesulfame-K in the sample solution was the same, 200 ppm. The results are shown in Table 18-2.

TABLE 18-2

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 18-01 | 2 | 3 | 3 | 3 | 3.00 | 2.50 |
| 18-02 | 2.5 | 2.5 | 2.50 | 2.00 | 3.67 | 3.08 |
| 18-03 | 2.5 | 2 | 2.00 | 1.50 | 4.17 | 3.33 |
| 18-04 | 3 | 2 | 1.50 | 1.50 | 4.33 | 3.67 |
| 18-05 | 3.5 | 2.5 | 1.00 | 1.50 | 4.33 | 3.92 |
| 18-06 | 4 | 3 | 1.50 | 2.00 | 3.83 | 3.92 |
| 18-07 | 4 | 3.5 | 2.00 | 3.00 | 3.17 | 3.58 |

TABLE 18-2-continued

| The score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall like |
| 18-08 | 4.5 | 3.5 | 3.00 | 3.00 | 2.83 | 3.67 |
| 18-09 | 5 | 4 | 3.50 | 3.50 | 2.33 | 3.67 |
| 18-10 | 5 | 5 | 4.00 | 4.00 | 1.67 | 3.33 |

Figure 35:
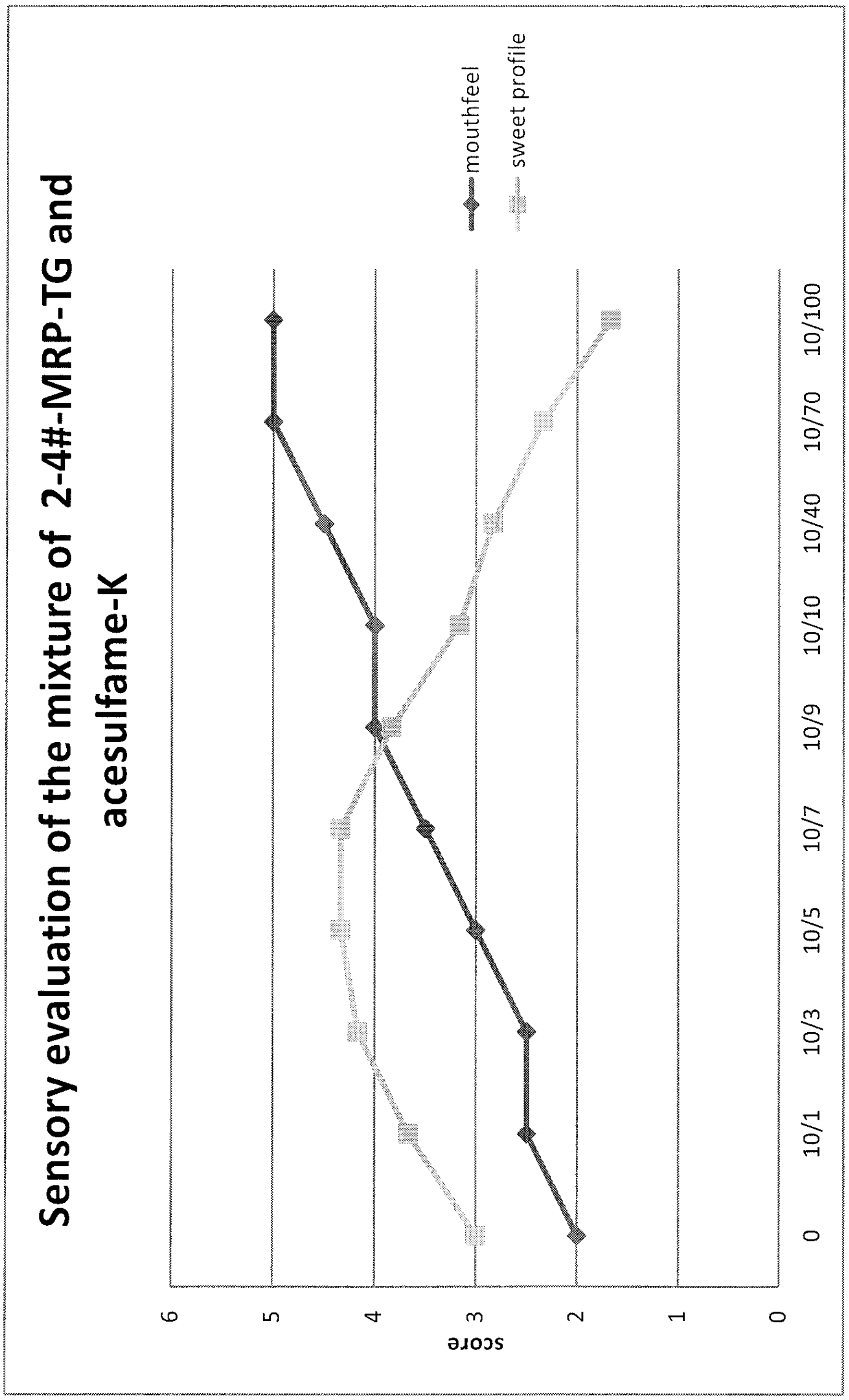
FIG. 35 shows the relationship between the sensory evaluation results to the ratio of Acesulfame-K to flavored glycosylated steviol glycosids 2-4 #-MRP-TG.
Figure 36:
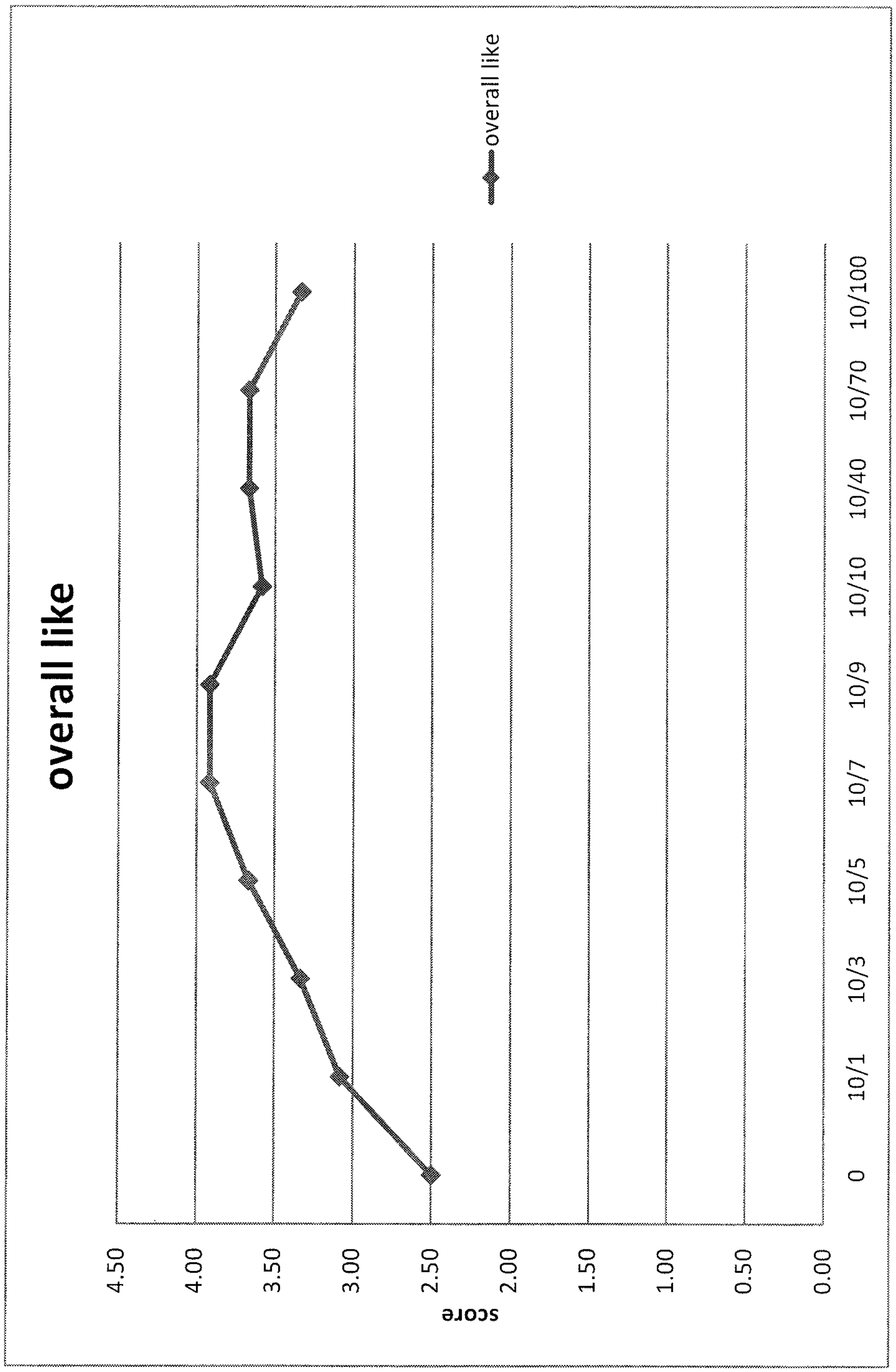
FIG. 36 shows the relationship between the overall like results to the ratio of Acesulfame-K to flavored glycosylated steviol glycosids 2-4 #-MRP-TG.
Figure 37:
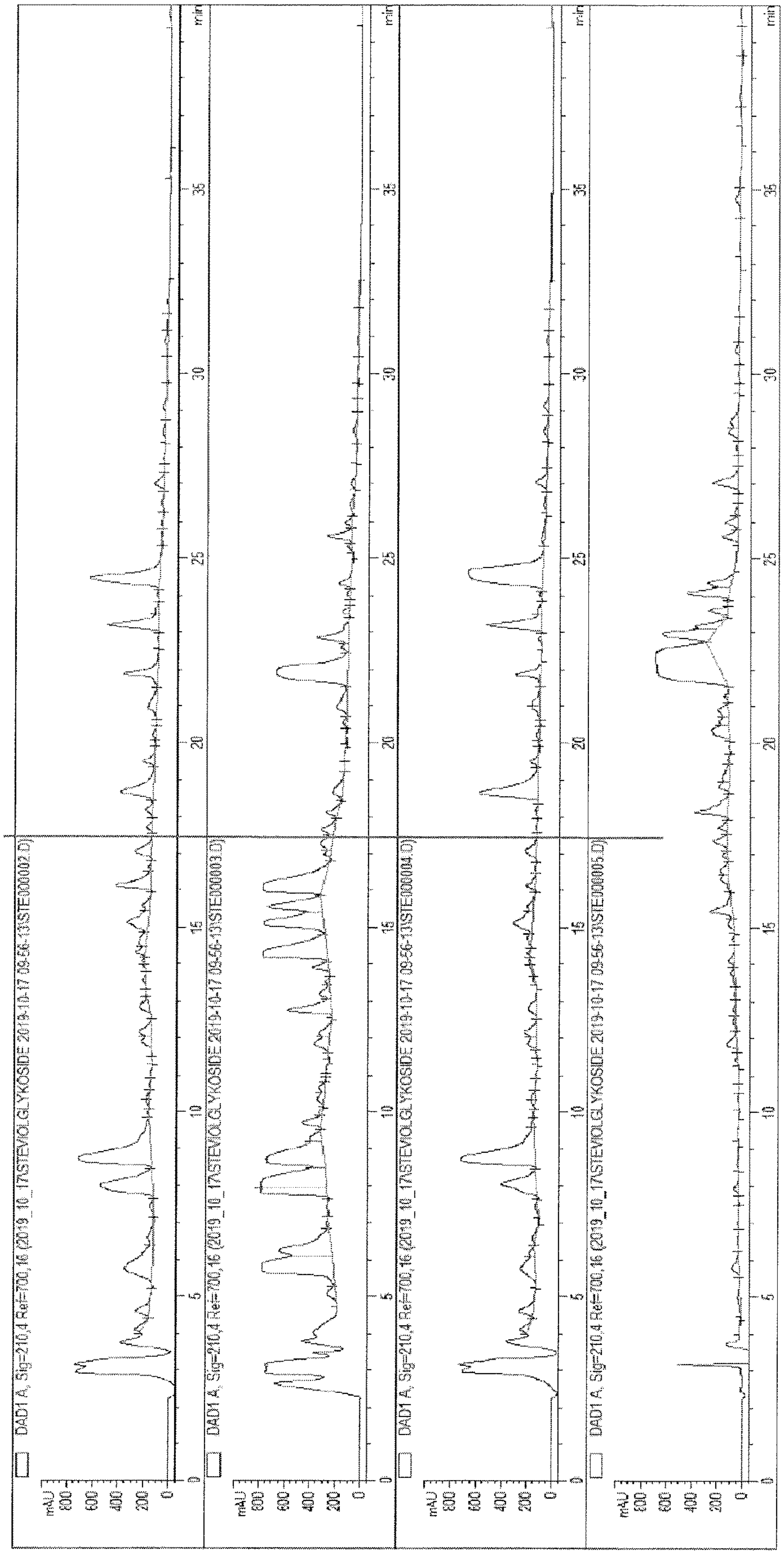
FIG. 37 shows UV-Trace (210 nm) of 2-1 # (top) to 2-1 # (bottom).
Figure 38:
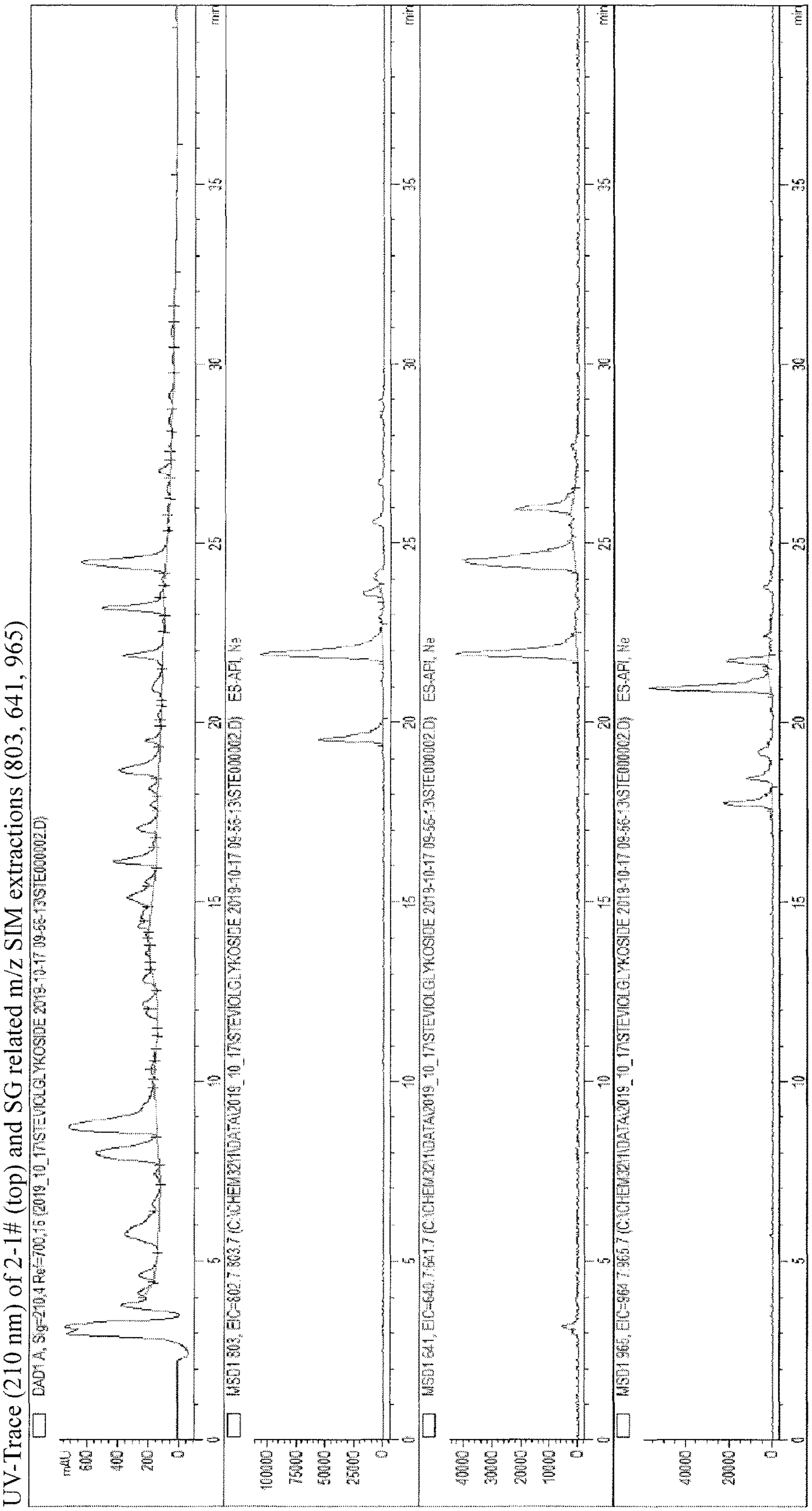
FIG. 38 shows UV-Trace (210 nm) of 2-1 # (top) and SG related m/z SIM extractions (803, 641, 965).
Figure 39:
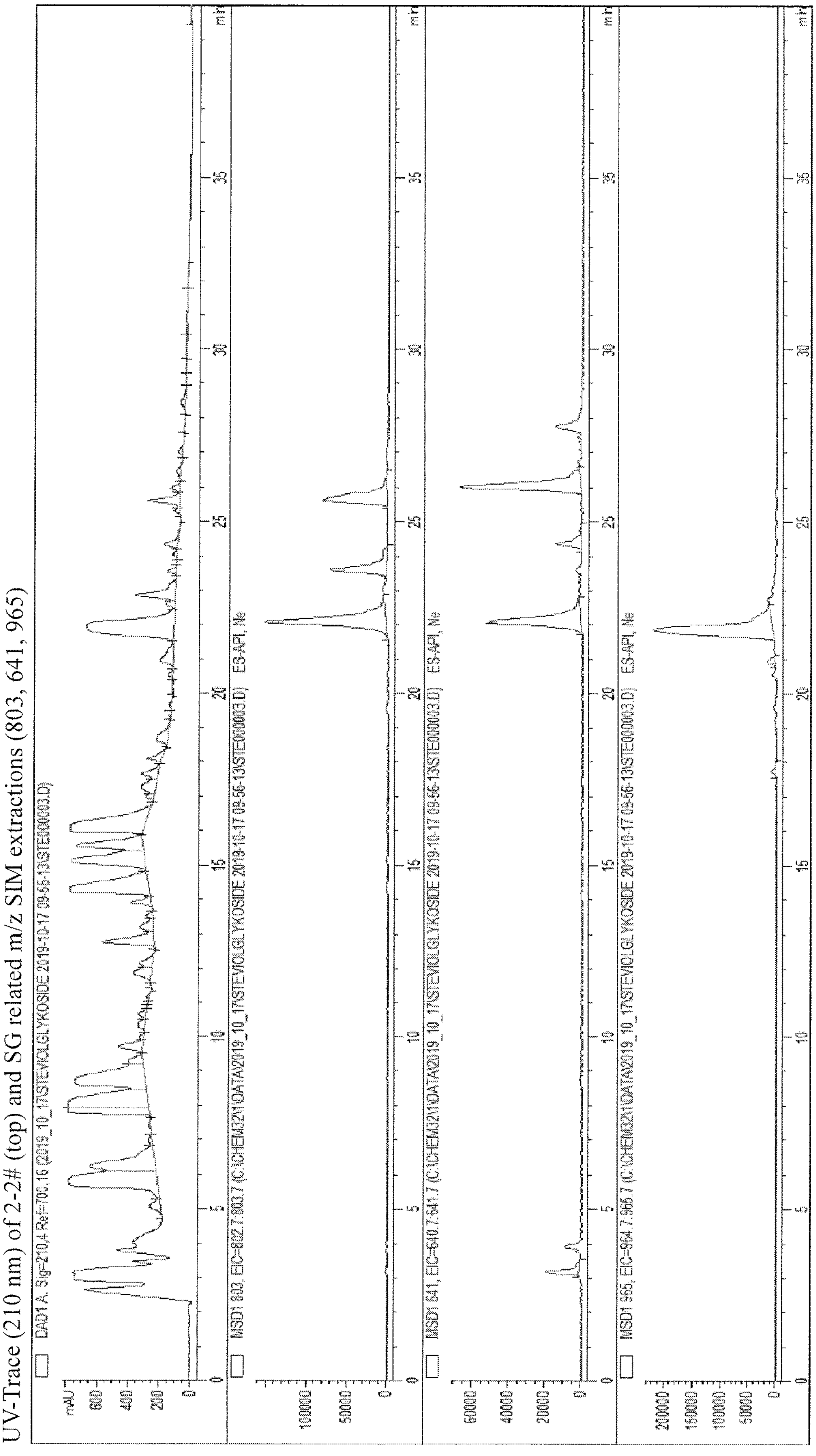
FIG. 39 shows UV-Trace (210 nm) of 2-2 # (top) and SG related m/z SIM extractions (803, 641, 965).
Figure 40:
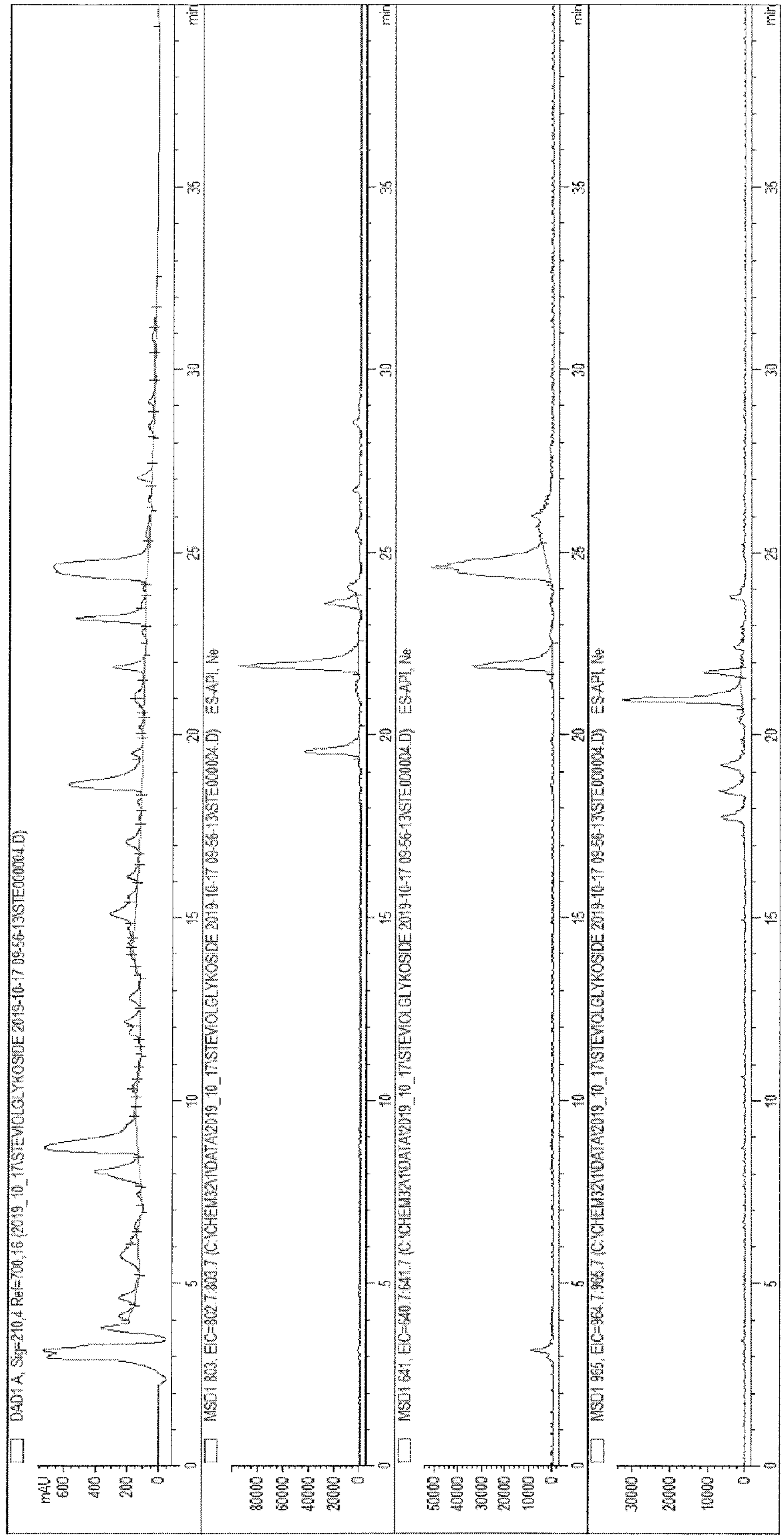
FIG. 40 shows UV-Trace (210 nm) of 2-3 # (top) and SG related m/z SIM extractions (803, 641, 965).
Figure 41:
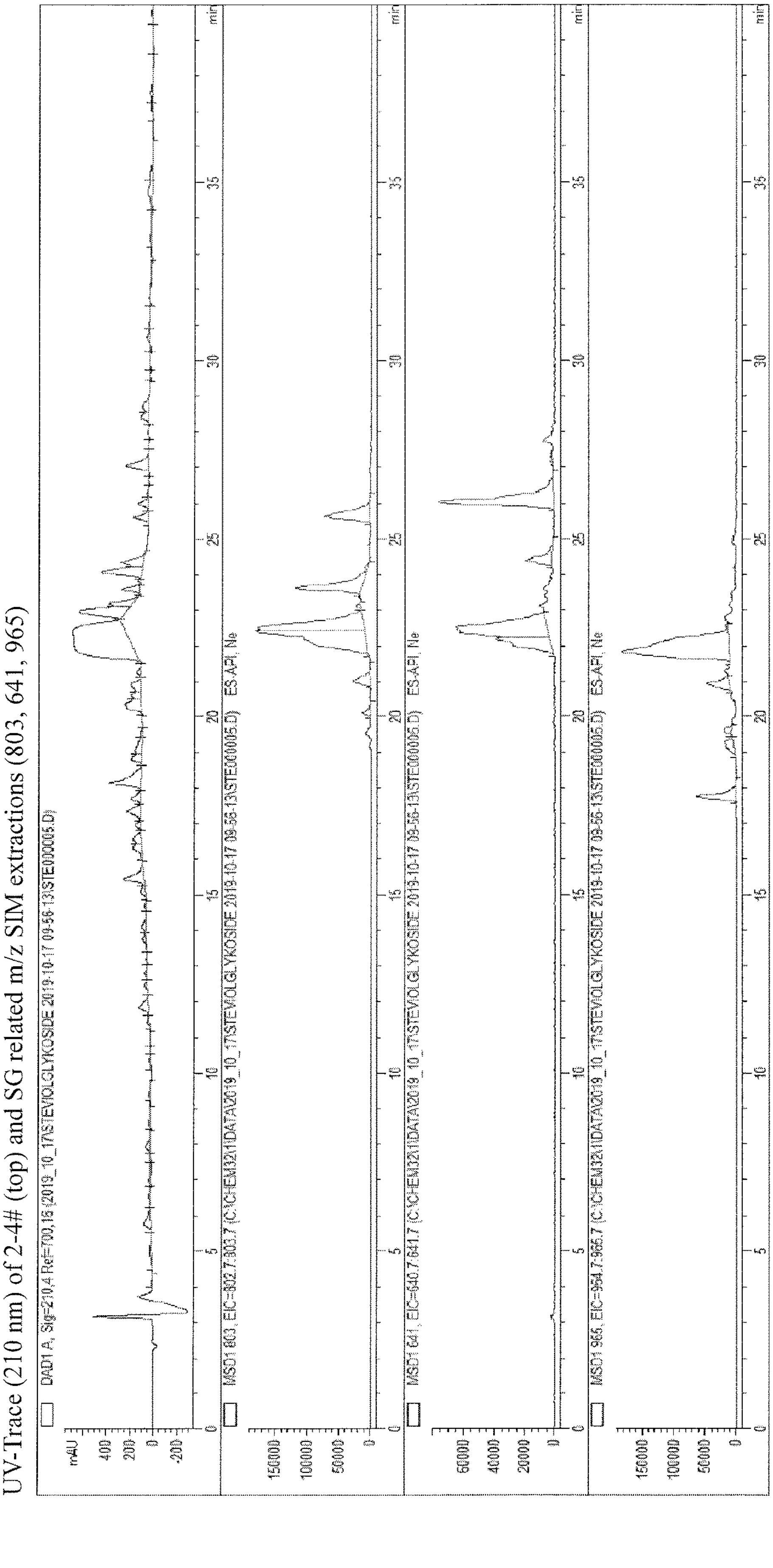
FIG. 41 shows UV-Trace (210 nm) of 2-4 # (top) and SG related m/z SIM extractions (803, 641, 965).
Figure 42:
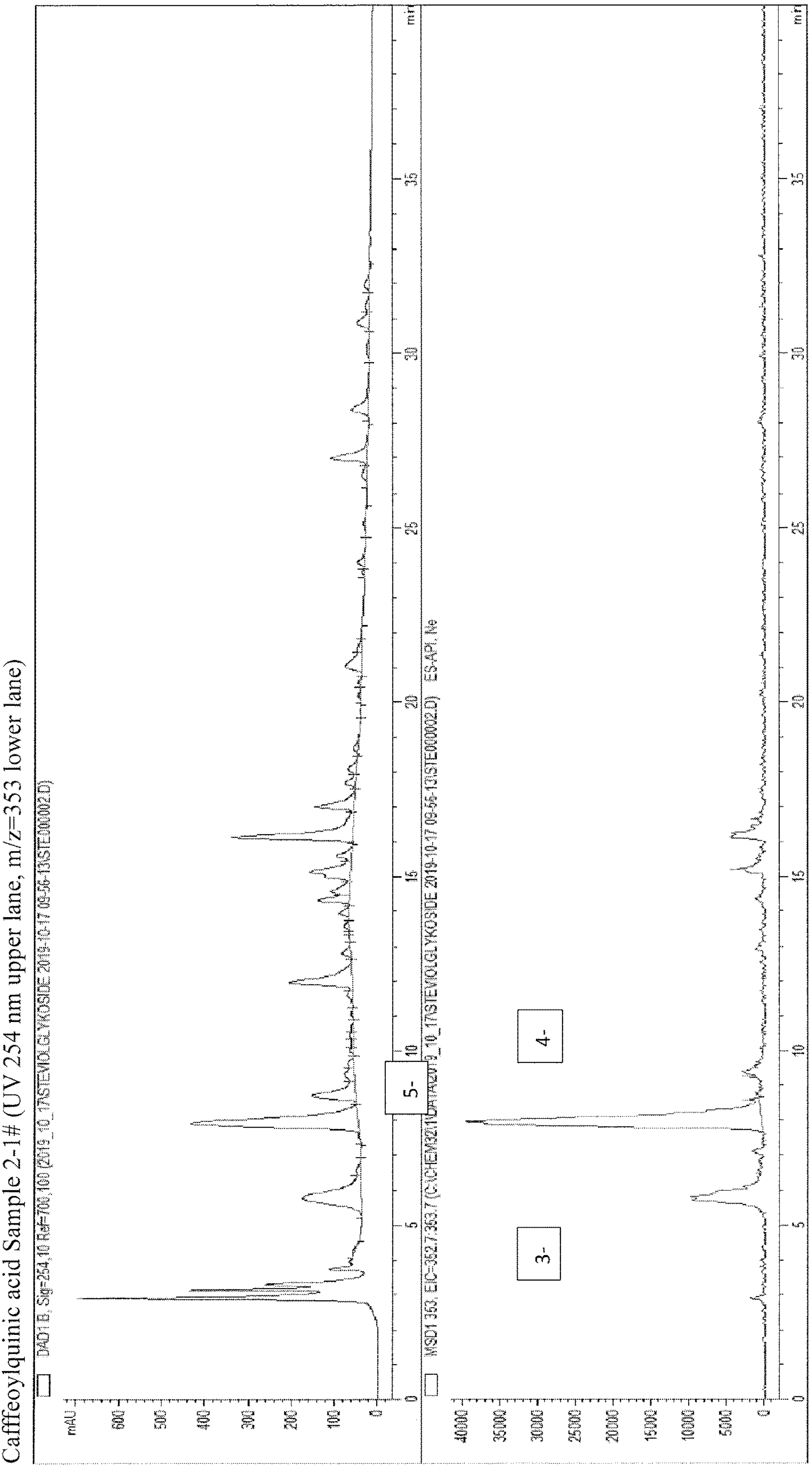
FIG. 42 shows detection of Cafffeoylquinic acid in Sample 2-1 # (UV 254 nm upper lane, m/z=353 lower lane).
Figure 43:
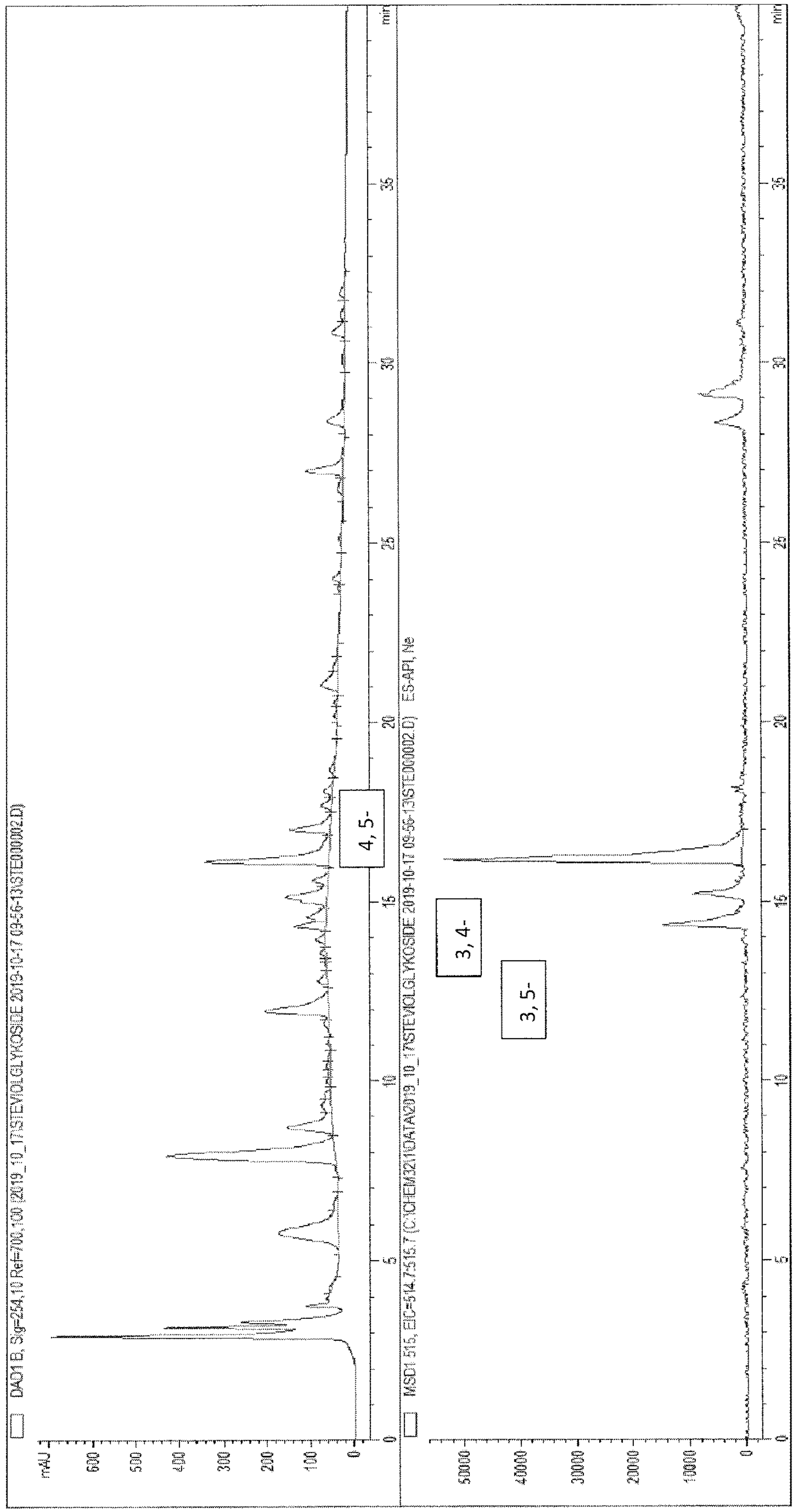
FIG. 43 shows detection of Di-cafffeoylquinic acid in Sample 2-1 # (UV 254 nm upper lane, m/z=515 lower lane).
Figure 44:
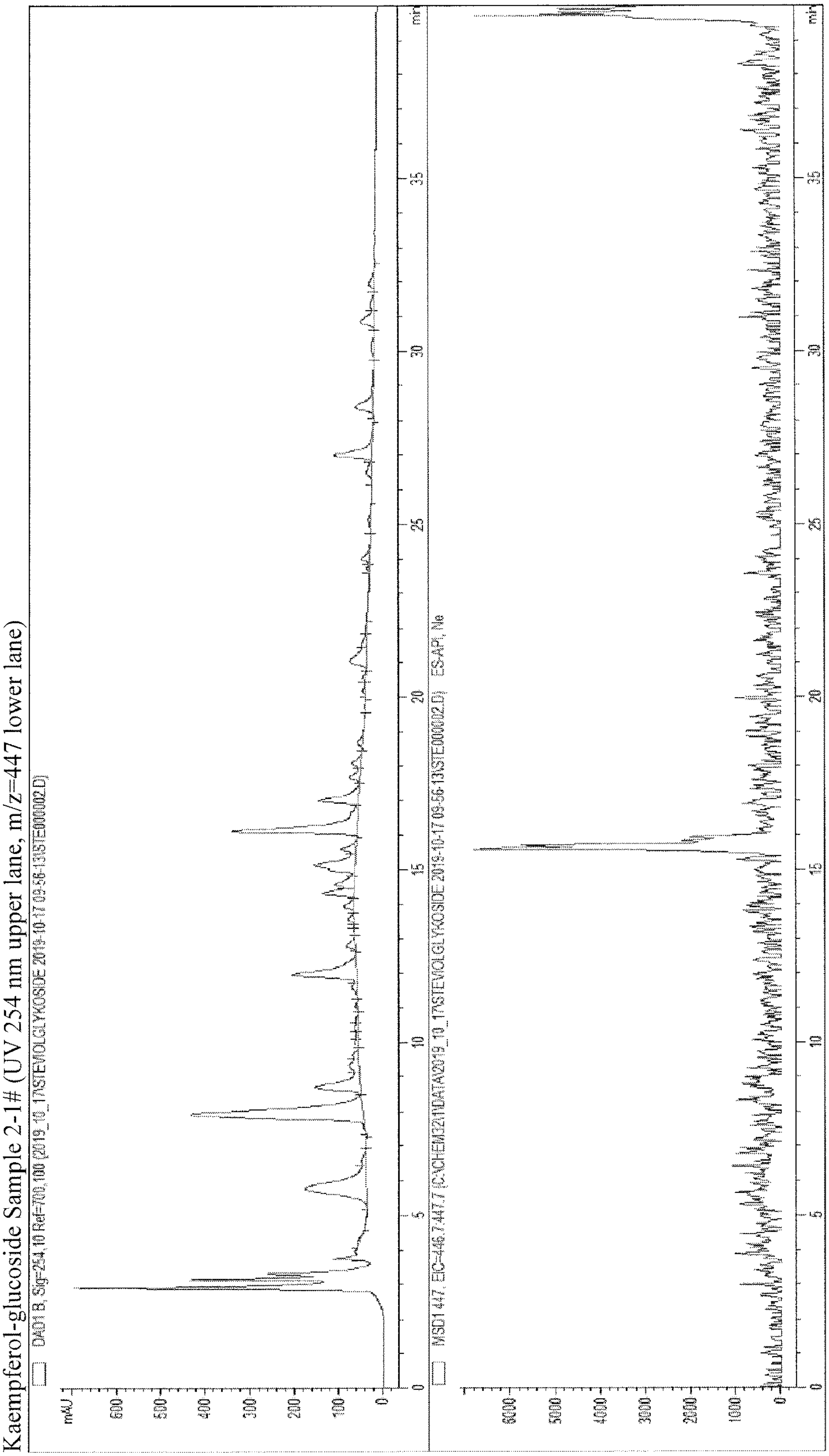
FIG. 44 shows detection of Kaempferol-glucoside in Sample 2-1 # (UV 254 nm upper lane, m/z=447 lower lane).
Figure 45:
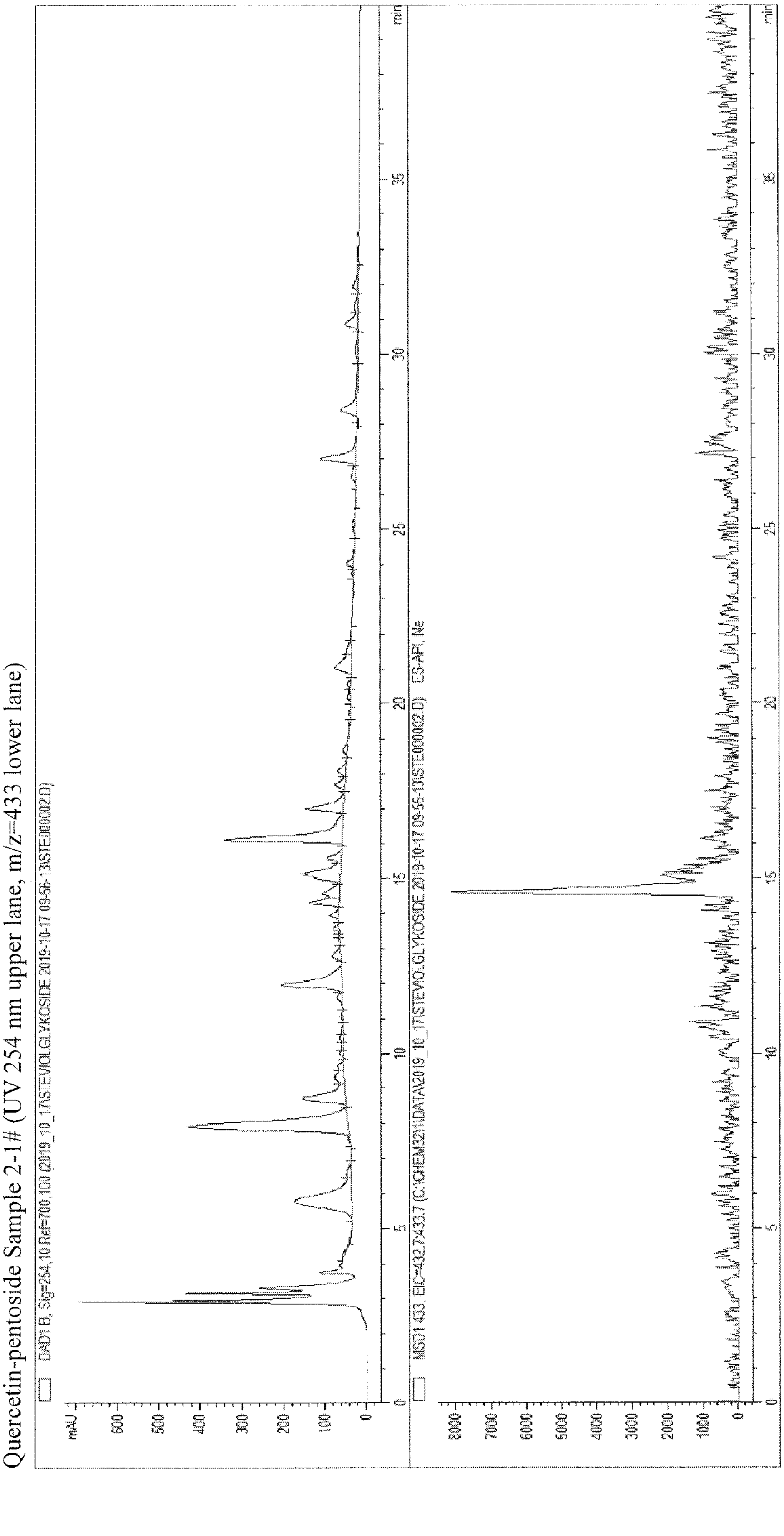
FIG. 45 shows detection of Quercetin-pentoside in Sample 2-1 # (UV 254 nm upper lane, m/z=433 lower lane).
Figure 46:
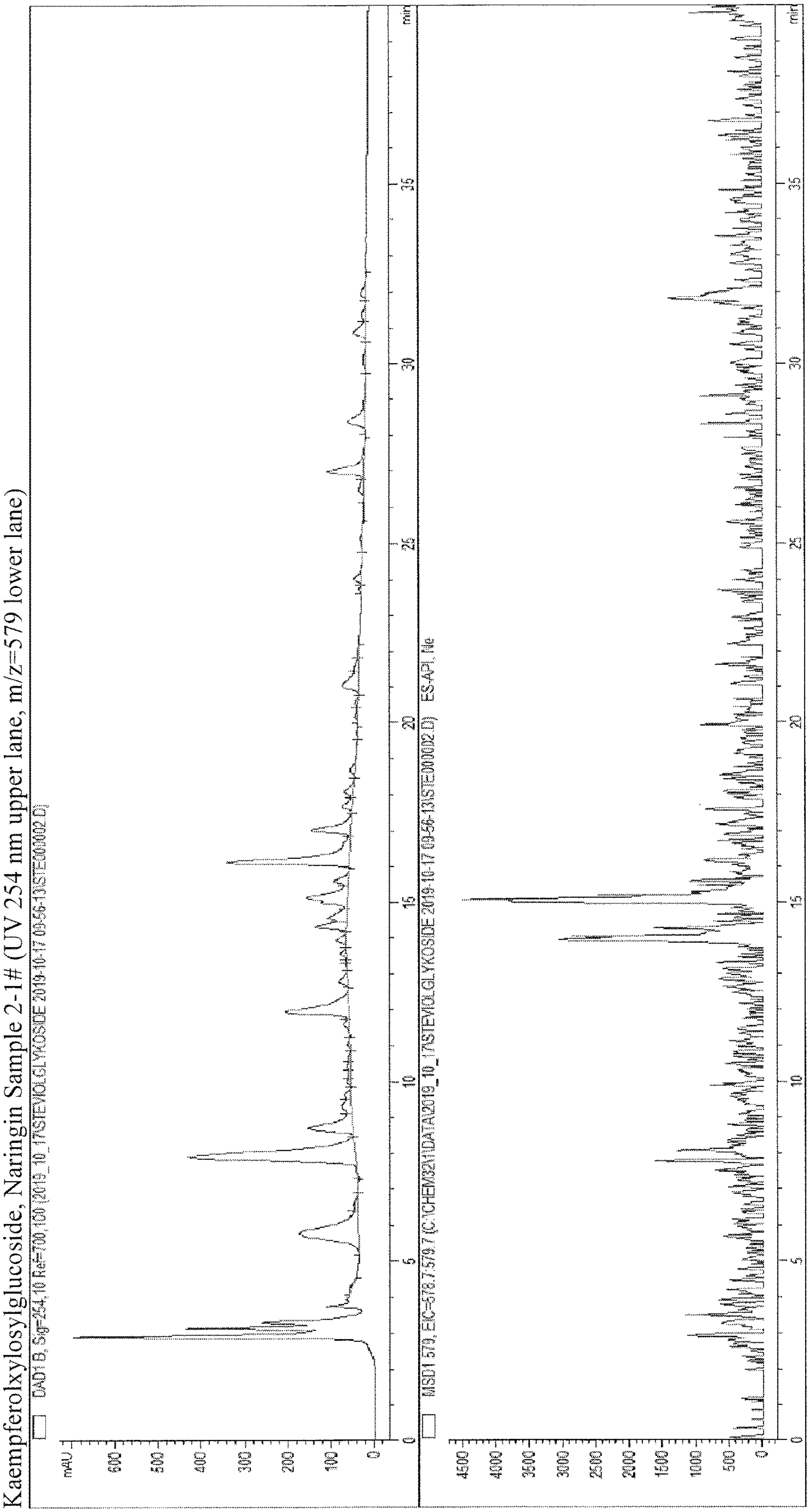
FIG. 46 shows detection of Kaempferolxylosylglucoside, Naringin in Sample 2-1 # (UV 254 nm upper lane, m/z=579 lower lane)
Figure 47:
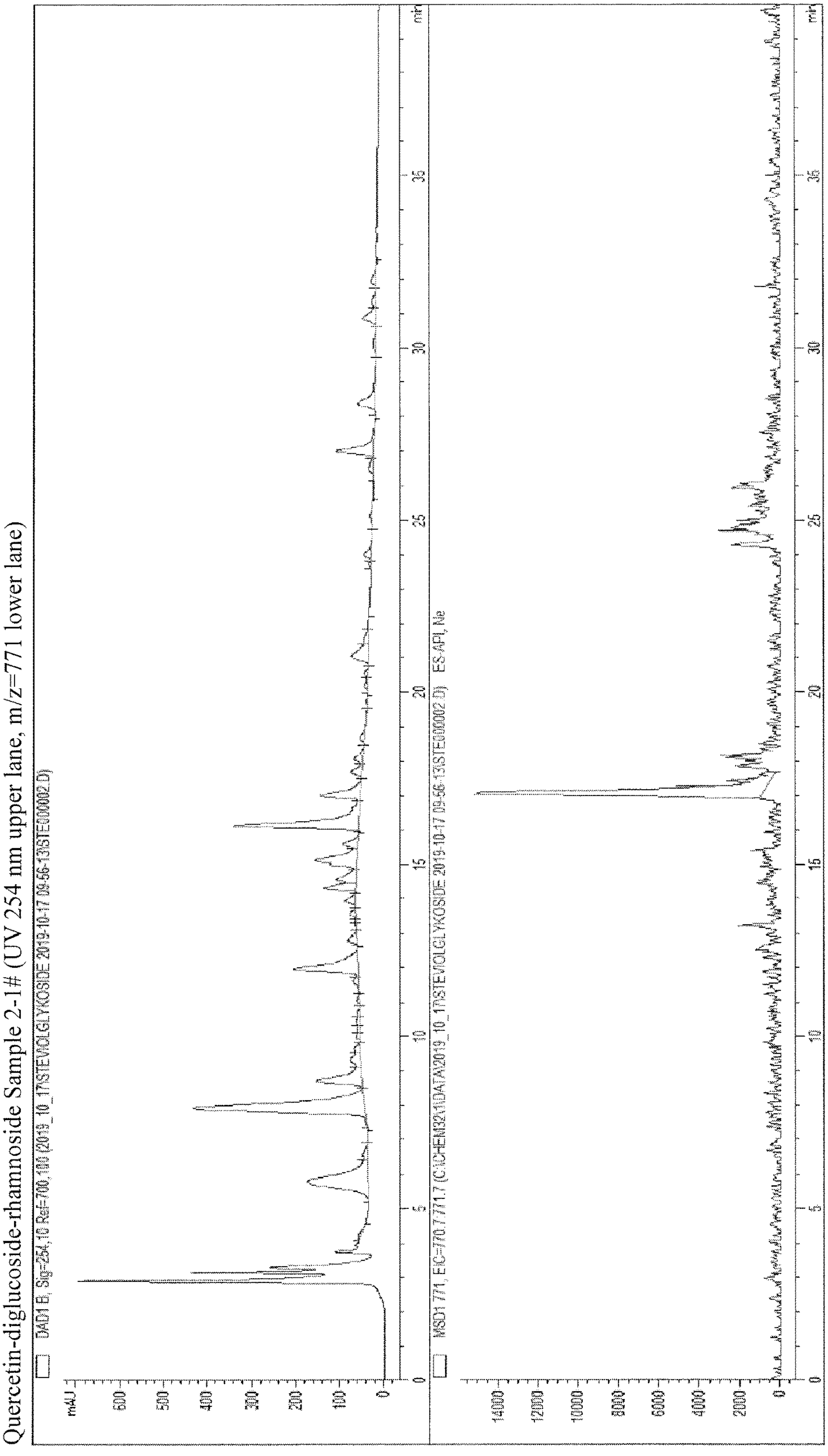
FIG. 47 shows detection of Quercetin-diglucoside-rhamnoside in Sample 2-1 #(UV 254 nm upper lane, m/z=771 lower lane)
Figure 48:
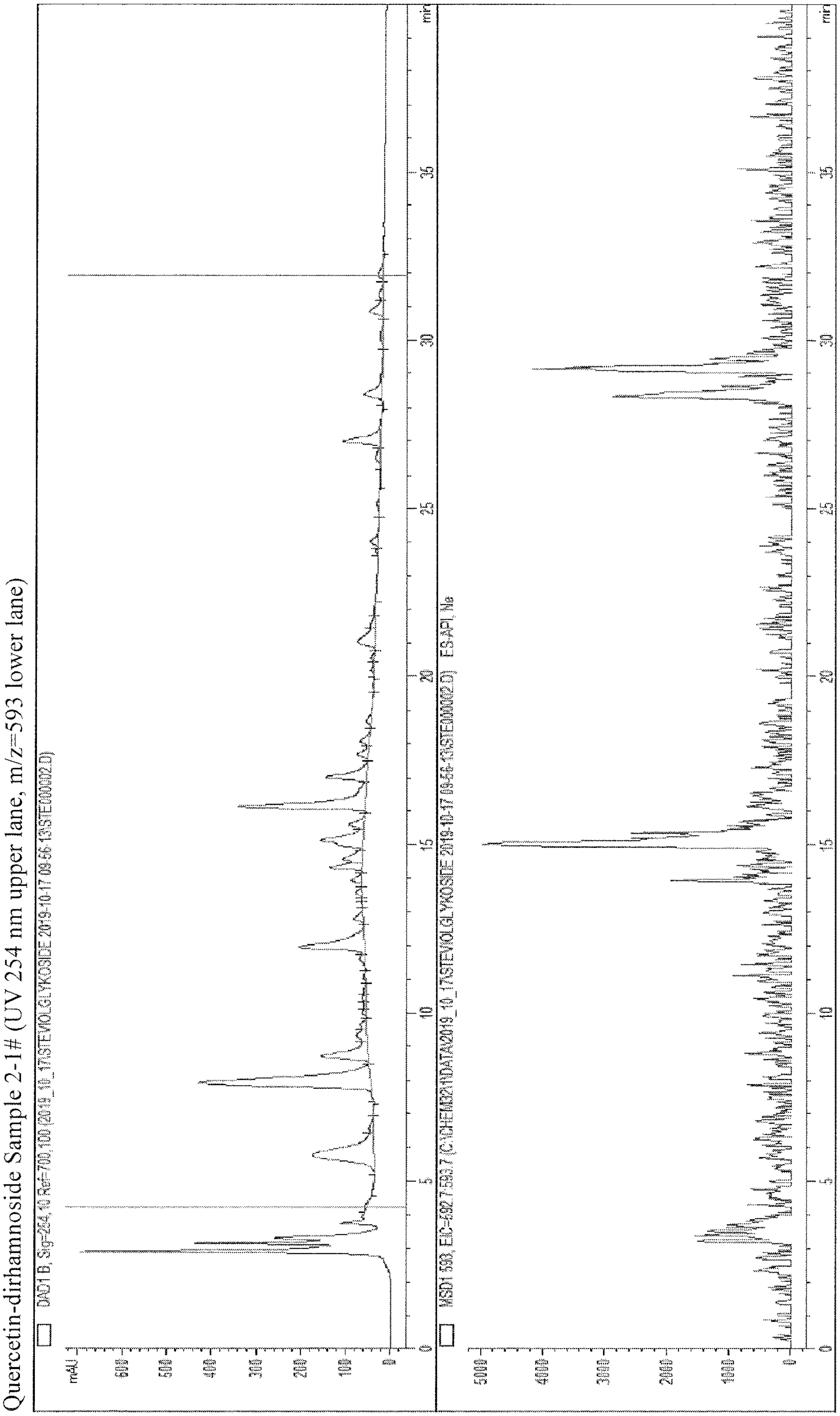
FIG. 48 shows detection of Quercetin-dirhamnoside in Sample 2-1 # (UV 254 nm upper lane, m/z=593 lower lane)

Data analysis: The relationship between the sensory evaluation results to the ratio of acesulfame-K to flavored stevia extract 2-4 #-MRP-TG in this example is as shown in FIG. 35. The relationship between the overall like results to the ratio of acesulfame-K to flavored stevia extract 2-4 #-MRP-TG in this example is as shown in FIG. 36.

Conclusion: The result showed that flavored stevia extract 2-4 #-MRP-TG could significantly improve taste profile, flavor intensity and mouthfeel of acesulfame-K. Range in tested ratio of acesulfame-K to 2-4 #-MRP-TG from 10:1 to 10:100 has good taste (overall like score >2.5), preferably when the ratio ranges from 10:5 to 10:70, the products will give very good taste (score >3.5). Surely the conclusion could be extended to 1:99 and 99:1. This example demonstrates that flavored stevia extract 2-4 #-MRP-TG can improve taste profile, flavor intensity and mouthfeel of artificial sweetener such as acesulfame-K.

Example 19. Evaluation of the Effect of Stevia Extract 1-1 #, 1-2 #, 1-3 #, or 1-4 # (Comparing RA97) in 50% Sugar Reduction System Materials:

stevia extract 1-1 #, the same as Example 1;

stevia extract 1-2 #, the same as Example 1;

stevia extract 1-3 #, the same as Example 1;

stevia extract 1-4 #, the same as Example 1;

RA 97, lot #3050123, available from Sweet Green Fields, LLC.

Production method: *Stevia* extract 1-1 #, 1-2 #, 1-3 #, or 1-4 # and 5% sugar solution were mixed according to the weight shown in Table 19-1 in this example. Each sample was evaluated according to the aforementioned sensory evaluation standard as the evaluation result data. It should be noted that according to the sensory evaluation method, the evaluation of the mouthfeel and the sweet profile is based on the iso-sweetness. That is to say, in these evaluations, the SE of stevia extract 1-1 #, 1-2 #, 1-3 #, or 1-4 #, and RA97 in the sample solution was the same according to their total glucoside, 10% SE.

All the samples are evaluated by a panel of 10 persons. The evaluation results are as followed in Table 19-2.

TABLE 19-1

| the weight of *stevia* extract 1-1#, 1-2#, 1-3#, or 1-4#, and RA97 | | |
|---|---|---|
| Components | Concentration (ppm) | Sugar concentration (%) |
| RA97 | 350 | 5 |
| 1-1# | 1750 | 5 |
| 1-2# | 1750 | 5 |
| 1-3# | 440 | 5 |
| 1-4# | 440 | 5 |

TABLE 19-2

| stevia extract 1-1# , 1-2# , 1-3#, or 1-4#, and RA97 in 5% sugar solution | | | | | | | | | | |
|---|---|---|---|---|---|---|---|---|---|---|
| | RA97 | | 1-1# | | 1-2# | | 1-3# | | 1-4# | |
| | Positive | Negative | Positive | Negative | Positive | Negative | Positive | Negative | Positive | Negative |
| flavor | 5 persons | 5 persons | 8 persons | 2 persons | 9 persons | 1 person | 6 persons | 4 persons | 6 persons | 4 persons |
| Sweet lingering | 3 persons | 7 persons | 6 persons | 4 persons | 7 persons | 3 persons | 6 persons | 4 persons | 7 persons | 3 persons |
| Mouthfeel | 5 persons | 5 persons | 9 persons | 1 person | 8 persons | 2 persons | 10 persons | 0 person | 10 persons | 0 person |
| Metallic aftertaste | 4 persons | 6 persons | 5 persons | 5 persons | 6 persons | 4 persons | 5 persons | 5 persons | 7 persons | 3 persons |
| Bitter | 1 person | 9 persons | 7 persons | 3 persons | 8 persons | 2 persons | 7 persons | 3 persons | 7 persons | 3 persons |
| Overall like | 3 persons | 7 persons | 9 persons | 1 person | 8 persons | 2 persons | 3 persons | 7 persons | 8 persons | 2 persons |
| Evaluation | Bitterness is very serious; Lack of full body mouthfeel Sweet lingering is very serious Metallic aftertaste is a little serious | | Orange flavor makes its taste pleasure Bitterness is decreased remarkably compare to RA97(control) full body mouthfeel, improved deeply compared to RA97(control) | | fruit flavor; Bitterness decreased compared to RA97(control) full body mouthfeel improved deeply compared to RA97(control) Sweet lingering and metallic aftertaste is improved significantly | | Herb flavor; Full body mouthfeel improved deeply compared to RA97(control) | | Herb flavor; Bitterness decreased compared to RA97(control) Full body mouthfeel improved deeply compared to RA97(control) | |

Conclusion: In total SE 10% and 50% sugar reduction system, compared to natural sweetener such as RA97, bitterness of stevia extract 1-1 #, 1-2 #, 1-3 #, or 1-4 # products is decreased remarkably. In addition all of them can supply very pleasant flavor. What is more, these flavor improve their mouthfeel with more full body. Sweet lingering, metallic aftertaste and overall like of stevia extract 1-1 #, 1-2 #, 1-3 #, or 1-4 # products are improved significantly compared to RA97, makes them a pleasure taste. An embodiment of stevia extract comprises non-stevia glycosides could be used as flavor or sweeteners. An embodiment of food or beverage comprises the stevia extract containing non-stevia glycosides substances, and an embodiment further comprises a sugar.

Example 20: Determination of Steviol Glycosides in Samples 2-1 #, 2-2 #, 2-3 #, and 2-4 #

Materials:

Reference standards for steviolglycosides (Reb A, Reb B, Reb C, Reb D, Reb E, Reb F, Reb G, Reb I, Reb M, Reb N, Reb O, Isoreb A, Isostevioside) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation:

For Steviolglycoside analysis the samples were fractionated over a glass column (100×5 mm) filled with Davisil Grade 633. The column was equilibrated with ethlyacetate/Acetic acid/H2O=8/3/2 (v/v/v). 100 mg sample, dissolved in 2 ml H2O, were loaded on the column and eluted with ethlyacetate/Acetic acid/H2O=8/3/2 at a flow rate of 2 ml/min. The first 6 ml of the eluate were discarded and the next 30 ml containing steviol-glycosides were collected.

From each sample 3 separate fractionations were prepared and the pooled eluates were evaporated to dryness and reconstituted in 20 ml Acetonitrile/H2O=9/1 (v/v) corresponding to an equivalent sample concentration of 150 mg sample/10 ml.

The method was qualified by fractionation of steviolglycoside standards and enzymatically reacted steviol-glycosides. An elution yield of >97% of steviol-glycosides was observed, the carry over between the fraction was calculated to less than 3%.

The pooled, evaporated samples were used for further analysis.

For flavonoid analysis the samples were dissolved in water (1 g in 10 ml) and extracted 3 times with 20 ml ethylacetate. The pooled ethylacetate fractions were evaporated to dryness and reconstituted in 5 ml mobile phase A.

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with H2O.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NH4-Acetate buffer (native pH) with 0.1% acetic acid, 0.05% trimethylamine and 0.001% dichloromethane. Mobile Phase B consisted of 0.01 molar NH4-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 µl.

The detectors were set to 210 nm (VWD), to 205 nm, 254 nm and 320 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V).

Detection at 205 nm and 210 nm were used to quantify Steviolglycosides, the MS-spectra were used to determine the molar mass and structural information of individual peaks. Detection at 254 nm and 320 nm was used to identify non-steviolglycoside peaks (flavonoids).

Samples were quantified by external standardization against reference compounds, in case where no authentic reference standard was available, the peak area was quantified against the reference standard with the most similar mass and corrected for the molar mass differences.

The amount of Steviol glycosides in Samples 2-1 #, 2-2 #, 2-3 #, and 2-4 # are shown in Table 20-1.

TABLE 20-1

Steviol glycosides in Samples 2-1#, 2-2#, 2-3#, and 2-4#

| Compound (proposed) | m/z [M − H]− | Sample 2-1# (% m/m) | Sample 2-2# (% m/m) | Sample 2-3# (% m/m) | Sample 2-4# (% m/m) |
|---|---|---|---|---|---|
| steviolmonoside | 479 | n.d. | n.d. | n.d. | <0.01 |
| SG-4 | 611 | n.d. | n.d. | n.d. | <0.01 |
| Dulcoside A1 | 625 | n.d. | n.d. | n.d. | n.d. |
| Iso-Steviolbioside | 641 | n.d. | n.d. | n.d. | n.d. |
| Reb-G1 | 641 | n.d. | n.d. | n.d. | n.d. |
| rubusoside | 641 | 0.087 | n.d. | n.d. | 0.114 |
| **steviolbioside** | **641** | **0.011** | **n.d.** | **n.d.** | **0.125** |
| Reb-F1 | 773 | <0.01 | <0.01 | n.d. | n.d. |
| Reb-R1 | 773 | n.d. | n.d. | n.d. | n.d. |
| SG-1 | 773 | n.d. | <0.01 | n.d. | <0.01 |
| SG-Unk1 | 773 | n.d. | n.d. | n.d. | n.d. |
| **dulcoside A** | **787** | **1.81** | **<0.01** | **n.d.** | **0.542** |
| dulcoside B | 787 | 0.023 | n.d. | n.d. | 0.412 |

TABLE 20-1-continued

Steviol glycosides in Samples 2-1#, 2-2#, 2-3#, and 2-4#

| Compound (proposed) | m/z [M − H]− | Sample 2-1# (% m/m) | Sample 2-2# (% m/m) | Sample 2-3# (% m/m) | Sample 2-4# (% m/m) |
|---|---|---|---|---|---|
| SG-3 | 787 | n.d. | n.d. | n.d. | n.d. |
| Iso-Reb B | 803 | <0.01 | n.d. | n.d. | 0.031 |
| Iso-Stevioside | 803 | <0.01 | <0.01 | n.d. | 0.020 |
| **Reb B** | **803** | **<0.01** | **0.741** | **n.d.** | **0.323** |
| Reb G | 803 | <0.01 | <0.01 | n.d. | 0.599 |
| SG-13 | 803 | <0.01 | <0.01 | n.d. | <0.01 |
| **Stevioside** | **803** | **1.03** | **3.66** | **0.874** | **31.5** |
| SG-15 | 803 | n.d. | n.d. | n.d. | n.d. |
| **Reb F** | **935** | **0.02** | **0.259** | **n.d.** | **0.721** |
| Reb R | 935 | <0.01 | 0.260 | — | 0.882 |
| SG-Unk2 | 935 | n.d. | n.d. | n.d. | n.d. |
| SG-Unk3 | 935 | n.d. | n.d. | n.d. | n.d. |
| SG-11 | 935 | <0.01 | <0.01 | n.d. | <0.01 |
| SG-14 | 935 | <0.01 | <0.01 | n.d. | <0.01 |
| **Reb C** | **949** | **<0.01** | **1.25** | **<0.01** | **5.79** |
| Reb S | 949 | <0.01 | 0.563 | <0.01 | 1.84 |
| SG-9 | 949 | n.d. | n.d. | n.d. | n.d. |
| SG-10 | 949 | n.d. | <0.01 | n.d. | <0.01 |
| Reb L1 | 949 | <0.01 | <0.01 | <0.01 | <0.01 |
| SG-2 | 949 | n.d. | n.d. | n.d. | n.d. |
| Iso-Reb A | 965 | <0.01 | 0.01 | n.d. | 0.03 |
| **Reb A** | **965** | **0.178** | **13.1** | **0.36** | **42.8** |
| SG-7 | 965 | n.d. | n.d. | n.d. | n.d. |
| SG-8 | 965 | n.d. | n.d. | n.d. | <0.01 |
| Reb E | 965 | <0.01 | 0.114 | n.d. | 0.42 |
| Reb H1 | 965 | n.d. | <0.01 | n.d. | <0.01 |
| **Reb U** | **1097** | **4.86** | **0.248** | **12.3** | **0.445** |
| SG-12 | 1111 | n.d. | n.d. | n.d. | n.d. |
| Reb H | 1111 | <0.01 | 0.081 | 0.062 | 0.218 |
| Reb J | 1111 | <0.01 | <0.01 | <0.01 | 0.154 |
| Reb K | 1111 | <0.01 | 0.094 | <0.01 | 0.371 |
| SG-Unk4 | 1111 | n.d. | n.d. | n.d. | <0.01 |
| SG-Unk5 | 1111 | n.d. | n.d. | n.d. | <0.01 |
| **Reb D** | **1127** | **0.646** | **<0.01** | **2.04** | **1.87** |
| Reb I | 1127 | <0.01 | 0.056 | 0.037 | 0.113 |
| Reb L | 1127 | <0.01 | <0.01 | <0.01 | 0.01 |
| SG-Unk6 | 1127 | n.d. | n.d. | n.d. | n.d. |
| SG-5 | 1127 | n.d. | n.d. | n.d. | n.d. |
| SG-6 | 1127 | n.d. | n.d. | n.d. | n.d. |
| Reb T | 1259 | n.d. | n.d. | <0.01 | 0.02 |
| Reb N | 1273 | <0.01 | <0.01 | <0.01 | 0.083 |
| Reb M | 1289 | <0.01 | 0.102 | 0.041 | 0.294 |
| 15α-OH Reb M | 1305 | n.d. | <0.01 | <0.01 | <0.01 |
| Reb O | 1435 | <0.01 | <0.01 | 0.03 | 0.07 |
| Sum of SG | — | 8.66 | 20.5 | 15.7 | 89.8 |
| Water content | | 3.42 | 2.78 | 3.06 | 2.47 |
| Content (% m/m) [dry mass] | | 8.97 | 21.1 | 16.2 | 92.1 |
| Non-SG substances | | 87.92 | 76.72 | 81.24 | 7.73 |

Legend:

SG-1 to 16: Steviolglycosides without a specific name;

SG-Unk1 to Unk6: Steviolglycosides without detailed structural proof;

n.d.: not detected (denotes to results where the compound is not visibly present in the sample.);

<0.01: denotes to results where the compound is visibly present in the sample.

Bolded compounds are TSG(9) compounds

Non-SG substances in these samples are in range of 7.73%-87.92% on dry basis.

FIGS. 37-41 shows UV-Trace (210 nm) of Samples 2-1 #, 2-2 #, 2-3 #, and 2-4 #.

Example 21: Determination of Non-Volatile Compounds in Samples 2-1 #-2-4 #

The amount of non-volatile compounds in Samples 2-1 #-2-4 # are shown in Table 21-1.

TABLE 21-1

Non-volatile compounds in Samples 2-1#-2-4#

| Compound (proposed) | mg/g Sample 2-1# | Sample 2-2# | Sample 2-3# | Sample 2-4# |
|---|---|---|---|---|
| 3-Caffeoylquinic acid | 0.884 | 7.03 | 0.476 | <0.1 |
| 4-Caffeoylquinic acid | 1.60 | 9.26 | 0.638 | <0.1 |
| 5-Caffeoylquinic acid | 0.367 | 0.645 | 0.385 | <0.1 |
| 3,5-Dicaffeoylquinic acid | 0.216 | 2.961 | 0.119 | <0.1 |
| 3,4-Dicaffeoylquinic acid | 0.172 | 1.909 | 0.067 | <0.1 |
| 4,5-Dicaffeoylquinic acid | 0.368 | 3.836 | 0.180 | <0.1 |
| Kaempferol-hexoside | 0.082 | 6.760 | 0.154 | <0.1 |
| Quercetin-pentoside | 0.061 | 3.223 | 0.095 | <0.1 |
| Kaempferol-xyloside-hexoside | 0.109 | 6.367 | 0.207 | <0.1 |
| Quercetin-dihexoside-rhamnoside | 0.041 | 3.681 | 0.128 | <0.1 |
| Quercetin-dirhamnoside | 0.066 | 4.533 | 0.116 | <0.1 |

Caffeoyl-qiumc acids were quantified against caffeic acid; Flavonoids against naringin FIGS. 42-48 show detection of Cafffeoylquinic acid, Di-cafffeoylquinic acid, Kaempferol-glucoside, Quercetin-pentoside, Kaempferolxylosylglucoside, Quercetin-diglucoside-rhamnoside, and Quercetin-dirhamnoside in Sample 2-1 #.

Figure 49:
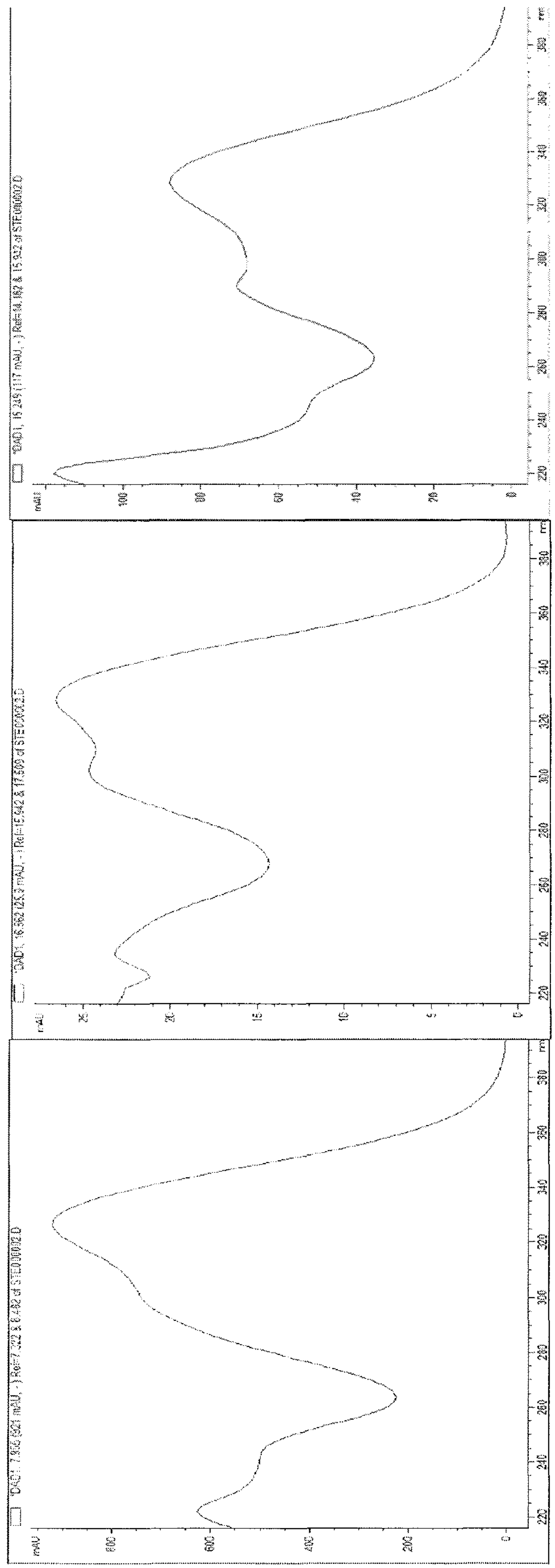
FIG. 49 shows UV-Spectra (Sample 2-1 #) of Caffeoylquinic acid (panel A), Di-Caffeoylquinic acid (panel B) and Quercetin-diglucoside-rhamnoside (panel C).

FIG. 49 shows UV-Spectra of Caffeoylquinic acid, Di-Caffeoylquinic acid and Quercetin-diglucoside-rhamnoside in Sample 2-1 #.

Figure 50:
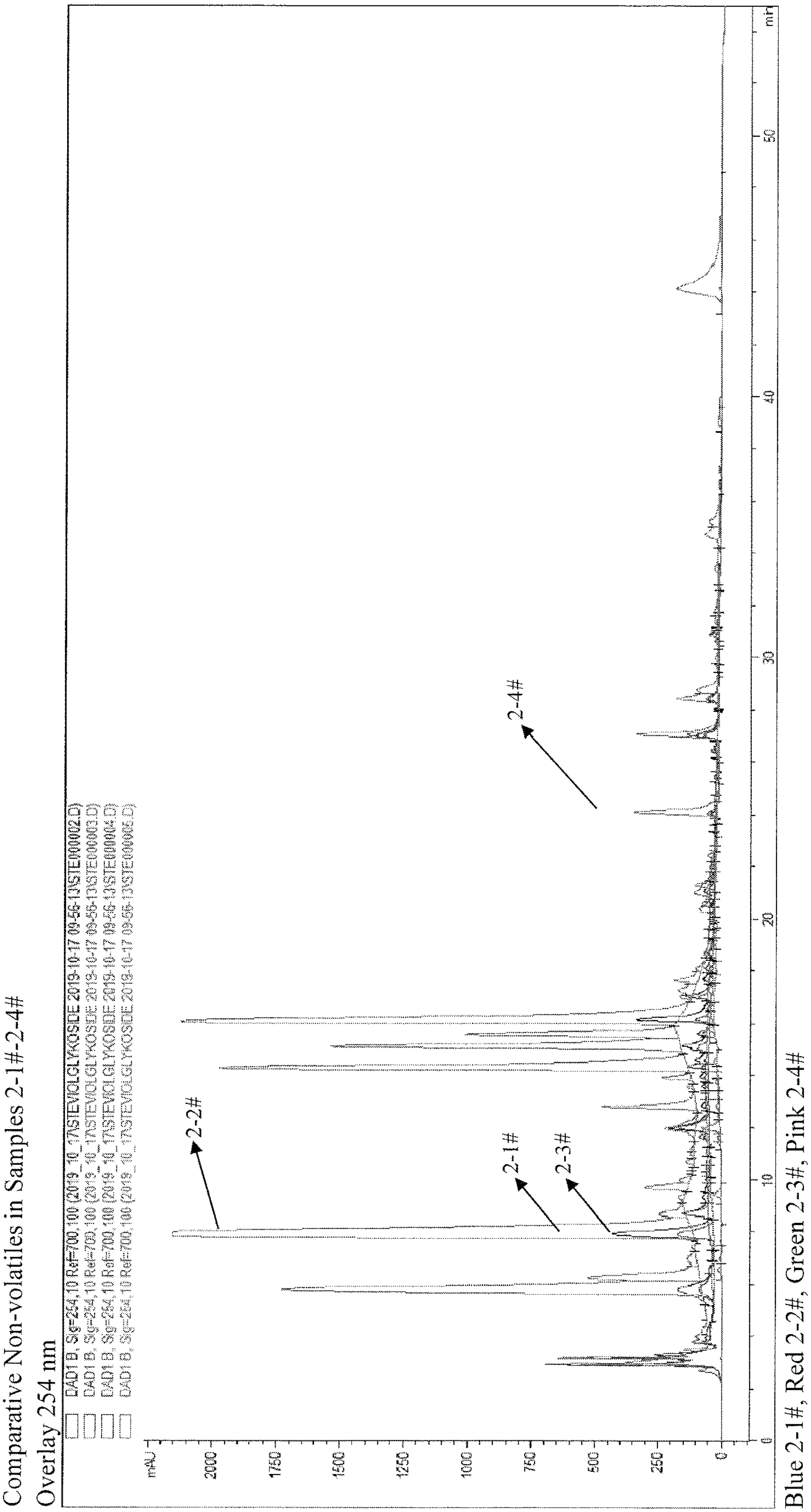
FIG. 50 shows comparative overlay of non-volatiles in Samples 2-1 #-2-4 # at 254 nm.

FIG. 50 shows comparative overlay of non-volatiles in Samples 2-1 #-2-4 # at 254 nm.

Figure 51:
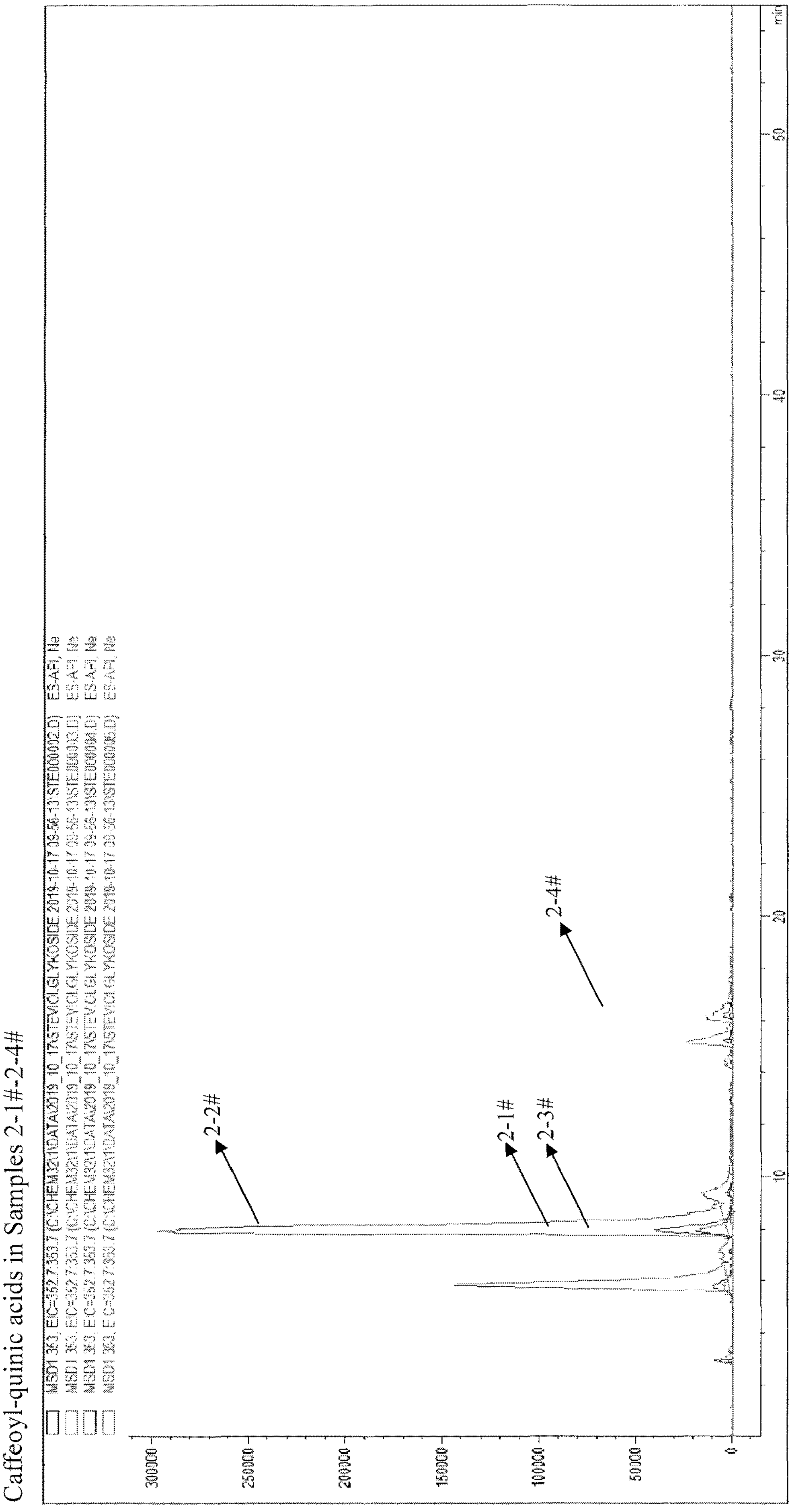
FIG. 51 shows comparative overlay of caffeoyl-quinic acids in Samples 2-1 #-2-4 #. Blue 2-1 #, Red 2-2 #, Green 2-3 #, Pink 2-4 #.

FIG. 51 shows comparative overlay of caffeoyl-quinic acids in Samples 2-1 #-2-4 #. Blue is 2-1 #, Red is 2-2 #, Green is 2-3 #, Pink is 2-4 #.

Figure 52:
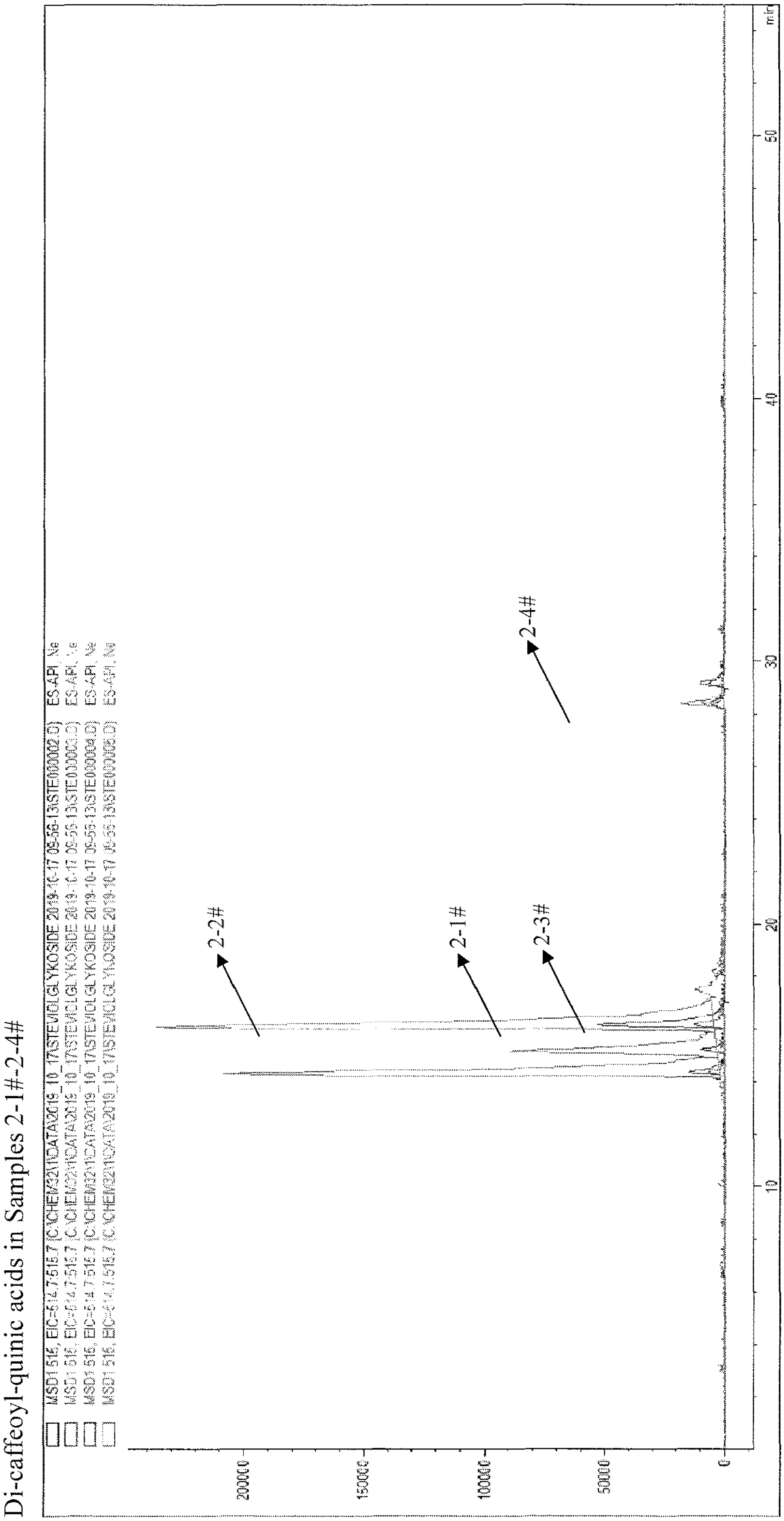
FIG. 52 shows comparative overlay of di-caffeoyl-quinic acids in Samples 2-1 #-2-4 #. Blue 2-1 #, Red 2-2 #, Green 2-3 #, Pink 2-4 #.

FIG. 52 shows comparative overlay of di-caffeoyl-quinic acids in Samples 2-1 #-2-4 #. Blue is 2-1 #, Red is 2-2 #, Green is 2-3 #, Pink is 2-4 #.

Example 22: Preparation of Stevia Flower Extract 100 g of fresh stevia flower and bud were soaked in 300 ml of deionized water and heated to 45° C. for 2 hours. The extract was separated by filtration. The filtered flower and bud were then soaked in another 300 ml of deionized water and heated to 45° C. for 2 hours. The extract was filtered and combined with the first filtrate. Spray drying gave 6.8 g of a brown powdery stevia flower extract.

Example 23: Evaluation of the Effect of Stevia Flower Extract in 50% Sugar Reduction System Material:

*Stevia* flower extract: the product of Example 22

Production Method:

Samples are prepared according to Table 23-1.

TABLE 23-1

| Solution# | Sample used | concentration sugar | Sample |
|---|---|---|---|
| 1 | Control | 10% | — |
| 2 | *Stevia* flower extract | 5% | 96.14 ppm |

Evaluation: The sugar solution (solution 1) was used as a control. A panel including 10 persons was ask to taste the solutions and made a comparison between each of solution 2 to solution 1. Panel needed to compare the sweetness, describe the taste feel and choose which one is the favorite. The result is as followed in table 23-2

TABLE 23-2

| Solution# | Taste Description | favorite Control | *Stevia* flower extract |
|---|---|---|---|
| 2 | 1. Very full body<br>2. Obvious pleasant herb and flower flavor taste<br>3. fragrant aftertaste<br>4. No bitter | 2 | 8 |

Conclusion: It can be concluded that stevia flower extract can reduce the usage of sugar by 50% or more without losing any good mouth feel, even when the total sugar equivalence (SE) reaches up to 10%. *Stevia* flower extract can give other pleasant flavor note and taste, which makes the taste of sugar reduction products better than that of full sugar version. *Stevia* extract originated from stevia flower contained raw material could be further used for glycosylation and MRP. An embodiment of stevia extract comprises stevia-flower derived substances. An embodiment of stevia extract comprises 0.01~99% stevia flower derived substances. An embodiment of glycosylated extract comprises 0.01~99% unglycosylated stevia flower derived substances. An embodiment of stevia-derived MRPs comprises 0.01~99% unreacted stevia flower derived substances.

The above description is for the purpose of teaching a person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

What is claimed is:

1. A composition comprising:

(1) a Maillard reaction product (MRP), wherein the MRP is produced with a starting mixture comprising:

(a) a *Stevia* extract; and (b) an amine donor, wherein (a) and (b) undergo a Maillard reaction; and (2) a high intensity sweetener, wherein the *Stevia* extract comprises one or more *Stevia*-derived volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, 1p-ocimene, p-cymene, 2-methyl-2-butenal, α,4-dimethyl-3-cyclohexene-1-acetaldehyde, safranal, benzaldchyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R, 5 S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, 2.3-dimethyl-1,3-Butadiene, β-myrcene, 1-limonene, p-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R, 5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde, pentadecane, hexadecane, 2,6,10,14-Tetramethylpentadecane, 2,6,11-trimethyldodecane, 2,6,10,14-tetramethylhexadecane, octadecane, heptanal, 2,3-butanedione, 2,3-pentaedione, 2-cyclohexen-1-one, 1-(6-methyl-7-oxabicyclo[4.1.0]hept-1-yl)-ethanone, 3,4,4α,5,6,7-hexahydro-1,1,4a-trimethyl-2(1H)-naphthalenone, 1-(2-methyl-1-cyclopenten-1-yl)-ethanone, [S-(R*,R*)]-2,3-butanediol, 5,8,10-undecatrien-3-ol, α,α-Dimethyl-benzenemethanol, dimethyl ester pentanedioic acid, 3,7-Dimethyl-6-nonen-1-ol acetate, methyl ester hexadecanoic acid and 6-octalactone, where in the MRP is added at a final concentration in the range of 1-2000 ppm, wherein the MRP improves a taste of the composition, and wherein the taste improvement is in terms of bitterness, sweetness onset, aftertaste, and/or sweetness linger of the high intensity sweetener.

2. The composition of claim 1, wherein the starting mixture further comprises a sugar.

3. The composition of claim 1, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, 1-hexanol, (Z)-3-hexen-1-ol, 2-ethyl-1-hexanol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, β-myrcene, 1-ethyl-4-methyl-benzene, p-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, hotrienol, beta-terpineol, α-terpineol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R, 5 S)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde, tetradecane, 2,3-dimethyl-1,3-Butadiene, β-myrcene, 1-limonene, O-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

4. The composition of claim 1, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4α,5,6,7-hexahydro-1,1,4a-trimethyl-2(1H)-naphthalenone, 1-(2-methyl-1-cyclopenten-1-yl)-ethanone, propanoic acid, butanoic acid, pentanoic acid, hexanoic acid, cyclohexanecarboxylic acid, 2-ethyl-1-hexanol, [S-(R*, R*)]-2,3-butanediol, hotrienol, p-mentha-1,5-dien-8-ol, 5,8, 10-undecatrien-3-ol, α,α-Dimethyl-benzenemethanol, phenylethyl alcohol, dimethyl ester pentanedioic acid, 3,7-Dimethyl-6-nonen-1-ol acetate, methyl ester hexadecanoic acid, 5-octalactone, 5,6,7,7a-tetrahydro-4,4,7a-trimethyl-2 (4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde.

5. The composition of claim 1, wherein the *Stevia* extract comprises one or more non-volatile NSG substances selected from the group consisting of quercetin-pentoside, kaemferol-xylosyl-glucoside, quercetin-diglucoside-rhamnoside, and quercetin-dirhamnoside in a total amount of 0.0001-99 wt % of the *Stevia* extract.

6. The composition of claim 1, wherein the *Stevia* extract is extracted from a raw material that comprises *Stevia* plant flower.

7. An orally consumable product comprising the composition of claim 1.

8. The orally consumable product of claim 7, wherein the composition is present in an amount of 1-100,000 ppm.

9. The orally consumable product of claim 7, wherein the orally consumable product is a beverage.

10. A method of improving flavor gr sweetness of an orally consumable product, comprising adding the composition of claim 1 to the orally consumable product.

11. The method of claim 10, wherein the composition is add to the orally consumable product at a final concentration of 1-100,000 ppm.

12. A composition comprising:

(1) a Maillard reaction product (MRP), wherein the MRP is produced with a starting mixture comprising:

(a) a glycosylated *Stevia* extract; and (b) an amine donor, wherein (a) and (b) undergo a Maillard reaction; and (2) a high intensity sweetener, wherein the glycosylated *Stevia* extract is derived from a *Stevia* extract comprising one or more *Stevia*-derived volatile NSG substances, wherein the composition further comprises one or more unreacted steviol glycosides, wherein the *Stevia* extract comprises one or more *Stevia*-derived volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1,3-cyclohexadiene-1-carboxaldehyde, 3-methyl-benzaldehyde, I-hexanol, (Z)-3-hexen-1-ol, 2-ethyl-1-hexanol, maltol, allyl acetate, butyl ester acetic acid, butyl ester butanoic acid, 3,7-dimethyl-1, 6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(I h-pyrrol-2-yl)-ethanone, 2-pentylfuran, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, 0-myrcene, 1-ethyl-4-methyl-benzene, p-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, hotrienol, beta-terpineol, α-terpineol, benzyl alcohol, phenylethyl alcohol, butyl ester 2-propenoic acid, 3-methyl-furan, 2-methyl-furan, 2-ethyl-furan, 2-vinyl-furan, (2R,5R)-2-methyl-5-(prop-1-en-2-yl)-2-vinyltetrahydrofuran, 2-pentyl-furan, (2R, 5 S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, 5-methyl-2-furancarboxaldehyde, 2,3-dimethyl-1,3-Butadiene, β-myrcene, 1-limonene, P-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R, 5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, I-(2-furanyl)-ethanone, 5-methyl-2-furancarboxaldehyde, pentadecane, hexadecane, 2,6,10,14-Tetramethylpentadecane, 2,6,11-trimethyldodecane, 2,6,10,14-tetramethylhexadecane, octadecane, heptanal, 2,3-butanedione, 2,3-pentaedione, 2-cyclohexen-1-one, 1-(6-methyl-7-oxabicyclo[4.1.0]hept-1-yl)-ethanone, 3,4,4a,5,6,7-hexahydro-1,1,4a-trimethyl-2(1H)-naphthalenone, 1-(2-methyl-1-cyclopenten-1-yl)-ethanone, [S-(R*,R*)]-2,3-butanediol, 5,8,10-undecatrien-3-ol, α,α-Dimethyl-benzenemethanol, dimethyl ester pentanedioic acid, 3,7-Dimethyl-6-nonen-1-ol acetate, methyl ester hexadecanoic acid, and δ-octalactone, wherein the MRP is present in the composition in a concentration in the range of 1-2000 ppm, wherein the MRP improves a taste of the composition, and wherein the taste improvement is in terms of bitterness, sweetness onset, aftertaste, and/or sweetness linger of the high intensity sweetener.

13. The composition of claim 12, wherein the starting mixture further comprises a sugar.

14. The composition of claim 12, wherein the *Stevia* extract comprises one or more volatile NSG substances selected from the group consisting of nonanal, decanal, undecanal, tetradecanal, 2-ethyl-1-hexanol, (3R,6R)-2,2,6-trimethyl-6-vinyltetrahydro-2h-pyran-3-ol, 1-decanol, 6-methyl-5-hepten-2-one, 1,3,8-p-menthatriene, p-cymene, hexanal, 2-methyl-2-butenal, 2-hexenal, 2,6,6-trimethyl-1, 3-cyclohexadiene-1-carboxaldehyde, 3-methyl-benzaldehyde, 1-hexanol, (Z)-3-hexen-1-ol, 2-ethyl-1-hexanol, maltol, allyl acetate, butyl ester acetic acid, butyl ester butanoic acid, 3,7-dimethyl-1,6-octadien-3-ol formate, dimethyl ester butanedioic acid, 5,6,7,7a-tetrahydro-4,4,7a-trimethyl-2(4H)-benzofuranone, α,α-dimethyl-benzenemethanol acetate, 5-butyldihydro-2(3h)-furanone, tetrahydro-6-propyl-2h-pyran-2-one, butyrolactone, 2,6,6-trimethyl-2-cyclohexene-1,4-dione, acetophenone, (E)-6,10-dimethyl-5,9-undecadien-2-one, 1-(1h-pyrrol-2-yl)-ethanone, 2-pentylfuran, propanoic acid, butanoic acid, pentanoic acid, hexanoic acid, cyclohexanecarboxylic acid, heptanoic acid, tetradecane, 1-limonene, terpinolene, E,E-6-dimethyl-1,3,5,7-octatetraene, bornylene, cyprotene, pimyrcene, l-ethyl-4-methyl-benzene, P-ocimene, p-cymene, 2-methyl-2-butenal, α,4-dimethyl-3-cyclohexene-1-acetaldehyde, safranal, benzaldehyde, 2-methyl-1-hepten-6-one, 6-methyl-5-hepten-2-one, 2,3-dihydro-3,3,5,6-tetramethyl-1h-inden-1-one, 9-dodecyn-1-ol, 2-hydroxy-α,α,4-trimethyl-3-cyclohexene-1-methanol, (Z)-Linalool oxide, hotrienol, beta-terpineol, α-terpineol, phenylethyl alcohol, butyl ester 2-propenoic acid, 3-methyl-furan, 2-methyl-furan, 2-ethyl-furan, 2-vinylfuran, (2R,5R)-2-methyl-5-(prop-1-en-2-yl)-2-vinyltetrahydrofuran, 2-pentyl-furan, (2R,5S)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde, tetradecane, 2,3-dimethyl-1,3-Butadiene, 1p-myrcene, 1-limonene, O-ocimene, E,E-2,6-dimethyl-1,3,5,7-octatetraene, bornylene, cyprotene, α,4-dimethyl-3-cyclohexene-1-acetaldehyde, 2-methyl-1-hepten-6-one, methyl vinyl ketone, 2-hydroxy-α,α,4-trimethyl-3-cyclohexene-1-methanol, methyl ester acetic acid, cis-3-hexenylpyruvate, 3-methylfuran, 2-methylfuran, 2,5-dimethylfuran, 2,3-dihydrofuran, 2-vinylfuran, (2R,5R)-2-methyl-5-(prop-1-en-2-yl)-2-vinyltetrahydrofuran, 2-pentylfuran, (2R,5R)-2-methyl-5-(prop-1-en-2-yl)-2-vinyltetrahydrofuran, cis-5-ethenyltetrahydro-α,α,5-trimethyl-2-furanmethanol, 1-(2-furanyl)-ethanone, 5-methyl-2-furancarboxaldehyde.

15. The composition of claim 12, wherein the *Stevia* extract comprises one or more volatile NSG substances selected from the group consisting of tetradecane, pentadecane, hexadecane, 2,6,10,14-Tetramethylpentadecane, heptadecane, 2,6,11-trimethyldodecane, 2,6,10,14-tetramethylhexadecane, octadecane, β-myrcene, 1-limonene, β-ocimene, bornylene, cyprotene, hexanal, heptanal, 2-hexenal, nonanal, α,4-dimethyl-3-cyclohexene-1-acetaldehyde, safranal, benzaldehyde, 2,3-butanedione, 2,3-pentanedione, 2-cyclohexen-1-one, 1-(6-methyl-7-oxabicyclo[4.1.0]hept-1-yl)-ethanone, 3,4,4α,5,6,7-hexahydro-1,1,4a-trimethyl-2(1H)-naphthalenone, 1-(2-methyl-1-cyclopenten-1-yl)-ethanone, propanoic acid, butanoic acid, pentanoic acid, hexanoic acid, cyclohexanecarboxylic acid, 2-ethyl-1-hexanol, [S-(R*,R*)]-2,3-butanediol, hotrienol, p-mentha-1,5-dien-8-ol, 5,8,10-undecatrien-3-ol, α,α-Dimethyl-benzenemethanol, phenylethyl alcohol, dimethyl ester pentanedioic acid, 3,7-Dimethyl-6-nonen-1-ol acetate, methyl ester hexadecanoic acid, 8-octalactone, 5,6,7,7a-tetrahydro-4,4,7a-trimethyl-2(4H)-benzofuranone, 3-methylfuran, 2-methylfuran, 2,5-dimethylfuran, 2,3-dihydrofuran, 2-vinylfuran, (2R,5R)-2-Methyl-5-(prop-1-en-2-yl)-2-vinyltetrahydrofuran, 2-pentylfuran, (2R,5S)-2-methyl-5-(prop-1-en-2-yl)-2-vinyltetrahydrofuran, cis-5-ethenyltetrahydro-α,α,5-trimethyl-2-furanmethanol, furfural, 1-(2-furanyl)-ethanone, and 5-methyl-2-furancarboxaldehyde.

16. The composition of claim 12, wherein the *Stevia* extract comprises one or more non-volatile NSG substances selected from the group consisting of quercetin-pentoside, kaempferol-xylosyl-glucoside, quercetin-diglucoside-rhamnoside, and quercetin-dirhamnoside in a total amount of 0.0001-99 wt.

17. The composition of claim 12, wherein the *Stevia* extract is extracted from a raw material that comprises *Stevia* plant flower.

18. An orally consumable product comprising the composition of claim 12.

19. The orally consumable product of claim 18, wherein the composition is present in an amount of 1-100,000 ppm.

20. The orally consumable product of claim 18, wherein the orally consumable product is a beverage.

21. A method of improving flavor or sweetness of an orally consumable product, comprising adding an effective amount of the composition of claim 12 to the orally consumable product.

22. The method of claim 21, wherein the composition is add to the orally consumable product at a final concentration of 1-100,000 ppm.

23. The composition of claim 1, wherein the high intensity sweetener is a high intensity natural sweetener.

24. The composition of claim 23, wherein the high intensity natural sweetener is selected from the group consisting of sweet tea extracts, stevia extracts, swingle extracts, sweet tea components, steviol glycosides, mogrosides, glycosylated sweet tea extracts, glycosylated stevia extracts, glycosylated swingle extracts, glycosylated sweet tea glycosides, glycosylated steviol glycosides, glycosylated mogrosides, licorice extracts, and glycyrrhizic acid.

25. The composition of claim 1, wherein the high intensity sweetener is a high intensity synthetic sweetener.

26. The composition of claim 25, wherein the high intensity synthetic sweetener is selected from the group consisting of sucralose, aspartame, acesulfame-K, neotame, saccharin and aspartame, glycyrrhizic acid ammonium salt, sodium cyclamate, saccharin, advantame, and neohesperidin dihydrochalcone (NHDC).

27. The composition of claim 25, wherein the high intensity synthetic sweetener is sucralose.

28. The composition of claim 25, wherein the high intensity synthetic sweetener is acesulfame-K.

29. The composition of claim 12, wherein the high intensity sweetener is a high intensity natural sweetener.

30. The composition of claim 29, wherein the high intensity natural sweetener is selected from the group consisting of sweet tea extracts, stevia extracts, swingle extracts, sweet tea components, steviol glycosides, mogrosides, glycosylated sweet tea extracts, glycosylated stevia extracts, glycosylated swingle extracts, glycosylated sweet tea glycosides, glycosylated steviol glycosides, glycosylated mogrosides, licorice extracts, and glycyrrhizic acid.

31. The composition of claim 12, wherein the high intensity sweetener is a high intensity synthetic sweetener.

32. The composition of claim 31, wherein the high intensity synthetic sweetener is selected from the group consisting of sucralose, aspartame, acesulfame-K, neotame, saccharin and aspartame, glycyrrhizic acid ammonium salt, sodium cyclamate, saccharin, advantame, and neohesperidin dihydrochalcone (NHDC).

33. The composition of claim 31, wherein the high intensity synthetic sweetener is sucralose.

34. The composition of claim 31, wherein the high intensity synthetic sweetener is acesulfame-K.

* * * * *